US012111040B2

(12) United States Patent
Hoffman et al.

(10) Patent No.: US 12,111,040 B2
(45) Date of Patent: Oct. 8, 2024

(54) SMALL APERTURE LIGHT EMITTING DIODE LED LIGHTING

(71) Applicant: Wangs Alliance Corporation, Port Washington, NY (US)

(72) Inventors: Jonathan Ian Hoffman, Bayshore, NY (US); Dunping Hu, Blaine, MN (US); Qianxiang Wang, Great Neck, NY (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/530,738

(22) Filed: Dec. 6, 2023

(65) Prior Publication Data

US 2024/0255128 A1 Aug. 1, 2024

Related U.S. Application Data

(60) Provisional application No. 63/441,514, filed on Jan. 27, 2023, provisional application No. 63/454,817, (Continued)

(51) Int. Cl.
*F21V 21/04* (2006.01)
*F21V 7/00* (2006.01)
(Continued)

(52) U.S. Cl.
CPC .......... *F21V 21/049* (2013.01); *F21V 7/0058* (2013.01); *F21V 7/10* (2013.01); (Continued)

(58) Field of Classification Search
CPC ........ F21V 21/049; F21V 7/0058; F21V 7/10; F21V 21/096; F21V 29/713; F21V 19/04; F21Y 2115/10; F21S 8/026; F21K 9/20
See application file for complete search history.

(56) References Cited

U.S. PATENT DOCUMENTS 8,070,328 B1 12/2011 Knoble et al.
8,106,569 B2 1/2012 Gershaw
(Continued)

FOREIGN PATENT DOCUMENTS

| | | | |
|---|---|---|---|
| CN | 104428580 | 3/2015 | |
| GB | 2531383 * | 4/2016 | ................ F21S 8/02 |

(Continued)

OTHER PUBLICATIONS

KR 1020180024690, Mar. 8, 2018, Dae Won Kong, English translation (Year: 2018).*

(Continued)

*Primary Examiner* — Peggy A Neils
(74) *Attorney, Agent, or Firm* — Weiss & Arons LLP

(57) ABSTRACT

Apparatus and methods for lighting. The apparatus may include a removable recess lighting assembly. The lighting assembly may include a light-emitting diode ("LED") light source. The LED light source may include an LED. The lighting assembly may define a central axis. The apparatus may include a heat sink. The heat sink may be configured to be mounted in a structure. The heat sink may be configured to retain the lighting assembly. The heat sink may be configured to release the lighting assembly in response to a translation of the lighting assembly along the central axis. The translation may be a translation without a rotation of the light assembly about the central axis. In operation, the lighting assembly may be serviced without causing damage to the structure in which the apparatus is mounted. The lighting assembly may be removed through a defined aperture in the apparatus.

29 Claims, 79 Drawing Sheets

Related U.S. Application Data filed on Mar. 27, 2023, provisional application No. 63/529,133, filed on Jul. 26, 2023, provisional application No. 63/529,426, filed on Jul. 28, 2023.

(51) Int. Cl.

| | |
|---|---|
| ***F21V 7/10*** | (2006.01) |
| ***F21V 21/096*** | (2006.01) |
| ***F21V 29/71*** | (2015.01) |
| ***F21Y 115/10*** | (2016.01) |

(52) U.S. Cl.

CPC .......... *F21V 21/096* (2013.01); *F21V 29/713* (2015.01); *F21Y 2115/10* (2016.08)

(56) References Cited

U.S. PATENT DOCUMENTS

| | | | | |
|---|---|---|---|---|
| 8,220,970 | B1 | 7/2012 | Khazi et al. | |
| 8,926,133 | B2 | 1/2015 | Booth | |
| 10,139,060 | B1 | 11/2018 | Erdener et al. | |
| 10,151,461 | B2 | 12/2018 | Petzold | |
| 10,180,218 | B2 | 1/2019 | Hierzer | |
| 10,234,091 | B1 | 3/2019 | Chaimberg et al. | |
| 10,344,952 | B2 | 7/2019 | Georgiev | |
| 10,900,654 | B1 | 1/2021 | Nguyen et al. | |
| 10,920,964 | B2 | 2/2021 | Vidakovic | |
| 11,226,087 | B2 * | 1/2022 | Wickham .............. | F21V 29/713 |
| 11,402,081 | B1 | 8/2022 | Hargroder et al. | |
| 11,428,398 | B1 | 8/2022 | Portinga et al. | |
| 11,441,768 | B1 | 9/2022 | Portinga et al. | |
| 11,466,848 | B1 | 10/2022 | Portinga et al. | |
| 2017/0184285 | A1 | 6/2017 | Visser et al. | |
| 2017/0314750 | A1 | 11/2017 | Feldman | |
| 2023/0100581 | A1 * | 3/2023 | Cohen ..................... | F21V 21/04 362/341 |
| 2023/0111632 | A1 * | 4/2023 | Cohen ..................... | F21V 7/041 362/404 |
| 2023/0146822 | A1 | 5/2023 | Hierzer | |
| 2023/0280019 | A1 | 9/2023 | Wickham et al. | |

FOREIGN PATENT DOCUMENTS

| | | | | |
|---|---|---|---|---|
| KR | 1020180024690 | * | 3/2018 | .............. F21S 8/026 |
| WO | WO 2010097733 | * | 9/2010 | ............ F21V 21/096 |

OTHER PUBLICATIONS

"CSL Whisper Brochure," https://csllighting.com/uc/wr/img-wmedia/WHISPER%20BROCHURE.pdf, Troy-CSL Lighting, Inc., Nov. 2, 2020.
"Introducing: The Little Ones Brochure," USAI Lighting, 2022.
"Apure: Minus One Cutsheet," www.apurelighting.com, Apure Distribution, LLC, Apr. 12, 2022.
"Mini LED Downlight: MD1LG2 (Rd) Recessed Housing and Trim, Low Voltage," Acuity Brands Lighting, Inc., May 19, 2020.
"Juno Mini LED Downlights and Gimbals," www.acuitybrands.com, Acuity Brands Lighting, Inc., 2016.
"MLV 100W 24V Power Supply: Remote Power Supply," www.apurelighting.com, Apure Holding, LLC, 2021.
"Minus Two: Minimal Recessed," www.apurelighting.com, Apure Holding, LLC, Dec. 3, 2021.
"Photometric Test Data for Apure Sample," Apr. 27, 2022.
"Minus One: Minimal Recessed," www.apurelighting.com, Apure Holding, LLC, Dec. 3, 2021.
"Constant Current Electronic 0-10V Dimmable Programmable LED Driver, AFLEX Series Compact," Magnitude Lighting, www.MagnitudeInc.com, Retrieved on Jan. 18, 2023.
"Cost Estimate for: Minus 2 low voltage mini recessed downlight. 14W 3000K, 90CRI, 20 degree flood and Universal Bracket for Mounting of Minus 2," Light Up Your Life, www.info@lights-sarasota.com, Feb. 18, 2022.
"M-Series 24V DC Installation Guide 20W—300W Magnetic DC Drivers (20W—96W are Class 2)," www.MagnitudeInc.com, Jul. 1, 2021.
"Minus Special Installation," Apure Distribution LLC, Jul. 2019.
"Instruction Manual: Recessed Luminaitre, Minus 1," Apure Lizenz—und Handelsgesellschaft mbH, 2019.
"MLV 100W 24V Power Supply: Remote Power Supply," Apure Holding LLC, 2021.
"Minus Custom Materials," Apure Distribution LLC, May 2019.
"Apure Minus One: Installation Sequence Using the Universal Drywall Bracket," Apure Distribution LLC, May 2019.
"Universal Drywall Bracket," Apure Distribution LLC, Apr. 2018.
"1", 2", 3", 4" IC NC Line Drawings," CSL Acrobat Downlights, Retrieved on Jan. 26, 2023.
"Installation Guide: Acrobat Downlight 1", 2", 3", 4" IC, NC, RM Models," Creative Systems Lighting, A Division of Troy—CSL Lighting, Inc., Sep. 26, 2022.
"Installation Guide: Acrobat Downlight 1", 2", 3", 4" Shallow Plenum (SIC, SNC) Models," Creative Systems Lighting, A Division of Troy—CSL Lighting, Inc., Sep. 26, 2022.
"Acrobat 1" LED Downlight Shallow Plenum A1-SIC, A1-SNC," Creative Systems Lighting, A Division of Troy—CSL Lighting, Inc., Oct. 14, 2022.
"Acrobat 1" LED Downlight A1-IC, Al-NC, A1-RM, A1-SIC, A1-SNC Specification Sheet," Creative Systems Lighting, A Division of Troy—CSL Lighting, Inc., Jan. 9, 2023.
"The Pinnacle of Performance and Precision 1", 2", 3", 4" LED Recessed Downlight Brochure," Creative Systems Lighting, A Division of Troy—CSL Lighting, Inc., Oct. 14, 2022.
"CSL Whisper FAQ," https://csllighting.com/uc/wr/img-wmedia/CSL%20Whisper%20FAQ.pdf, Nov. 25, 2020.
"½" Trimless LED Downlight Installation Guide," Creative Systems Lighting, A Division of Troy—CSL Lighting, Inc., 2020.
"Whisper ½" Trimless LED Downlight WS-IC Specification Sheet," Creative Systems Lighting, A Division of Troy—CSL Lighting, Inc., Mar. 8, 2021.
"The OAK™ System 1" Miniature LED Downlights with over 600 Lumens Delivered," www.ecolighting.com, Retrieved on Jan. 6, 2023.
"1" Round Recessed Oak™ Downlight," Elco Lighting, Dec. 21, 2021.
"High Center Beam Round Pinhole Downlight 1"," Gotham Architectural Downlighting, Apr. 27, 2021.
"1 Inch Light Emitting Surface Round Shape Miniature LED Recessed Downlight: Specification Sheet," Liteharbor Lighting Technology Co., Ltd., Jul. 2019.
"1 Inch Light Emitting Surface Square Shape Miniature LED Recessed Downlight: Specification Sheet," Liteharbor Lighting Technology Co., Ltd., Jul. 2019.
"Super Thin LED Mini Spotlight: Specification Sheet," Liteharbor Lighting Technology Co., Ltd., Jul. 2017.
"X-Light-E II 1 Inch Super Thin LED Mini Spotlight: Specification Sheet," Liteharbor Lighting Technology Co., Ltd., May 2022.
"X-Light III LED Wall Washer Mini Spotlight: Specification Sheet," Liteharbor Lighting Technology Co., Ltd., Mar. 2022.
"The LittleOnes Micro-M1RD Hight Output 1.25" Round Downlight with One Remote Driver Per Fixture Specification Sheet," USAI, LLC, Jun. 23, 2023.
"The LittleOnes Micro: Installation Instructions NC Housing Millwork M1RDM, M1SDM, M1RWM, M1SWM Ceiling Cut Out Templates," USAI, LLC, Mar. 11, 2022.
"The LittleOnes Micro: Installation Instructions NC Housing Trimless M1RDL, M1SDL, M1RWL, M1SWL Ceiling Cut Out Templates," USAI, LLC, Mar. 11, 2022.
"The LittleOnes Zepto: Installation Instructions: Z1RD, Z1RW," USAI, LLC, Feb. 18, 2022.
"Luminus Dynamic COB Four Channel RGBW Tunable Preliminary Datasheet," Luminus, Inc., Retrieved on Jun. 27, 2022.
"SFT-40-WxS, WxE High Power SFT Product Datasheet," Luminus Devices, Inc., Retrieved on Jun. 27, 2022.
"Luminus Ecosystem," Luminus, Inc., Retrieved on Jun. 27, 2022.

(56) References Cited

OTHER PUBLICATIONS

"The LittleOnes Micro T24-M1RA-T24 High Output 1.25" Round Adjustable with One Remote Driver per Fixture Specification Sheet," USAI, LLC, Jun. 23, 2022.
"The LittleOnes Micro-M1SD High Output 1.25" Square Downlight with One Remote Driver Per Fixture Specification Sheet," USAI, LLC, Jun. 23, 2022.
"The LittleOnes Zepto Service Instructions Z1RD, Z1RW," USAI, LLC, 2022.
"The LittleOnes Zepto-Z1RD 1" Round Downlight Specification Sheet," USAI, LLC, Jan. 19, 2022.
"The LittleOnes Zepto-Z1RW 1" Round Wall Wash Specification Sheet," USAI, LLC, Jan. 19, 2022.
"The LittleOnes Zepto-Z1RW High Output 1" Round Wall Wash with One Remote Driver Per Fixture Specification Sheet," USAI, LLC, Jun. 22, 2022.
Uncertified Transcription and Stills of Video "CSL Whisper Downlights Installation Guide," Original date unknown, Retrieved on Feb. 24, 2022.
Photos of "CSL Whisper," Photos taken Feb. 17, 2021.
Photos of "Apure," Photos taken Apr. 12, 2022.
"Installation Instruction Aether 2" Shallow Recessed Housing HR-2LED-HI3A, WAC Lighting, Dec. 2021.
"Installation Instruction Aether 3.5" Shallow Recessed Housing HR-3LED-H17A, WAC Lighting, Mar. 6, 2018.

* cited by examiner

SECTION 7-7

5300

24V Voltage and Output Current Control

SMALL APERTURE LIGHT EMITTING DIODE LED LIGHTING

CROSS-REFERENCE TO RELATED APPLICATIONS

This is a nonprovisional of U.S. Provisional Application No. 63/441,514, filed on Jan. 27, 2023, U.S. Provisional Application No. 63/454,817, filed on Mar. 27, 2023, U.S. Provisional Application No. 63/529,133 filed on Jul. 26, 2023 and U.S. Provisional Application No. 63/529,426, filed on Jul. 28, 2023.

BACKGROUND

Recessed lighting typically requires openings in structures for installation and servicing of light fixtures. Typically, the openings are sized to accommodate removal and replacement of light bulbs and perhaps associated reflectors and trims. In proportion to a typical space in which the fixtures are installed, the openings are often large enough to allow glare. The glare, and sometimes the openings themselves may detract from architectural features of the space. Fixtures that use small-scale light sources, such as light-emitting diodes ("LEDs"), have become popular. The light sources do not require openings that are as large as the typical recessed lighting openings. However, LED fixtures may have ancillary components that are larger than the light sources, and thus would require openings larger than those required by the light sources alone, thus diminishing any aesthetic benefit that could be achieved with smaller openings sized for the LED light sources.

It would therefore be desirable to provide improved apparatus and methods for a removable recess lighting assembly.

Figure 1:
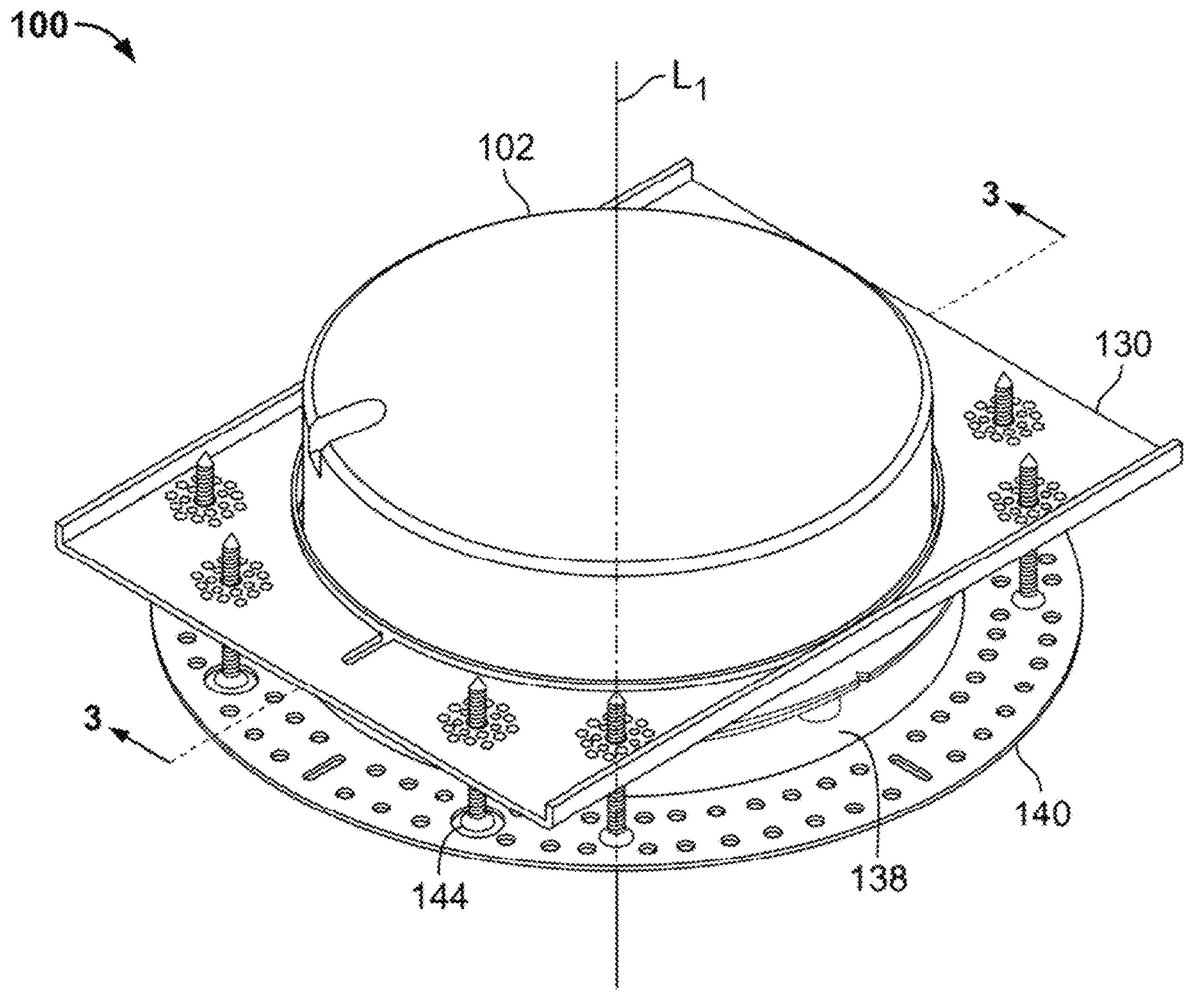
FIG. 1 shows a view of illustrative apparatus in accordance with principles of the invention.

The leftmost digit (e.g., “L”) of a three-digit reference numeral (e.g., “LRR”), and the two leftmost digits (e.g., “LL”) of a four-digit reference numeral (e.g., “LLRR”), generally identify the first figure in which a part is called-out.

DETAILED DESCRIPTION

Apparatus and methods for lighting are provided.

The apparatus may include a light fixture. The light fixture may include a removable recess lighting assembly. The lighting assembly may include a light-emitting diode (“LED”) light source. The LED light source may include an LED. The LED light source may include a plurality of LEDs. The lighting assembly may define a central axis. The lighting assembly may include a light engine base. The lighting assembly may include an LED brace. The brace may be fastened to the base. The LED light source may be disposed in between the light engine base and the LED brace. The lighting assembly may be removable. The lighting assembly may be removable through an aperture. The aperture may be defined in the light fixture.

The light fixture may include a heat sink. The heat sink may be mounted in a structure.

Table 1 lists illustrative structures.

TABLE 1

| Illustrative structures. Illustrative structures |
|---|
| Ceiling |
| Wall |
| Roof |
| Other suitable structures |

The structure may include a panel. The heat sink may be disposed in a housing. The housing may be mounted on a first side of the panel. In operation, the LED light source may emit light to a second side of the panel.

Table 2 lists illustrative panel materials.

TABLE 2

| Illustrative panel materials. Illustrative panel materials |
|---|
| Plaster |
| Sheet rock |

TABLE 2-continued

| Illustrative panel materials. Illustrative panel materials |
|---|
| Wood |
| Other suitable panel materials |

The light fixture may include a spackle plate. The aperture may be defined in the spackle plate. The lighting assembly may be removeable through the aperture defined in the spackle plate. The spackle plate may be disposed flush against the second side of the panel. The spackle plate may retain a surface treatment.

Table 3 lists illustrative surface treatments.

TABLE 3

| Illustrative surface treatments. Illustrative surface treatments |
|---|
| Spackle |
| Paint |
| Joint Putty |
| Wallpaper |
| Other suitable surface treatments |

In operation, the lighting assembly may be serviced without causing damage to the structure in which the light fixture is mounted. The lighting assembly may be removed without causing damage to the panel included in the structure. In new construction, the light fixture may be mounted before the structure is built. After the construction is done, the lighting assembly may be removable by a linear pull along the central axis.

The lighting assembly may be releasably connected to the light fixture. The lighting assembly may be magnetically connected to the light fixture. Removing the lighting assembly may not cause damage to the structure. The lighting assembly may be removed without causing damage to the surface treatment. The lighting assembly may be removed through the aperture in the light fixture. The lighting assembly may be removed through the aperture in the spackle plate. The lighting assembly may be removed with a tool. The tool may remove the lighting assembly without damaging the structure.

The lighting assembly may be removable without removal of the spackle plate. The heat sink may be not removable through the aperture in the spackle plate. The heat sink may be not removable through the aperture in the light fixture.

Table 4 lists illustrative ranges which may include the ratio of the size of the diameter of the aperture and the size of the diameter of the heat sink.

TABLE 4

| Illustrative diameter ratios. Illustrative diameter ratios |
|---|
| 0.1-0.2 |
| 0.2-0.3 |
| 0.3-0.4 |
| 0.4-0.5 |
| 0.5-0.6 |
| 0.6-0.7 |
| 0.7-0.8 |
| 0.8-0.9 |
| 0.9-0.99 |

TABLE 4-continued

| Illustrative diameter ratios. Illustrative diameter ratios |
|---|
| Any other suitable diameter ratio |

The heat sink may include a docking pad. The docking pad may include a magnet. The heat sink may retain the lighting assembly. The light fixture may include a magnetically dockable lighting assembly. The lighting assembly may be docked to the pad. The lighting assembly may be docked to the pad by insertion of the lighting assembly into the aperture.

The lighting assembly may be magnetically retained by the heat sink. The light engine base may include a material that is configured to magnetically connect to the heat sink. The magnetic material may form a ring.

Table 5 lists illustrative materials.

TABLE 5

| Illustrative magnetic materials that may be included in the ring. Illustrative magnetic materials that may be included in the ring |
|---|
| Permanent magnetic material |
| Electromagnetic material |
| Ferromagnetic material |
| Paramagnetic material |
| Diamagnetic material |
| Other suitable materials |

The heat sink may release the lighting assembly. The heat sink may release the lighting assembly in response to a translation of the lighting assembly along the central axis. The translation may be a translation without a rotation of the light assembly about the central axis.

The LED and the heat sink may be configured such that the heat sink may draw heat from the LED. The heat sink may draw heat from the LED when the lighting assembly is magnetically mounted in the heat sink. The light fixture may include thermal adhesive. The thermal adhesive may provide or enhance thermal communication between the LED light source and the light engine base. The thermal adhesive may enable the heat transfer from the LED to the heat sink.

The light fixture may include a reflector. The reflector may be positioned to form a beam of light emitted by the LED light source. The reflector may engage the spackle plate. The reflector may include a trim. The trim may releasably engage the reflector. The trim may engage the spackle plate. In a cross-sectional view transverse to the central axis, the trim may have a round shape. In a cross-sectional view transverse to the central axis, the trim may have a rectangular shape. In a cross-sectional view transverse to the central axis, the trim may have any other suitable shape.

The apparatus may include a tool for removing the lighting assembly from the heat sink. The tool may include a handle. The handle may include a first extension member. The tool may include a tubular base. The tubular base may include a second extension member. The tubular base may be releasably attached to the handle. The tubular base may be threadingly attached to the handle.

The first extension member may detach the reflector from the light fixture. The first extension member may disengage the reflector from the spackle plate. The first extension member may disengage the trim from the spackle plate.

The second extension member may engage with a receptacle in the lighting assembly. The second extension member may release the lighting assembly. The releasing of the lighting assembly may be along the central axis. The second extension member may release the lighting assembly in response to a force from a user. The force may be a linear force.

The light fixture may include one or more thermally insulated bushings. The light fixture may include one or more thermally insulated gaskets. The light fixture may include one or more spacers. The one or more thermally insulated bushings, thermally insulated gaskets, and spacers may reduce an amount of heat conducted from the LED light source to the spackle plate.

The light fixture may include a power lead. The power lead may provide power to the LED light source. The power lead may include a connector. The connector may be attached at an end of the power lead. The end of the power lead may be drawn below the spackle plate when the light assembly is removed from the heat sink.

The light fixture may include a lighting controller. The lighting controller may provide to the LED included in the light source a dimming signal. The lighting controller may provide to the LED included in the light source a color control signal. The lighting controller may provide to the LED included in the light source a dim-to-warm correlation signal.

The lighting assembly may include the beam adjusting lens. The beam adjusting lens may change an angle of a beam of light from the LED light source.

The LED light source may be configured as a downlight. The LED light source may be configured as a wall-wash light. The LED light source may be configured as any suitable kind of light.

The light fixture may include a power supply. The power supply may be disposed outside the housing of the heat sink. The power supply may be disposed inside the housing of the heat sink.

The power supply may provide power for generating light from the LEDs included in the light fixture. The power supply may be an enclosed-electronics power supply. The power supply may include an integrated wiring compartment. The wiring compartment may support streamlined installation.

The power supply may include a plurality of power output channels. Each of the output power channels may include circuitry. Each of the output channels may represent a branch of the power supply. The plurality of output power channels may be controlled by a single controller.

The power supply may include a plurality of LED modules. Each of the LED modules may be light fixtures. Each LED module may include a plurality of LED light sources. Each LED module may correspond to one of the power output channels. Each power output channel may provide a current to a corresponding LED module. Each power output channel may provide a current to a corresponding light fixture. The current may be a regulated current.

The power output channels may include output terminals. The power supply may include six output terminals. The terminals may include quick connectors for conductors from 24-12 AWG or any other suitable size. The quick connectors may include solid, stranded, fine-stranded material. The quick connectors may include any other suitable material conductors.

The connectors may include a lever. A user may pull the lever up, insert a conductor and push the lever back down to make electrical contact between the terminal and the conductor.

The power supply may include over-voltage protection. The power supply may include short circuit protection. The power supply may include overcurrent protection. The power supply may include an overcurrent protection circuit. The overcurrent protection circuitry may protect the power supply from overcurrent, over-voltage, and short circuit conditions.

The power supply may include a voltage conditioning circuit. The voltage conditioning circuit may receive an input voltage. The voltage conditioning circuit may receive an input voltage of 120-277 VAC. The input voltage may be a line voltage. The voltage conditioning circuit may receive the line voltage from a power source. The voltage conditioning circuit may condition the line voltage.

An LED module may have an operating voltage. The light fixture may have an operating voltage. The voltage conditioning circuit may generate a boosted voltage from the line voltage. The boosted voltage may be greater than the line voltage. The line voltage may be boosted using boost circuitry. The boost circuitry may be included in the voltage conditioning circuit. The line voltage may be boosted to stabilize the current. The boosted voltage may be transmitted through inductor-inductor-capacitor ("LLC") circuitry. The LLC circuitry may also be included in the voltage conditioning circuit. The LLC circuitry may include a transformer. The transformer may reduce the boosted voltage. The voltage conditioning circuit may provide to the power output channels a conditioned voltage. The conditioned voltage may be greater than the operating voltage The conditioned voltage may be transmitted to the overcurrent protection circuit.

The overcurrent protection circuit may receive the conditioned voltage. The conditioned voltage may be a DC voltage. The conditioned voltage may be a constant voltage. The conditioned voltage may be a constant DC voltage. The conditioned voltage may be any suitable conditioned voltage. The overcurrent protection circuit may use the conditioned voltage. The overcurrent protection circuit may limit the conditioned voltage. The overcurrent protection circuit may use the conditioned voltage to feed to each of the power output channels output current.

A power output channel may provide regulated current to an LED module at the operating voltage. A power output channel may provide regulated current to a connected light fixture at the operating voltage. The operating voltage may be lower than the voltage received by the overcurrent protection circuit. The power output channels may include step-down circuitry. The step-down circuitry may include a buck converter. The step-down circuitry may further reduce the conditioned voltage. The step-down circuitry may reduce the conditioned voltage using a transformer. The step-down circuitry may reduce the conditioned voltage using any suitable voltage step-down circuitry components. The stepped-down voltage may be used to provide the regulated current to the LED modules. The stepped-down voltage may be used to provide regulated current to the connected light fixtures.

In total, the output current of each of the power output channels may have a power that is no greater than a predetermined power limit. The predetermined power limit may correspond to an Underwriters Laboratories ("UL") Class 2 classification. A UL Class 2 classification may ensure that the output current is considered safe to touch and does not require primary safety protection at the LED level. The power supply may be a Class 2 UL listed power supply. The power supply may be a cUL listed power supply.

The predetermined power limit may be factory set. The predetermined power limit may be non-user selectable. The predetermined limit may be nominally 96 W. The predetermined limit may be any other suitable value.

Table 6 lists illustrative ranges of maximum total power output.

TABLE 6

| Illustrative ranges of maximum total power output.<br>Illustrative total power output |
| --- |
| <90 W |
| 91-95 W |
| 96-100 W |
| >100 W |
| Other suitable ranges of maximum total power output |

The plurality of LED modules may include a number of operational LED modules. The number may be user selectable. The number may be limited by the predetermined power limit. The plurality of LED modules may be a plurality of light fixtures. A single LED module may be connected to a single power output channel. A series of LED modules may be connected to a single power output channel. The series of LED modules may include a user selectable number of LED modules. The series of LED modules may be limited by the predetermined power limit. The plurality of power output channels may have a total maximum allowable power output. Based on the total maximum allowable power output, the power limit for each power output channel may be different. The power limit for each power output channel may depend on an amount of LED modules that are connected to each power output channel. The maximum allowable power for each of power output channel may be the maximum allowable power of the power output channels divided by the number of connected LED modules.

The plurality of LED modules may include a first LED module. The plurality of LED modules may include a second LED module. The first LED module and the second LED module may receive power from the same power output channel. The first LED module and the second LED module may be connected in series with each other. The first LED module and the second LED module may be connected electrically in parallel with each other.

The overcurrent protection circuit may prevent user exposure, from the LED modules in aggregate, to power greater than the predetermined limit. The protection may occur independent of the number of LED modules connected to the power output channels.

The power supply may provide a dimming function to adjust the brightness of the LEDs. The power supply may be compatible with one or more of a TRIAC dimmer, an ELV dimmer, a 0-10V dimmer, and any other suitable dimmer.

Each of the LED modules may have a brightness. The brightness for each LED module may be controlled by a user. The apparatus may include a microcontroller. The microcontroller may include a dimming mode setting. The microcontroller may adjust the brightness of each of the modules. The microcontroller may adjust the brightness of each of the LED modules based on a dimming signal. The dimming signal may correspond to the dimming mode setting. The diming mode setting may be user selectable.

Table 7 lists illustrative dimming signals.

TABLE 7

| Illustrative dimming signals.<br>Illustrative dimming signals |
| --- |
| Electric Low Voltage ("ELV") |
| Triode for Alternating Current ("TRIAC") |
| 0-10 Volt |
| Digital Multiplexing (DMX) |
| Other suitable dimming signals |

The microcontroller may adjust individually the brightnesses of the connected LED modules. The microcontroller may adjust together the brightnesses of the connected LED modules. The microcontroller may adjust the brightnesses based on the user selected dimming signal.

A power output channel may be controlled individually. The power output channel may be controlled via a DMX controller or protocol. If multiple power output channels are controlled through 0-10V or TRIAC/ELV, all of the power output channels controlled through 0-10V or TRIAC/ELV may be controlled together.

If the unit has DMX function, it may have a switch that may allow a user to select between dimming modes. The modes may include TIRAC/ELV/0-10V or DMX function. The power supply may be a power supply that does not operate in both modes concurrently.

The power supply may include a user interface ("UI"). The UI may include a switch. The UI may include a rotary dial. The UI may include four switches. Three of the switches may be for setting a DMX address. One of the switches may be for setting a dimming curve. The UI may provide data feedback to the microcontroller.

Each of the plurality of LED modules may be operable at a brightness. The microcontroller may control the brightness. The microcontroller may include a dimming mode setting. The microcontroller may include a dimming curve setting. The power supply may provide a dimming curve. The dimming curve may be adjustable. The dimming curve may be user-adjustable. The microcontroller may be configured to adjust the brightness of each of the modules. The brightness may be adjusted based on a dimming signal corresponding to the dimming curve. The microcontroller may adjust a correlated color temperature ("CCT") of each of the modules. The CCT may be based on the dimming curve and the brightness.

The microcontroller may adjust the brightness and the CCT temperature of each LED module individually. The microcontroller may adjust the brightness and CCT temperature of the LED modules together.

The power output channels, the overcurrent protection circuit; and the voltage conditioning circuit may be included in a power-limited power supply. The limited power supply may include the microcontroller. The regulated current may be regulated based on a control signal received from the microcontroller.

The light fixture may be mounted to an architectural structure. The architectural structure may include structural support. The architectural structure may include a panel. The panel may include plaster, sheet rock, wood or any other suitable material. The fixture may be mounted to the structural support on one side of the panel. The fixture may illuminate a space on the other side of a panel.

The fixture may include a heat sink. The fixture may include a magnet.

The fixture may include a detachable lighting unit. The detachable lighting unit may include the lighting assembly.

The lighting unit may include a light engine. The light engine may include a light source. The light source may include one or more LEDs.

The lighting unit may include a metal ring that is configured to be detachably held by the magnet. The lighting unit may include a heat-conducting base. The base may be configured to conduct heat from the LED to the heat sink when the lighting unit is magnetically coupled to the fixture.

The lighting unit may include an LED holder. The holder may hold the LED. The holder may hold the LED against the base to provide heat transfer from the LED to the base. The LED holder may include the LED brace.

The light source may emit a beam that propagates through a hole in the panel. The fixture may be too large to pass through the hole. The light engine may be detachable from the rest of the fixture. The light engine may pass through the hole.

The fixture may include an optical component. The optical component may include one or more of a reflector, a refractor or any other suitable optical component. The fixture may include trim. The trim may be adjustable. The trim may have an adjustable length along a central axis of the light engine. The trim may have an adjustable angle relative to the central axis. The fixture may include a beam adjusting lens. The lens may change an angle of the beam. The lens may change a shape of the beam. The lens may change a direction of the beam. The lens may change a direction of the beam in a vertical plane. The lens may change a direction of the beam in a horizontal plane.

A reflector may be arranged to form a beam from light from the LED. The reflector may direct the beam through the hole. The trim may extend from the reflector through the hole. The trim may be snapped to the reflector.

The apparatus may include a tool for removing the light engine. The tool may have a first extension that is configured to engage a ledge of the trim and pull the trim away from the light engine and through the hole.

The tool may have a second extension that is configured to engage the LED holder. The second extension may detach the lighting unit from the heat sink. The second extension may detach the lighting unit from the heat sink by pulling axially downward. The second extension may detach the lighting unit from the heat sink without rotating the lighting unit relative to the heat sink. The second extension may detach the lighting unit from the heat sink without rotating the lighting unit relative to other parts of the fixture.

Power leads to the light source may include connectors so that the light engine may be disconnected from a power supply after being separated from the rest of the fixture. The power supply may be located outside of the fixture. The power supply may be located inside the fixture.

The apparatus may include a lighting controller. The controller may be integral with the power supply. The controller may be configured to provide dimming to the fixture. The controller may be configured to provide color control to the fixture. The color control may include mixing of light from LEDs of different colors. The colors may include red, green, blue, violet, and white of one or more CCTs. The controller may provide one or more dim-to-warm curves. The curves may correlate a color of the LEDs, such as a mixed white color, with a dimming level.

Selected components of the apparatus are described below in reference to the figures.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

FIG. 1 shows illustrative fixture 100. Fixture 100 may include housing 102. Fixture 100 may include spackle plate 140. Spackle plate 140 may include collar ring 138. Fixture 100 may include baseplate 130. Housing 102 and spackle plate 140 may be mounted using structure mounting screws 144. Structure mounting screws 144 may be screwed through threaded holes included in baseplate 130. Structure mounting screws 144 may screw into the structure in which housing 102 is mounted. Fixture 100 may define axis $L_1$. Axis $L_1$ may be a central axis.

Figure 2:
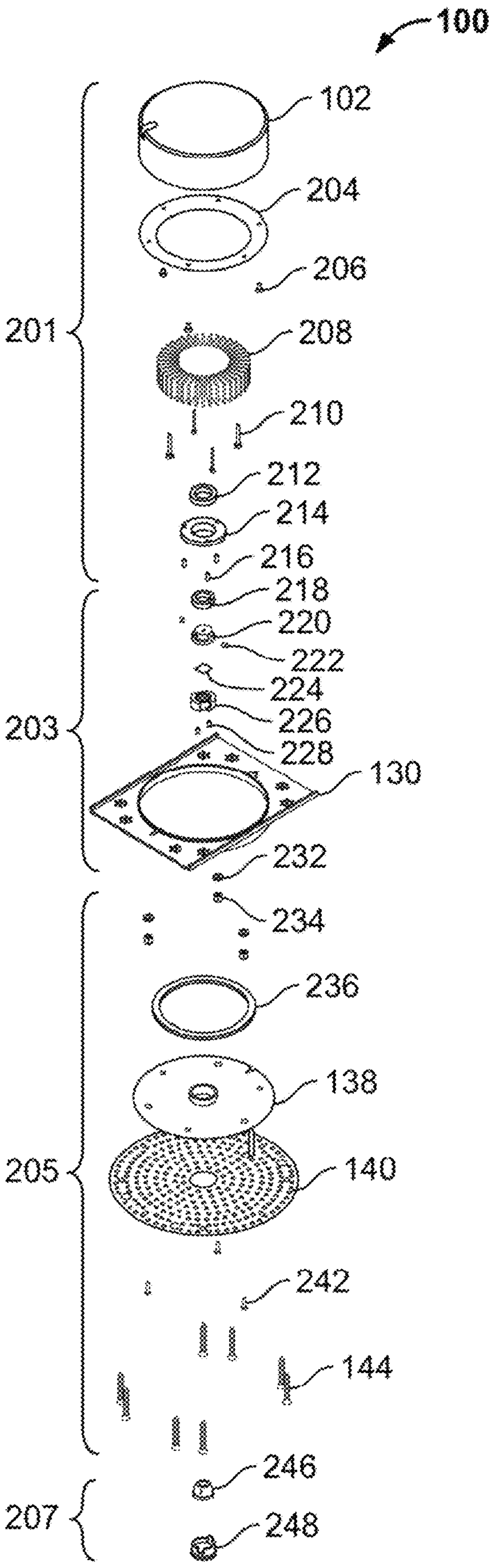
FIG. 2 shows an exploded view of illustrative apparatus in accordance with principles of the invention.

FIG. 2 is an exploded view of fixture 100.

Fixture 100 may include housing enclosure assembly 201, light assembly 203, spackle frame assembly 205, and trim assembly 207. Housing enclosure assembly 201 may include housing 102. Housing 102 may include die-cast aluminum. Housing 102 may include any other suitable material. Housing enclosure assembly 201 may include housing ring 204. Housing ring 204 may include steel. Housing ring 204 may include any other suitable material. Housing enclosure assembly 201 may include housing ring mounting screws 206. Housing ring mounting screws 206 may include steel. Housing ring screws 206 may include any other suitable material. Housing ring mounting screws 206 may be used to fasten housing ring 204 to housing 102.

Housing enclosure assembly 201 may include heat sink 208. Heat sink 208 may include aluminum extrusion. Heat sink 208 may include any other suitable material. Heat sink 208 may be used to dissipate the heat produced by a light emitting diode ("LED") light source disposed in the fixture. Housing enclosure assembly 201 may include heat sink mounting screws 210. Heat sink mounting screws 210 may include steel. Heat sink mounting screws 210 may include any other suitable material. Heat sink mounting screws 210 may be used to fasten heat sink 208 to housing 102. Housing enclosure assembly 201 may include magnet ring 212. Magnet ring 212 may be embedded in heat sink 208. Magnet ring 212 may be flush with heat sink surface. Magnet ring 212 may be used to mount light engine assembly 203.

Housing enclosure assembly 201 may include light engine receptacle 214. Light engine receptacle 214 may include aluminum. Light engine receptacle 214 may include any other suitable material. Light engine receptacle 214 may be used as the receiving base to have light engine assembly 203 seated. Light engine receptacle 214 be used to have light engine assembly 203 centered around a central axis, such like axis $L_1$ (shown in FIG. 1). Housing enclosure assembly 201 may include light engine receptacle mounting Screws 216. Light engine receptacle mounting screws 216 may include steel. Light engine receptacle mounting screws 216 may include any other suitable material. Light engine receptacle mounting screws 216 may be used to mount light engine receptacle 214 to heat sink 208.

Light engine assembly 203 may include light engine base ring 218. Light engine base ring 218 may include steel. Light engine base ring 218 may include any other suitable material. Light engine base ring 218 may be used as the means for attaching light engine assembly 203 to magnet ring 212 embedded in heat sink 208. Light engine assembly 203 may include light engine base 220. Light engine base 220 may include copper. Light engine base 220 may include any other suitable material. Light engine base 220 may be used for mounting the LED and transferring heat generated from the LED to heat sink 208. Light engine assembly 203 may include set screws 222. Set screws 222 may be used for attaching light engine base ring 218 to light engine base 220.

Light engine assembly 203 may include a light-emitting diode ("LED") light source 224. LED light source 224 may include an LED chip on board ("COB"). LED light source 224 may be soldered with two wire leads. Light engine assembly 203 may include LED brace 226. LED brace 226 may include polycarbonate ("PC"). LED brace 226 may include any other suitable material. LED brace 226 may be used to attach LED light source 224 to light engine base 220. Light engine assembly 203 may include LED brace mounting screws 228.

Fixture 100 may include baseplate 130. Baseplate 130 may include aluminum. Baseplate 130 may include any other suitable material. Baseplate 130 may be seated on top of a structure. Baseplate 130 may be used for supporting the weight of fixture 100.

Spackle frame assembly 205 may include bushings 232. Bushings 232 may be thermally insulating. Bushings 232 may include foam plastic. Bushings 232 may include any other suitable material. Spackle frame assembly 205 may include spacer 234. Spacer 234 may include aluminum. Spacer 234 may include any other suitable material. Bushings 232 may be placed on top of spacer 234. Spacer 234 may be used with bushings 232 to fill up the gap between housing 102 and spackle frame assembly 205. Spackle frame assembly 205 may include gasket 236. Gasket 236 may be thermally insulated. Gasket 236 may include foam. Gasket 236 may include any other suitable material. Gasket 236 may be used to seal the gap between housing 102 and spackle frame assembly 205.

Spackle frame assembly 205 may include collar plate 138. Collar plate 138 may include steel. Collar plate 138 may include any other suitable material. Collar plate 138 may be used to block the surface treatment from getting inside housing 102. Collar plate 138 may be riveted to spackle plate 140 with three rivets. Spackle frame assembly 205 may include spackle plate 140. Spackle plate 140 may include stainless steel. Spackle plate 140 may include any other suitable material. Spackle plate 140 may be used to seal the structure opening. Spackle plate 140 may be used as the base for applying the surface treatment. It may be desirable to omit a spackle plate to mount the fixture on a wood ceiling. Spackle frame assembly 205 may include spackle plate assembly mounting screws 242. Spackle plate assembly mounting screws 242 may be used to mount spackle frame assembly 205 to housing enclosure assembly 201.

Fixture 100 may include structure mounting screws 144. Structure mounting screws 144 may be used to mount spackle plate 140 to housing 102. Structure mounting screws 144 may be screwed into the structure and baseplate 130.

Trim assembly 207 may include reflector 246. Reflector 246 may include PC. Reflector 246 may include any other suitable material. Reflector 246 may be used to redistribute the light. Narrow flood, flood and wide flood reflectors may be provided. Trim assembly 207 may include trim 248. Trim 248 may include PC. Trim 248 may include any other suitable material. Trim 248 may be used to cover the structure opening. Collar plate 138 may be configured, with its collar, to hold trim 248. Trim 248 may be used to serve as an optical and glare control. Trim 248 options may include round and square downlight or wall wash trims, round and square pinholes, and any other suitable trim options. Reflector 246 may be held on the top of trim 248 by two tabs. The tabs may be disposed on reflector 246. The tabs may be disposed on trim 248.

Figure 3:
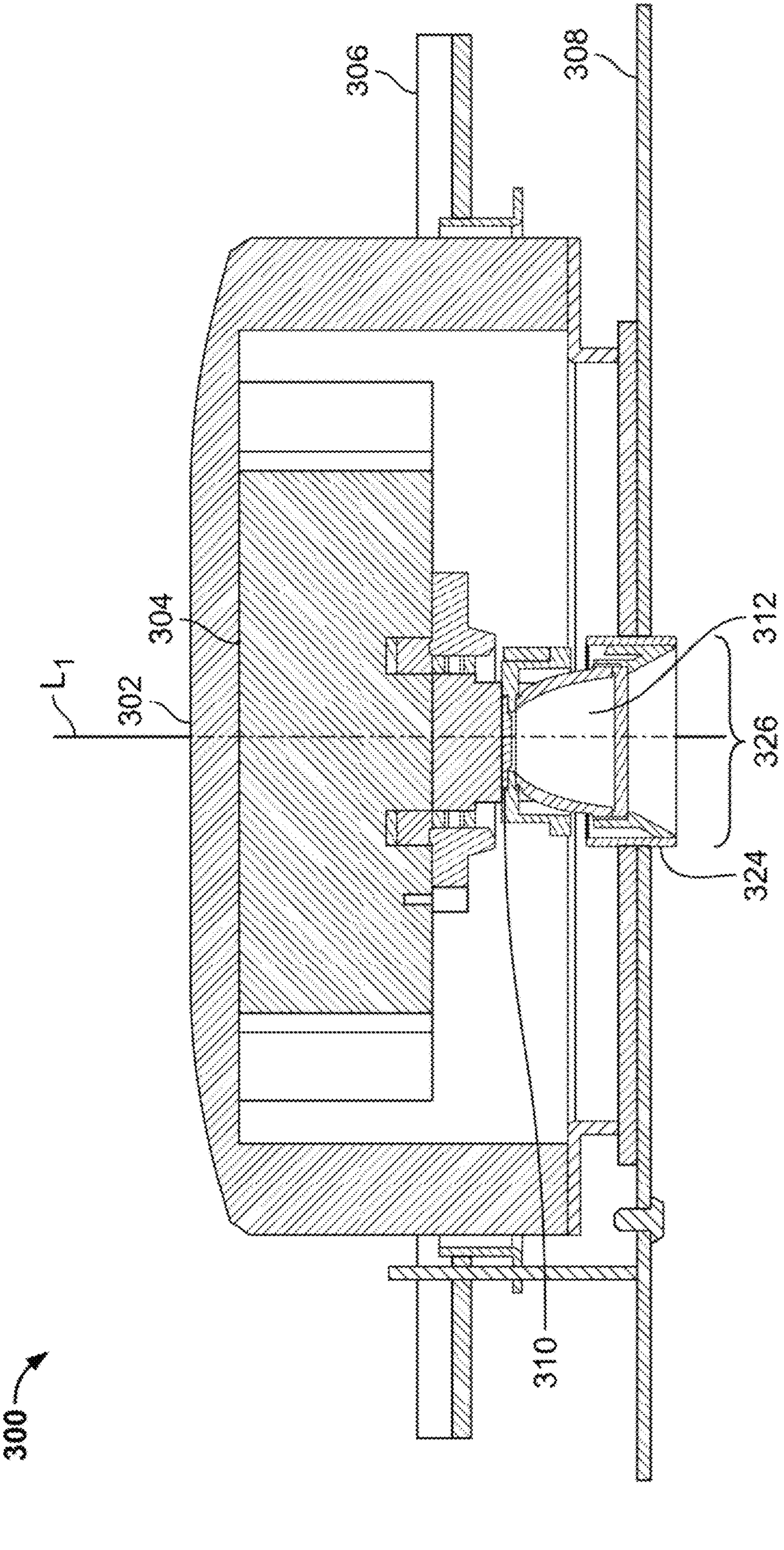
FIG. 3 is a partial cross-section of apparatus, in accordance with principles of the invention, corresponding to the view taken along lines 3-3 in FIG. 1.

FIG. 3 shows a view of illustrative fixture 300. Fixture 300 may include one or more features in common with fixture 100. Fixture 300 may include housing 302. Housing 302 may include heat sink 304. Fixture 300 may include baseplate 306. Heat sink 304 may be configured to magnetically hold lighting assembly 310. Fixture 300 may include spackle plate 308. Spackle plate 308 may include collar 324. Collar 324 may define aperture 326. Collar 324 may be configured to engage reflector 312.

Figure 4:
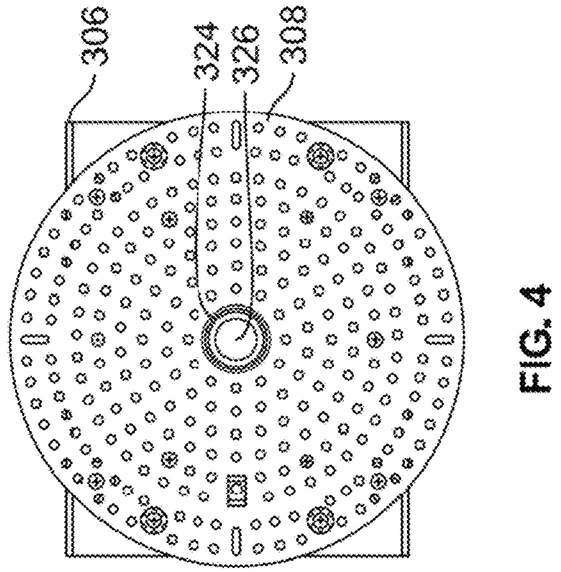
FIG. 4 shows a bottom view of illustrative apparatus in accordance with principles of the invention.

FIG. 4 shows baseplate 306, spackle plate 308, collar 324, and aperture 326 from a bottom view.

Figure 5:
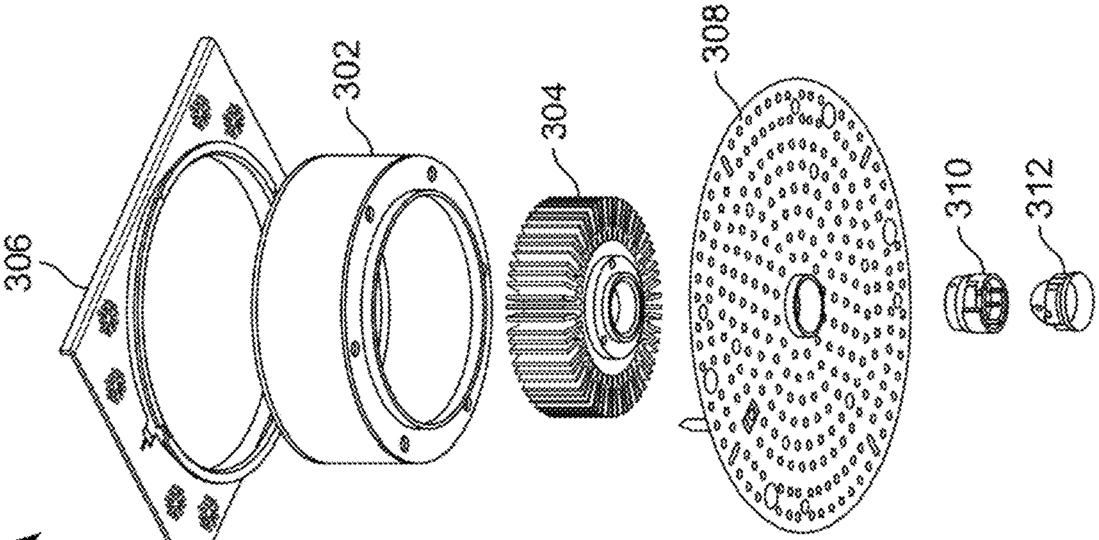
FIG. 5 shows an exploded view of illustrative apparatus in accordance with principles of the invention.

FIG. 5 is an exploded view of fixture 300. Exploded view may include baseplate 306, housing 302, heat sink 304, spackle plate 308, lighting assembly 310, and reflector 312.

Figure 6:
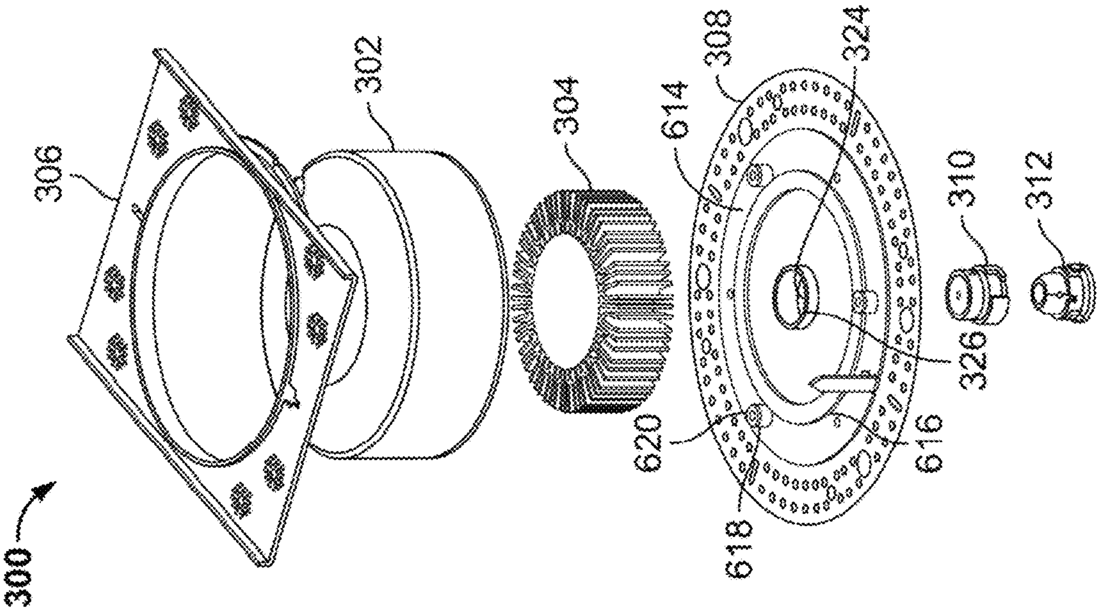
FIG. 6 shows an exploded view of illustrative apparatus in accordance with principles of the invention.

FIG. 6 shows a different view of the exploded view of fixture 300. The exploded view may include baseplate 306, housing 302, heat sink 304, spackle plate 308, lighting assembly 310, and reflector 312. Spackle plate 308 may include collar plate 614. Collar plate 614 may define collar 324. Collar plate 614 may include gasket 616, spacers 618 and bushing 620. Collar 324 may define aperture 326.

Figure 7:
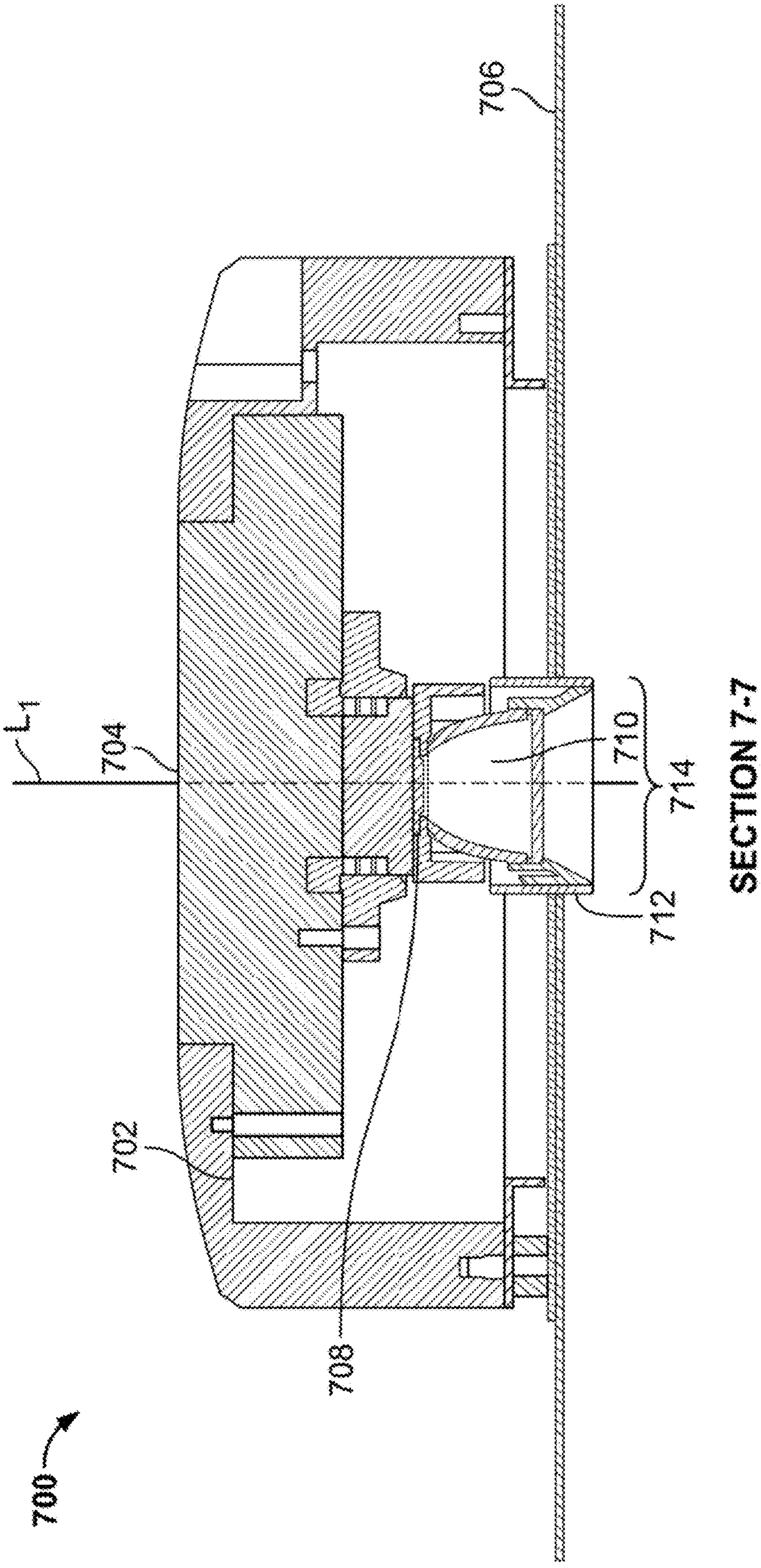
FIG. 7 is a partial cross-section of apparatus, in accordance with principles of the invention, corresponding to the view taken along lines 7-7 in FIG. 8.

FIG. 7 shows a view of illustrative fixture 700. Fixture 700 may include one or more features in common with one or more of fixture 100 and fixture 300. Fixture 700 may include housing 702. Housing 702 may include heat sink 704. Heat sink 704 may be disposed at the top of housing 702. Heat sink 704 may be disposed in an opening defined by housing 702. Heat sink 704 may be configured to magnetically hold lighting assembly 708. Fixture 700 may include spackle plate 706. Spackle plate 706 may include collar 712. Collar 712 may be configured to engage reflector 710. Collar 712 may define aperture 714.

Figure 8:
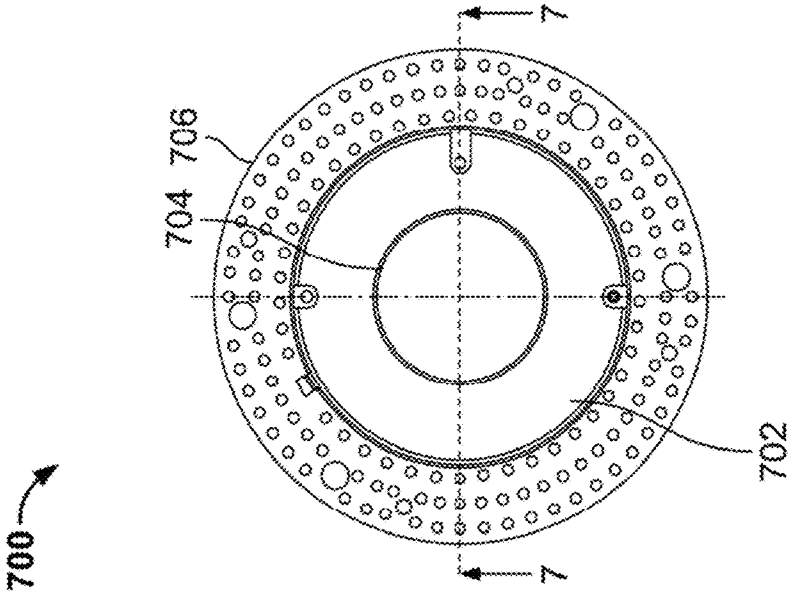
FIG. 8 shows a bottom view of illustrative apparatus of FIG. 1, in accordance with principles of the invention.

FIG. 8 shows housing 702, heat sink 704, and spackle plate 706 from a top view.

Figure 9:
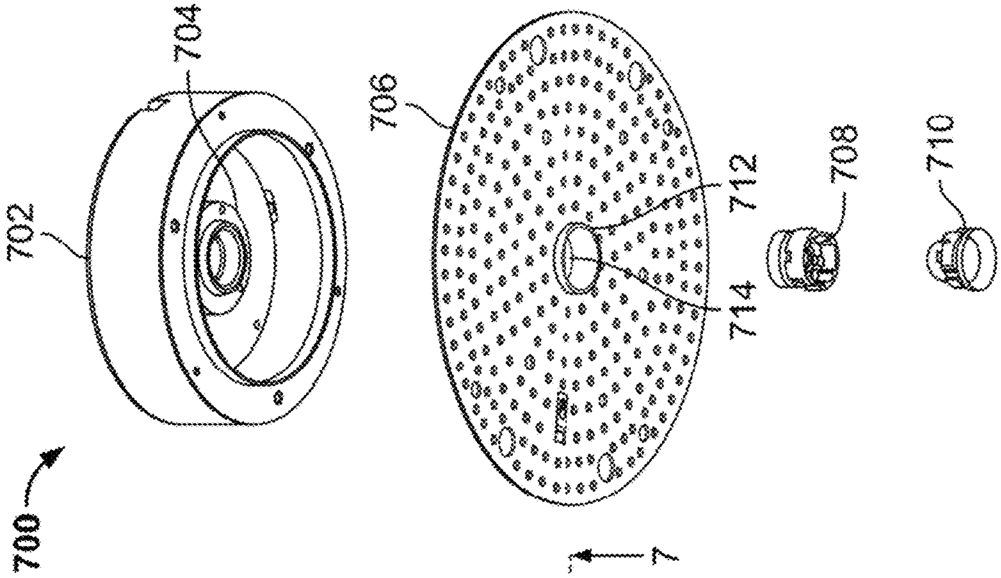
FIG. 9 shows an exploded view of illustrative apparatus in accordance with principles of the invention.

FIG. 9 is an exploded view of fixture 700. Exploded view may show housing 702, heat sink 704, spackle plate 706, lighting assembly 708, reflector 710 and aperture 714. Spackle plate 706 may include collar 712. Collar 712 may define aperture 714.

Figure 10:
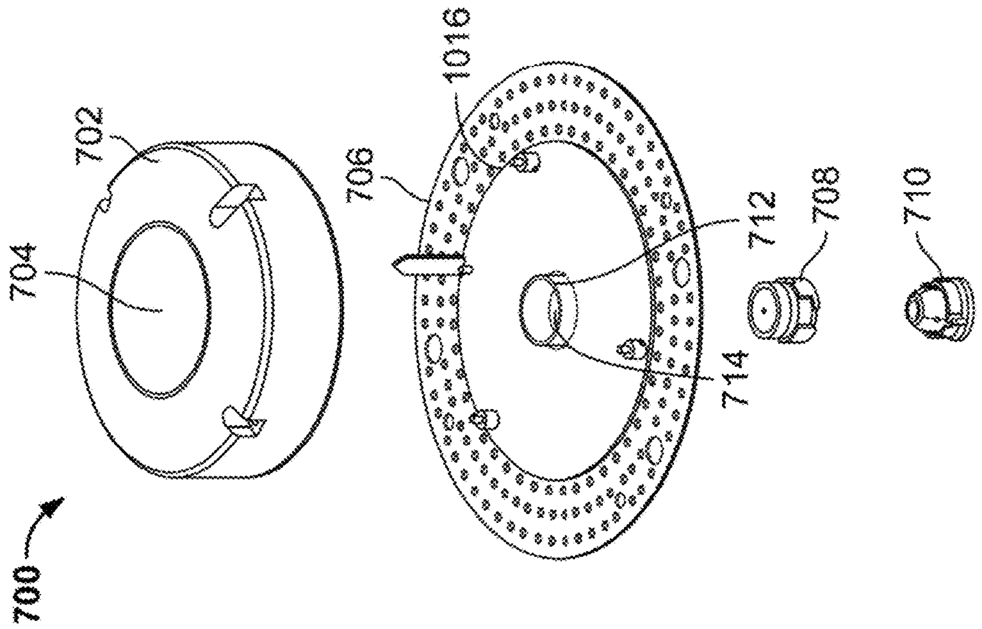
FIG. 10 shows exploded view of illustrative apparatus in accordance with principles of the invention.

FIG. 10 shows a different view of the exploded view of fixture 700. Exploded view may show housing 702, heat sink 704, spackle plate 706, lighting assembly 708, reflector 710, collar 712, aperture 714 and collar plate 1016. Spackle plate 706 may include collar plate 1016. Collar plate 1016 may include collar 712. Collar 712 may define aperture 714.

Figure 11:
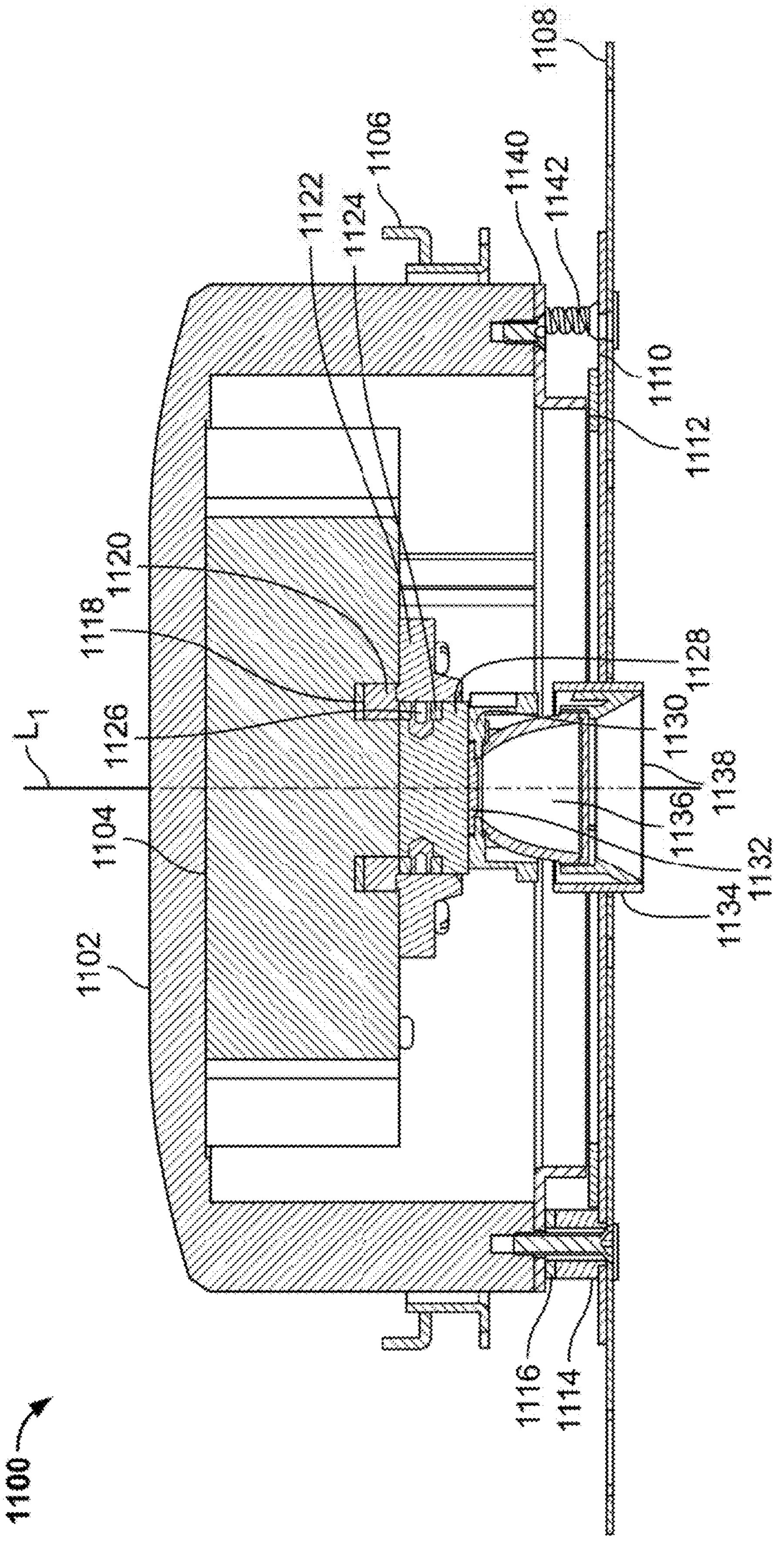
FIG. 11 shows a cross-sectional view of illustrative apparatus in accordance with principles of the invention.

FIG. 11 shows illustrative fixture 1100. Illustrative fixture 1100 may include some or all of the parts described above in relation to one or more of fixture 100, fixture 300, and fixture 700.

Fixture 1100 may include housing 1102. Housing 1102 may include heat sink 1104. Heat sink 1104 may be fastened to housing 1102. Heat sink 1104 may include magnet spacer 1118. Magnet spacer 1118 may allow for room to attach magnet 1120 to heat sink 1104. Magnet spacer 1118 may be ring shaped. Magnet spacer 1118 may not be magnetic. Magnet 1120 may be ring shaped. Magnet 1120 may be taped to heat sink 1104 with conductive tape. Heat sink 1104 may include light engine receptacle 1122. Light engine receptacle 1122 may be configured to receive light engine base 1128. Light engine receptacle 1122 may include light engine base ring 1124. Light engine receptacle 1122 may include set screw 1126. Set screws 1126 may be used to attach light engine base ring 1124 to light engine base 1128.

Light engine base 1128 may include one or more of the magnetic materials. The magnetic material included in light engine base 1128 may be ring shaped. Light engine base 1128 may be configured to be magnetically docked to magnet 1120 included in heat sink 1104 using the magnetic material. Light engine base 1128 may be removable from heat sink 1104 in response to a linear pull by a user. The magnetic force between light engine base 1128 and magnet 1120 may be configured such that the user will be able to remove light engine base 1128 with the linear pull. The linear pull may be along central axis $L_1$. Light engine base 1128 may define central axis $L_1$.

Light engine base 1128 may include LED brace 1130. LED brace 1130 may be fastened to light engine base 1128. LED brace 1130 may be configured to hold LED light source 1132. LED light source 1132 may include one or more LEDs. LED brace 1130 may be configured to hold LED light source 1132 against light engine base 1128. LED light source 1132 may be connected to light engine base 1128 with a thermal adhesive. LED light source 1132 may generate heat during operation. Heat sink 1104 may be configured to dissipate the heat generated by LED light source 1132. Excess heat may degrade or weaken components of fixture 1100. Heat sink 1104 may be configured and dimensioned to dissipate enough heat from LED light source 1132. Light engine base 1128, LED brace 1130, and LED light source 1132, may together form a lighting assembly. The lighting assembly may be configured to be magnetically docked to heat sink 1104. The lighting assembly may be configured to be removable from heat sink 1104.

Housing 1102 may include housing ring 1140. Housing ring 1140 may be configured to be fastened to housing 1102. Fixture 1100 may include spackle plate 1108. Spackle plate 1108 may be fastened to housing 1102 via spackle plate mounting screws 1142. Spackle plate mounting screws 1142 may be screwed into housing ring 1140.

Spackle plate 1108 may include collar plate 1110. Collar plate 1110 may define collar 1134. Collar plate 1110 may include gasket 1112. Gasket 1112 may be a thermally insulating gasket. Gasket 1112 may be an electrically insulating gasket. Gasket 1112 may include any suitable gasket. Gasket 1112 may be ring shaped. Collar plate 1110 may include spacer 1114. Spacer 1114 may include bushing 1116. Bushing 1116 may be a thermally insulating bushing. Bushing 1116 may include an electrically insulating bushing. Bushing 1116 may include any suitable bushing. Collar plate 1110 may include one or more of spacer 1114 and bushing 1116. One or more of gasket 1112, spacer 1114, and bushing 1116 may include thermal non-conductive materials. One or more of gasket 1112, spacer 1114, and bushing 1116 may include electrical non-conductive materials. One or more of gasket 1112, spacer 1114, and bushing 1116 may be configured to reduce heat transfer from LED light source 1132 to spackle plate 1108.

Collar 1134 may be configured to engage with reflector 1136. Reflector 1136 may include trim 1138. Trim 1138 may be releasably engaged with reflector 1136. Reflector 1136 may be configured to form a beam of light emitted by LED light source 1132.

Fixture 1100 may include baseplate 1106. Baseplate 1106 may be seated on top of a panel. The panel may be part of the structure. The panel may include sheet rock. The panel may include plaster. The panel may include any suitable panel material. Baseplate 1106 may be used for supporting the weight of fixture 1100.

Figure 12:
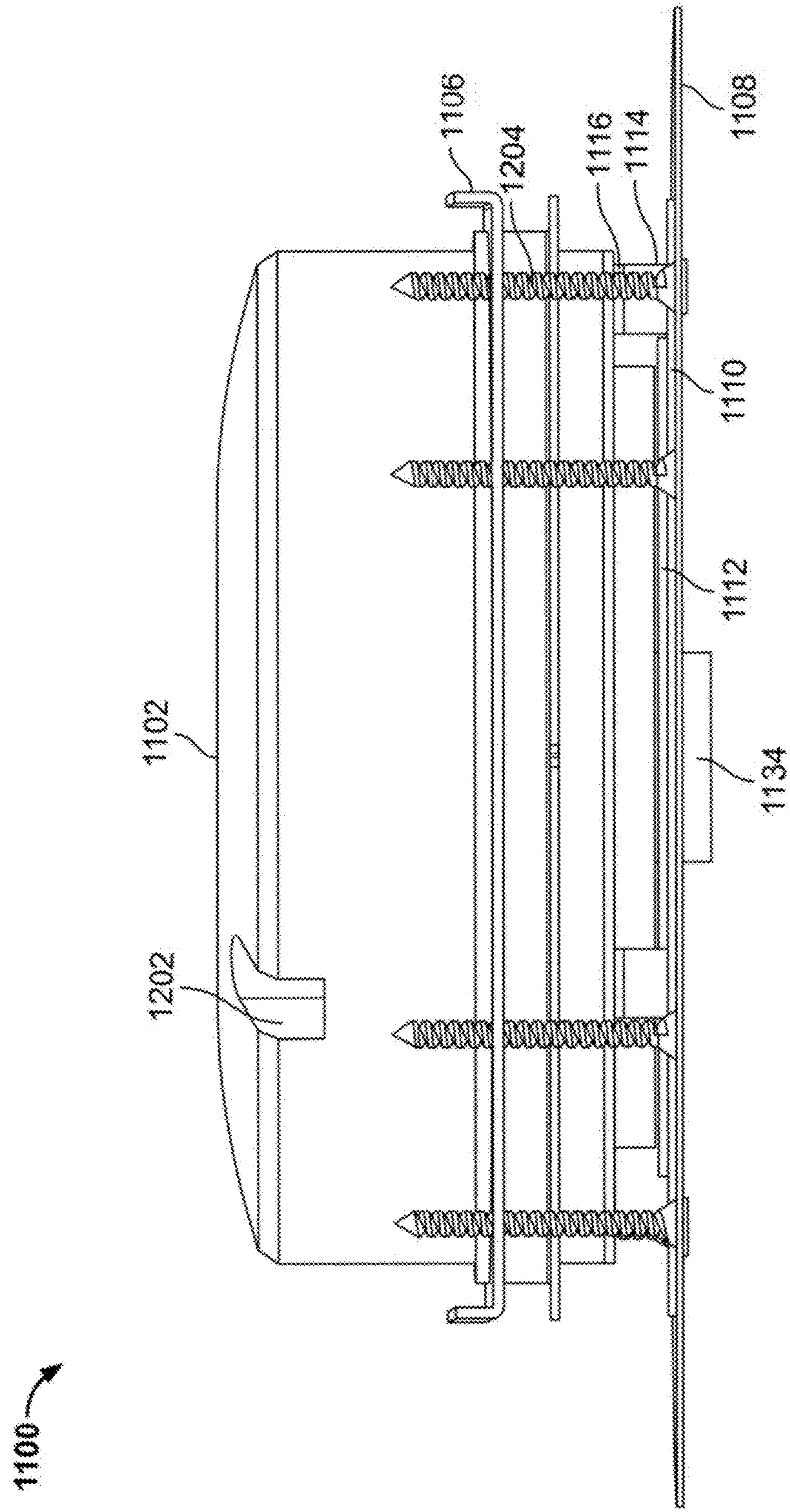
FIG. 12 shows illustrative apparatus in accordance with principles of the invention.

FIG. 12 shows a different view of fixture 1100. Housing 1102 may include concavity 1202. Concavity 1202 may include a cannula. The cannula may allow for a wire to pass through the fixture. The wire may connect to an external power supply. FIG. 12 shows structure mounting screws 1204. Structure mounting screws 1204 may be configured to mount housing 1102 to spackle plate 1108. Structure mounting screws 1204 may be assembled to the panel and baseplate 1106.

Figure 13:
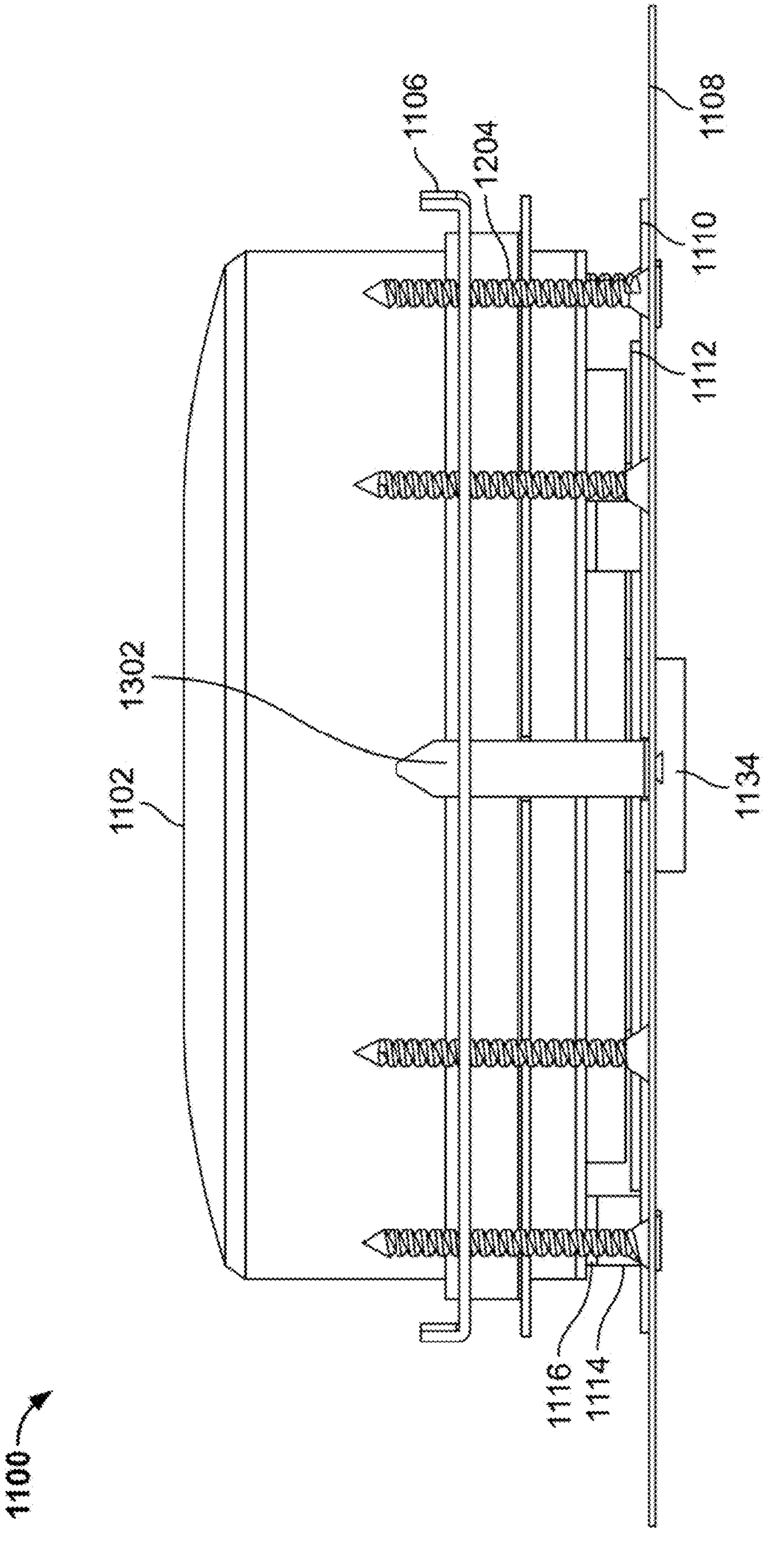
FIG. 13 shows illustrative apparatus in accordance with principles of the invention.

FIG. 13 shows that spackle plate 1108 may include tang 1302. Tang 1302 may engage a cut-out (not shown) in baseplate 1106. Tang 1302 may engage the cut-out to prevent movement of baseplate 1106 relative to central axis $L_1$. Tang 1302 may be used to align spackle plate 1108 relative to baseplate 1106.

Figure 14:
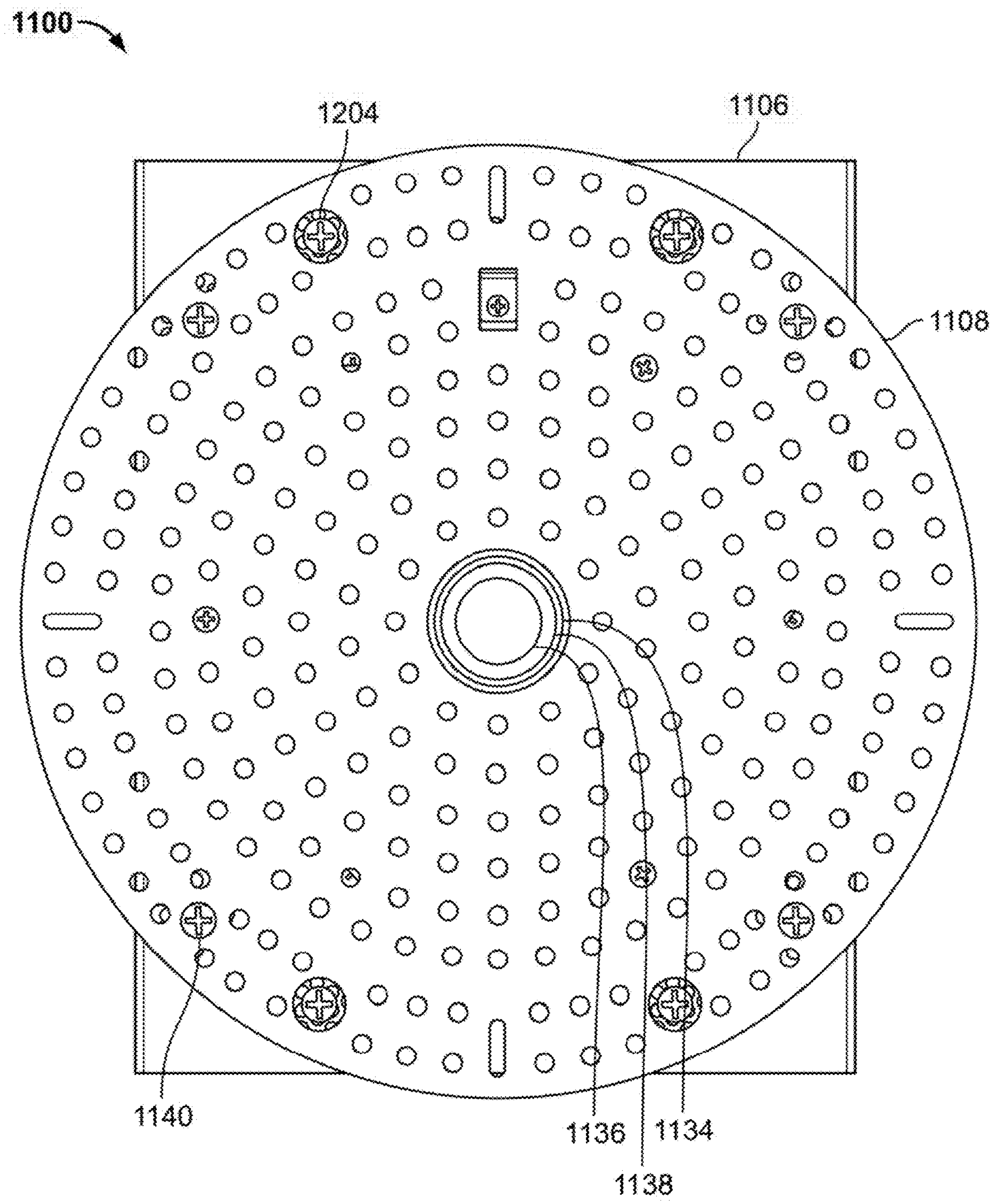
FIG. 14 shows a bottom view of illustrative apparatus in accordance with principles of the invention.

FIG. 14 shows baseplate 1106, spackle plate 1108, collar 1134, reflector 1136, trim 1138, spackle plate mounting screws 1142, and structure mounting screws 1204 from a bottom view.

Figure 15:
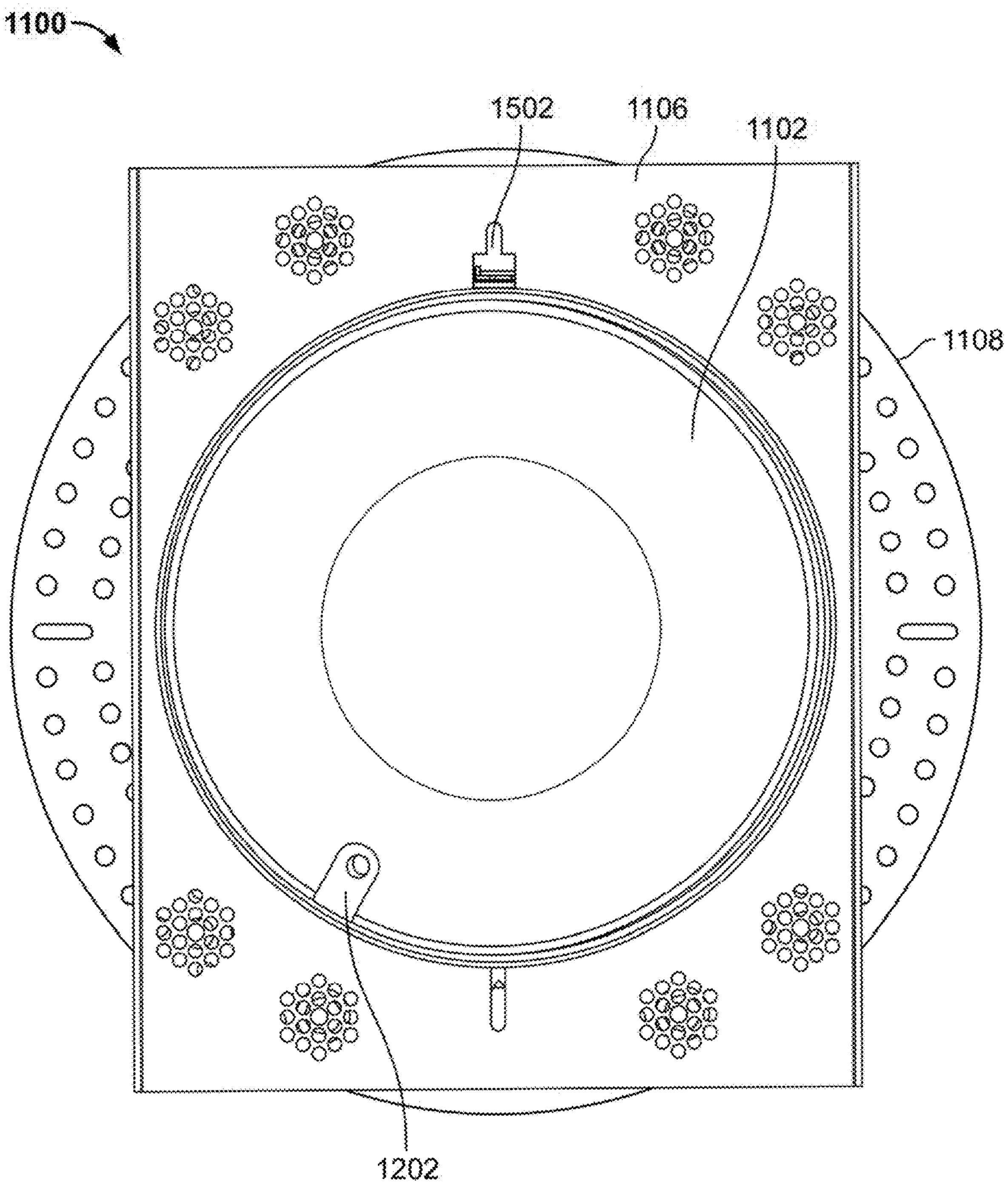
FIG. 15 shows a top view of illustrative apparatus in accordance with principles of the invention.

FIG. 15 shows fixture 1100 from the top. Cut-out 1502 may be configured to accept tang 1302.

Figure 16:
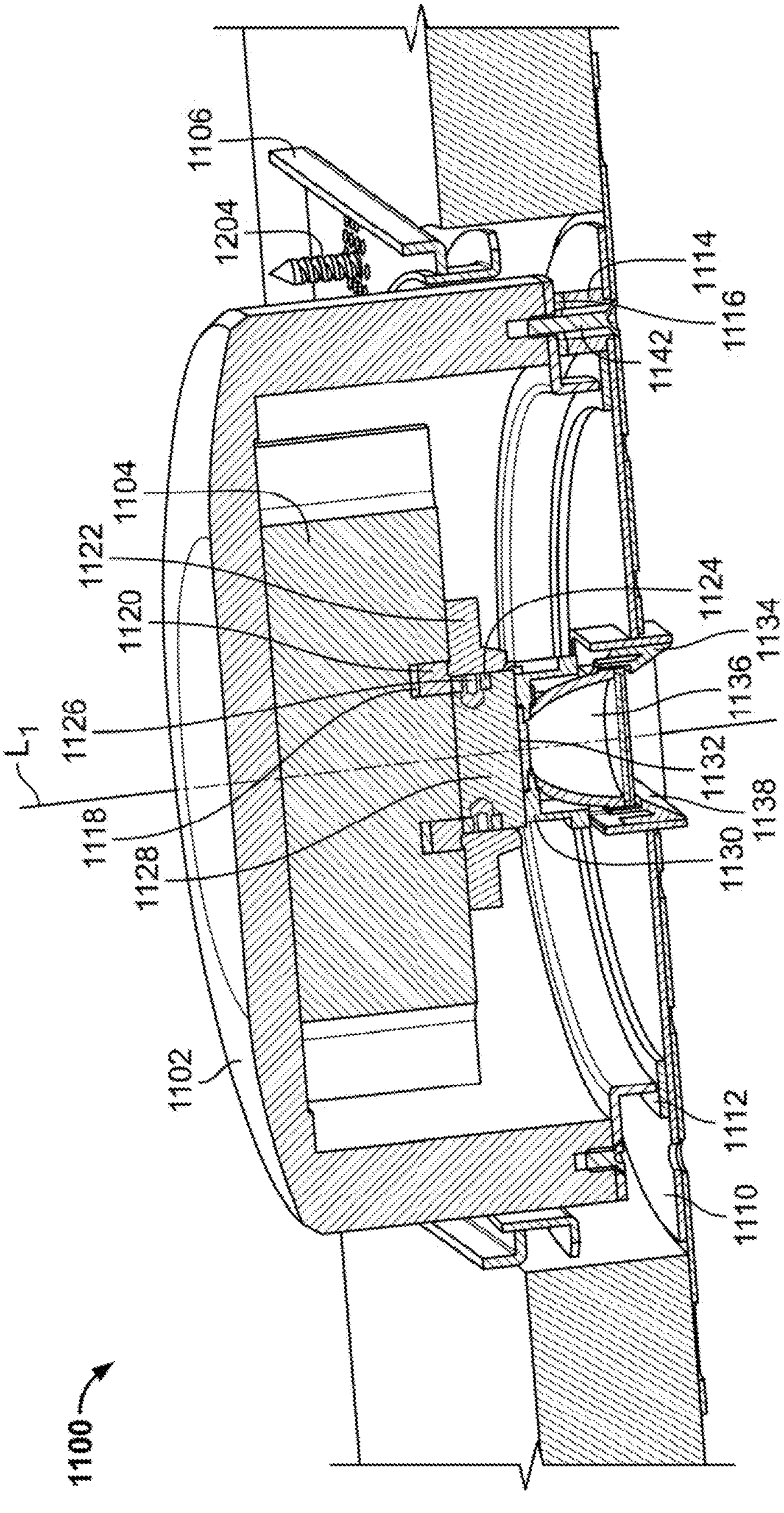
FIG. 16 shows a cross-sectional view of illustrative apparatus in accordance with principles of the invention.

FIG. 16 shows a cross-sectional view of fixture 1100.

Figure 17:
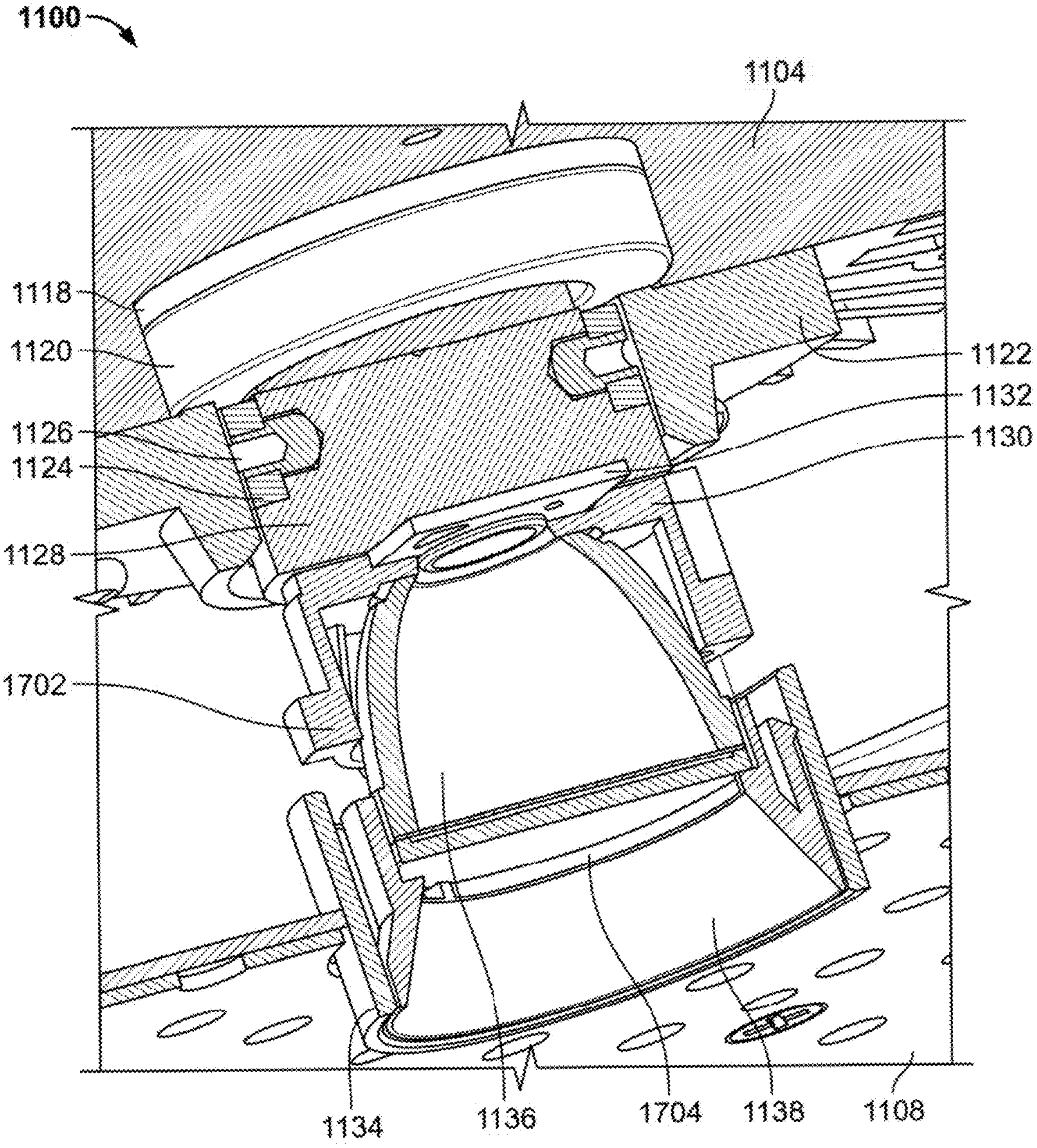
FIG. 17 shows a partial cross-sectional view of illustrative apparatus in accordance with principles of the invention.

FIG. 17 shows magnet spacer 1118 and magnet 1120 in relief. LED brace 1130 may include tool receptacle 1702. Tool receptacle 1702 may receive a removal tool (not shown). The removal tool may engage the lighting assembly. Tool receptacle 1702 may enable a user to remove the lighting assembly with a linear pull. Trim 1138 may include ledge 1704. Ledge 1704 may be engaged by the removal tool. Ledge 1704 may enable the removal of reflector 1136.

Figure 18:
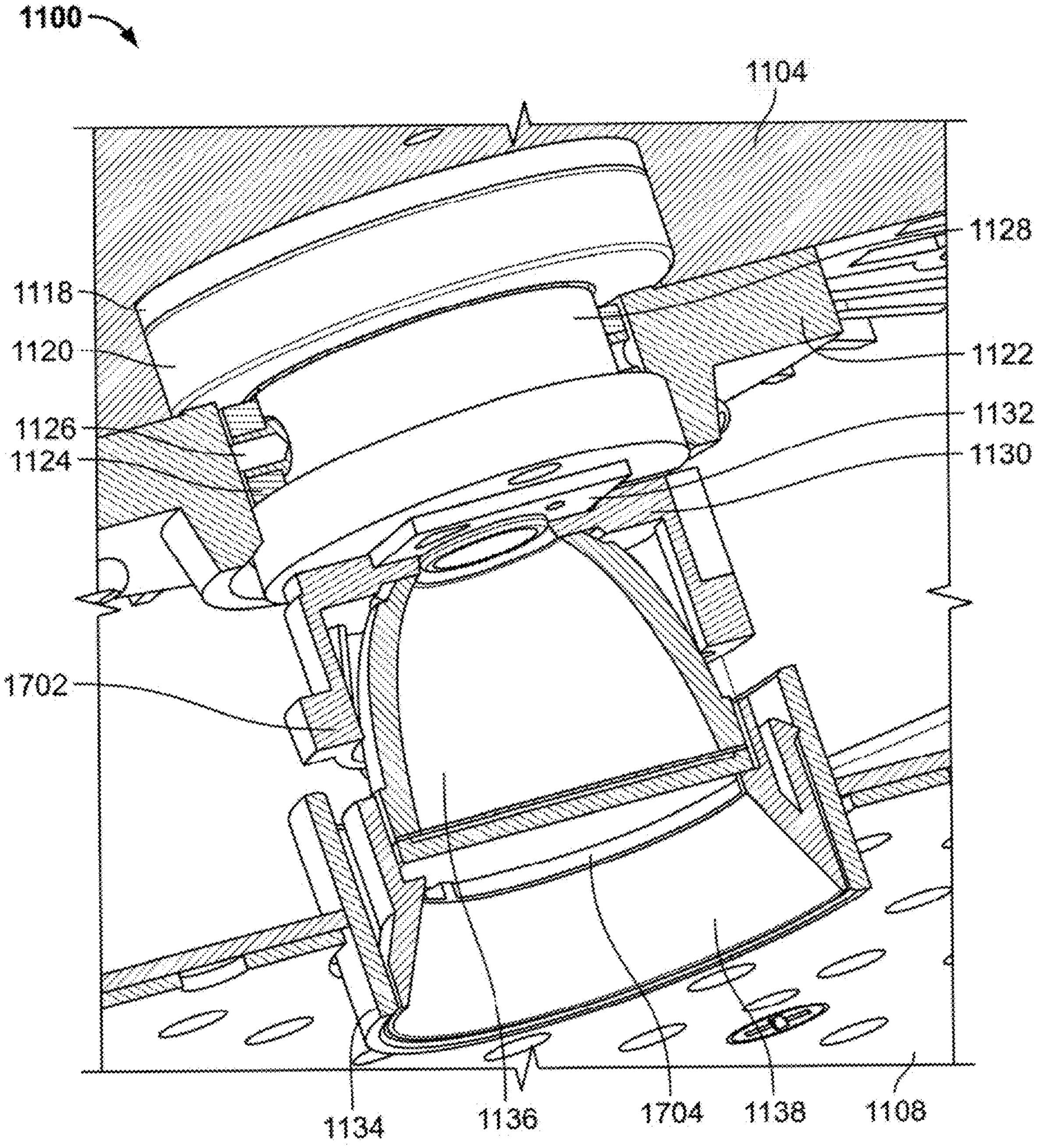
FIG. 18 shows a partial cross-sectional view of illustrative apparatus in accordance with principles of the invention.

FIG. 18 shows light engine base 1128 in relief.

Figure 19:
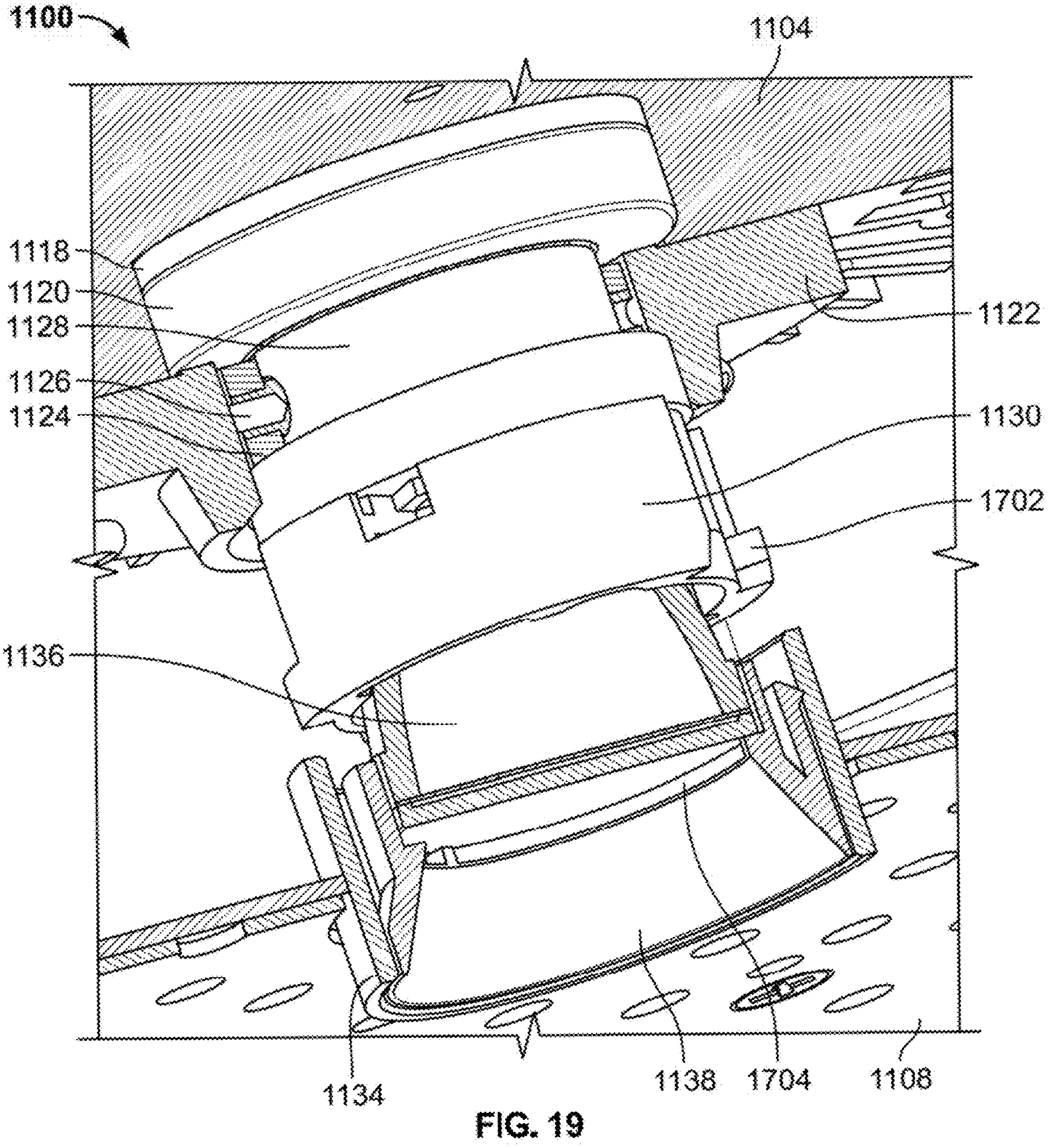
FIG. 19 shows a partial cross-sectional view of illustrative apparatus in accordance with principles of the invention.

FIG. 19 shows LED brace 1130 in relief.

Figure 20:
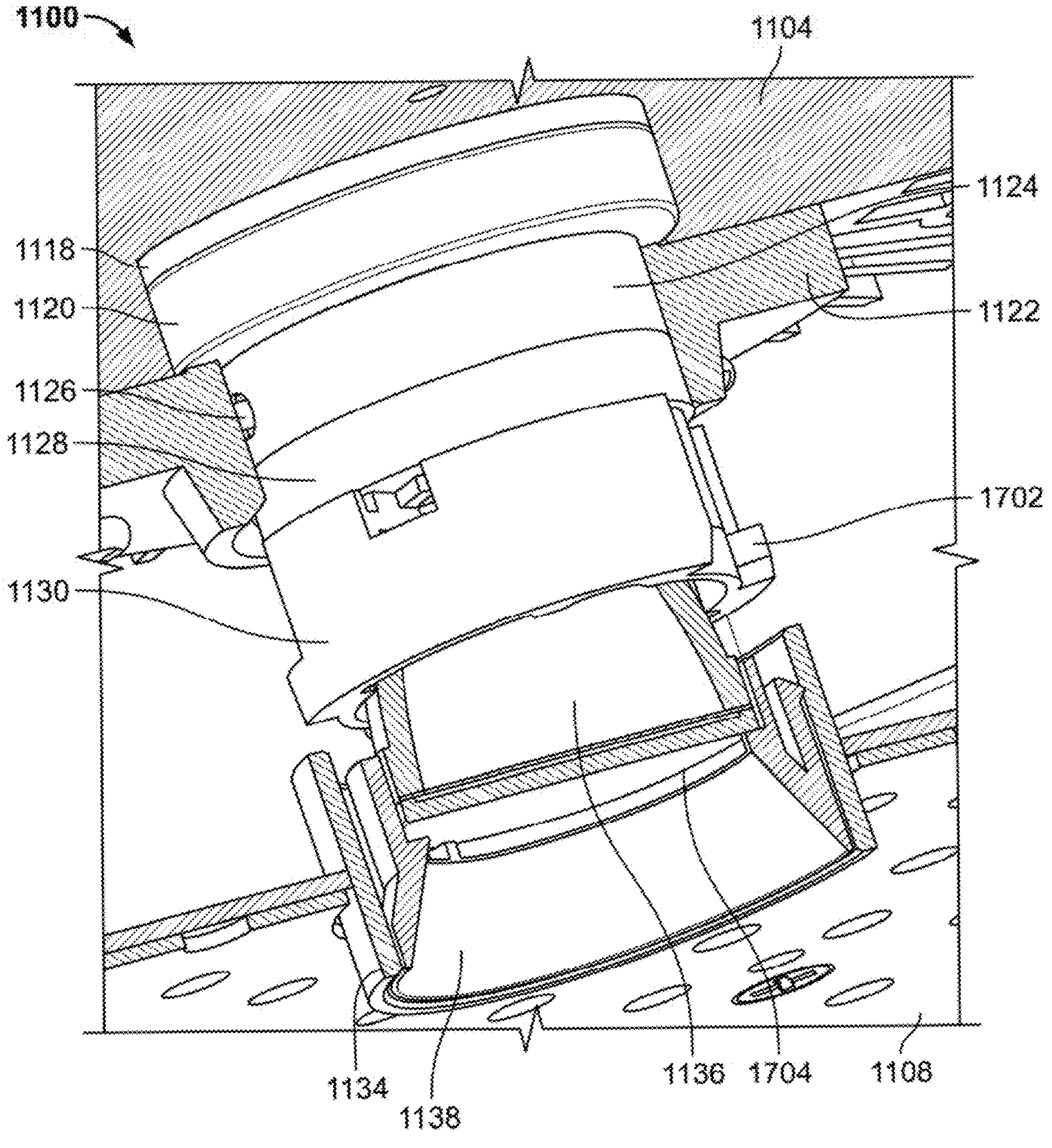
FIG. 20 shows a partial cross-sectional view of illustrative apparatus in accordance with principles of the invention.

FIG. 20 shows light engine base ring 1124 in relief.

Figure 21:
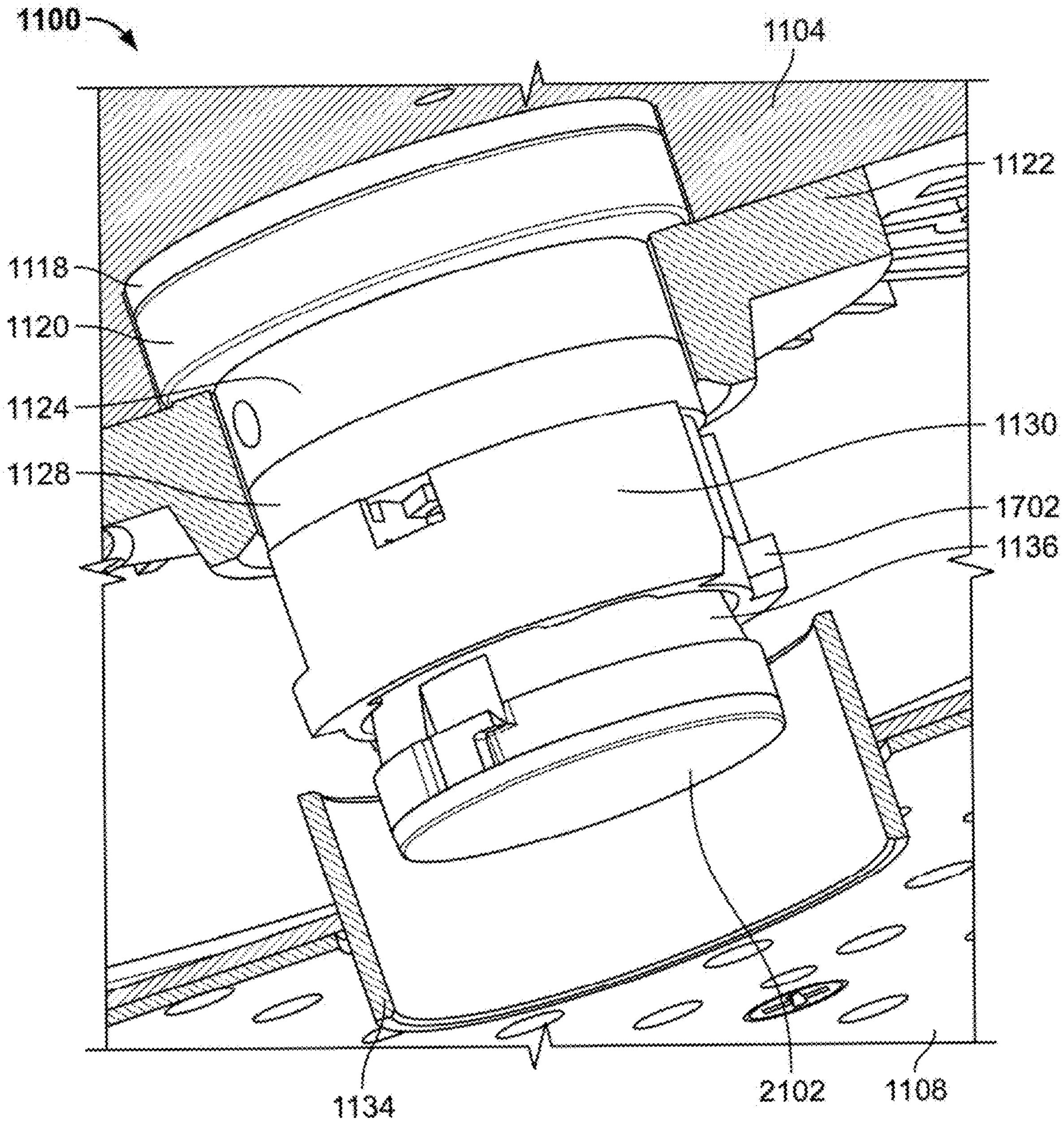
FIG. 21 shows illustrative apparatus in accordance with principles of the invention, with reflector and trim removed.

FIG. 21 is a close-up view of fixture 1100. Reflector 1136 may include lens diffusing element 2102. Lens diffusing element 2102 may be configured to disperse light emitted from LED light source 1132.

Figure 22:
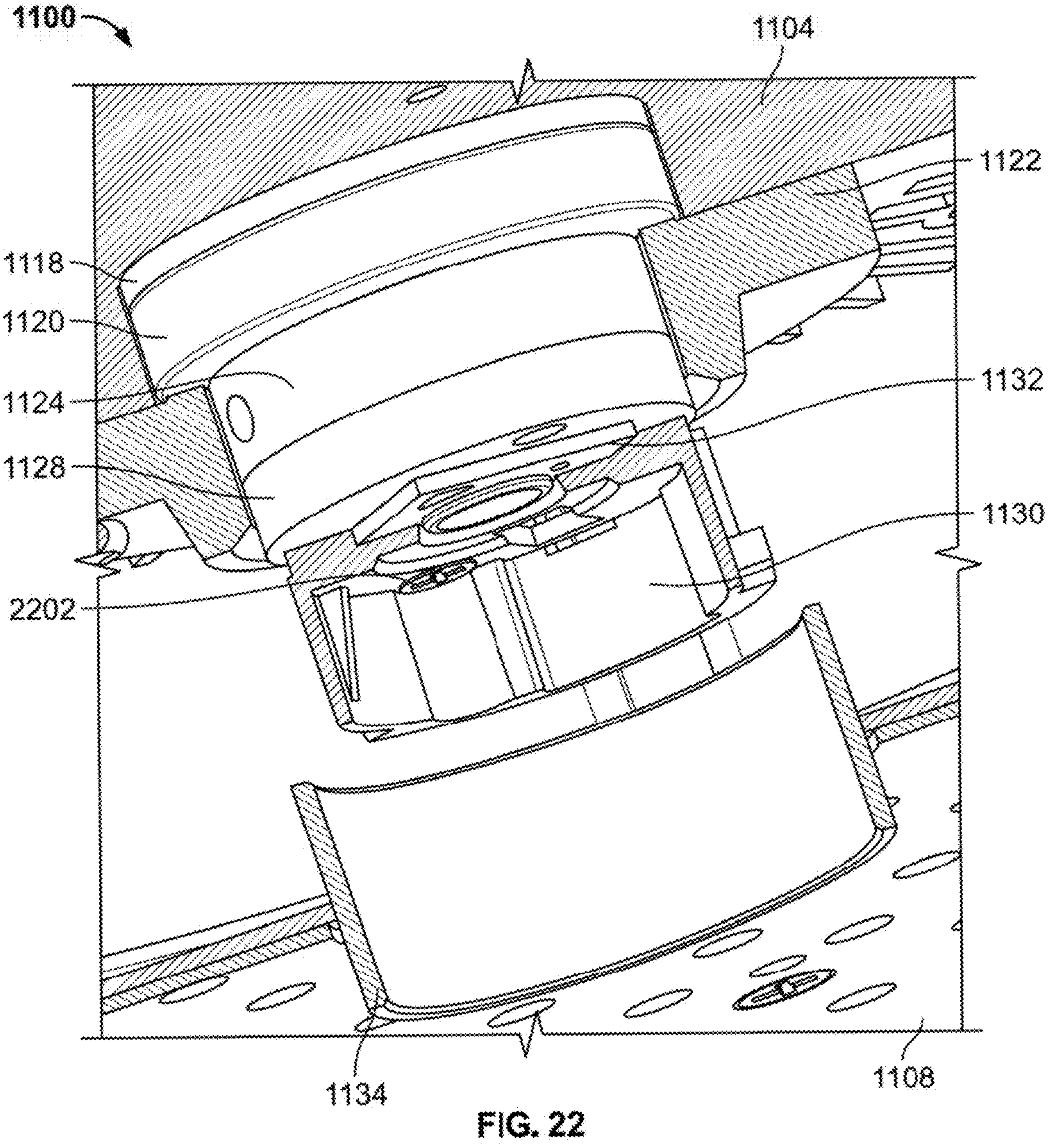
FIG. 22 shows illustrative apparatus in accordance with principles of the invention, with light engine in intermediate position during removal of light engine. Arrow shows direction of displacement along central axis of fixture.

FIG. 22 shows that LED brace 1130 may be mounted to light engine base 1128 using LED brace mounting screw 2202. The lighting assembly may include light engine base ring 1124, light engine base 1128, LED light source 1132, and LED brace 1130. The lighting assembly may be disengaged from magnet 1120 by a linear pull along a central axis, such like axis $L_1$ (shown in FIG. 1). The linear pull may be along the arrow shown. The linear pull may overcome the magnetic force between magnet 1120 and light engine base ring 1124. The magnetic force between magnet 1120 and light engine base ring 1124 may be configured such that a user can overcome the magnetic force with the linear pull.

Figure 23:
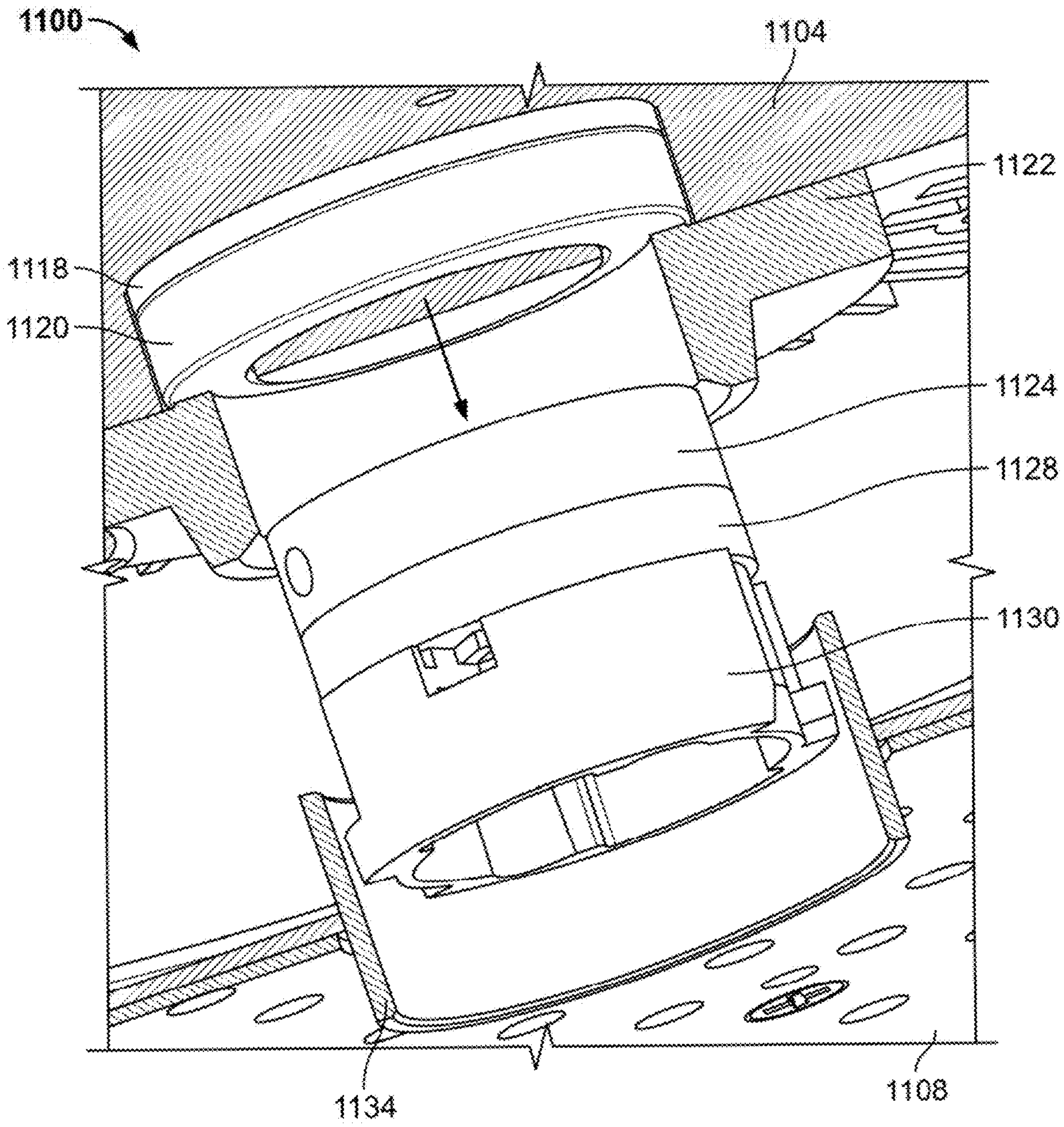
FIG. 23 shows illustrative apparatus in accordance with principles of the invention, with light engine in lower position during removal of light engine. Arrow shows direction of displacement along central axis of fixture.

FIG. 23 shows the lighting assembly being removed along a central axis, such like axis $L_1$ (shown in FIG. 1). The lighting assembly, including light engine base ring 1124, light engine base 1128, and LED brace 1130, may be configured to be removed through an aperture included in collar 1134.

Figure 24:
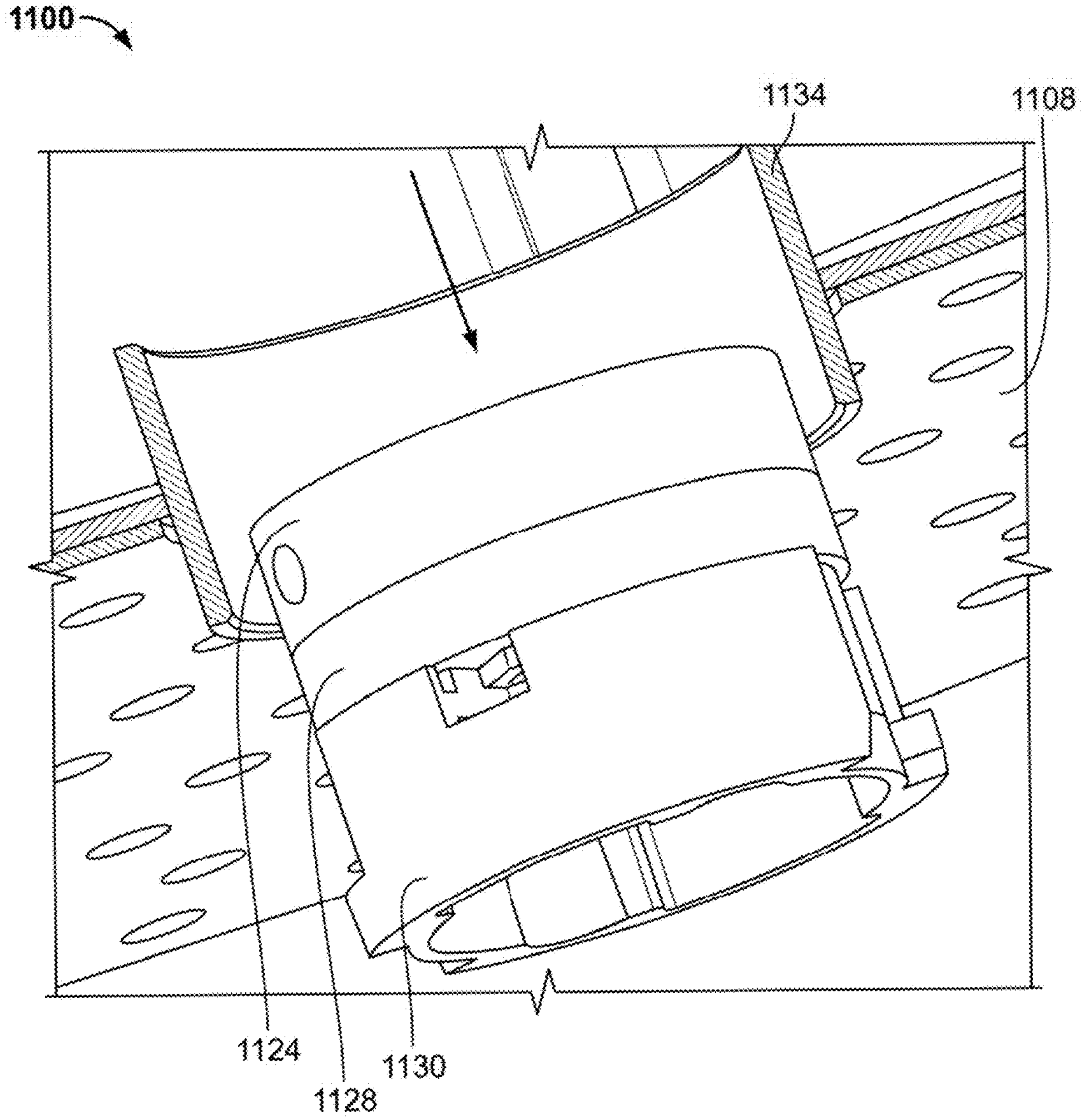
FIG. 24 shows illustrative apparatus in accordance with principles of the invention, with light engine in lower position during removal of light engine. Arrow shows direction of displacement along central axis of fixture.

FIG. 24 shows that the lighting assembly may be configured to be removable through the aperture included in collar 1134. The lighting assembly may be removed outside fixture 1100. The lighting assembly may be removed without the removal of heat sink 1104.

Figure 25:
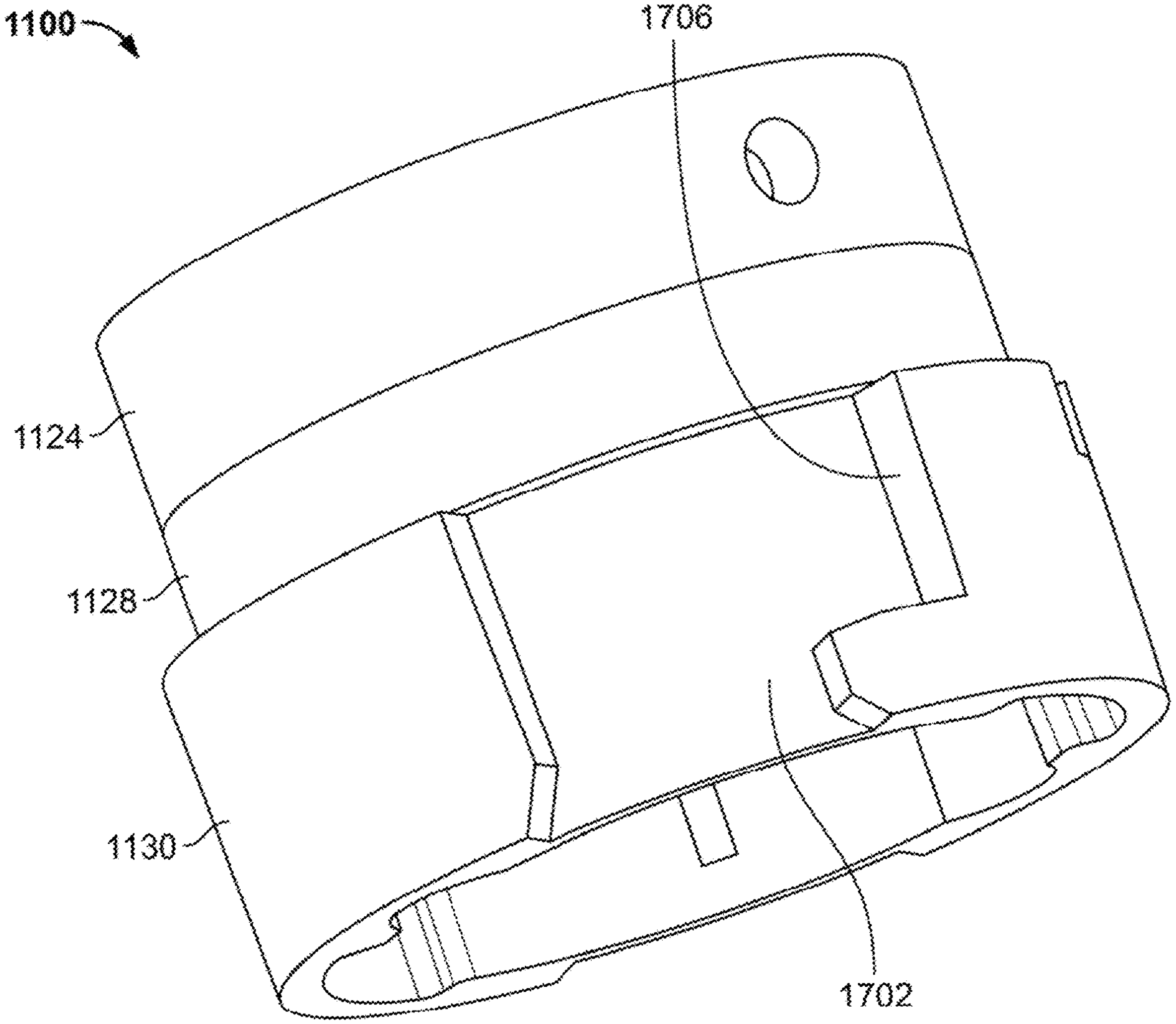
FIG. 25 shows illustrative apparatus in accordance with principles of the invention.

FIG. 25 shows the lighting assembly of fixture 1100. The lighting assembly may include light engine base ring 1124, light engine base 1128 and LED brace 1130. LED brace 1130 may define tool receptacle 1702. Tool receptacle 1702 may be configured to engage a tool. Tool receptacle 1702 may include edge 1706.

Figure 26:
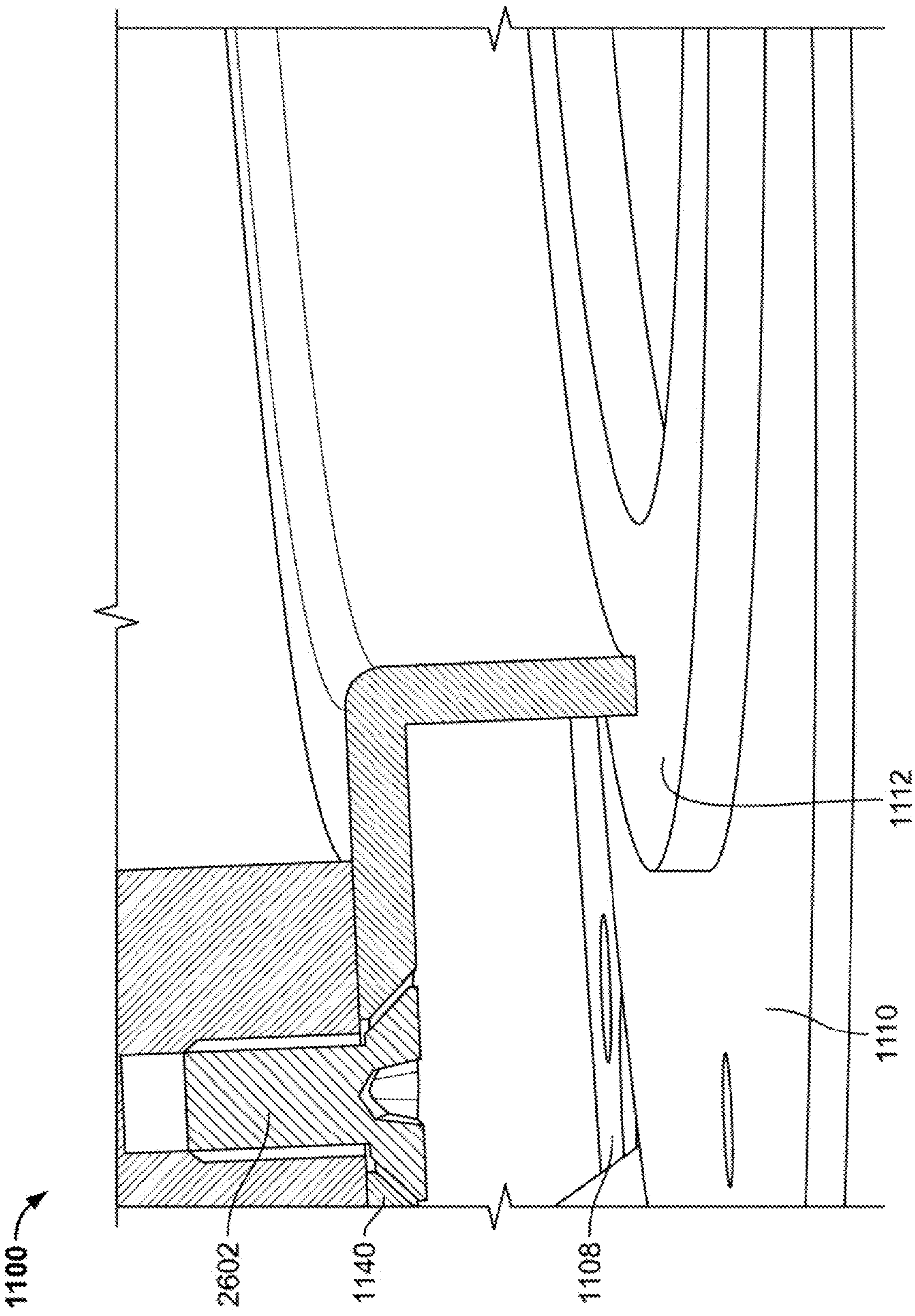
FIG. 26 shows illustrative apparatus in accordance with principles of the invention.

FIG. 26 shows a partial view of fixture 1100. Fixture 1100 may include gasket 1112, collar plate 1110, spackle plate 1108,and housing ring 1140. Housing ring 1140 may be fastened to housing 1102 via housing ring mounting screws 2602.

Figure 27:
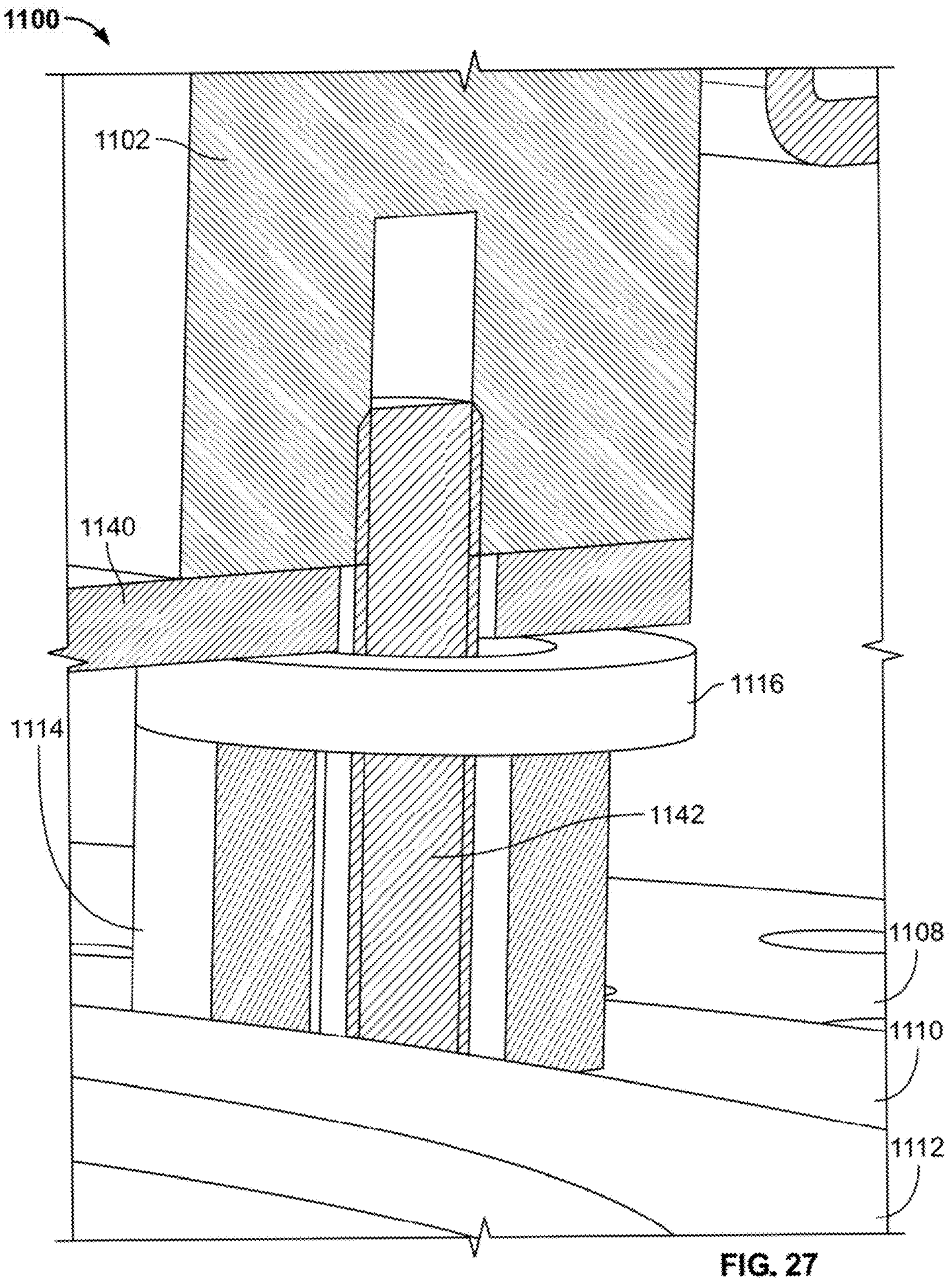
FIG. 27 shows illustrative apparatus in accordance with principles of the invention.

FIG. 27 shows a partial view of fixture 1100. Fixture 1100 may include gasket 1112, collar plate 1110, spackle plate 1108, spacer 1114, bushing 1116, housing ring 1140. Spackle plate 1108 may be mounted to housing 1102 using spackle plate mounting screws 1142. Gasket 1112, bushing 1116, and spacer 1114 may be configured to prevent the transfer of heat from heat sink 1104 to spackle plate 1108.

Figure 28:
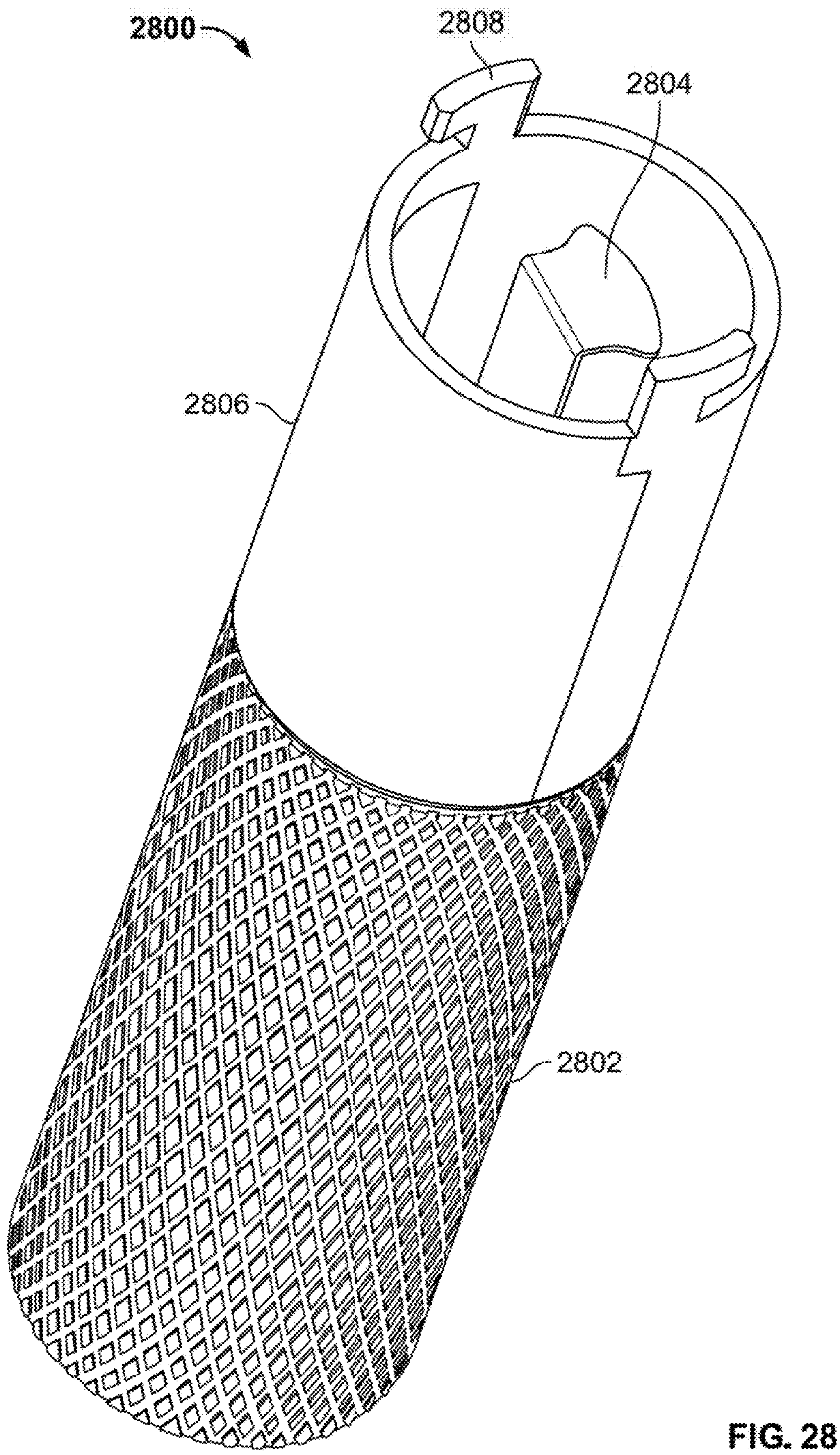
FIG. 28 shows illustrative apparatus in accordance with principles of the invention.

FIG. 28 shows illustrative tool 2800. Tool 2800 may be configured to remove the reflector, trim, and lighting assembly from the fixture. Tool 2800 may include base 2802. Base 2802 may include first engagement member 2804. First engagement member 2804 may be configured to attach to the ledge of the trim and disengage the trim and reflector from the spackle plate. Tool 2800 may include tube 2806. Tube 2806 may be threadingly attached to base 2802. Tube 2806 may include second engagement member 2808. Second engagement member 2808 may be configured to engage the tool receptacle included in the LED brace. The tool receptacle may include a recess in the outer surface of the LED brace. Second engagement member 2808 may be dimensioned to fit within the recess. Second engagement member 2808 may be inserted into recess. Upon insertion, tool 2800 may be rotated. Rotating tool 2800 within the recess may allow second engagement member 2808 to engage with an edge of the recess, such as edge 1706 of receptacle 1702 (shown in FIG. 25). Engagement with an edge of the recess may allow second engagement member 2808 to remove the lighting assembly from the heat sink. Second engagement member 2808 may be configured to remove the lighting assembly with a linear pull along the central axis, such like axis $L_1$ (shown in FIG. 1).

Figure 29:
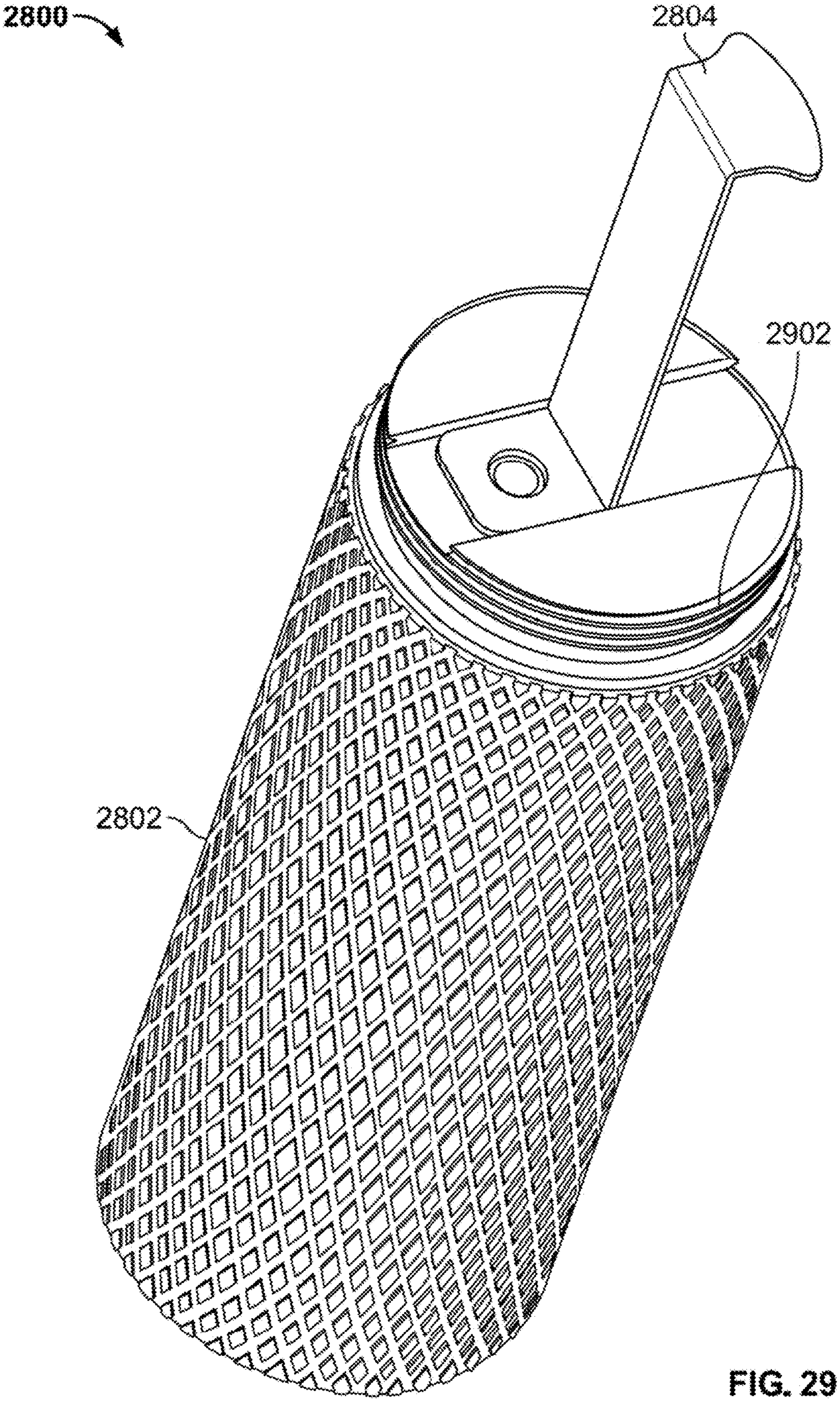
FIG. 29 shows illustrative apparatus in accordance with principles of the invention.

FIG. 29 shows another view of tool 2800. Tool 2800 may include base 2802 and first engagement member 2804. Base 2802 may include threading 2902. Threading 2902 may be configured to accept tube 2806.

Figure 30:
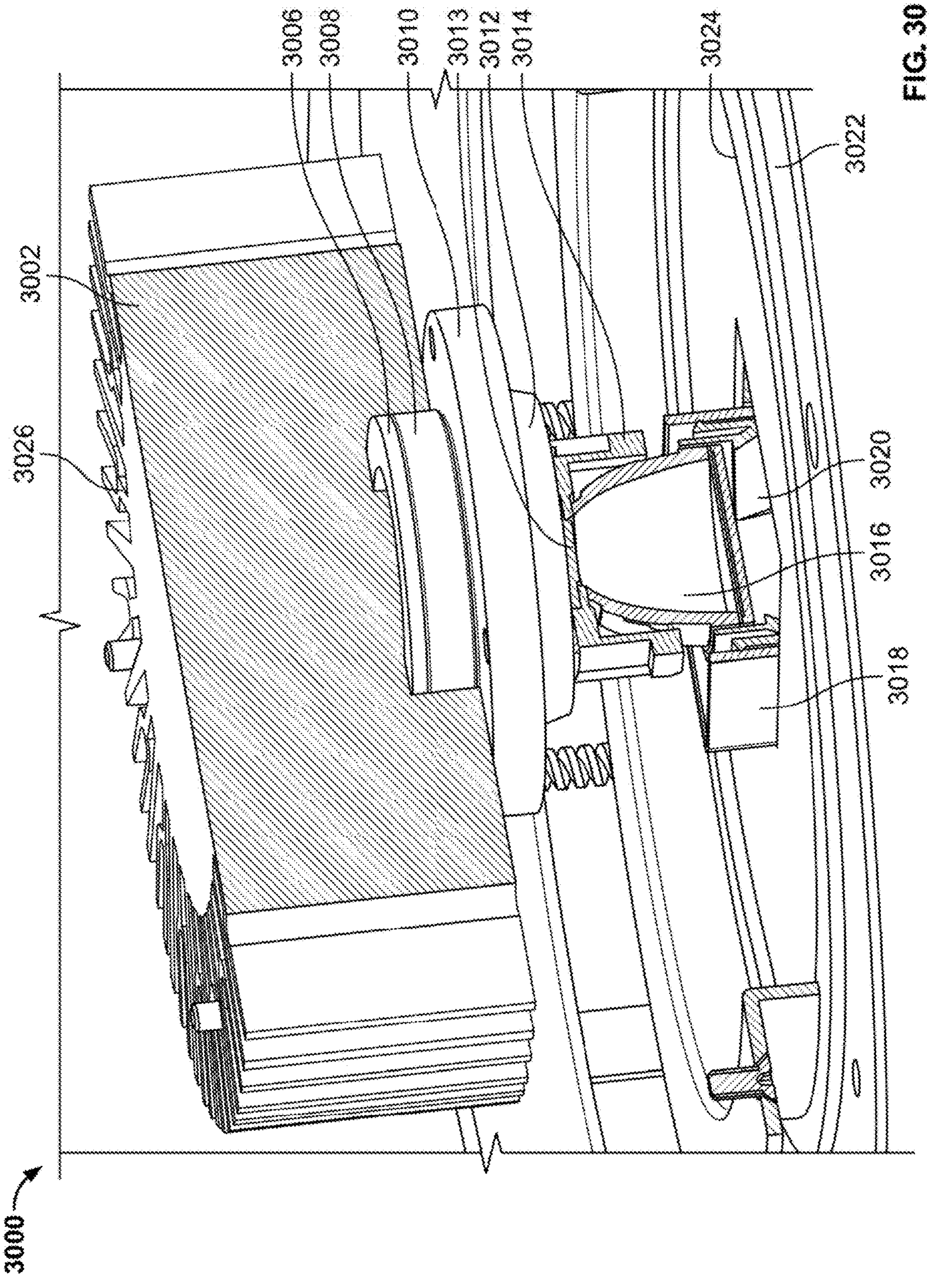
FIG. 30 shows illustrative apparatus in accordance with principles of the invention with a rectilinear collar and rectilinear trim.

FIG. 30 shows illustrative fixture 3000. Illustrative fixture 3000 may include some or all of the parts described above in relation to fixture 100, fixture 300, fixture 700, and fixture 1100. Fixture 3000 may include heat sink 3002, magnet spacer 3006, magnet 3008, light engine receptacle 3010, light engine base 3012, LED light source 3013, LED brace 3014, reflector 3016, trim 3020, collar 3018, collar plate 3024, spackle plate 3022. Heat sink 3002 may include fins such as fin 3026. Fins such as fin 3026 may be configured and dimensioned to dissipate enough heat from LED light source 3013 such that no components degrade or weaken from excess heat. Trim 3020 and collar 3018 may be configured to have a rectangular shape. Trim 3020 may be configured to engage collar 3018.

Figure 31:
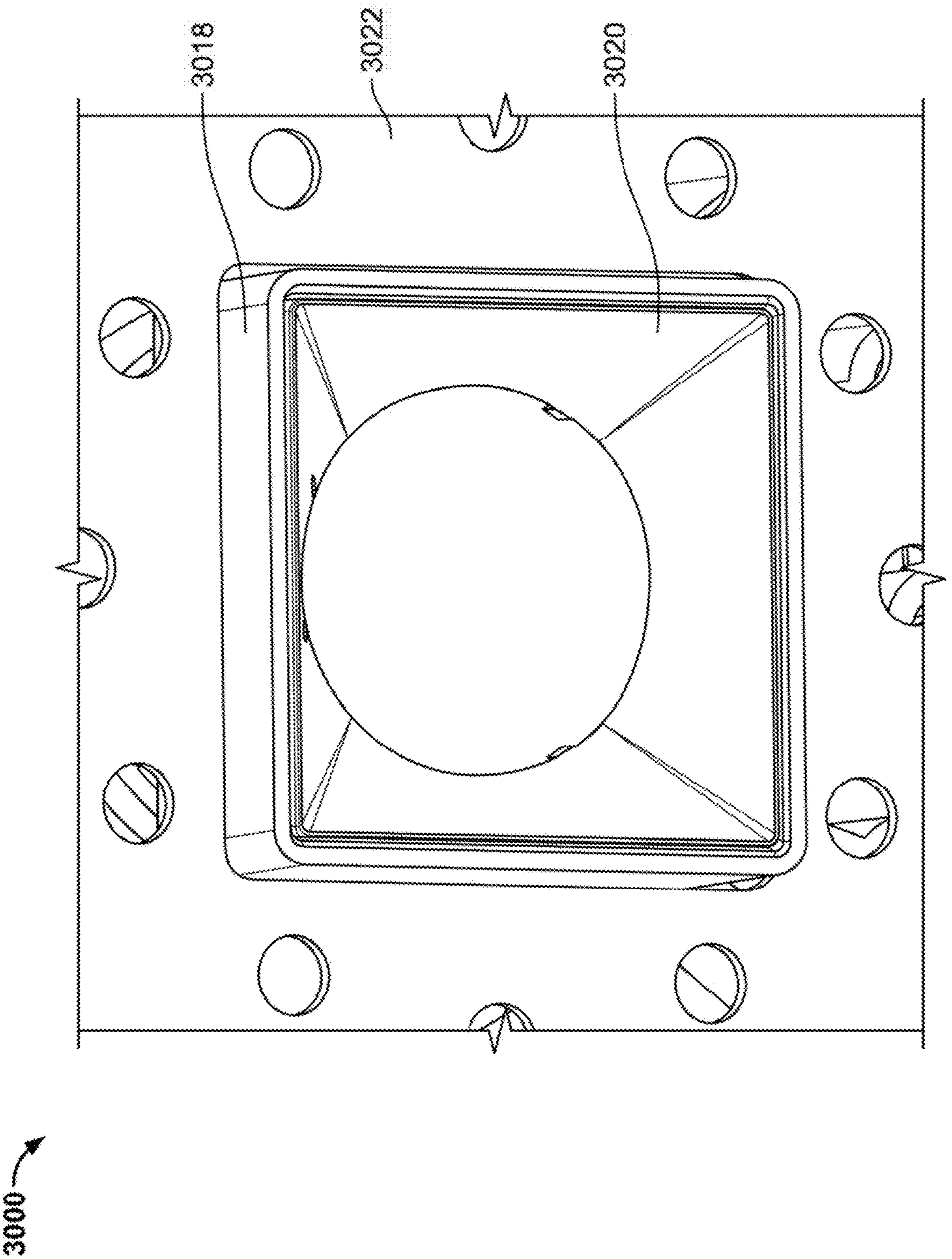
FIG. 31 shows illustrative apparatus in accordance with principles of the invention with a rectilinear collar and rectilinear trim from below.

FIG. 31 shows a bottom view of fixture 3000. Spackle plate 3022 may define collar 3018. Collar 3018 may have a rectangular shape. Trim 3020 may be configured to fit within collar 3018. Trim 3020 may also have a rectangular shape.

Figure 32:
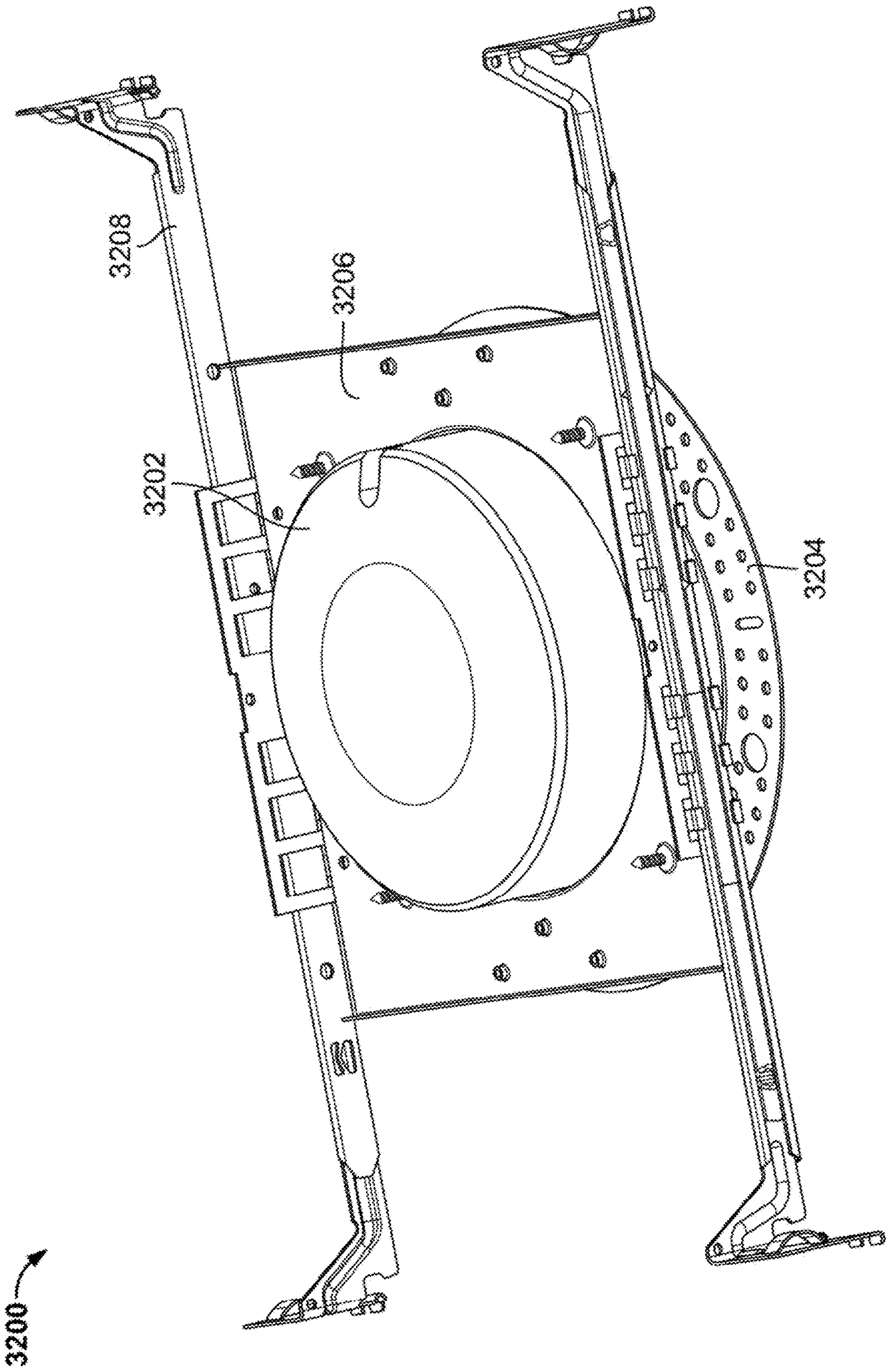
FIG. 32 shows illustrative apparatus in accordance with principles of the invention with a support bracket.

FIG. 32 shows illustrative fixture 3200. Illustrative fixture 3200 may include some or all of the parts described above in relation to fixture 100, fixture 300, fixture 700, fixture 1100, and fixture 3000. Housing 3202 may be mounted on fixture support 3208. Housing 3202 may be mounted on fixture support 3208 with baseplate 3206. Baseplate 3206 may be connected to fixture support 3208. Baseplate 3206 may be connected to fixture support 3208 with brackets. Spackle plate 3204 may be disposed under fixture support 3208.

When the panel includes wood, the top rim of the collar may be disposed lower than a top rim of the collar used with a sheet rock panel.

Figure 33:
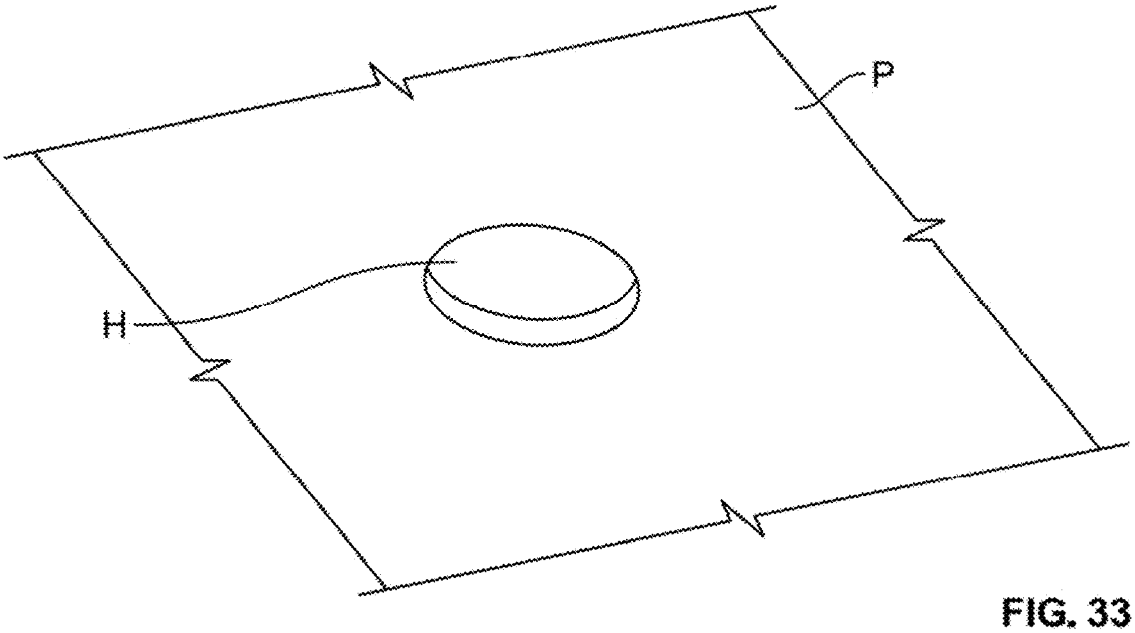
FIG. 33 shows illustrative apparatus in accordance with principles of the invention.

FIG. 33 shows illustrative panel P. Panel P may include hole H.

Figure 34:
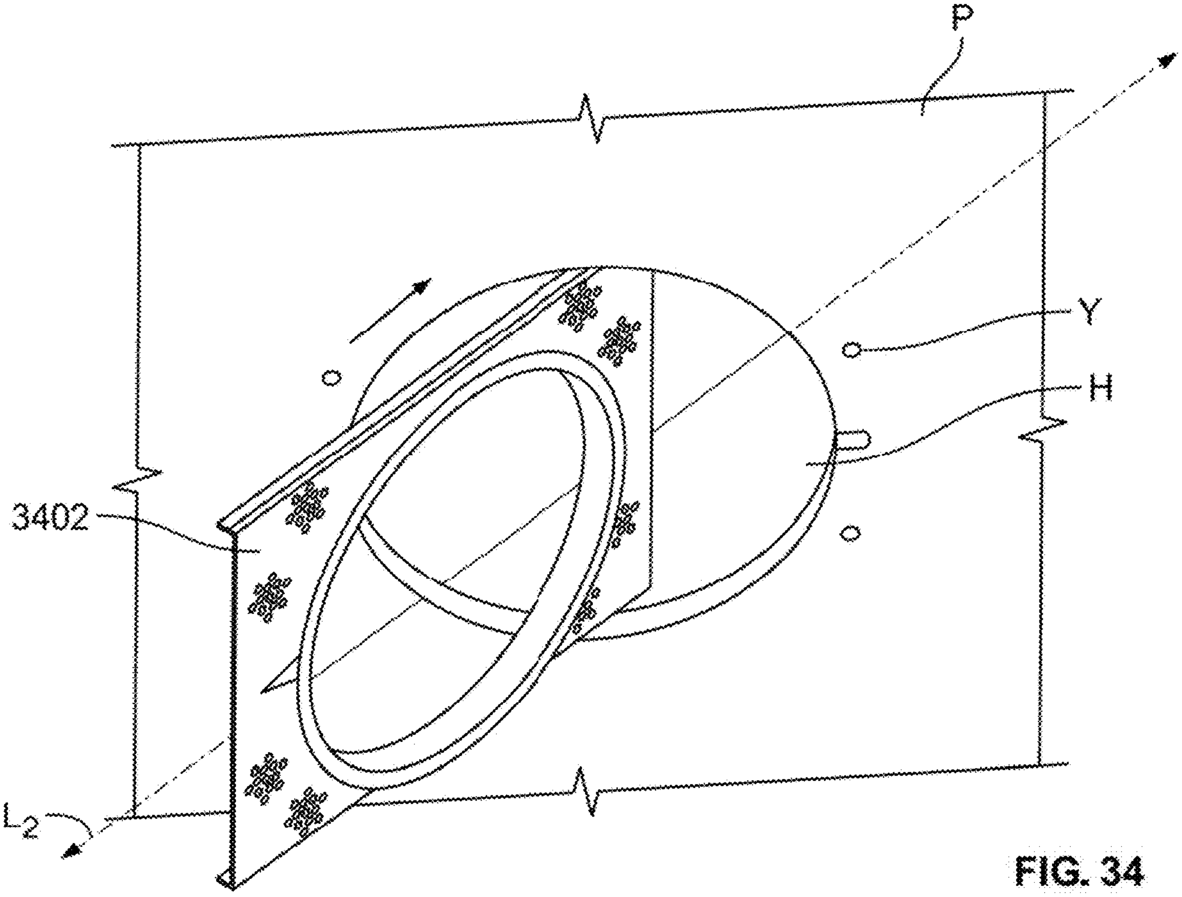
FIG. 34 shows illustrative apparatus in accordance with principles of the invention.

FIG. 34 shows baseplate 3402 being inserted into hole H. An installer may mark dots, such as dot Y at locations along panel P. Dot Y may serve as a guide for placement of baseplate 3402. Baseplate 3402 may be rotated along axis $L_2$ Baseplate 3402 may be placed on top of panel P. Baseplate 3402 may be placed on top of panel P by passing baseplate 3402 through hole H on axis $L_2$.

Figure 35:
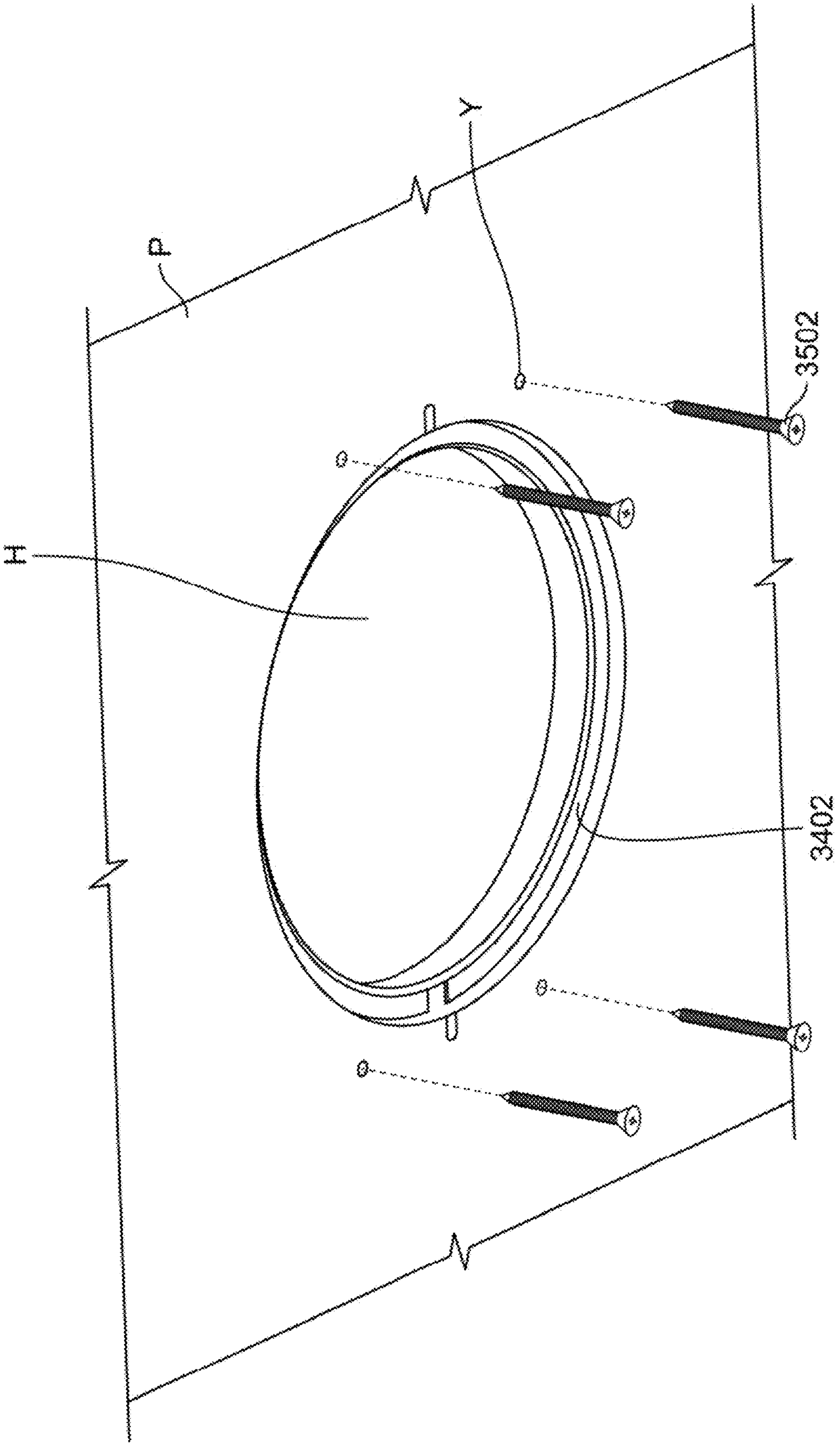
FIG. 35 shows illustrative apparatus in accordance with principles of the invention.

FIG. 35 shows baseplate 3402 being fastened to panel P. Baseplate 3402 may be fastened to panel P using screws 3502. Screws 3502 may be screwed into the location marked by dots such as dot Y.

Figure 36:
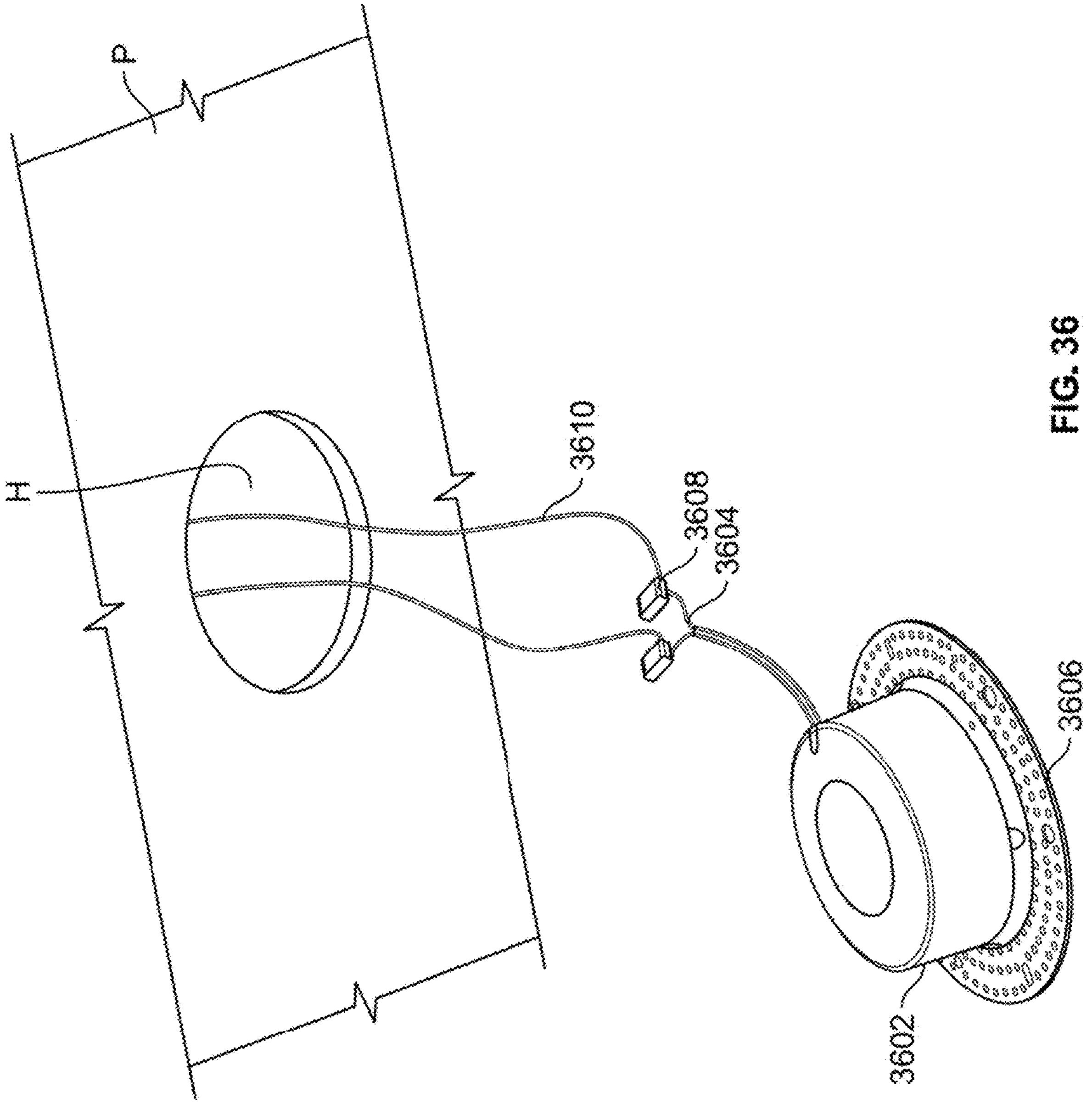
FIG. 36 shows illustrative apparatus in accordance with principles of the invention.

FIG. 36 shows fixture 3602 being inserted into hole H. Fixture 3602 may include one or more features in common with one or more of fixture 100, fixture 300, fixture 700, fixture 1100, fixture 3000, and fixture 3200. Fixture 3602 may include spackle plate 3606. Fixture 3602 may include power leads 3604. Power leads 3604 may be connected to wire leads 3610 from a power supply. Power leads 3604 may be connected to the wire leads using connector 3608. Connector 3608 may be a connector such as that available from Acme Inc., Los Angeles, California, under the trade name WAGO.

Figure 37:
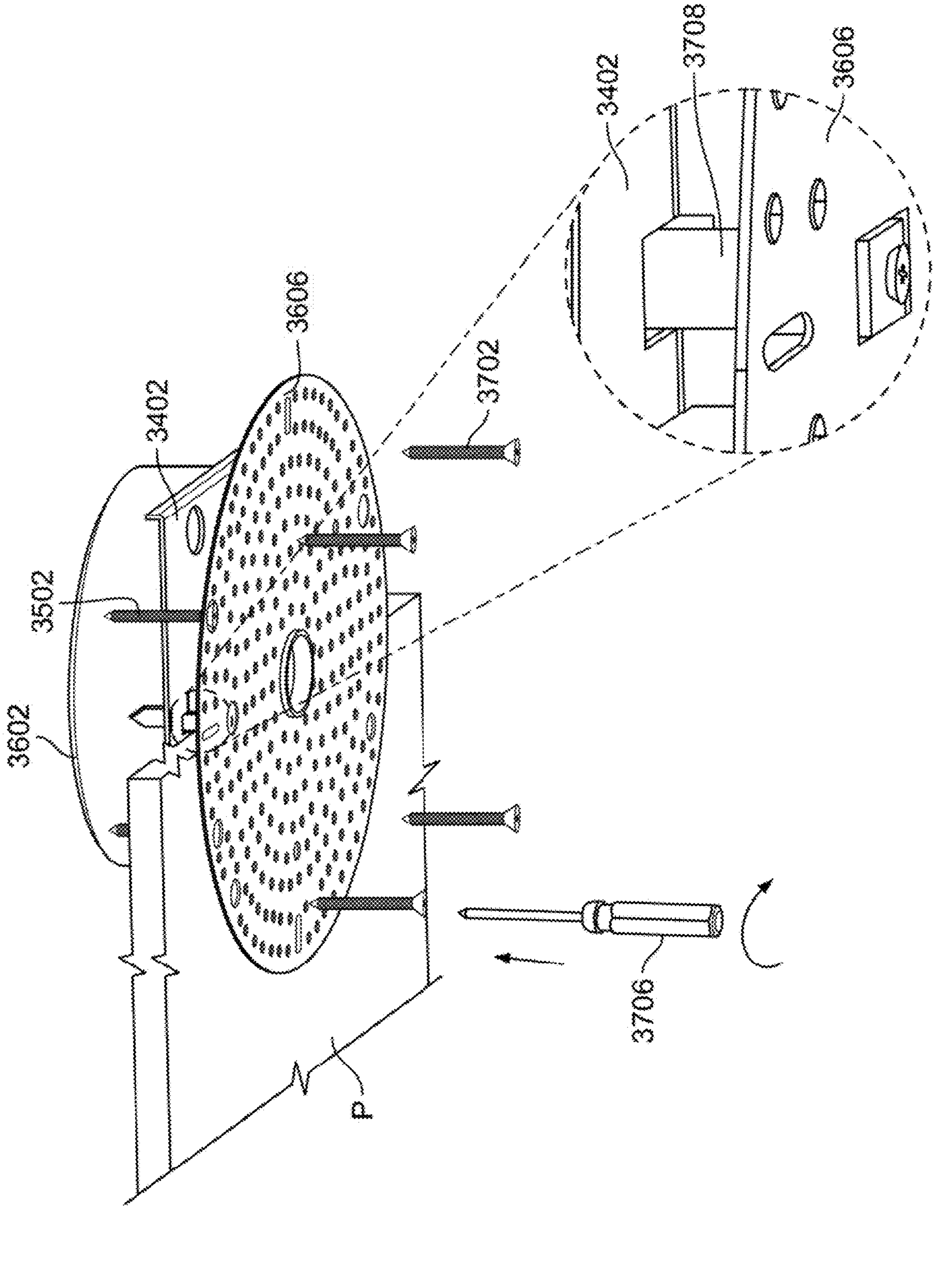
FIG. 37 shows illustrative apparatus in accordance with principles of the invention.

FIG. 37 shows fixture 3602 being fastened to panel P. Fixture 3602 may be placed inside hole H. Fixture 3602 may include tang 3708. Tang 3708 may fit into a cutout in baseplate 3402. Spackle plate 3606 may be connected to fixture 3602 with screws 3502. Spackle plate 3606 may be placed flush against panel P. Fixture 3602 may be mounted in panel P using screws 3702. Screws 3702 may be screwed in with tool 3706.

Figure 38:
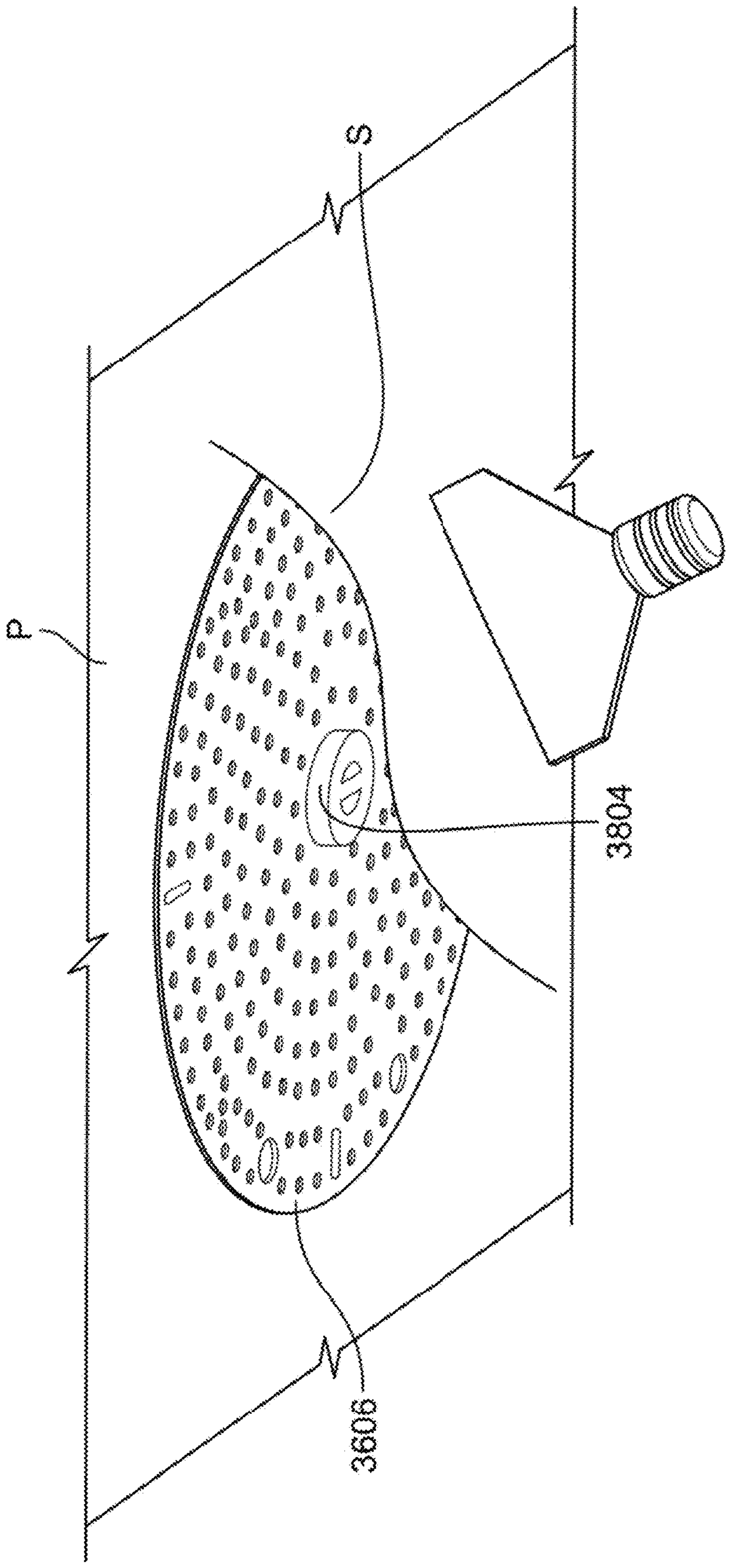
FIG. 38 shows illustrative apparatus in accordance with principles of the invention.

FIG. 38 shows surface treatment S being applied to panel P. Once fixture 3602 is mounted, foam plug 3804 may be inserted. Spackle plate 3606 may include a collar opening. Foam plug 3804 may be inserted into the collar opening with its bottom surface flush with the collar edge. An installer may apply surface treatment S over spackle plate 3606. Foam plug 3804 may be removed from the spackle plate after surface treatment S dries. Surface treatment S may partially cover spackle plate 3606. Surface treatment S may fully cover spackle plate 3606. A reflector and a trim may be installed into the collar opening in spackle plate 3606.

Figure 39:
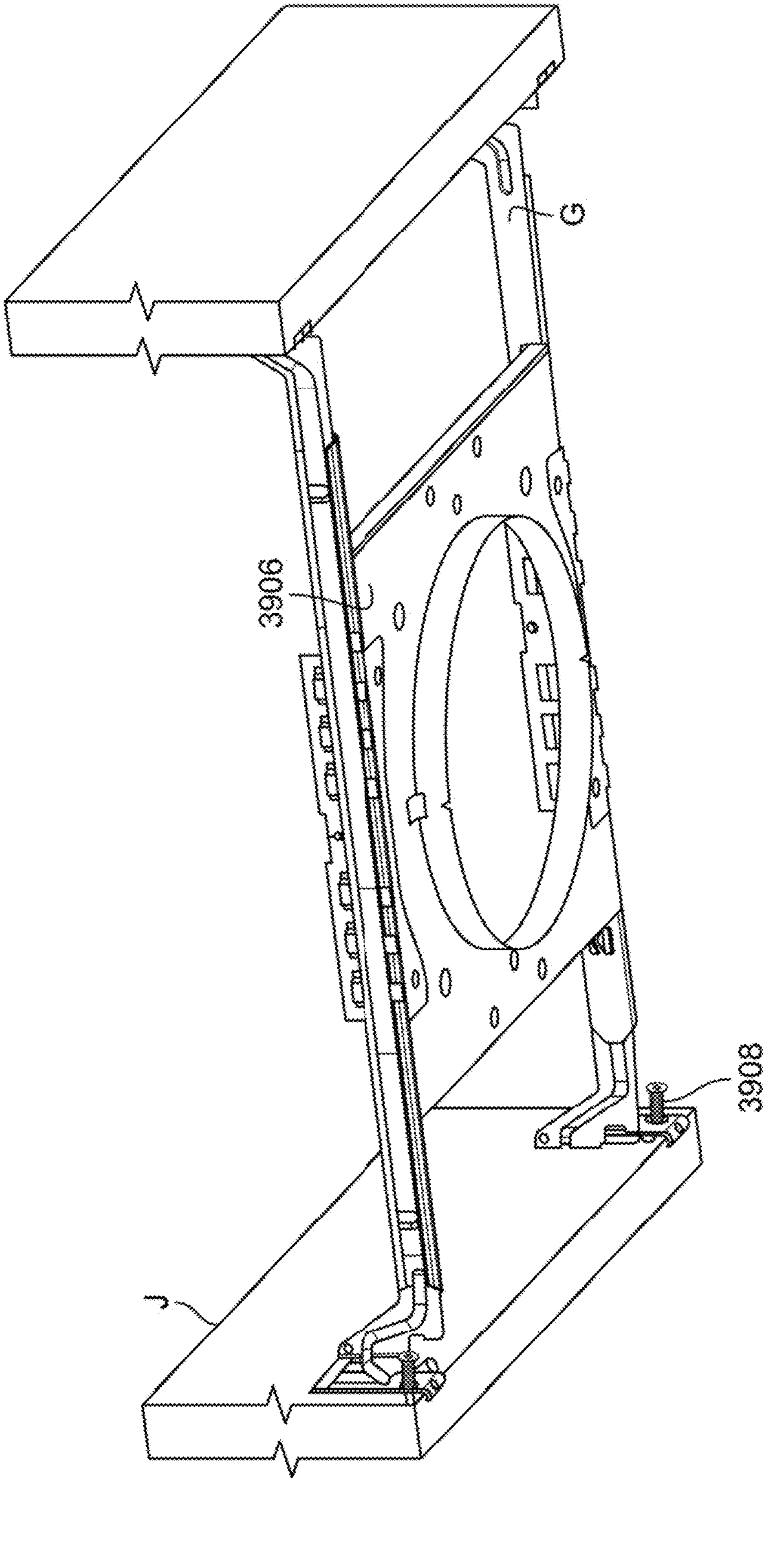
FIG. 39 shows illustrative apparatus in accordance with principles of the invention.

FIG. 39 shows illustrative hanger G. Hanger G may include some or all of the features in common with panel P. Hanger G may be mounted to joist J. Hanger bar 3904 may be mounted to joist J. Hanger G may be mounted using screw-nail 3908. Baseplate 3906 may be slid onto hanger G. Baseplate 3906 may be placed in a desired location. Hanger G may be resizable. Baseplate 3906 may be secured to hanger G with lock-screws.

Figure 40:
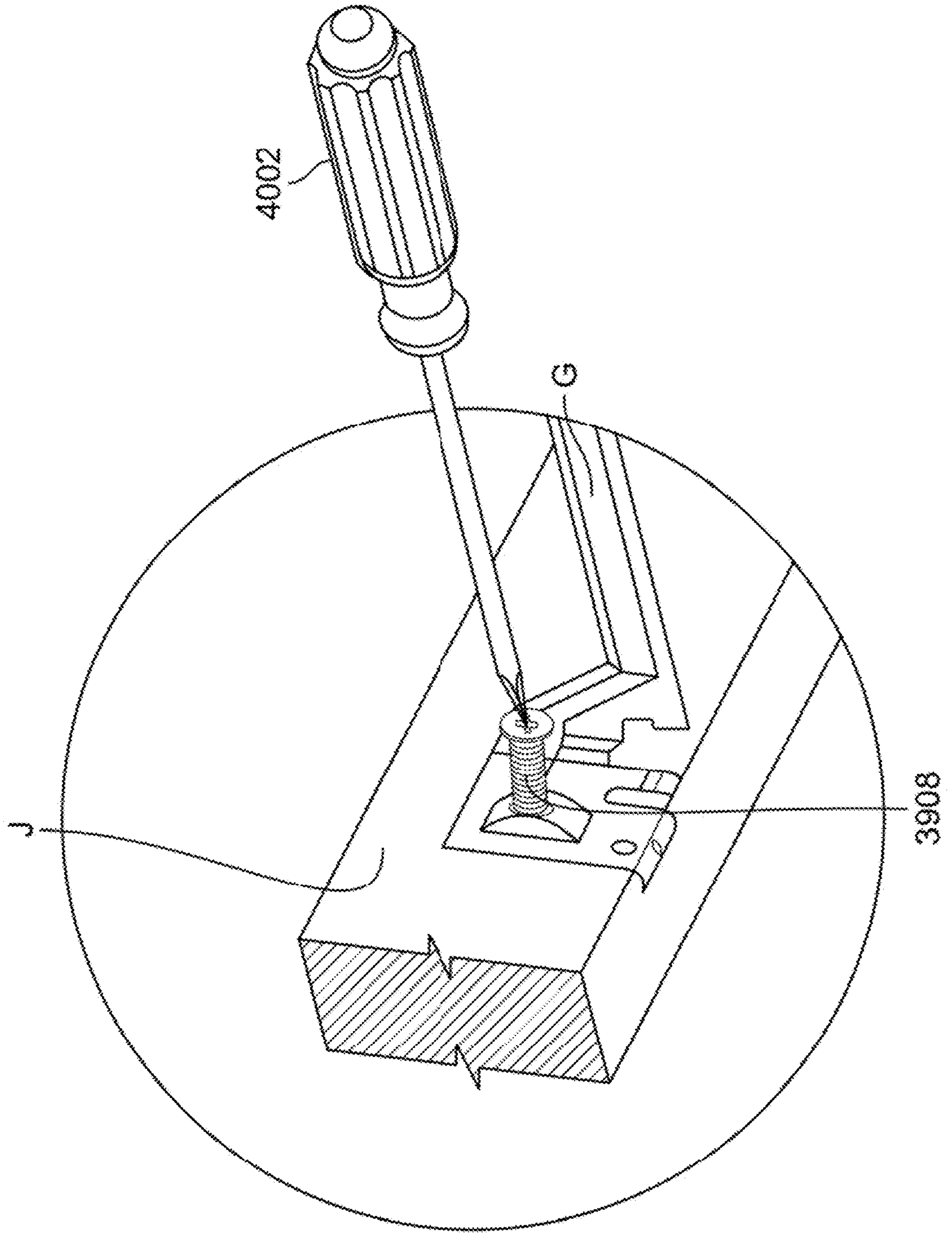
FIG. 40 shows illustrative apparatus in accordance with principles of the invention.

FIG. 40 shows hanger G being mounted to joist J. Screw nail 3908 may mount hanger G to joist J. Screw nail 3908 may be screwed into joist J. Screw nail 3908 may be screwed in using screwdriver 4002. Screw nail may be inserted into joist J using a hammer.

Figure 41:
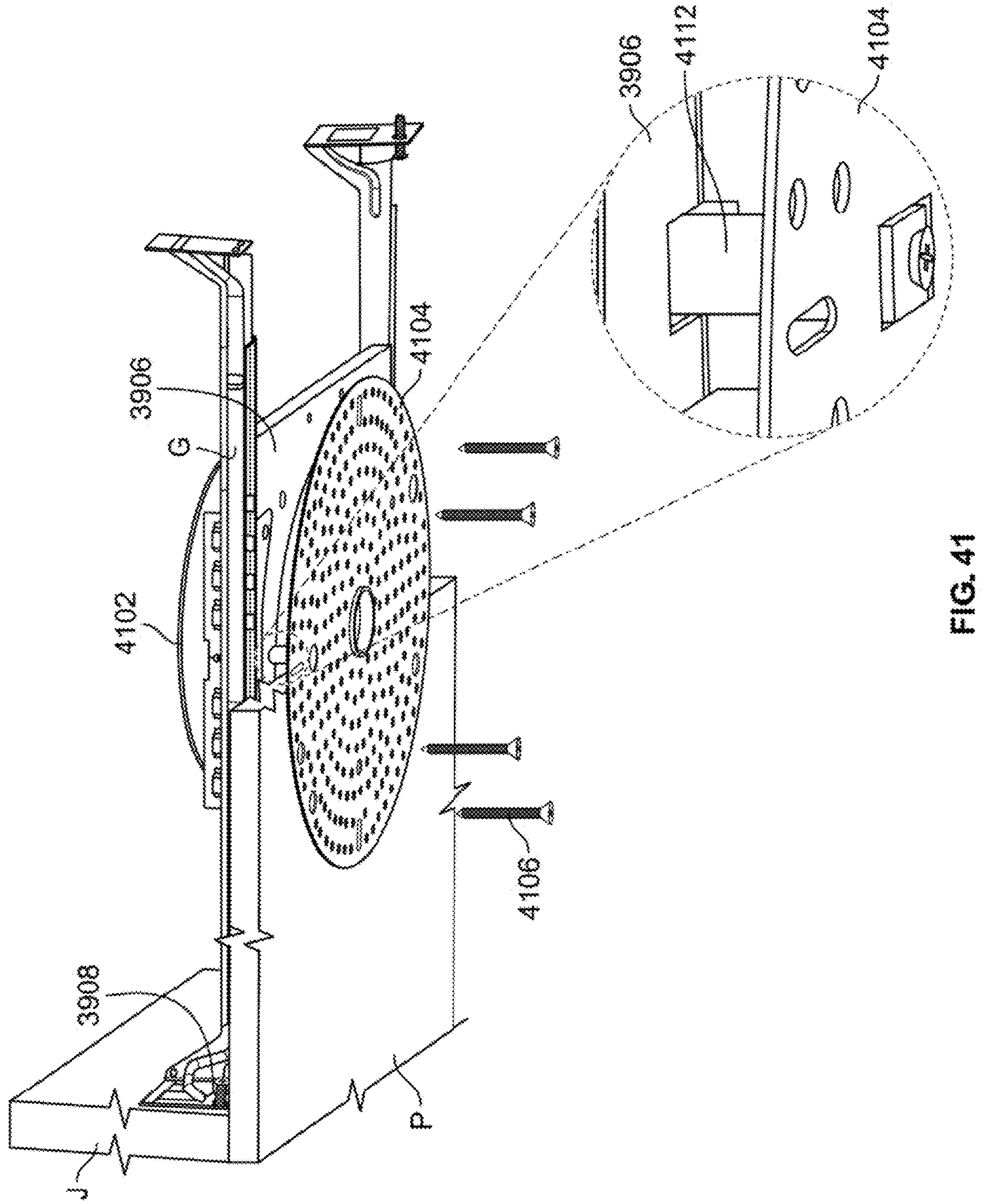
FIG. 41 shows illustrative apparatus in accordance with principles of the invention.

FIG. 41 shows fixture 4102 being inserted into baseplate 3906. Joist J may be connected to panel P. Panel P may include a hole. Fixture 4102 may be inserted into the hole. The fixture may include one or more features in common with one or more of fixture 100, fixture 300, fixture 700, fixture 1100, fixture 3000, fixture 3200, and fixture 3602. Fixture 4102 may include spackle plate 4104. Spackle plate 4104 may be flushed against panel P. Fixture 4102 may be aligned with baseplate 3906 using tang 4112. Tang 4112 may be inserted into a cut out in baseplate 3906. Fixture 4102 and spackle plate 4104 may be mounted using screws 4106. Spackle plate 4104 may be covered with a surface treatment.

Figures 42, 43A, 43B:
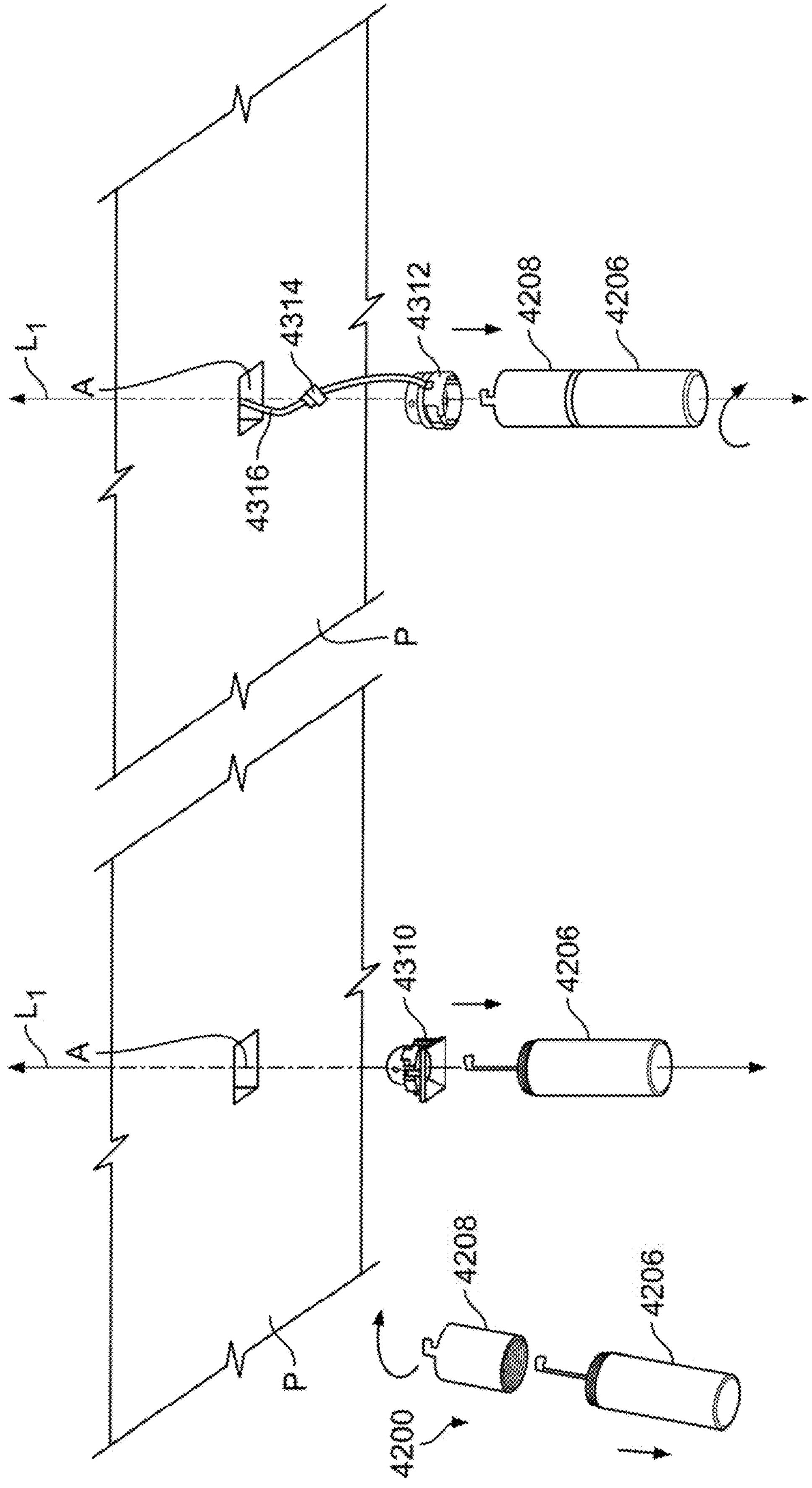
FIG. 42 shows illustrative apparatus in accordance with principles of the invention.
FIG. 43A shows illustrative apparatus in accordance with principles of the invention.
FIG. 43B shows illustrative apparatus in accordance with principles of the invention.

FIG. 42 shows illustrative removal tool 4200. Illustrative removal tool 4200 may include base 4206. Base 4206 may include an engagement member. The removal tool may include tubular engagement member 4208.

FIG. 43A shows reflector 4310 being removed from aperture A. Panel P may house a fixture. The fixture may include one or more features in common with one or more of fixture 100, fixture 300, fixture 700, fixture 1100, fixture 3000, fixture 3200, fixture 3602 and fixture 4102. The fixture may include aperture A. Aperture A may have a square shape. Aperture A may define axis $L_1$. Axis $L_1$ may be a central axis. The fixture may include reflector 4310. Reflector 4310 may include a trim. Reflector 4310 may be releasably engaged with aperture A. A user may use base 4206 and the attached engagement member of removal tool 4200 to remove reflector 4310 from aperture A. Reflector 4310 may be removed by a user with a linearly directed force.

FIG. 43B shows lighting assembly 4312 being removed from aperture A. The fixture may include lighting assembly 4312. Lighting assembly 4312 may be connected via connector 4314 to power lines 4316. Power lines 4316 may be connected to a power supply. Lighting assembly 4312 may be magnetically docked within the fixture. Lighting assembly 4312 may be removed from the fixture with tubular engagement member 4208 of removal tool 4200. Lighting assembly 4312 may be removed from the fixture by a user with a linear force. The linear force may be along axis $L_1$. Lighting assembly 4312 may be serviced once it is removed from the fixture.

Figure 44:
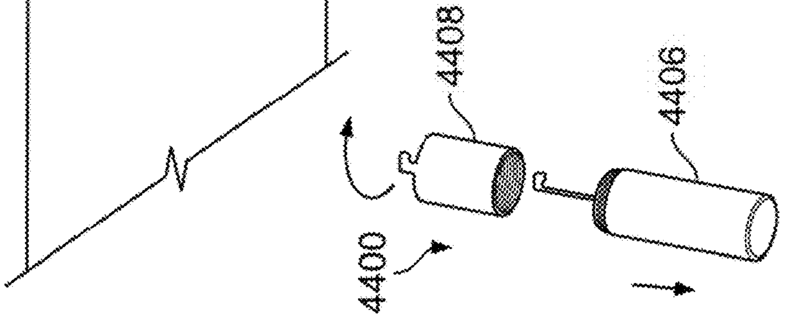
FIG. 44 shows illustrative apparatus in accordance with principles of the invention.

FIG. 44 shows illustrative removal tool 4400. Illustrative removal tool 4400 may include base 4406. Base 4406 may include an engagement member. The removal tool may include tubular engagement member 4408.

Figure 45B:
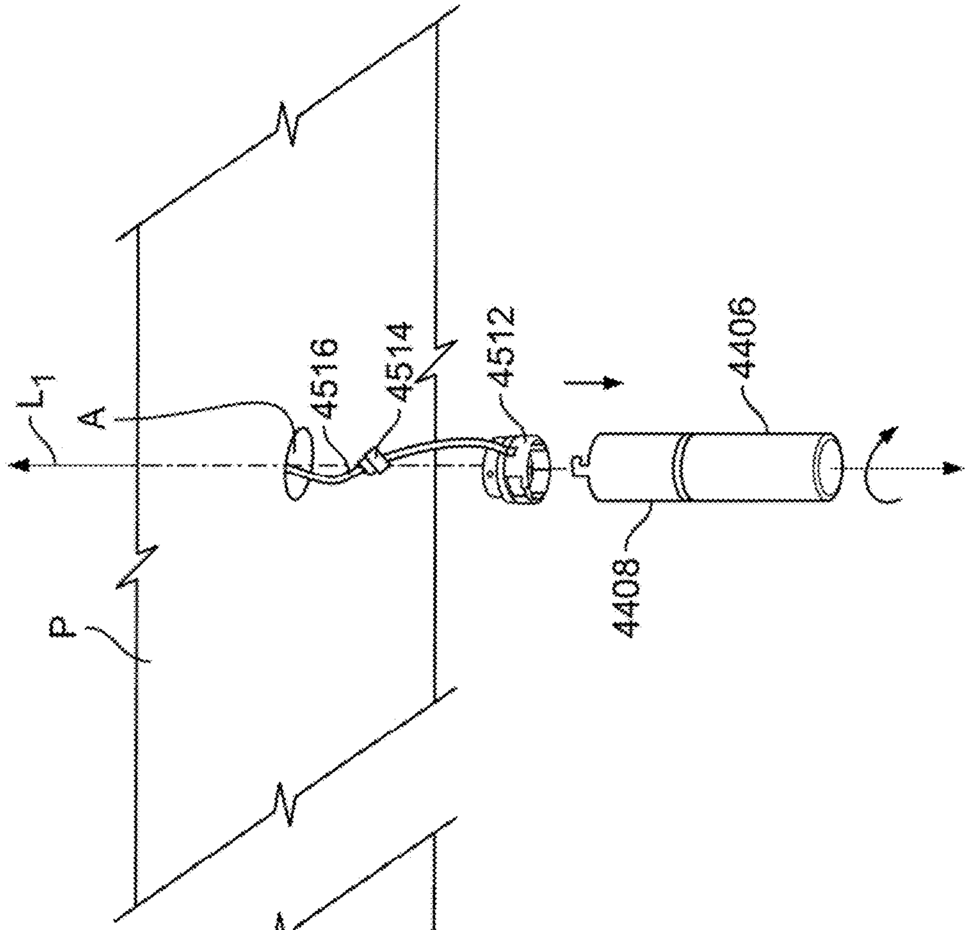
FIG. 45B shows illustrative apparatus in accordance with principles of the invention.
Figure 45A:
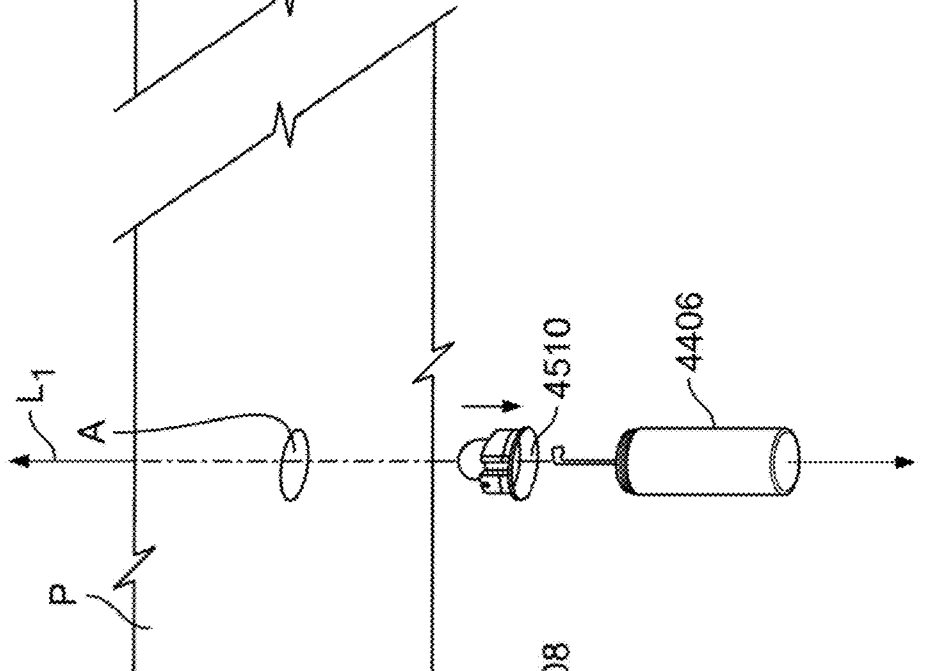
FIG. 45A shows illustrative apparatus in accordance with principles of the invention.

FIG. 45A shows reflector 4510 being removed from aperture A. Panel P may house a fixture. The fixture may include one or more features in common with one or more of fixture 100, fixture 300, fixture 700, fixture 1100, fixture 3000, fixture 3200, fixture 3602 and fixture 4102. The fixture may include aperture A. Aperture A may have a round shape. Aperture A may define axis $L_1$. Axis $L_1$ may be a central axis. The fixture may include reflector 4510. Reflector 4510 may include a trim. Reflector 4510 may be releasably engaged with aperture A. A user may use base 4406 and the attached engagement member of removal tool 4400 to remove reflector 4510 from aperture A. Reflector 4510 may be removed by a user with a linear force.

FIG. 45B shows lighting assembly 4512 being removed from aperture A. The fixture may include lighting assembly 4512. Lighting assembly 4512 may be connected via connector 4514 to power lines 4516. Power lines 4516 may be connected to a power supply. Lighting assembly 4512 may be magnetically docked within the fixture. Lighting assembly 4512 may be removed from the fixture with tubular engagement member 4408 of removal tool 4400. Lighting assembly 4512 may be removed from the fixture by a user with a linear force. The linear force may be along axis $L_1$. Lighting assembly 4512 may be serviced once it is removed from the fixture.

Figure 46:
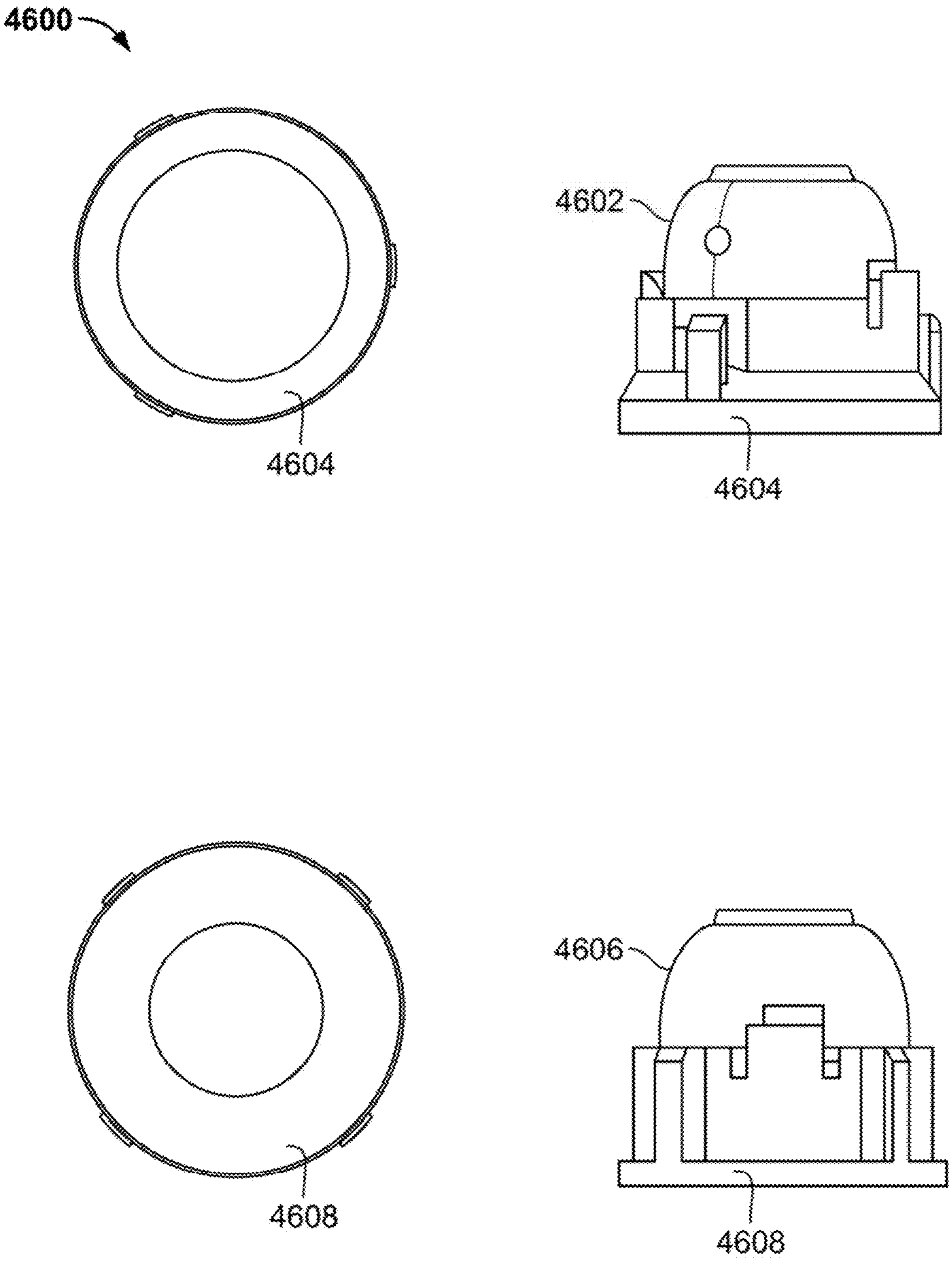
FIG. 46 shows illustrative apparatus in accordance with principles of the invention.

FIG. 46 shows an illustrative assembly 4600. Assembly 4600 may include reflector 4602. Reflector 4602 may include trim 4604. Reflector 4602 may be configured to form a beam of light emitted by an LED light source. Reflector 4602 may be configured to engage a spackle plate. Trim 4604 may be configured to releasably engage reflector 4602.

Assembly 4600 may include reflector 4606. Reflector 4606 may have one or more features in common with reflector 4602. Reflector 4606 may include trim 4608. Reflector 4606 may be configured to form a beam of light emitted by an LED light source. Reflector 4606 may be configured to engage a spackle plate. Trim 4608 may be configured to releasably engage the reflector. Trim 4608 may include a rim. The rim may be visible from a bottom view of reflector 4606.

Figure 47:
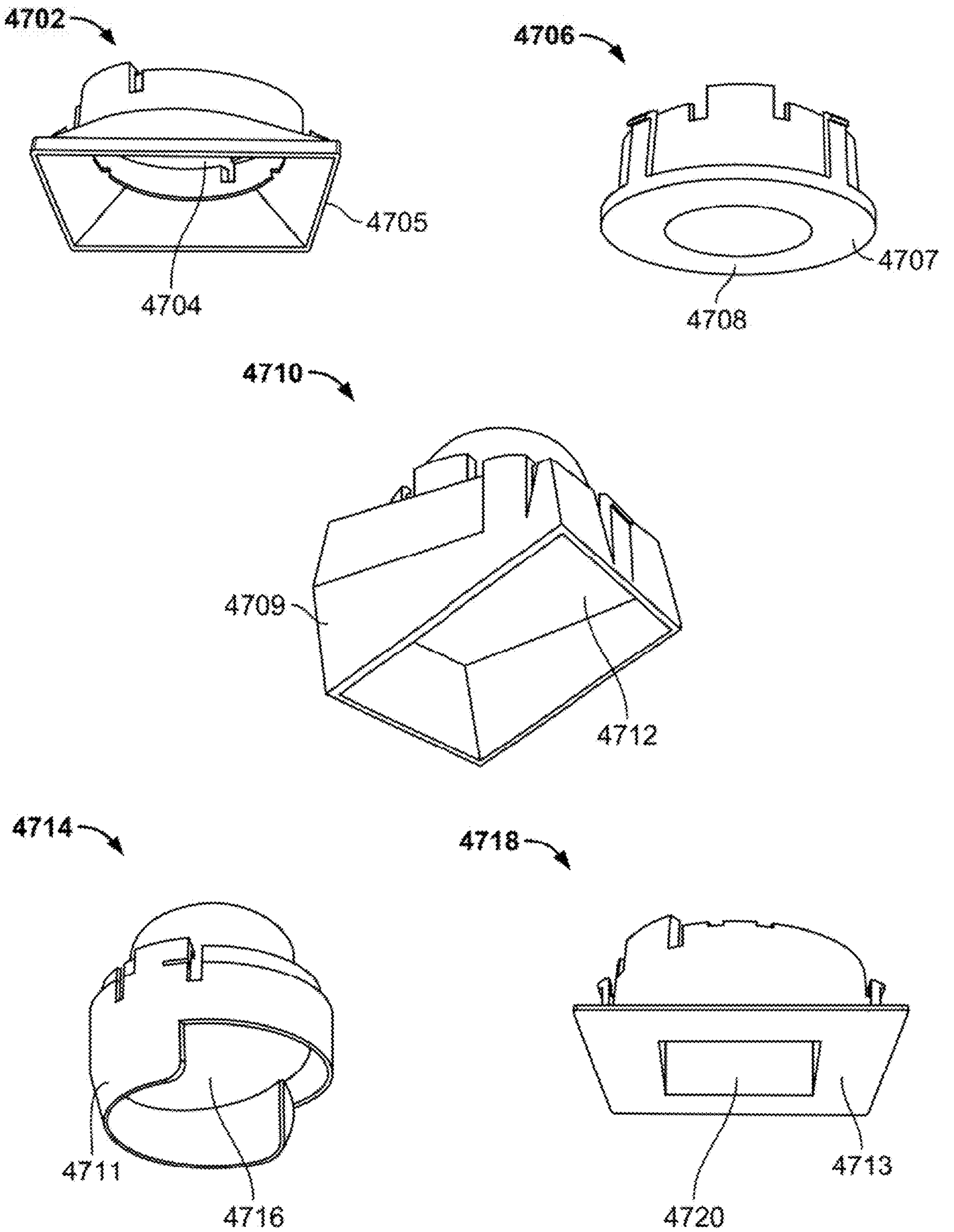
FIG. 47 shows illustrative apparatus in accordance with principles of the invention.

FIG. 47 shows illustrative trims 4702, 4706, 4710, 4714 and 4718. Trim 4702 may include rectilinear trim outline 4705. Trim 4702 may include circular light outlet 4704. Trim 4706 may be a cylindrical trim. Trim 4706 may include circular light outlet 4708. Trim 4706 may include annular flat face 4707. Trim 4710 may include angled extension 4709. Angled extension 4709 may be used for directing light. Trim 4710 may include rectangular light outlet 4712. Trim 4714 may be a cylindrical trim. Trim 4714 may include half cylinder extension 4711. Half cylinder extension 4711 may be used for directing light. Trim 4714 may include circular light outlet 4716. Trim 4718 may include rectangular trim outline 4713. Rectangular trim outline 4713 may include a rectangular flat face. Trim 4718 may include rectangular light outlet 4720.

Figure 48:
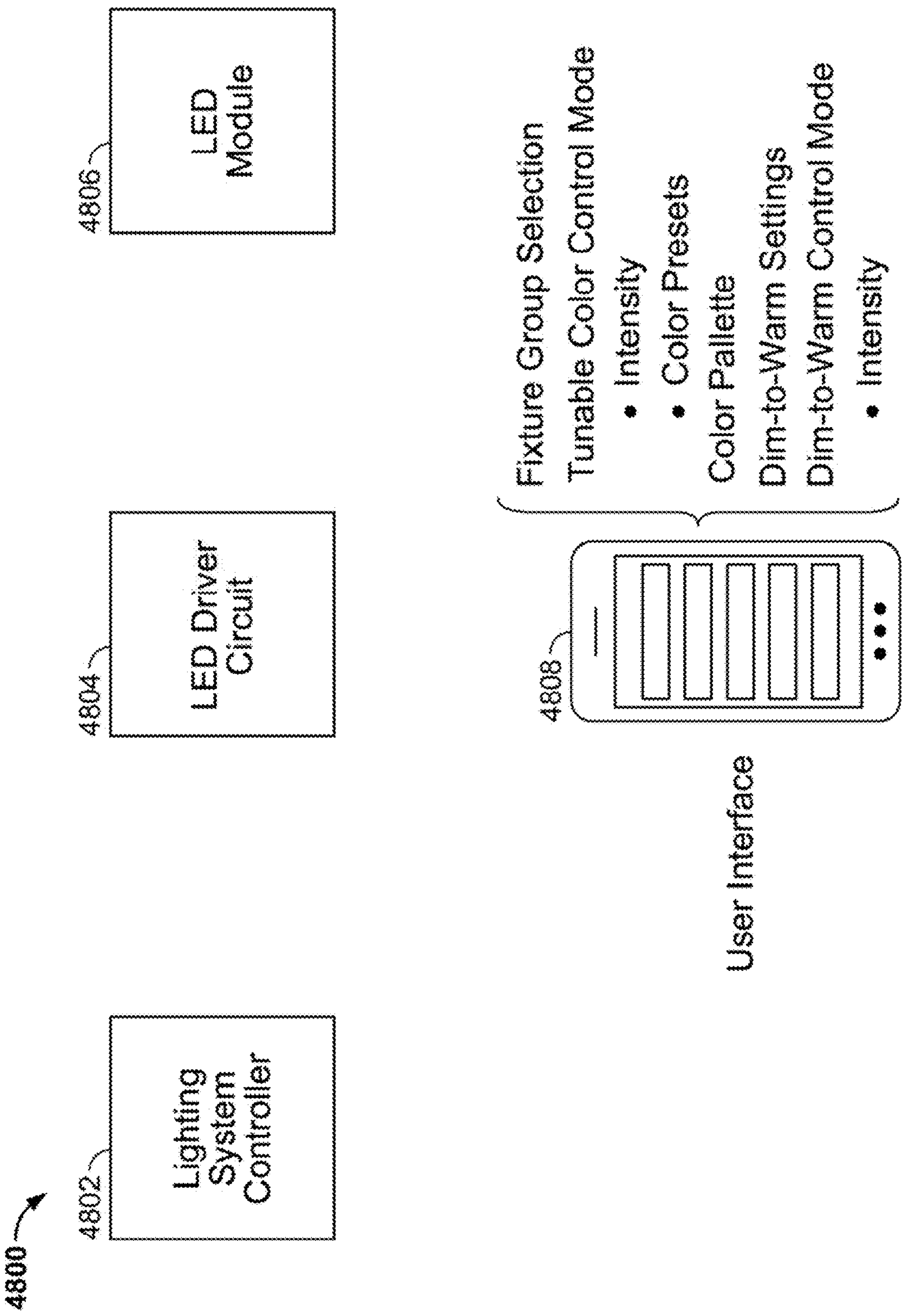
FIG. 48 shows illustrative apparatus in accordance with principles of the invention.

FIG. 48 shows illustrative lighting apparatus 4800. Lighting apparatus 4800 may include some or all of the parts described above in relation to fixture 100, fixture 300, fixture 700, fixture 1100, fixture 3602, and fixture 4102. Lighting apparatus 4800 may include lighting system controller 4802. Lighting system controller 4802 may include a fixture controller. Lighting apparatus 4800 may include LED driver 4804. LED driver 4804 may include a microcontroller. Lighting apparatus 4800 may include LED module 4806. LED module 4806 may include one or more LEDs. The microcontroller may control a plurality of light settings of the one or more LEDs included in LED module 4806.

Lighting apparatus 4800 may include user interface 4808. User interface 4808 may accept user inputs relating to the plurality of lighting settings. The plurality of lighting settings may include one or more of the following: fixture group selection, tunable color mode, intensity mode, color presets, intensity presets, color palette, dim-to-warm settings, dim-to-warm control mode, dim-to-warm intensity, and any other suitable lighting settings.

Table 8 lists illustrative input formats.

TABLE 8

| Illustrative input formats.<br>Illustrative formats |
|---|
| DMX (Digital Multiplexer) |
| DALI (Digital Addressable Lighting Interface) |
| TRIAC or ELV (Phase cut dimmer signal) |
| 0-10 V dimmer signal |
| Z-wave (Z-wave Alliance, Beaverton, Oregon) |
| Zigbee (Zigbee Alliance, of San Ramon, California) |
| Custom user defined |
| Default-provided in memory |
| Other third-party control protocol |
| Other suitable input formats |

Lighting system controller 4802 may include a transmitter. Lighting system controller 4802 may include a receiver. One or both of the transmitter and the receiver may be configured to be in communication with user interface 4808. Lighting system controller 4802 may be in communication with LED driver 4804. LED driver 4804 may be in communication with LED module 4806. The communication may be wired. The communication may be wireless.

The apparatus may include a fixture (not shown). The fixture may include one or more of system controller 4802, LED driver 4804, LED module 4806 and user interface 4808. The fixture may be included in a group of fixtures, such as room downlights. The apparatus may include a fixture support (not shown). The fixture support may include one or more of system controller 4802, LED driver 4804, LED module 4806 and user interface 4808.

LED driver 4804 may include a microcontroller. The microcontroller may control the color and brightness level of LEDs included in LED module 4806. The microcontroller may control the light emitted by the LEDs. The microcontroller may control color of LEDs included in LED module 4806 using a dim-to-warm mode. The microcontroller may control the brightness level of LEDs included in LED module 4806 using a dim-to-warm mode. The microcontroller may control the color of LEDs included in LED module 4806 using a tunable color mode. The microcontroller may control the brightness level of LEDs included in LED module 4806 using a tunable white mode.

LED driver 4804 may receive a command. The command may be received from lighting system controller 4802.

Table 9 shows illustrative commands and illustrative command descriptions.

TABLE 9

Illustrative commands.

| Illustrative commands | Illustrative command description |
|---|---|
| wdLevel | When this parameter is set by an up-stream system, the fixture will go to the brightness and color temperature specified by the Dim-to-warm Curve. |
| wdLow | The color temperature to be rendered at the minimum dimming level.<br>Must be greater than or equal to minColorTemp |
| wdHigh | The color temperature to be rendered at the maximum dimming level.<br>Must be less than or equal to maxColorTemp |
| Other suitable illustrative commands | Other suitable illustrative command description |

Lighting system controller 4802 may provide to the lighting system controller wired inputs. The wired inputs may include, for example, triode for alternating current ("TRIAC")/electronic low voltage ("ELV"), 0-10V or any other suitable input.

The user may use a software application to cause the lighting system controller to set a wdLevel ("warm dim" level) of a fixture or group. This may allow a single wired input (TRIAC/ELV or 0-10V) to control a fixture or group as if it were a dim-to-warm fixture.

For devices with a DMX input the user may configure a DMX channel to set the wdLevel of a fixture or group. This may allow a single DMX channel to control a fixture or group as if it were a dim-to-warm fixture.

When interacting with fixtures or groups capable of a dim-to-warm feature, the application control may display a toggle to set the fixture to dim-to-warm mode. When in dim-to-warm mode, the application may display a single slider representing the wdLevel of the fixture or group. The application may be an application that does not display separate intensity CCT controls.

The fixture settings for applicable fixtures may also allow for the setting of the wdLow and wdHigh value for those fixtures.

The fixture may calculate the brightness and color temperature to emit when a wdLevel command is received.

Figure 49:
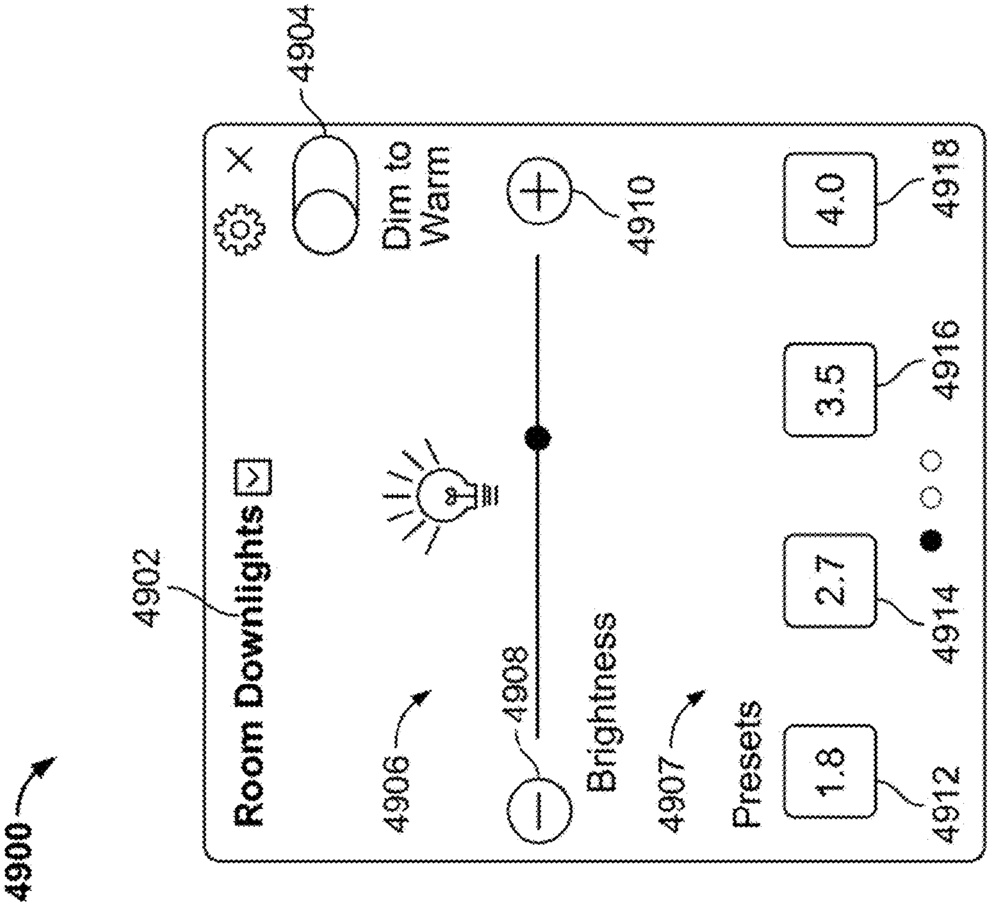
FIG. 49 shows illustrative apparatus in accordance with principles of the invention.

FIG. 49 shows user interface view 4900. User interface view 4900 may be a tunable color control mode. User interface view 4900 may include two or more user-selectable controls, such as a brightness and a correlated color temperature ("CCT"). The user-selectable controls may include brightness control 4906. Brightness control 4906 may include brightness selector 4908. Brightness control 4906 may include brightness selector 4910. Brightness selector 4908 may decrease the brightness level of the light emitted by LED module 4806. Brightness selector 4910 may increase the brightness level of the light emitted by LED module 4806. Brightness control 4906 may include a slider. A user may slide along the slider to determine a desired brightness. The brightness control may be an intensity control. The brightness control may include a dimming control.

The user-selectable controls may include preset CCT control 4907. Preset CCT control 4907 may include presets 4912, 4914, 4916, and 4918. Presets 4912, 4914, 4916, and 4918 may each correspond to a preset CCT value. The user may use preset CCT control 4907 to select a CCT of light emitted by LED module 4806.

View 4900 may include drop-down list 4902 from which the user may select a group of fixtures to control. The group of fixtures may include direct lighting fixtures. The group of fixtures may include indirect lighting fixtures. View 4900 may include mode switch 4904. Mode switch 4904 may be configured to enable a selection between a tunable color mode (such as that shown) and a dim-to-warm mode.

Figure 50:
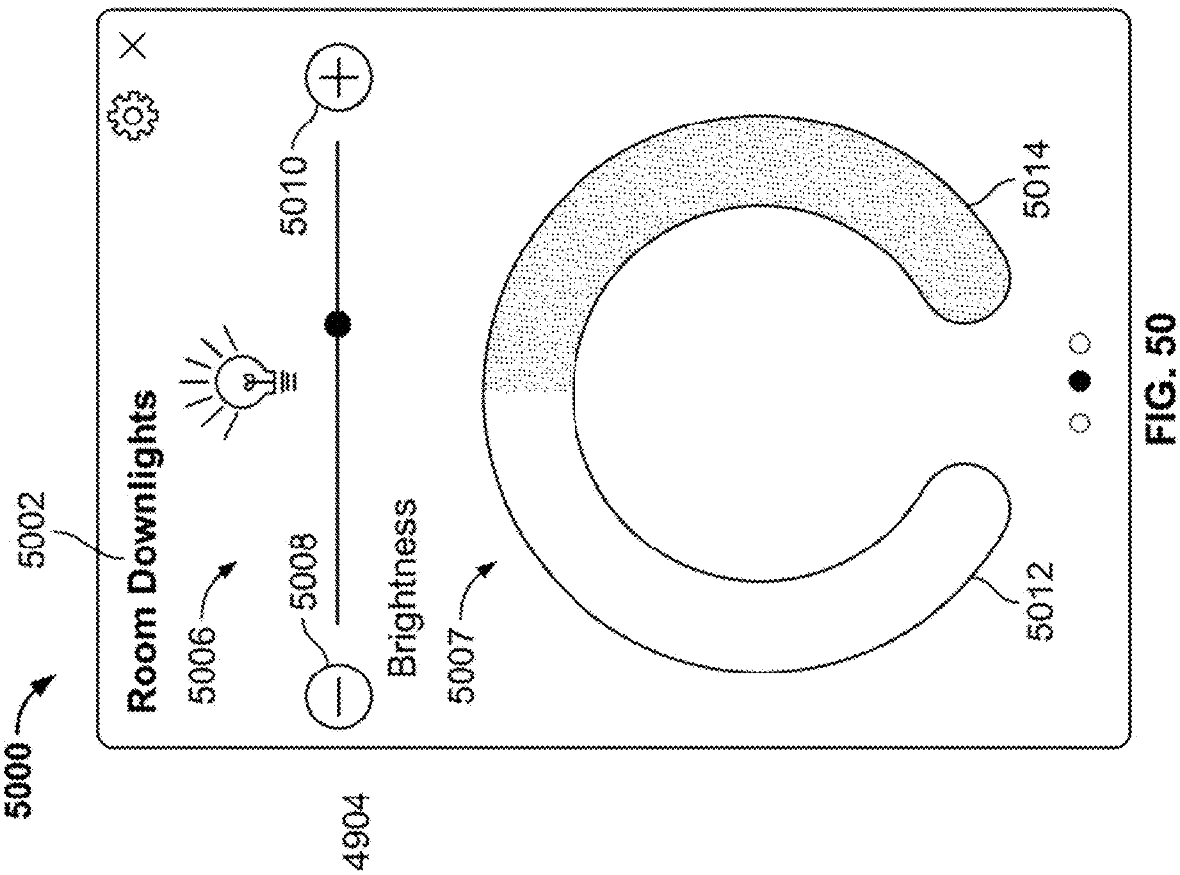
FIG. 50 shows illustrative apparatus in accordance with principles of the invention.

FIG. 50 shows user interface view 5000. User interface view 5000 may be a tunable color control mode. User interface view 5000 may include two or more user-selectable controls The two or more user-selectable controls may include brightness control 5006. Brightness control 5006 may include brightness selector 5008. Brightness control 5006 may include brightness selector 5010. Brightness selector 5008 may decrease the brightness level of the light emitted by LED module 4806. Brightness selector 5010 may increase the brightness level of the light emitted by LED module 4806. Brightness control 5006 may include a slider. A user may slide along the slider to determine a desired brightness. The brightness control may be an intensity control. The brightness control may include a dimming control.

The two or more user-selectable controls may include continuous CCT control 5007. Continuous CCT control 5007 may include low-CCT end 5012. Continuous CCT control may include high-CCT end 5014. Continuous CCT control 5007 may include a range of CCTs from low-CCT end 5012 to high-CCT end 5014. The user may use continuous CCT control 5007 to select a desired CCT of light to be emitted by LED module 4806.

View 5000 may include drop-down list 5002 from which the user may select a group of fixtures to control. The group of fixtures may include direct lighting fixtures. The group of fixtures may include indirect lighting fixtures.

Figure 51:
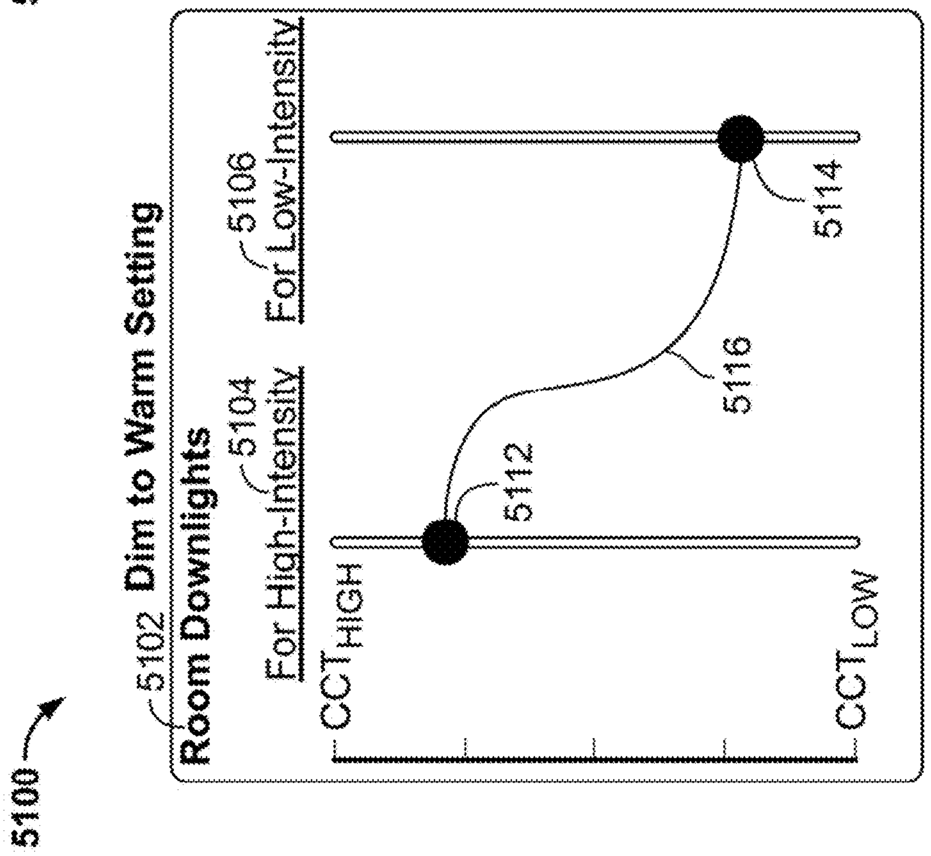
FIG. 51 shows illustrative apparatus in accordance with principles of the invention.

FIG. 51 shows user interface view 5100. User interface view 5100 may be a dim-to-warm control mode. User interface view 5100 may include a parameter selector. User interface view 5100 may include a CCT partition set-point selector. View 5100 may include a high-intensity CCT partition set-point selector 5104. View 5100 may include low-intensity CCT partition set-point selector 5106.

A user may select high-intensity CCT partition set point 5112 using high-intensity CCT partition set-point selector 5104. The user may select low-intensity CCT partition set-point 5114 using low-intensity CCT partition set-point selector 5106. View 5100 may indicate correlation curve 5116 between the selected high-intensity CCT partition set-point 5112 and the low-intensity CCT partition set-point 5114. The user interface may provide the user with a control for selecting correlation curve 5116.

View 5100 may include drop-down list 5102 from which the user may select a group of fixtures to control. The group of fixtures may include direct lighting fixtures. The group of fixtures may include indirect lighting fixtures.

Figure 52:
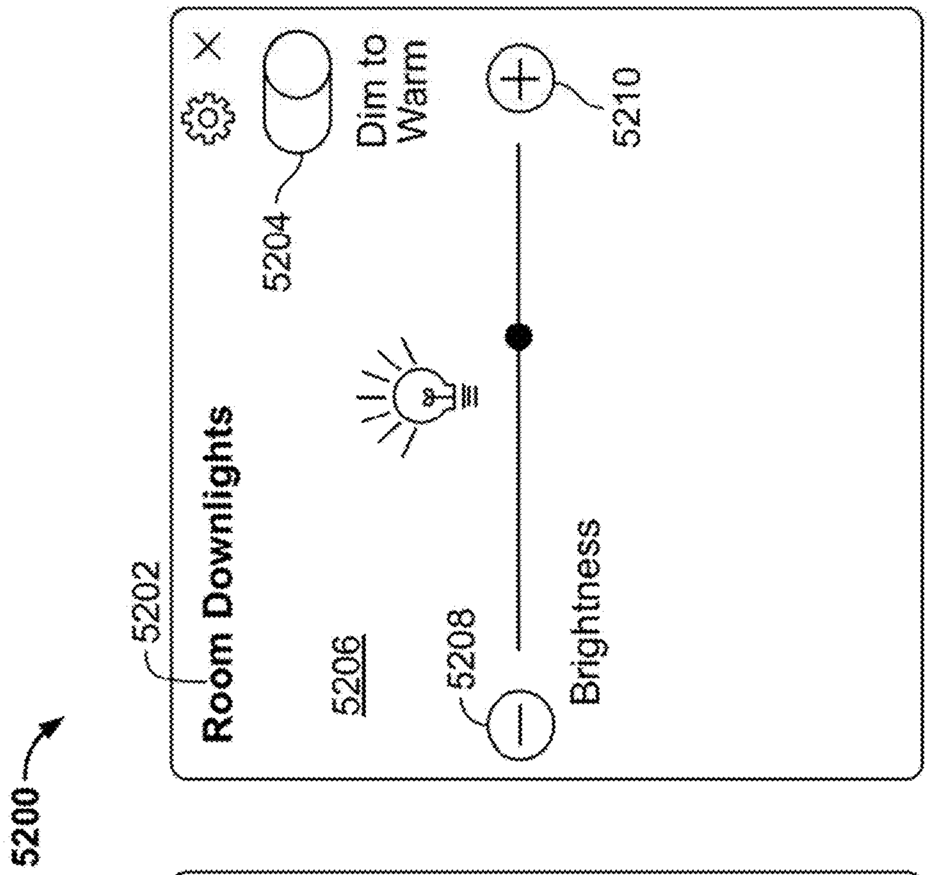
FIG. 52 shows illustrative apparatus in accordance with principles of the invention.

FIG. 52 shows user interface view 5200. User interface view 5200 may be a dim-to-warm control mode. User interface view 5200 may include a user-selectable control. The user-selectable control may be brightness control 5206. Brightness control 5206 may include brightness selector 5208. Brightness control 5206 may include brightness selector 5210. Brightness selector 5208 may decrease the brightness level of the light emitted by LED module 4806. Brightness selector 5210 may increase the brightness level of the light emitted by LED module 4806. Brightness control 5206 may include a slider. A user may slide along the slider to determine a desired brightness. The brightness control may be an intensity control. The brightness control may include a dimming control.

View 5200 may include drop-down list 5202 from which the user can select a group of fixtures to control. The group of fixtures may include direct lighting fixtures. The group of fixtures may include indirect lighting fixtures. View 5200 may include mode switch 5204. Mode switch 5204 may be configured to enable a selection between a tunable color mode and a dim-to-warm mode (such as that shown).

In the dim-to-warm mode, the user may select a brightness from brightness control 5206. The microcontroller may use the selected brightness to compute a corresponding CCT for LED module 4806 based on the selections shown in the dim-to-warm parameter selector view (shown in FIG. 51).

Figure 53:
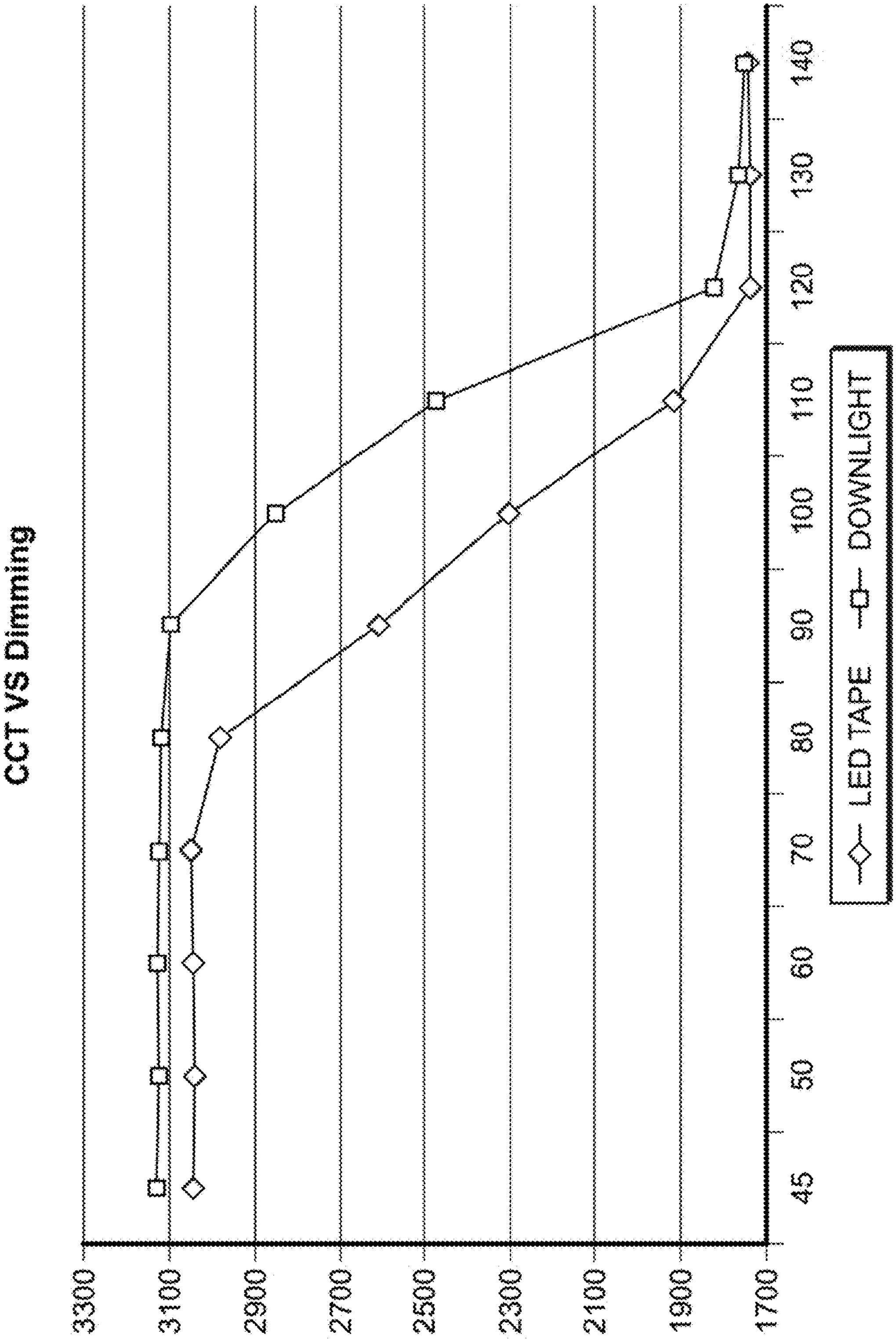
FIG. 53 shows illustrative apparatus in accordance with principles of the invention.

FIG. 53 shows illustrative curves 5300 for a fixture with 1800-3200K CCT capability. Curves 5300 may correspond to user selected CCT partition points and intensity levels from the selector shown in FIGS. 51 and 52. Curves 5300 may correspond to direct lighting fixtures. Curves 5300 may correspond to indirect lighting fixtures.

Figure 54:
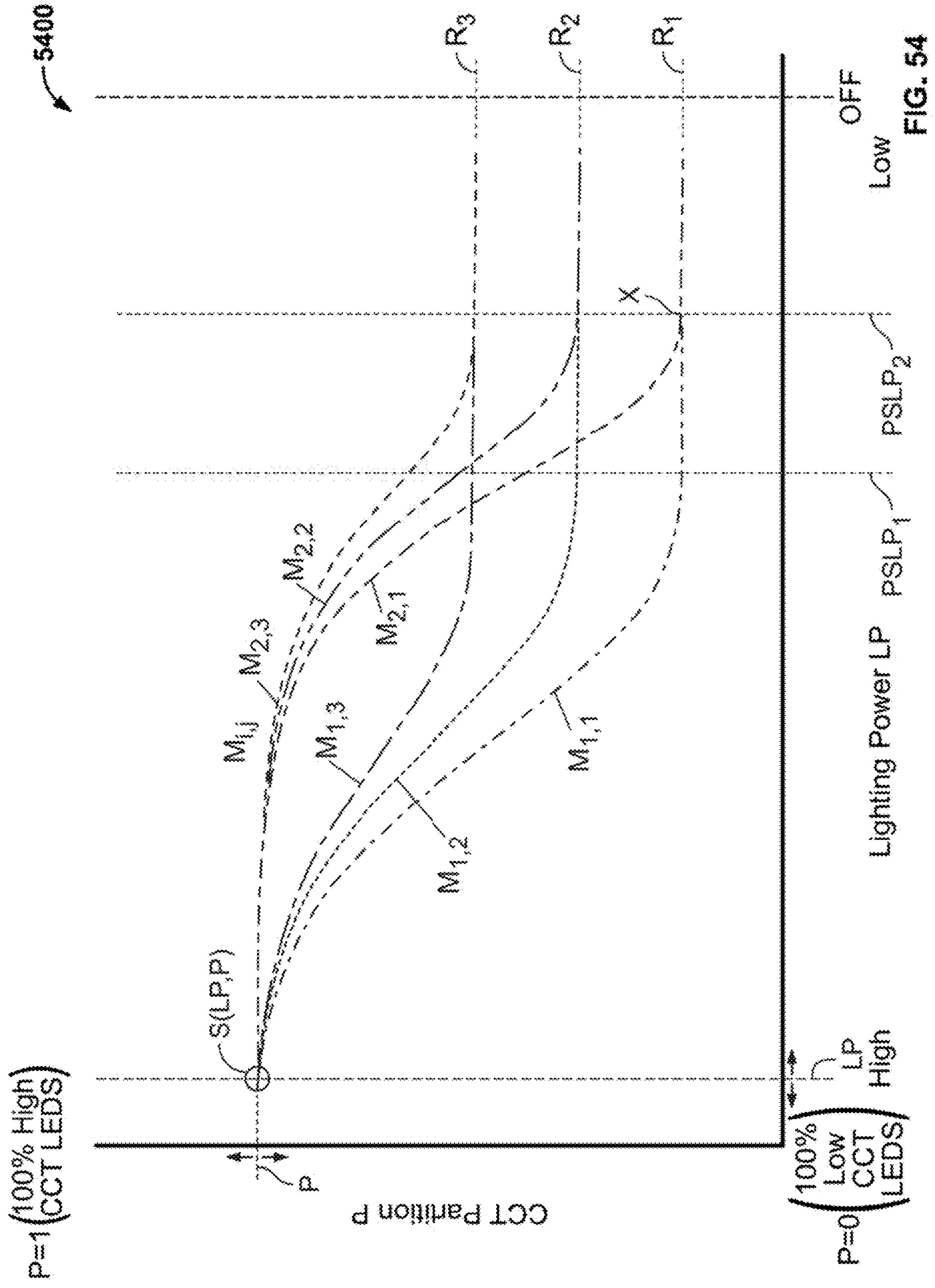
FIG. 54 shows illustrative apparatus in accordance with principles of the invention.

FIG. 54 shows illustrative lighting power CCT scheme 5400. CCT scheme 5400 may have one or more features in common with one or more of dim-to-warm setting view 5100 and user interface view 5200. The horizontal axis may represent a total lighting power (LP) for the high CCT LEDs and the low CCT LEDs included in the lighting module, the lighting module may include one or more features in common with LED module 4806. The vertical axis may represent a partitioning P of power between the high CCT LEDs and the low CCT LEDs. The partitioning may range, for example, from delivery of 100% of the lighting power to low CCT LEDs to delivery of 100% of the lighting power to high CCT LEDs. The partitioning may be linear over the range of LP. The partitioning may be non-linear over the range of LP.

CCT scheme 5400 may include CCT partition curves $M_{i,j}$. i may indicate a preset lighting power $PSLP_k$ such as $PSLP_1$ or $PSLP_2$. j may indicate a CCT partition set-point $R_1$ such as $R_1$, $R_2$ or $R_3$. A CCT partition set-point selector may be used to select a $PSLP_k$. The selector may be used to select a CCT partition set-point $R_1$.

Curves $M_{i,j}$ may be defined using a controller. The controller may have one or more features in common with one or both lighting system controller 4802 and the microcontroller included in LED driver circuit 4804. Curves $M_{i,j}$ may be stored in the microcontroller. Curves $M_{i,j}$ may be calculated using the controller.

Each of curves $M_{i,j}$ may identify a CCT value that is to be displayed in connection with a given lighting power level.

A user may select a preset lighting power PSLP such as $PSLP_2$. The user may set a CCT partition set-point. The CCT partition set-point may correspond to a CCT partition R such as $R_1$. The user may set scene S. Scene S may be defined by a lighting power LP. Scene S may be defined by a partition P. Scene S may be defined by a lighting power LP and a partition P. Scene S may be a preset dim to warm correlation.

When the light source is set to scene S, the user may use dimmer switch to reduce the lighting power of the LEDs. The reduction may proceed in discrete steps. The reduction may be a continuous reduction. The controller may detect the reduction. The controller may determine a curve $M_{2,1}$ that is constrained by scene S, $PSLP_2$ and $R_1$. For each reduced lighting power between scene S and $PSLP_2$, The controller along with a power supply may control the lighting module to provide light having a CCT corresponding to $M_{2,1}$. Target X is the CCT partition set-point defined by $R_1$. $M_{2,1}$ may be flat between target X and OFF.

Figure 55:
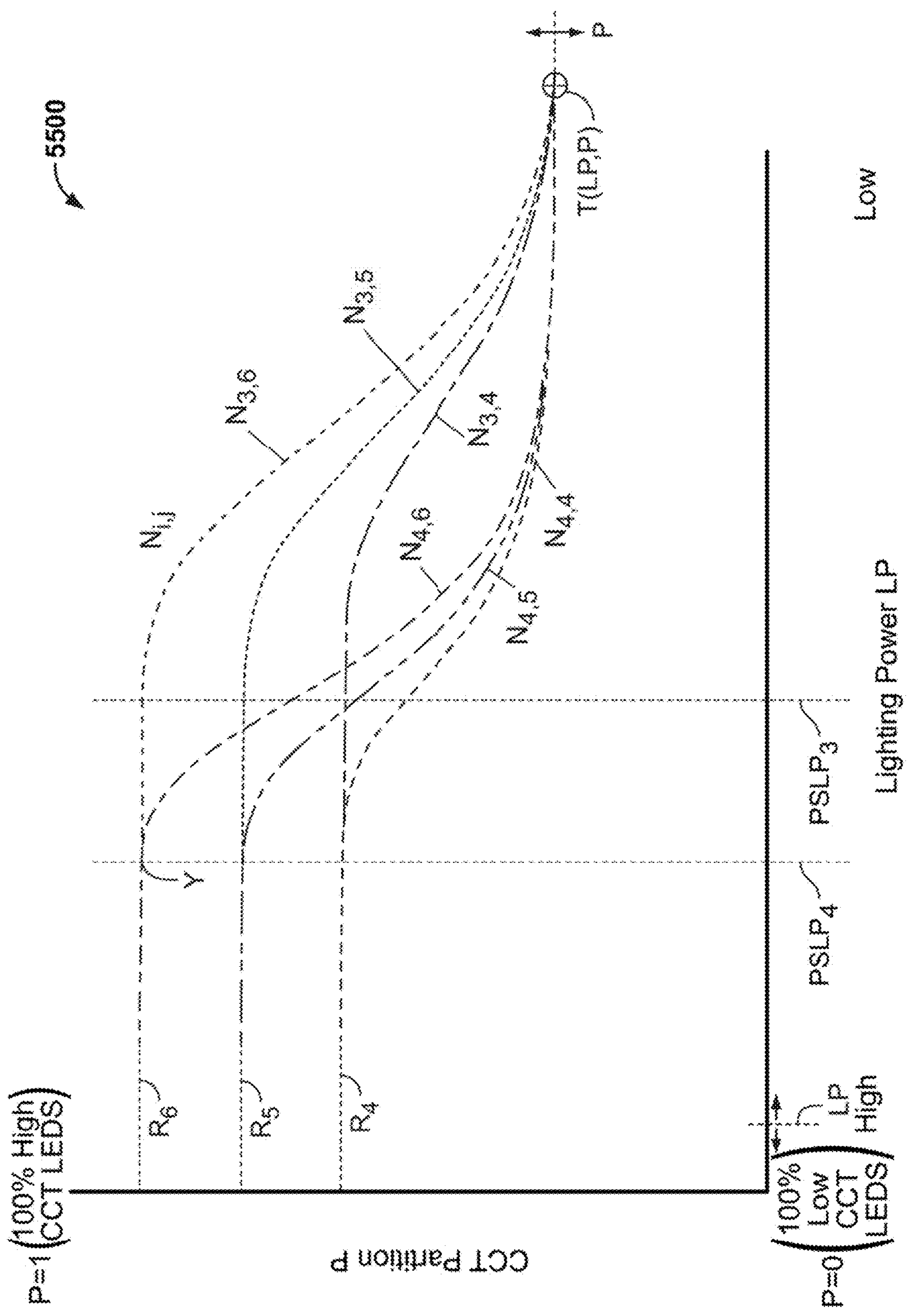
FIG. 55 shows illustrative apparatus in accordance with principles of the invention.

FIG. 55 shows illustrative lighting power-CCT scheme 5500. CCT scheme 5500 may include one or more features in common with lighting power-CCT-correlation scheme 5400. The horizontal axis may represent a total lighting power LP for the high CCT LEDs and the low CCT LEDs included in the lighting module. The vertical axis P may represent a partitioning of power between the high CCT LEDs and the low CCT LEDs. The partitioning may range, for example, from delivery of 100% of the lighting power to low CCT LEDs to delivery of 100% of the lighting power to high CCT LEDs. The partitioning may be linear over the range. The partitioning may be non-linear over the range.

CCT scheme 5500 may include CCT partition curves $N_{i,j}$. i may indicate a preselected lighting power $PSLP_k$ such as $PSLP_3$ or $PSLP_4$. j may indicate a CCT partition R such as $R_4$, $R_5$ or $R_6$. The CCT partition set-point selector may be used to select a $PSLP_k$. The selector may be used to select an $R_1$.

Curves $N_{i,j}$ may be defined in t the controller. Curves $N_{i,j}$ may be stored in the controller. Curves $N_{i,j}$ may be calculated in the controller.

Each of curves $N_{i,j}$ may identify a CCT value that is to be displayed in connection with a given lighting power level.

A user may select a preset lighting power PSLP such as $PSLP_4$. The user may set a CCT partition set-point. The CCT partition set-point may correspond to a CCT partition R such as $R_6$. The user may set scene T. Scene T may be defined by a lighting power LP. Scene S may be defined by a partition P. Scene S may be defined by both a lighting power LP and a partition P.

When the lighting module is set to scene T, the user may use the dimmer switch to increase the lighting power of the LEDs. The increase may proceed in discrete steps. The increase may be a continuous increase. The controller may detect the increase. The controller may determine a curve N4,6 that is constrained by scene T, PSLP4 and R6. For each increased lighting power between scene T and PSLP4, the controller may control the lighting module to provide light having a CCT corresponding to N4,6. Target Y is the CCT partition set-point defined by R1. N4,6 may be flat between target Y and a higher LP.

One or more of lighting system controller 4802, LED driver circuit 4804, LED module 4806, user interface 4808, and any other suitable lighting apparatus component may perform one or more of the functions of a system for controlling fixtures, such as that shown and described in US Publication No. 2021/0352790 which is hereby incorporated by reference.

Figure 56:
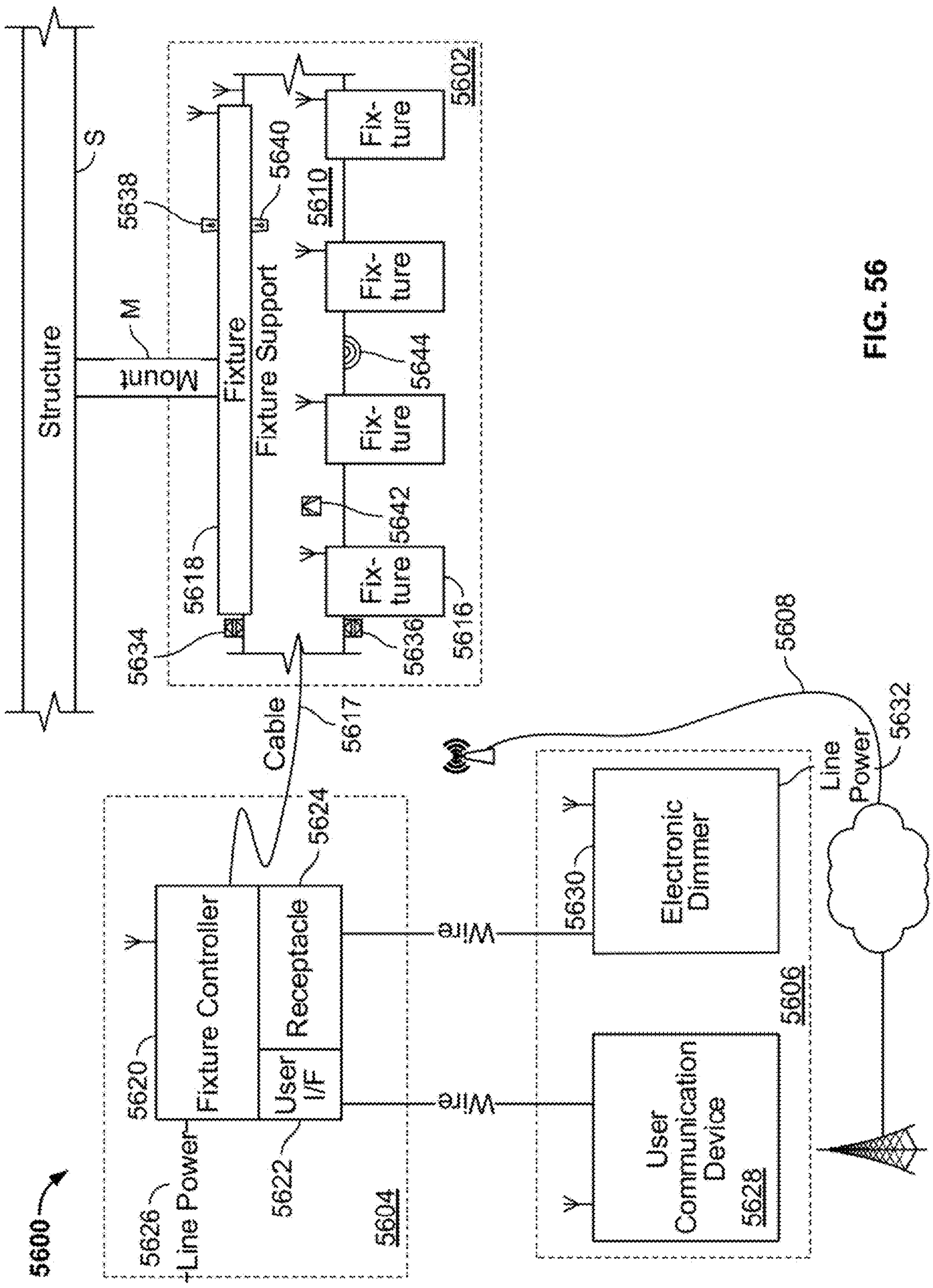
FIG. 56 shows illustrative apparatus in accordance with principles of the invention.

FIG. 56 shows illustrative architecture 5600 for controlling fixtures. Architecture 5600 may include one or more of the features described herein in relation to lighting apparatus 4800. Architecture 5600 may include fixture arrangement 5602. Fixture arrangement 5602 may include LED driver circuit 4804 and LED module 4806. LED driver circuit 4804 and LED module 4806 may be included in one or more fixtures included in fixture arrangement 5602. Architecture 5600 may include fixture control module 5604. Fixture control module 5604 may include lighting system controller 4802. Architecture 5600 may include inputs 5606. Architecture 5600 may include wide area network 5608. Architecture 5600 may include any suitable network.

Table 10 lists illustrative networks.

TABLE 10

| Illustrative networks.<br>Illustrative networks |
|---|
| Wide Area Network (e.g., Internet) |
| Local Area Network |
| DMX 512 |
| Dali |
| Other suitable networks |

Architecture 5600 may define one or more network segments. A first segment may include inputs 5606. A second segment may include fixtures such as fixtures 5616 and 5618 in fixture arrangement 5602. A segment may include one or more individually addressable devices. A segment may include one or more addressable groups.

Fixture arrangement 5602 may include fixture support 5610. Fixture arrangement 5602 may be supported by mount M. Mount M may fix fixture support 5610 to structure S. Structure S may include a ceiling, a wall, a beam, cabinet, a free-standing object or any other suitable structure. Fixture support 5610 may support one or more fixtures such as fixture 5616. Fixture support 5610 may support one or more fixtures such as fixture 5618. One or more of fixtures 5616 and 5618 may be disposed on top of fixture support 5610. One or more of fixtures 5616 and 5618 may be disposed on bottom of fixture support 5610. One or more of fixtures 5616 and 5618 may be disposed on a side of fixture support 5610. One or more of fixtures 5616 and 5618 may be disposed on an end of fixture support 5610.

Fixture control module 5604 may include fixture controller 5620. Fixture control module 5604 may include user interface 5622. Fixture control module 5604 may include receptacle 5624. Fixture controller 5620 may be in electrical communication with line power 5626. Line power 5626 may provide two-phase or three-phase power at 110 V or 220 V, DC voltage at any suitable level, or any other suitable voltage. Receptacle 5624 may receive a dimmer voltage from electronic dimmer 5630. Fixture 5616 may operate over a range of operational levels. Fixture 5616 may operate at a maximum operational level. The dimmer voltage may have a maximum voltage. A proportion of the maximum dimmer voltage that is represented by the dimmer voltage may correspond to an operational level at which a fixture 5616 is to be operated. The dimmer voltage proportion, if applied to the maximum operational level, may define the operational level at which a fixture 5616 is to be operated.

The operational level may be a power level, a current level, or any other suitable level.

Input 5606 may include user communication device 5628. User communication device 5628 may include user interface 4808. Input 5606 may include electronic dimmer 5630.

Fixture controller 5620 may be in wired electrical communication with fixture arrangement 5602. The wired electrical communication may be provided by cable 5617. The wired electrical communication may provide power to fixture arrangement 5602. The wired electrical communication may provide control messages to fixture arrangement 5602. Fixture controller 5620 may provide the power and the control messages over different conductors. Fixture controller 5620 may provide the power and the control messages simultaneously over a conductor, as is done in power line control methods.

Fixture controller 5620 may be in wireless communication with fixture arrangement 5602. The wireless electrical communication may provide control messages to fixture arrangement 5602.

Communication between fixture controller 5620 and fixture arrangement 5602 may be wholly or in part by wired electrical communication. Communication between fixture controller 5620 and fixture arrangement 5602 may be wholly or in part by wireless electrical communication. Communication between fixture controller 5620 and fixture arrangement 5602 may be wholly or in part by wireless communication. The wireless communication may include optical communication. The wireless communication may include acoustic communication. Communication between fixture controller 5620 and fixture arrangement 5602 may be partially by wired electrical communication and partially wireless communication.

Fixture control module 5604 may be in communication with input 5606.

User interface 5622 may provide communication functions for fixture control module 5604. The communication may include transmission of a user command to fixture control module 5604. The communication may include transmission of fixture information to input 5606. The fixture information may include a fixture parameter. The communication may be wireless. The communication may be wired.

User interface 5622 may receive a user command from communication device 5628. User interface 5622 may include a data input device. The data input device may include one or more of a touch screen, a key pad and any other suitable device. User interface 5622 may receive a user command from communication device 5628. Control over a fixture may be passed from user communication device 5628 to user interface 5622. Control over a fixture may be passed from user interface 5622 to user communication device 5628. The control may be passed by the user. The control may be configured to be passed automatically. The control may be configured to be passed automatically upon the fulfilment of a condition. The condition may be a temporal condition. The condition may be based on a fixture parameter. The condition may be based on an ambient lighting condition. The condition may be based on any suitable condition.

Electronic dimmer 5630 may provide TRIAC/ELV dimming. Electronic dimmer 5630 may receive electrical current from line power 5632.

Architecture 5600 may include one or more sensors. The sensors may include a range sensor such as sensors 5634 and 5636. The range sensor may sense a distance to a surface. The sensors may include a temperature sensor such as sensors 5638 and 5640. The temperature sensor may sense an ambient temperature. The temperature sensor may sense a temperature or a differential temperature of a surface at a distance from the sensor. The sensors may include motion sensors such as sensors 5642. The sensors may include one or more light sensors such as sensors 5644. The light sensor may sense visible light. The light sensor may sense energy associated with one or more wavelengths of light.

Figure 57:
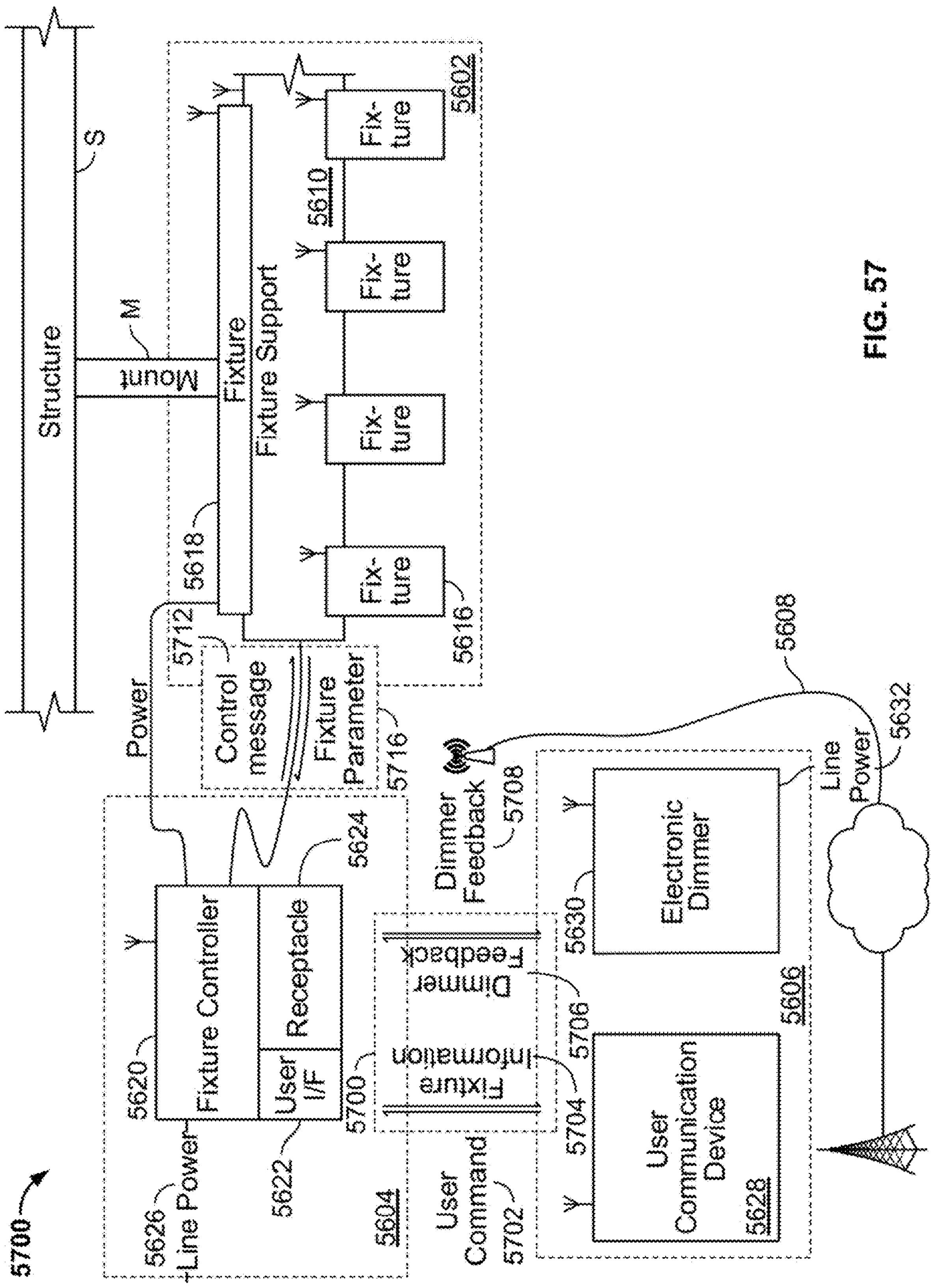
FIG. 57 shows illustrative apparatus in accordance with principles of the invention.

FIG. 57 shows illustrative communications 5700 between fixture controller 5620 and input 5606. Illustrative communications 5700 may include user command 5702, fixture information 5704, dimmer voltage 5706, dimmer feedback 5708 or any other suitable communication. FIG. 57 shows illustrative communications 5700 between fixture controller 5620 and fixture arrangement 5602. Communications 5700 may include control messages 5712 for control performance of fixtures such as parameter 5716.

The lighting apparatus may include architecture for controlling fixtures such as is described in US Publication No. 2021/0352790 which is incorporated by reference herein.

Figure 58:
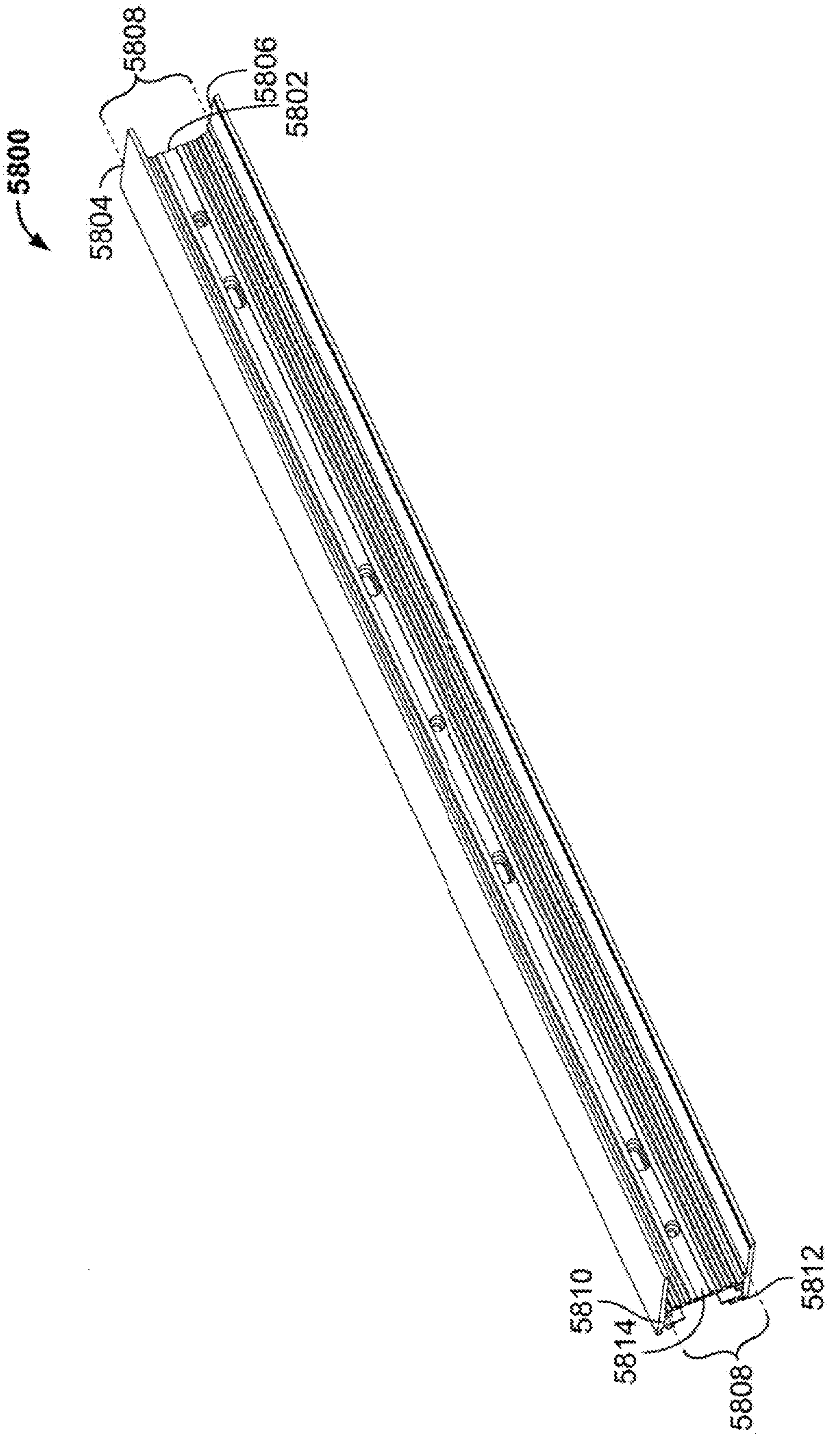
FIG. 58 shows illustrative apparatus in accordance with principles of the invention.

FIG. 58 shows illustrative fixture support 5800. Fixture support 5800 may have one or more features in common with fixture support 5610. LED driver circuit 4804 and LED module 4806 may be disposed in the fixture support. The fixture support may perform one or more functions such as those shown and described in US Publication No. 2021/0352790, which is incorporated by reference herein.

Fixture support 5800 may include spine 5802. Fixture support may include panel 5804. Fixture support may include panel 5806. Spine 5802, panel 5804 and panel 5806 may define fixture docking area 5808. Spine 5802, panel 5804 and panel 5806 may define connector slot 5810. Panel 5804 and panel 5806 may define fixture slot 5812. Fixtures such as fixture 5616 may be docked in docking area 5808. Fixtures such as fixtures 5618 may be mounted in fixture slot 5812. Fixture docking tier 5814 may be disposed between panel 5804 and 5806.

Figure 59:
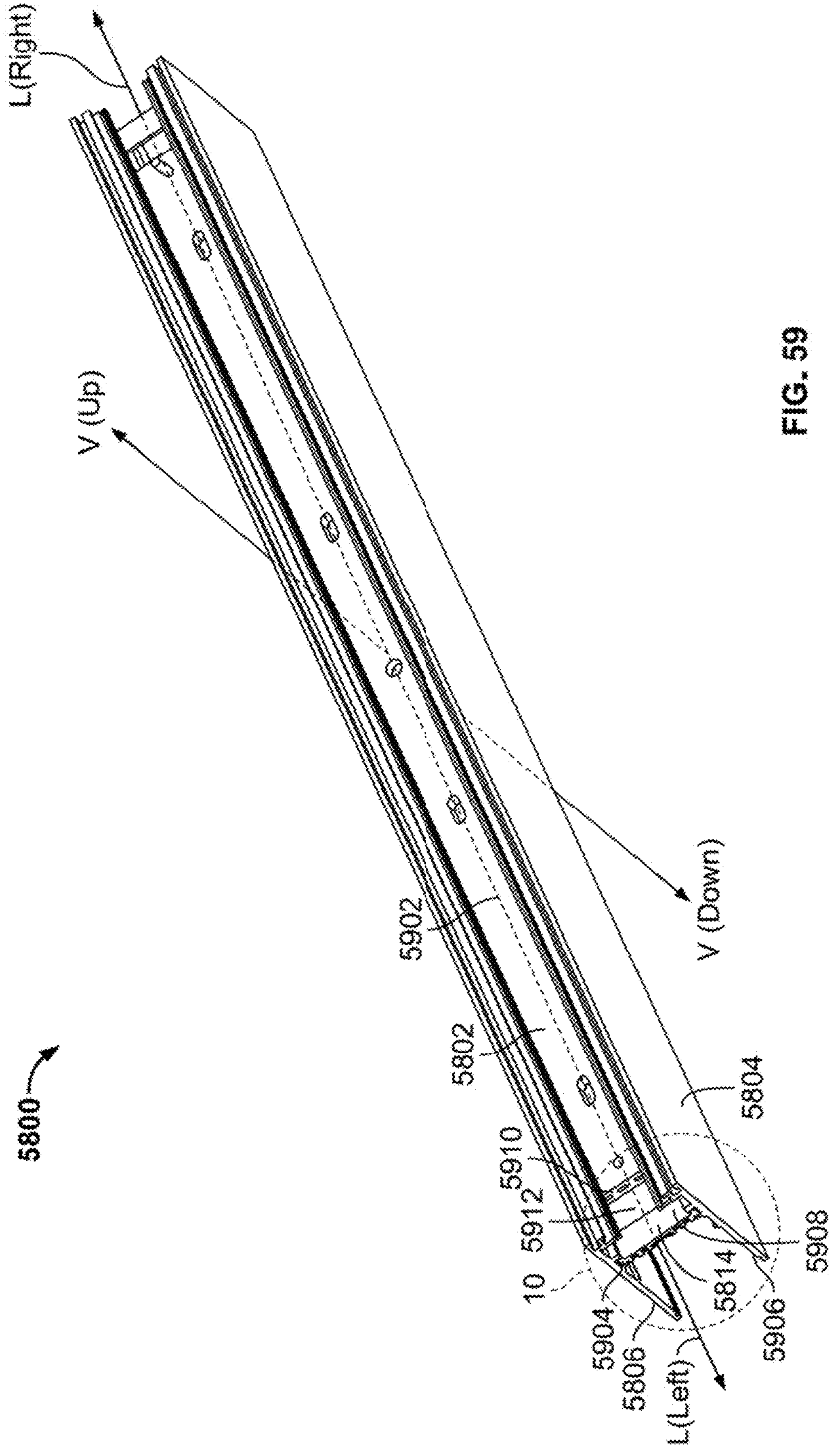
FIG. 59 shows illustrative apparatus in accordance with principles of the invention.

FIG. 59 is a view of fixture support 5800 that is different from that shown in FIG. 58. FIG. 59 shows that spine 5802 may include bridge 5902. Bridge 5902 may span between panel 5804 and panel 5806. Fixture docking tier 5814 may extend longitudinally to the left along longitudinal direction L (left). End 5904 of tier 5814 may be flush with end 5906 of fixture support 5800. Tier 5814 may include platform 5908. Tier 5814 may include connection field 5912. Bridge 5902 may include abutment 5910. Abutment 5910 may be set back to the right along direction L (right) from end 5904. The directions L (left) and R (right) are for description of relative positions within fixture support 5800, and do not necessarily define an orientation of fixture support 5800 relative to any other frame of reference.

Figure 60:
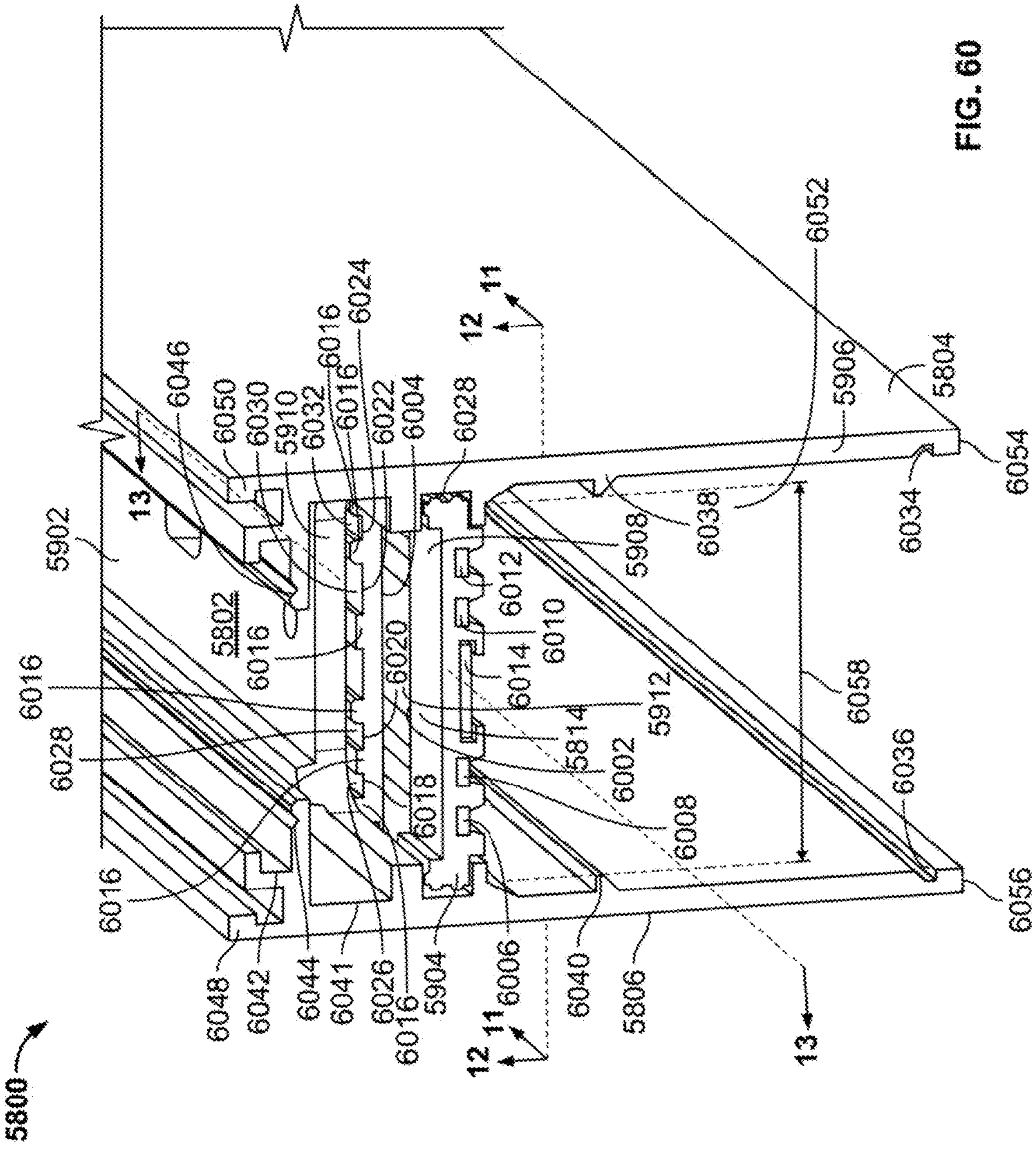
FIG. 60 shows illustrative apparatus in accordance with principles of the invention.

FIG. 60 shows that platform 5908 may be disposed above, in direction V (up), from connection field 5912. The directions V (up) and V (down) are for description of relative positions within fixture support 5800, and do not necessarily define an orientation of fixture support 5800 relative to any other frame of reference. Platform 5908 may include abutment 6002 between platform 5908 and connection field 5912.

Tier 5814 may include back-plate 6004. Back-plate 6004 may extend above, and define a right limit of, connection field 5912. Connection field 5912 may provide access, from above tier 5814 to conductors in tier 5814. A connector bridging from another fixture support to fixture support 5800 may thus be made without interfering with fixture docking area 5808 below tier 5814.

Docking tier 5814 may include conductor 6006. Docking tier 5814 may include conductor 6008. Docking tier 5814 may include conductor 6010. Docking tier 5814 may include conductor 6012. A pair of the conductors, one positive and one negative, may be a communication bus that may transmit communications 5700. A pair of the conductors, one positive and one negative, may be a power rail that may transmit power from a transformer. Docking tier 5814 may include magnetic strip 6014. Back-plate 6004 may include ribs such as ribs 6016. Back-plate 6004 may include grooves 6018, 6020, 6022 and 6024. Together with bridge 5902, grooves 6018, 6020, 6022 and 6024 may form slots 6026, 6028, 6030 and 6032.

Panel 5804 may include groove 6034. Panel 5806 may include groove 6036. The grooves may engage with a complementary feature on a fixture such as fixture 5616. Panel 5804 may include ridge 6038. Panel 5806 may include ridge 6040. The ridges may engage with a complementary feature on the fixture.

Docking tier 5814 may be disposed in slot 6028.

Fixture support 5800 may include slot 6041. Slot 6041 may be above tier 5814. Slot 6041 may receive a fixture support connector.

Fixture support 5800 may include slot 6042. Slot 6042 may be above slot 6041. Slot 6042 may include grooves 6044 and 6046. Slot 6042 may receive a fixture such as fixture 5618.

Fixture support 5800 may include overhangs 6048 and 6050.

Fixture support 5800 may define U-channel 6052. U-channel 6052 may be defined by docking tier 5814, panel 5804 and panel 5806. Panel 5804 may include distal edge 6054. Panel 5806 may include distal edge 6056. The fixture may be retractable within U-channel 6052. A lowest extreme of the fixture may be retracted above distal edge 6054. A lowest extreme of the fixture may be retracted above distal edge 6056. The lowest extreme may be a lip.

Fixture support 5800 may have docking area width 6058.

Figure 61:
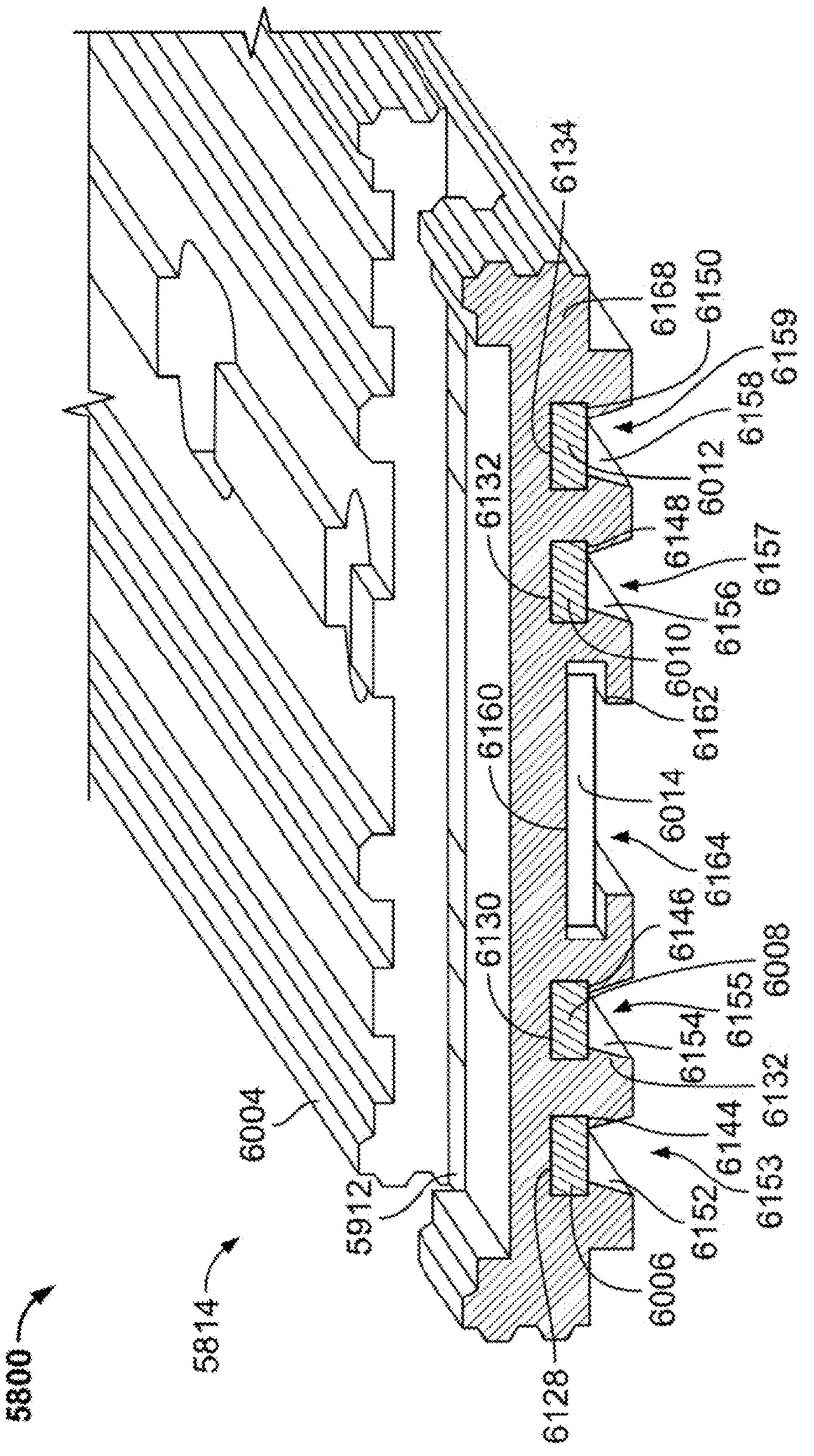
FIG. 61 shows illustrative apparatus in accordance with principles of the invention.

FIG. 61 shows that conductors 6006, 6008, 6010 and 6012 may be disposed in grooves 6128, 6130, 6132 and 6134, respectively. Tier 5814 may include lips 6144, 6146, 6148 and 6150, corresponding to grooves 6128, 6130, 6132 and 6134. The lips may retain the conductors in tier 5814. Tier 5814 may include tapers 6153, 6155, 6157 and 6159, corresponding to grooves 6128, 6130, 6132 and 6134. A taper may guide a terminal from a fixture such as fixture 5616 toward a conductor. A taper may guide a terminal from a fixture such as fixture 5616 into electrical communication with a conductor. A taper may guide a terminal from a fixture such as fixture 5616 into direct contact with a conductor. Gaps 6152, 6154, 6156, and 6158 may provide access for direct contact between the fixture and a conductor.

Magnetic strip 6014 may be disposed in groove such as strip 6160. Tier 5814 may include lip 6162 for retaining magnetic strip 6014. Gap 6164 may expose magnetic strip 6014. Gap 6164 may have a magnetic permeability that is less than that of body 6168 of tier 5814. Gap 6164 may be a gap that includes no solid material.

Figure 62:
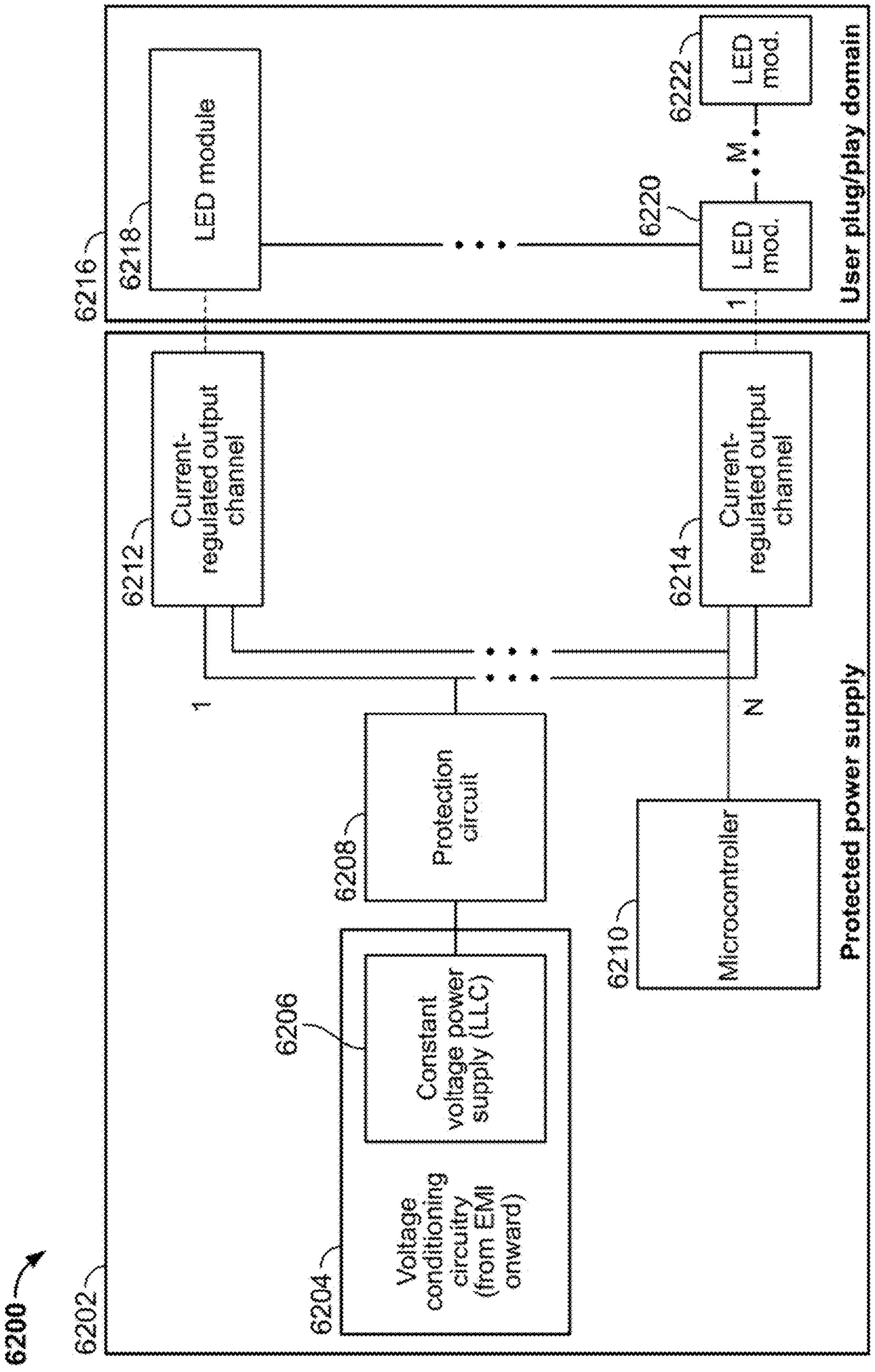
FIG. 62 shows illustrative apparatus in accordance with principles of the invention.

FIG. 62 shows illustrative apparatus 6200. Apparatus 6200 may include protected power supply 6202. Protected power supply 6202 may include current regulated output channel 6212. Protected power supply 6202 may include current regulated output channel 6214. Protected power supply 6202 may include a number, N, of current regulated output channels.

Protected power supply 6202 may include voltage conditioning circuitry 6204. Voltage conditioning circuitry may include constant power supply 6206. Voltage conditioning circuitry 6204 may receive line voltage. Voltage conditioning circuitry 6204 may convert received line voltage from AC to DC voltage. Voltage conditioning circuitry 6204 may rectify the voltage. Voltage conditioning circuitry 6204 may condition the voltage. Voltage conditioning circuitry 6204 may boost the voltage. Voltage conditioning circuitry 6204 may step down the voltage.

The stepped down voltage may be transmitted through protection circuitry 6208. Protection circuitry 6208 may ensure a constant current. Protection circuitry 6208 may protect the power supply from overcurrent. Protection circuitry 6208 may regulate the current being transmitted to current regulated output channels 6212 through 6214. Current regulated output channel 6212 may be a first current regulated output channel. Current regulated output channel 6214 may be an $n^{th}$ current regulated output channel. There may be a plurality of current regulated output channels in between current regulated output channel 6212 and current regulated output channel 6214.

Protected power supply 6202 may include microcontroller 6210. Microcontroller 6210 may transmit pulse width modulated ("PWM") signals to current regulated output channels 6212 and 6214. Microcontroller 6210 may transmit PWM signals to the $n^{th}$ number of current regulated output channels. Microcontroller 6210 may transmit a dimming signal to the LED modules connected to current regulated output channels 6212 and 6214. Microcontroller 6210 may transmit a dimming signal to LED modules connected to the $n^{th}$ number of current regulated output channels.

The dimming signal may include a digital multiplexing ("DMX") dimming signal. The dimming signal may include a triode for alternating current ("TRIAC") dimming signal. The dimming signal may include 0-10V dimming signal. The dimming signal may include an electrical low voltage ("ELV") dimming signal. The dimming signal may include any suitable dimming signal.

Apparatus 6200 may define user plug/play domain 6216. User plug/play domain 6216 may include LED module 6218. LED module 6218 may include some or all of the parts described above in relation to one or more of fixture 100, fixture 300, fixture 700, fixture 1100, fixture 3602, fixture 4102, and lighting apparatus 4800. LED module 6218 may be connected to current regulated output channel 6212. LED module 6218 may be plugged into current regulated output channel 6212. LED module 6218 may receive power from current regulated output channel 6212. User plug/play domain 6216 may include LED module 6220. User plug/play domain 6216 may include LED module 6222. LED module 6220 may be connected in series with LED module 6222. LED module 6220 may be a first LED module. LED module 6222 may be an $m^{th}$ LED module. There may be a plurality of LED modules connected in series with LED modules 6220 and 6222. LED modules 6220, 6222, and any other connected LED modules may receive power from current regulated output channel 6214.

User plug/play domain may include a plurality of LED modules. The plurality of LED modules may be connected to the plurality of current regulated output channels. Protected power supply 6202 may include a number of current regulated output channels. User plug/play domain may include a corresponding number of pluggable ports to the number of current regulated output channels.

Table 11 lists illustrative number of current regulated output channels.

TABLE 11

| Illustrative number of current regulated output channels. Illustrative number of current regulated output channels | |
|---|---|
| 1 | 7 |
| 2 | 8 |
| 3 | 9 |
| 4 | 10 |
| 5 | 11 |
| 6 | 12 |
| Other suitable number of current regulated output channels | |

Each of the current regulated output channels may provide power to an LED module plugged into the corresponding port. When there is no LED module plugged into a current regulated output channel, the current regulated output channel may not provide power through the corresponding port. The current regulated output channels may have a maximum total power output.

Table 12 lists illustrative ranges of maximum total power output.

TABLE 12

| Illustrative ranges of maximum total power output. Illustrative total power output |
|---|
| <90 W |
| 91-95 W |
| 96-100 W |
| Other suitable ranges of maximum total power output |

Each of the current regulated output channels may provide a different amount of power. Each of the current regulated output channels may provide a different amount of power depending on how many current regulated output channels are connected to LED modules. Each of the current regulated output channels may provide a different amount of power depending on how many LED modules are plugged into each corresponding port. Each of the current regulated output channels may provide a different amount of power depending on the maximum total power output.

Figure 63:
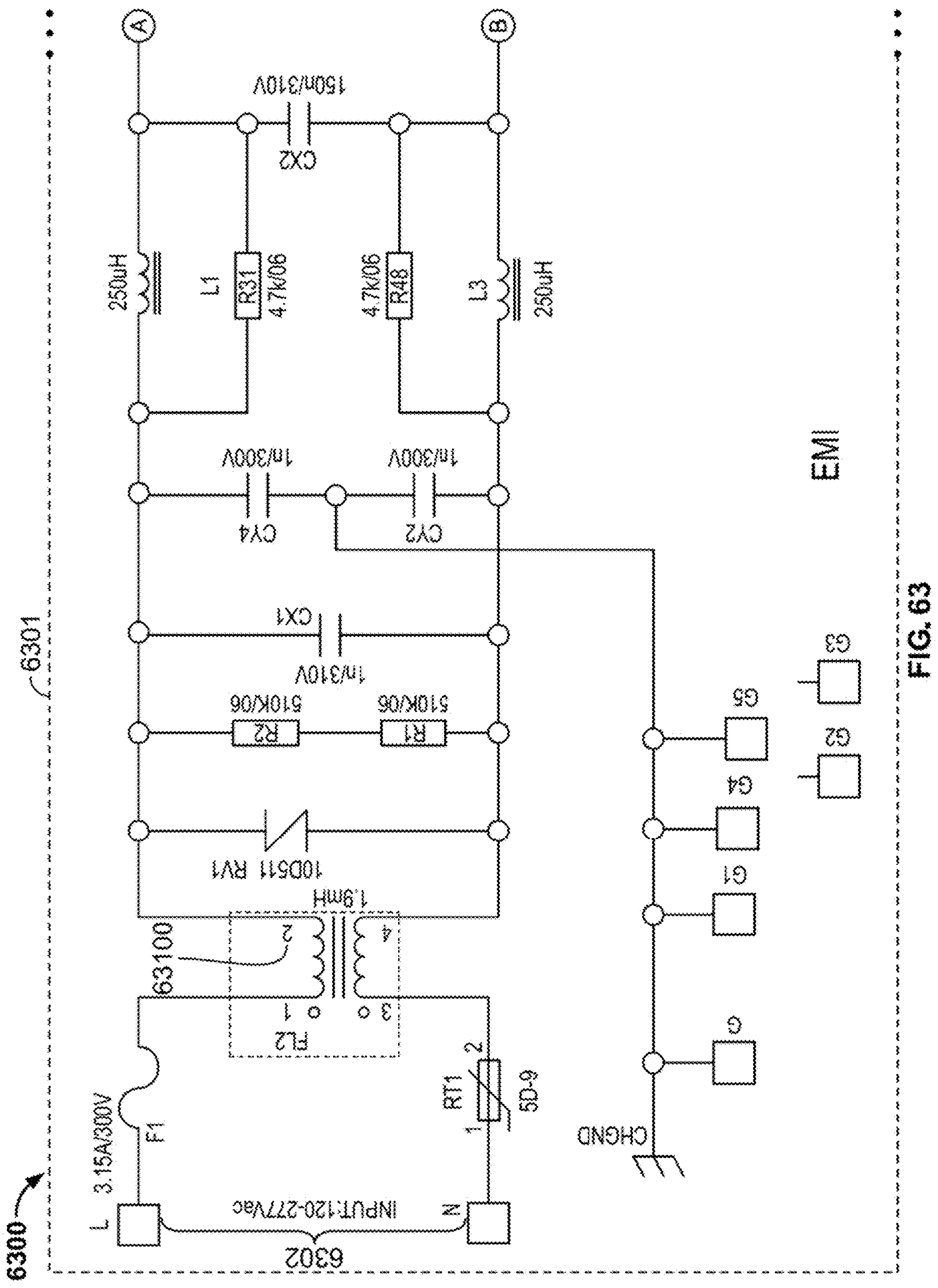
FIG. 63 shows illustrative apparatus in accordance with principles of the invention.
Figure 63:
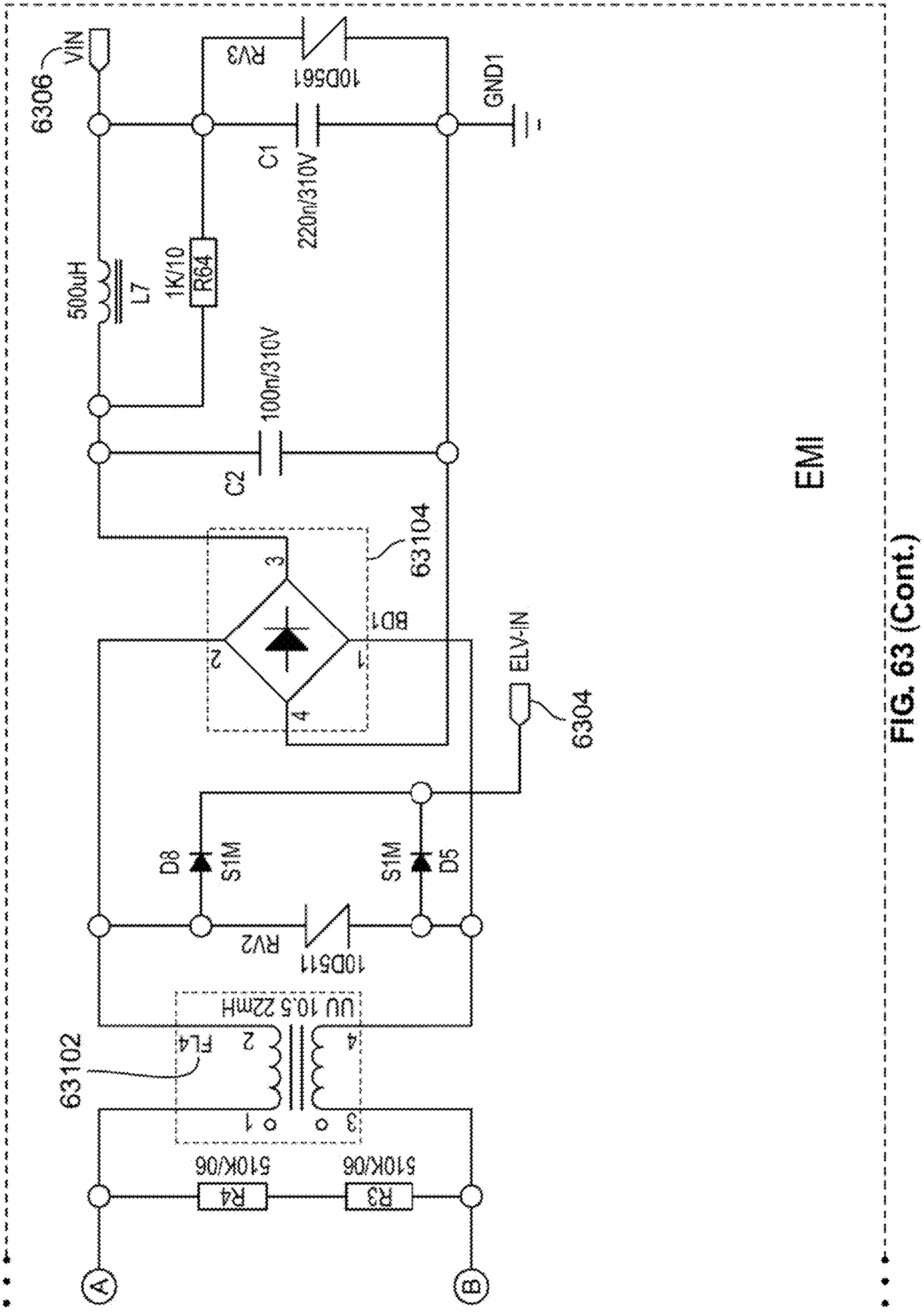

FIG. 63 shows illustrative circuit 6300. Circuit 6300 may have one or more features in common with one or more features of apparatus 6200. Illustrative circuit 6300 may include electromagnetic interference ("EMI") circuitry 6301. EMI circuitry 6301 may include input voltage terminals 6302. Input voltage terminals 6302 may receive line voltage. The line voltage may be 120-277 VAC. The line voltage may include noise. EMI circuitry 6301 may include or common mode inductors 63100 (FL2) and 63102 (FL4). Common mode inductors 63100 and 63102 may be used to remove and/or suppress noise and other EMI from the line voltage.

EMI circuitry 6301 may contain rectifier bridge 63104 (BD1). Rectifier bridge 63104 may rectify the AC line voltage. The rectified voltage may be smoothed into a DC waveform using a capacitor. EMI circuitry 6301 may output a DC voltage. EMI circuitry 6301 may output a DC voltage through terminal 6306. EMI circuitry 6301 may convert line voltage of 120-277 VAC to 120 VDC. EMI circuitry 6301 may output 120 VDC through terminal 6306.

EMI circuitry 6301 may include ELV-IN terminal 6304. ELV-IN terminal 6304 may connect to TRIAC/ELV circuitry 6333. ELV-IN terminal 6304 may transmit an input voltage from EMI circuitry 6301 to TRIAC/ELV circuitry 6333. The input voltage may be transmitted before it is converted to a DC voltage. The input voltage transmitted may be AC voltage. The voltage may be transmitted to TRIAC/ELV circuitry 6333 to provide a signal for phase angle dimming to microcontroller 6327. The AC voltage may be used to determine a dimming level from a phase cut dimmer.

Figure 64:
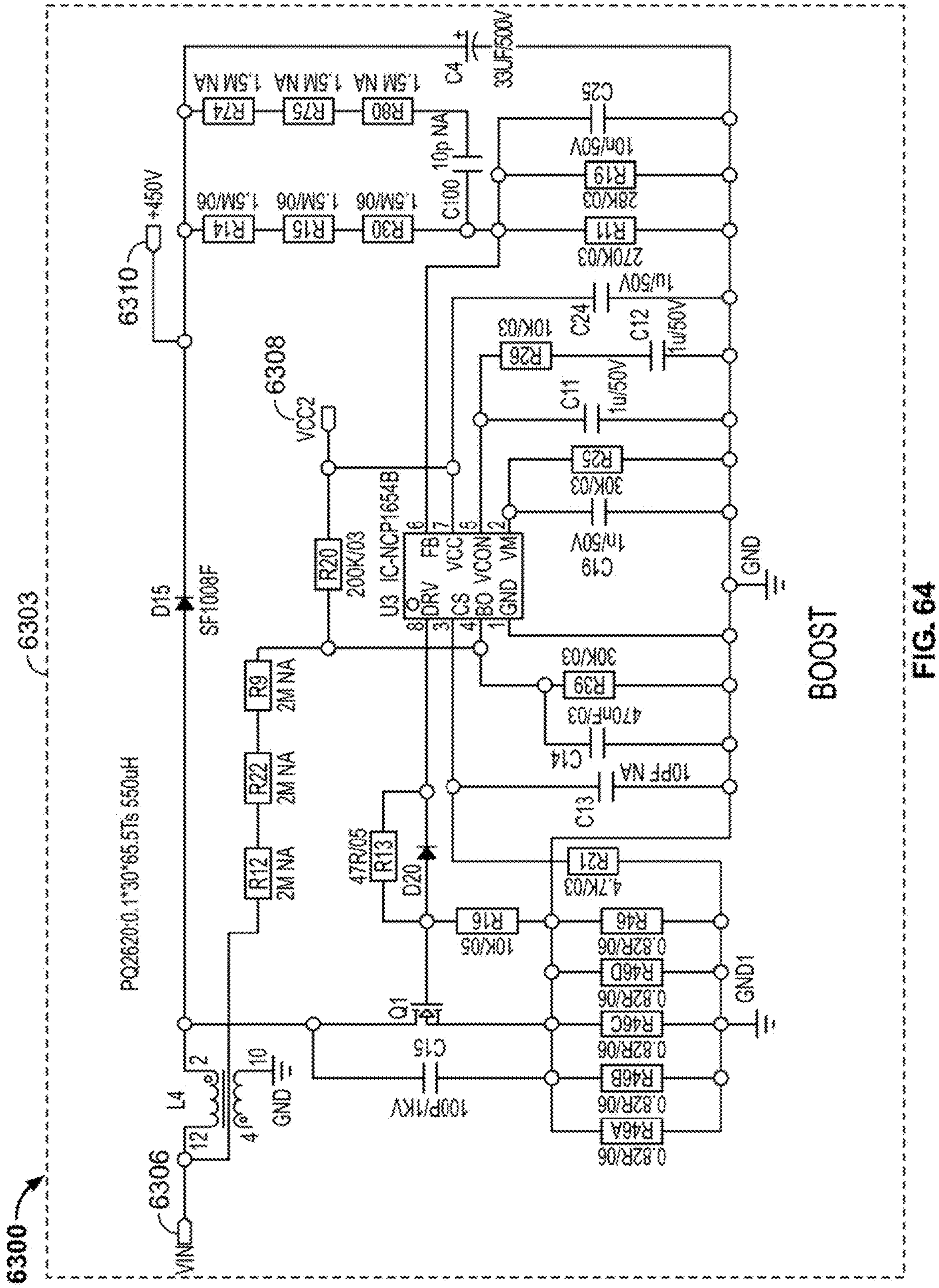
FIG. 64 shows illustrative apparatus in accordance with principles of the invention.

FIG. 64 shows illustrative circuit 6300. Circuit 6300 may include boost circuitry 6303. Boost circuitry 6303 may boost voltage received through terminal 6306. Voltage received through terminal 6306 may be 120 VDC. Boost circuitry 6303 may boost the voltage from 120 VDC to 450 VDC. Boost circuitry 6303 may transmit the boosted voltage through terminal 6310.

Boost circuitry 6303 may receive power from voltage common collector ("VCC") circuitry 6307. Boost circuitry 6303 may receive power from VCC circuitry 6307 through terminal 6308 (VCC2).

Figure 65:
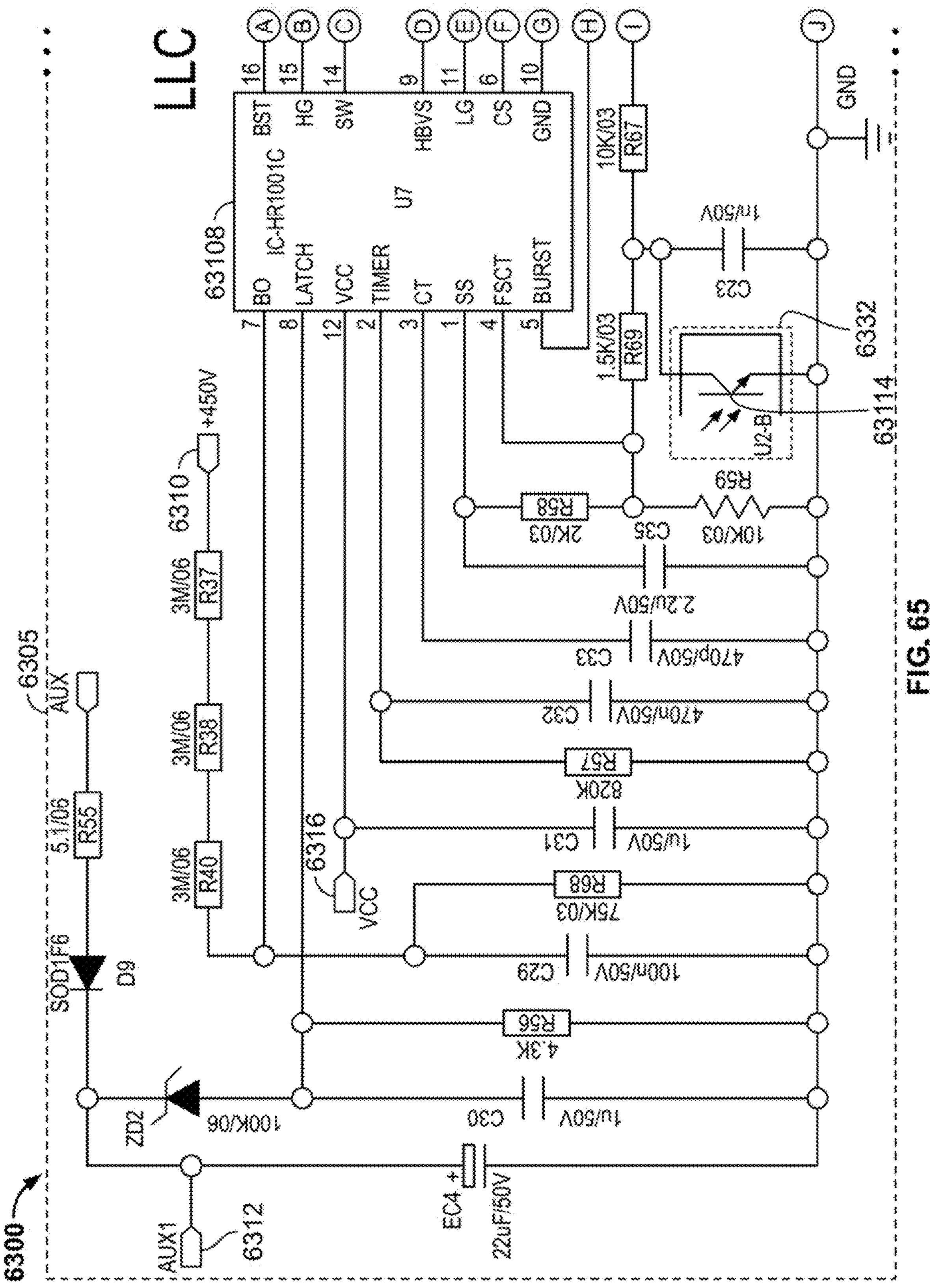
FIG. 65 shows illustrative apparatus in accordance with principles of the invention.
Figure 65:
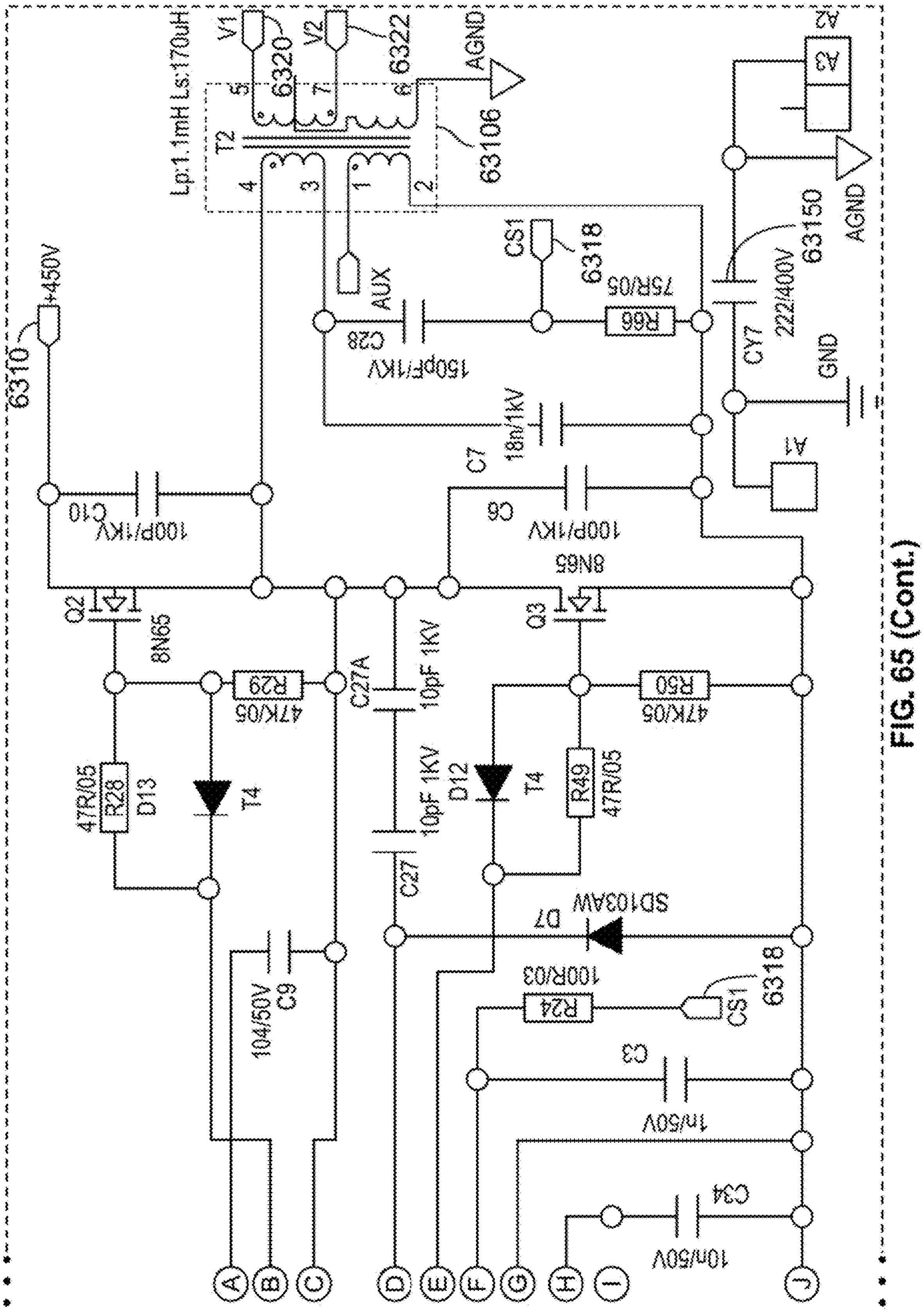

FIG. 65 shows illustrative circuit 6300. Circuit 6300 may include inductor-inductor capacitor ("LLC") circuitry 6305. LLC circuitry 6305 may be an LLC resonant converter. LLC circuitry 6305 may be used for high-efficiency power conversion. LLC circuitry 6305 may include LLC topology to transfer energy from a primary to a secondary side of circuit 6300. LLC circuitry 6305 may operate in a resonance mode. LLC circuitry 6305 may use natural resonant frequency of circuit 6300 to switch power between input and output stages. LLC circuitry 6305 may tune values of inductors and capacitors included in LLC circuitry 6305 to create a resonant tank circuit. A switching frequency of the converter may be synchronized with the resonant frequency of the resonant tank circuit.

LLC circuitry 6305 may output voltage through terminals 6320 (V1) and 6322 (V2). The voltage may be transmitted from terminals 6320 and 6322 to a second side of circuit 6300. The output voltage may be stepped down from 450 VDC received from boost circuitry 6303.

LLC circuitry may include transformer 63106. Transformer 63106 may step down the 450 VDC received from boost circuitry 6303 through terminal 6310. Transformer 63106 may output a stepped-down voltage through terminals 6320 and 6322. The voltage transmitted from terminals 6320 and 6322 may be the same voltage. The voltage transmitted from terminal 6320 may be different from the voltage transmitted from terminal 6322. The voltage transmitted from terminals 6320 and 6322 may have the same polarity. The voltage transmitted from terminals 6320 and 6322 may have different polarities. The voltage transmitted from terminals 6320 and 6322 may have a power that does not exceed the predetermined limit.

LLC circuitry 6305 may be connected to VCC circuitry 6307. LLC circuitry 6305 may be connected to VCC circuitry 6307 through terminals 6312 (AUX1) and 6316 (VCC). VCC circuitry 6307 may supply power to LLC circuitry 6305 through terminals 6312 and 6316.

LLC circuitry 6305 may include integrated circuit ("IC") 63108. IC 63108 may be an IC as that available from Monolithic Power Systems, Kirkland, Washington, under the trade name HR1001C LLC with Surge Enhancement. IC 63108 may include a current-sensing pin. The current-sensing pin may include a current-sensing resistor. The current-sensing pin may include a current-sensing capacitor. The current-sensing pin may sense a current on the primary side of circuit 6300. LLC circuitry 6305 may include current-sensing terminal 6318 (CS1). Current-sensing terminal 6318 may capture current from the primary side of circuit 6300. Current-sensing terminal 6318 may transmit the sensed current to the current-sensing pin in IC 63108. The current-sensing pin may enable a mode such as overcurrent regulation, overcurrent protection, and capacitive mode protection. A mode, such as overcurrent regulation, overcurrent protection, and capacitive mode protection, may protect circuit 6300 from an overcurrent condition.

LLC circuitry 6305 may include capacitor 63150. Capacitor 63150 may be placed across the ground. Capacitor 63150 may be placed between the primary and secondary sides of circuit 6300. Capacitor 63150 may be placed between the primary and secondary sides of circuit 6300 for EMI suppression.

Figure 66:
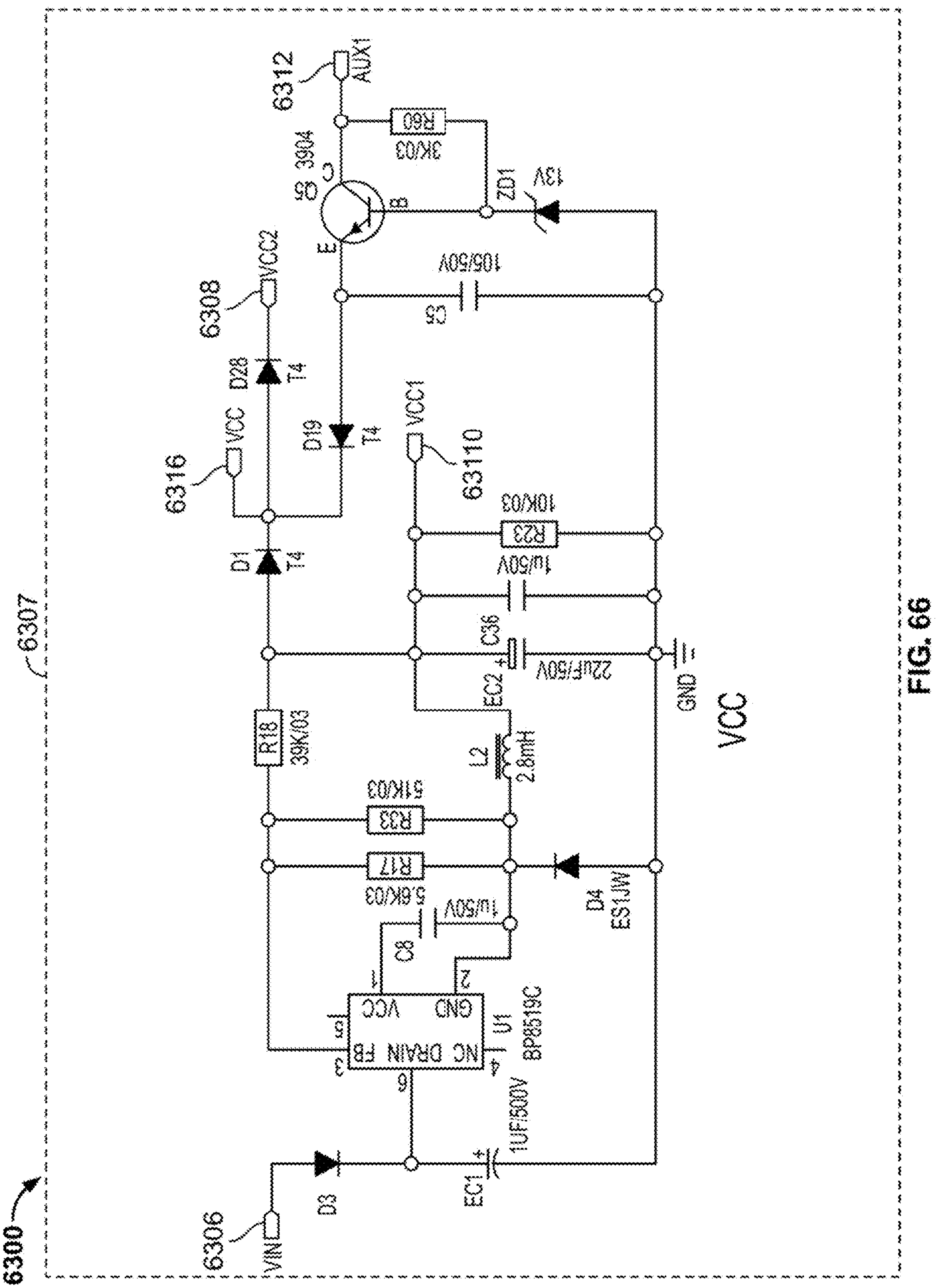
FIG. 66 shows illustrative apparatus in accordance with principles of the invention.

FIG. 66 shows illustrative circuit 6300. Circuit 6300 may include VCC circuitry 6307. VCC circuitry 6307 may supply voltage to components of circuit 6300. VCC circuitry 6307 may receive voltage from EMI circuitry 6301. VCC circuitry 6307 may receive voltage through terminal 6306. VCC circuitry 6307 may receive 120 VDC. VCC circuitry may receive any suitable voltage. VCC circuitry may step-down the voltage received through terminal 6306. VCC circuitry 6307 may not step-down voltage received through terminal 6306. VCC circuitry 6307 may provide supply voltage through terminals 6316, 6308, 6312, and 63110. The supply voltage may be uniform through terminals 6316, 6308, 6312 and 63110. The supply voltage may be different through terminals 6316, 6308, 6312 and 63110.

Figure 67:
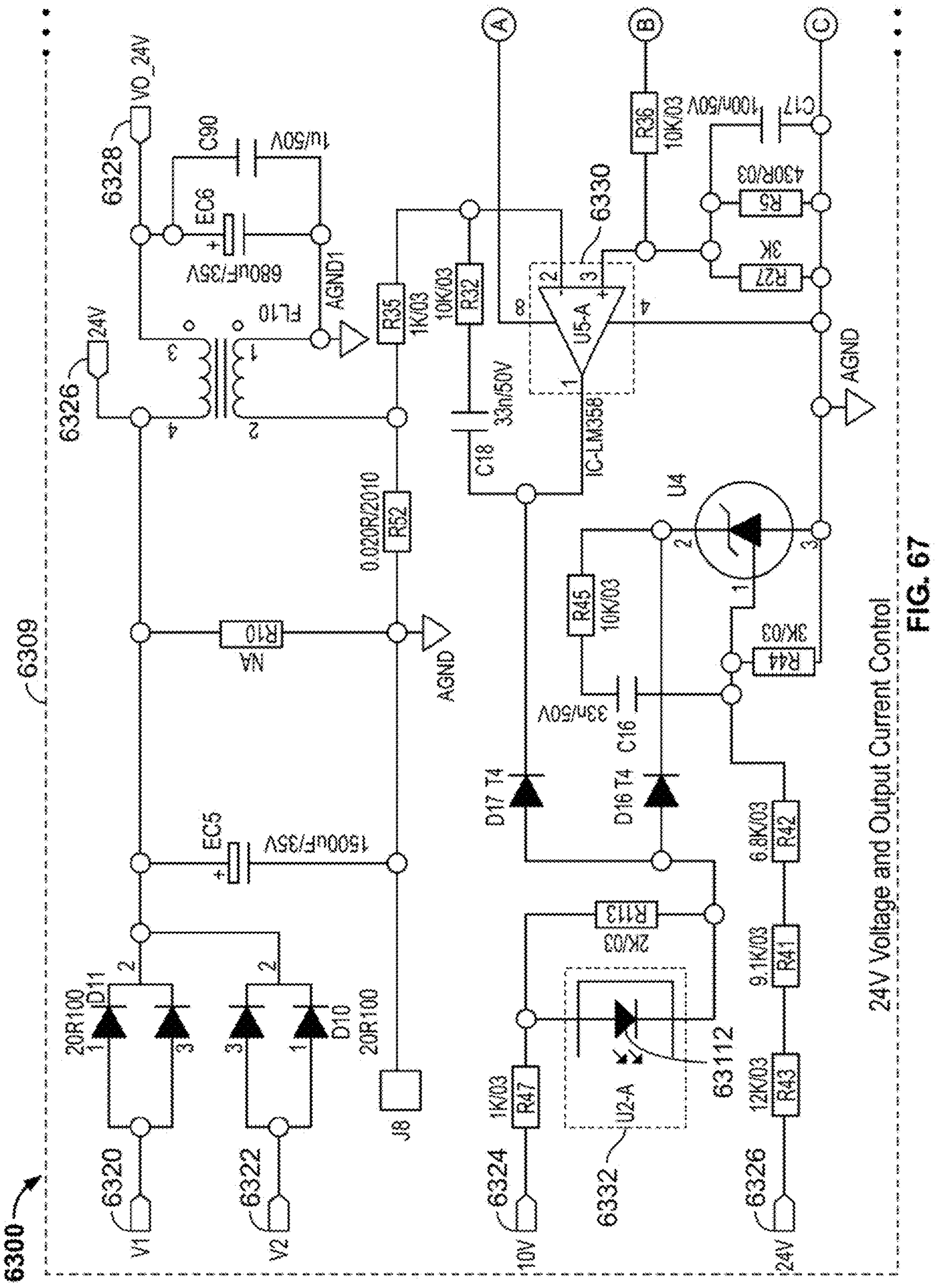
FIG. 67 shows illustrative apparatus in accordance with principles of the invention.
Figure 67:
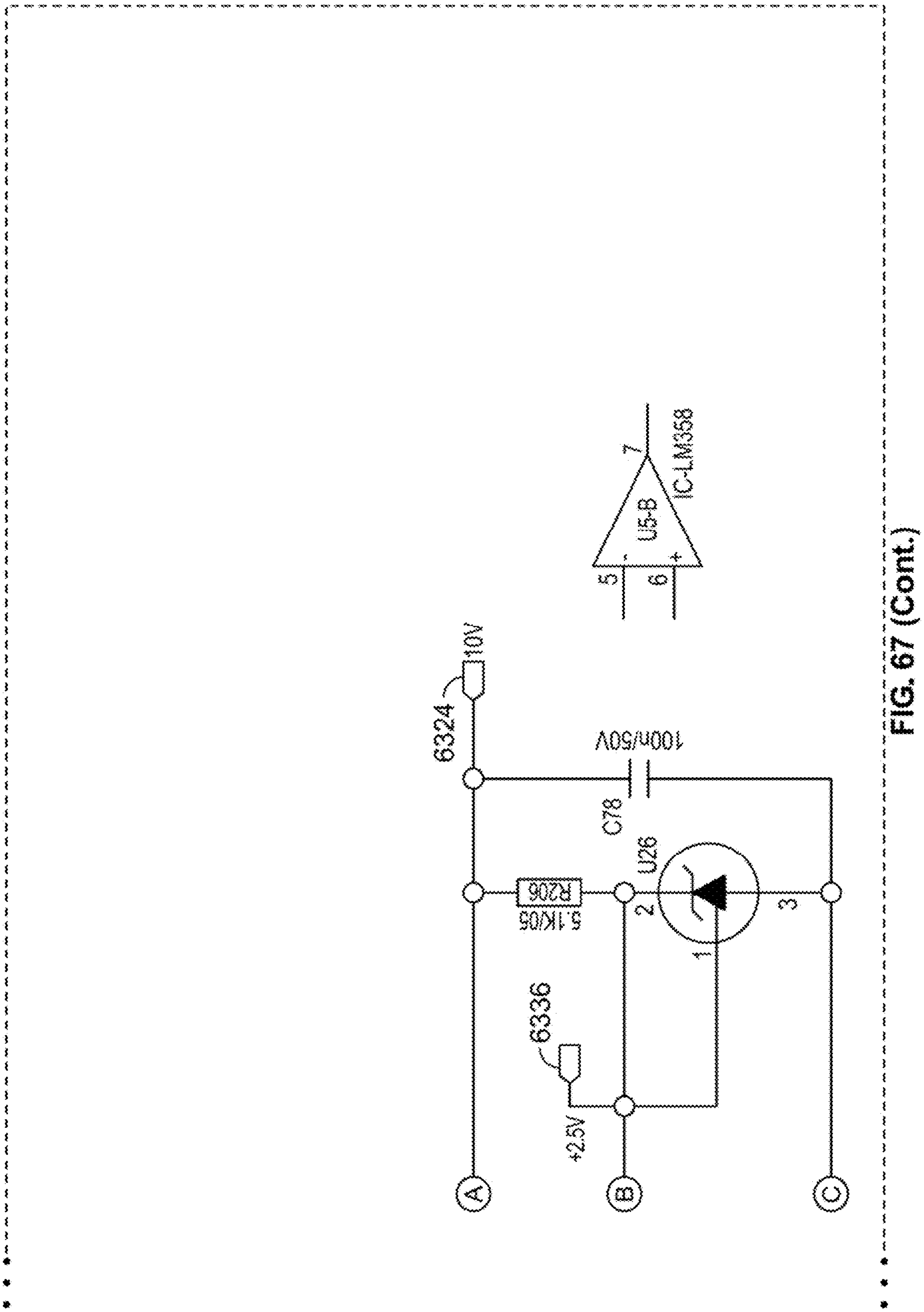

FIG. 67 shows illustrative circuit 6300. Circuit 6300 may include protection circuitry 6309. Protection circuitry 6309 may prevent an overcurrent condition in current regulated output channels 6315, 6317, 6319, 6321, 6323, and 6325. Protection circuitry 6309 may receive voltage from LLC circuitry 6305. Protection circuitry 6309 may receive voltage through terminals 6320 and 6322. Protection circuitry 6309 may be on the secondary side of circuit 6300. Protection circuitry 6309 may receive power from secondary VCC circuitry 6311. Secondary VCC circuitry 6311 may provide supply voltage on the secondary side of circuit 6300. Secondary VCC circuitry 6311 may transmit 10 VDC to protection circuit 6309. Secondary VCC circuitry 6311 may transmit 10 VDC to protection circuit 6309 through terminal 6324.

Protection circuitry 6309 may be connected to quick discharge circuitry 6313. Protection circuitry 6309 may be connected to quick discharge circuitry 6313 through terminal 6326.

Protection circuitry 6309 may include operational amplifier 6330 (U5-A). Operational amplifier 6330 may be an operational amplifier such as that available from Texas Instruments, Dallas, Texas, under the trade name LM358. Operational amplifier 6330 may include an inverting amplifier. Circuitry around operational amplifier 6330 may include a current loop. The circuitry may set a maximum output current. The circuitry may limit the current in abnormal states, such as overload, short circuit, and any other suitable abnormal state.

Voltage may be transmitted from terminals 6320 and 6322 to a negative terminal (2) of operational amplifier 6330. The voltage flowing through the negative terminal (2) may be compared to the voltage of a positive terminal (3) of operational amplifier 6330. Positive terminal (3) may be a reference voltage. The reference voltage may be calculated from a voltage divider including resistors R27, R5, and R36 and voltage 6336 (2.5 VDC).

When the voltage of negative terminal (2) is greater than the voltage in the positive terminal (3), current may flow to photocoupler 6332. The current may flow to light emitter 63112 of photocoupler 6332. Light emitter 63112 may transmit current to phototransistor 63114 included in photocoupler 6332. Phototransistor 63114 may be disposed in LLC circuitry 6305. The current may flow from phototransistor 63114 to the ground. The flow of current to the ground may regulate the voltage. Keeping the voltage regulated may enable current control of current regulated output channels 6315, 6317, 6319, 6321, 6323, and 6325.

When the voltage of positive terminal (3) is greater than the voltage in negative terminal (2), the output voltage may be a high voltage. Because of the high voltage output, current may not flow through photocoupler 6332. When the output is a high voltage, the current may continue flowing through protection circuitry 6309 to current regulated output channels 6315, 6317, 6319, 6321, 6323, and 6325.

Protection circuitry 6309 may output a regulated voltage of 24 VDC on the secondary side of circuit 6300. Protection circuitry 6309 may output a voltage of 24 VDC through terminal 6328. Protection circuitry may output a voltage of 24 VDC through terminal 6328 to current regulated output channels 6315, 6317, 6319, 6321, 6323, and 6325.

Figure 68:
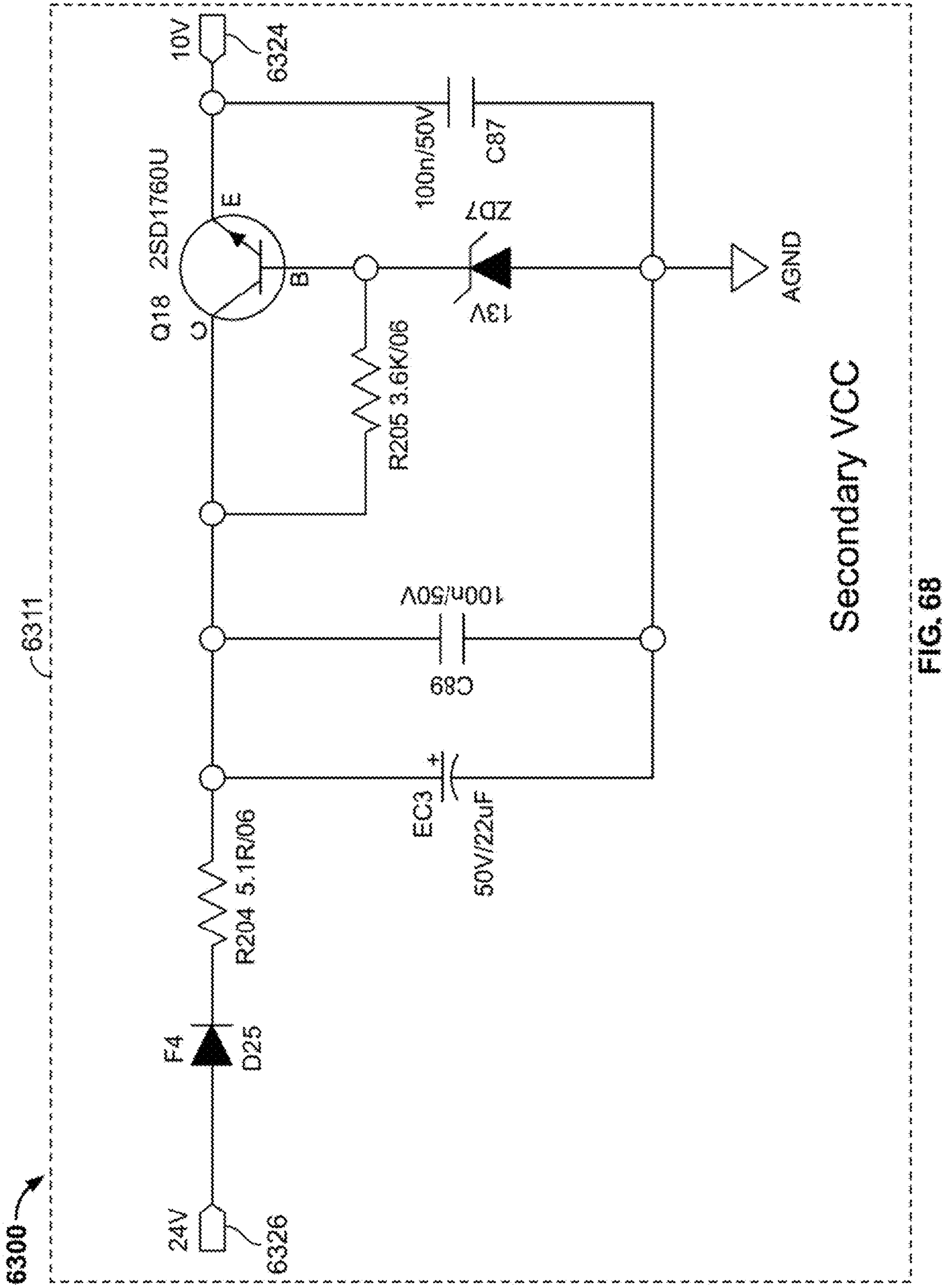
FIG. 68 shows illustrative apparatus in accordance with principles of the invention.

FIG. 68 shows illustrative circuit 6300. Circuit 6300 may include secondary VCC circuitry 6311. Secondary VCC circuitry 6311 may provide supply voltage to different circuit components included in the secondary side of circuit 6300. Secondary VCC circuitry 6311 may receive voltage through terminal 6326. Secondary VCC circuitry 6311 may receive 24 VDC through terminal 6326. Secondary VCC circuitry may step-down the received 24 VDC to output 10 VDC. Secondary VCC circuitry 6311 may include low drop-out regulator ("LDO") circuitry. Secondary VCC circuitry 6311 may use the low drop-out regulator circuitry to step-down the 24V. Secondary VCC circuitry 6311 may output 10 VDC through terminal 6324.

Figure 69:
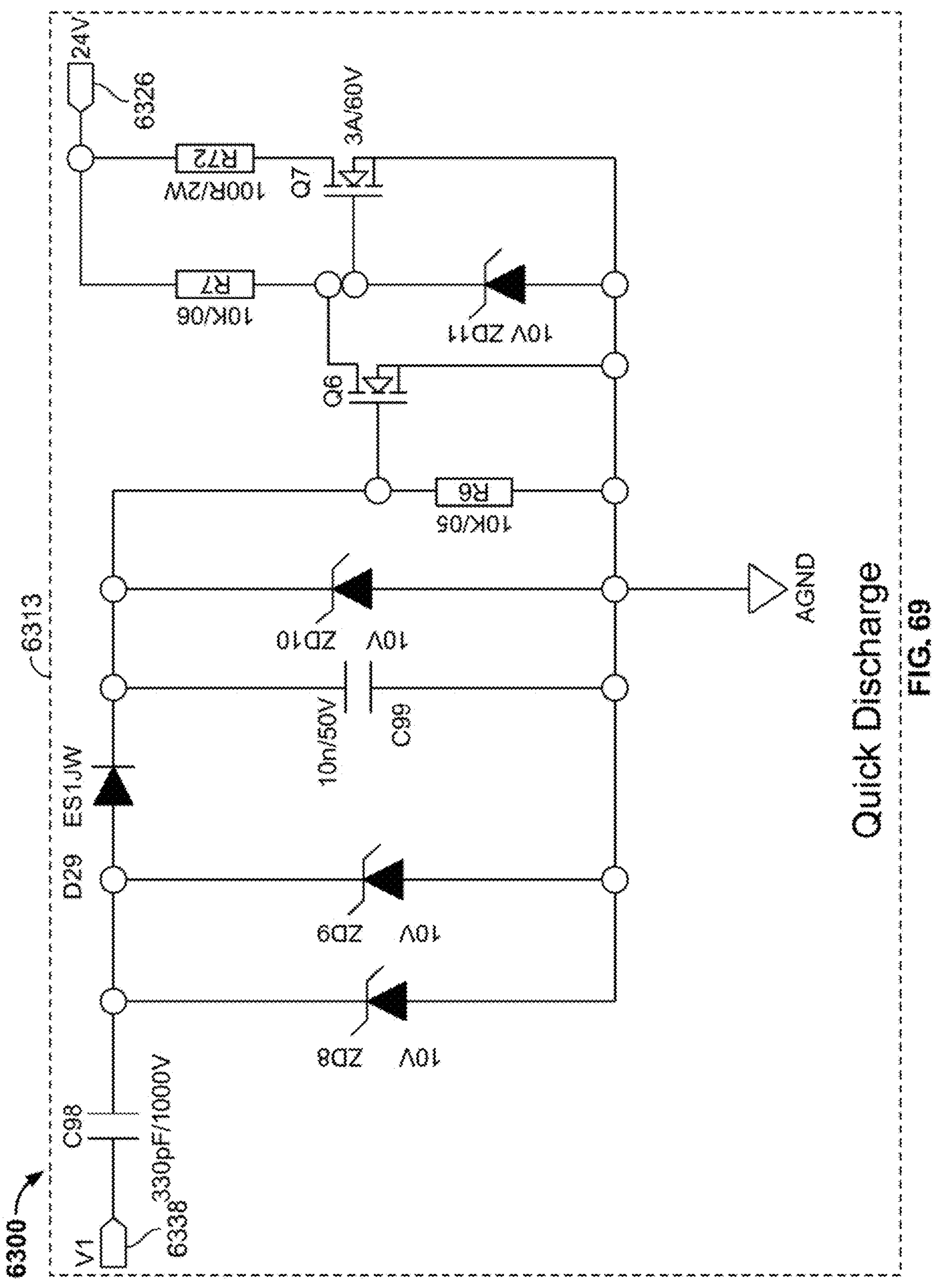
FIG. 69 shows illustrative apparatus in accordance with principles of the invention.

FIG. 69 shows illustrative circuit 6300. Circuit 6300 may include quick discharge circuitry 6313. Quick discharge circuitry 6313 may receive voltage through terminal 6338. Quick discharge circuitry 6313 may receive voltage from LLC circuitry 6305. Quick discharge circuitry 6313 may discharge energy faster from an output capacitor when there is no voltage flowing through terminal 6338. Quick discharge circuitry 6313 may reduce the VCC voltage of microcontroller 6327 to below working voltage within one second. Quick discharge circuitry 6313 may reduce the VCC voltage of microcontroller 6327 to below working voltage within any suitable amount of time. Quick discharge circuitry 6313 may output a voltage of 24 VDC. Quick discharge circuitry 6313 may output a voltage of 24 VDC through terminal 6326.

Figure 70A:
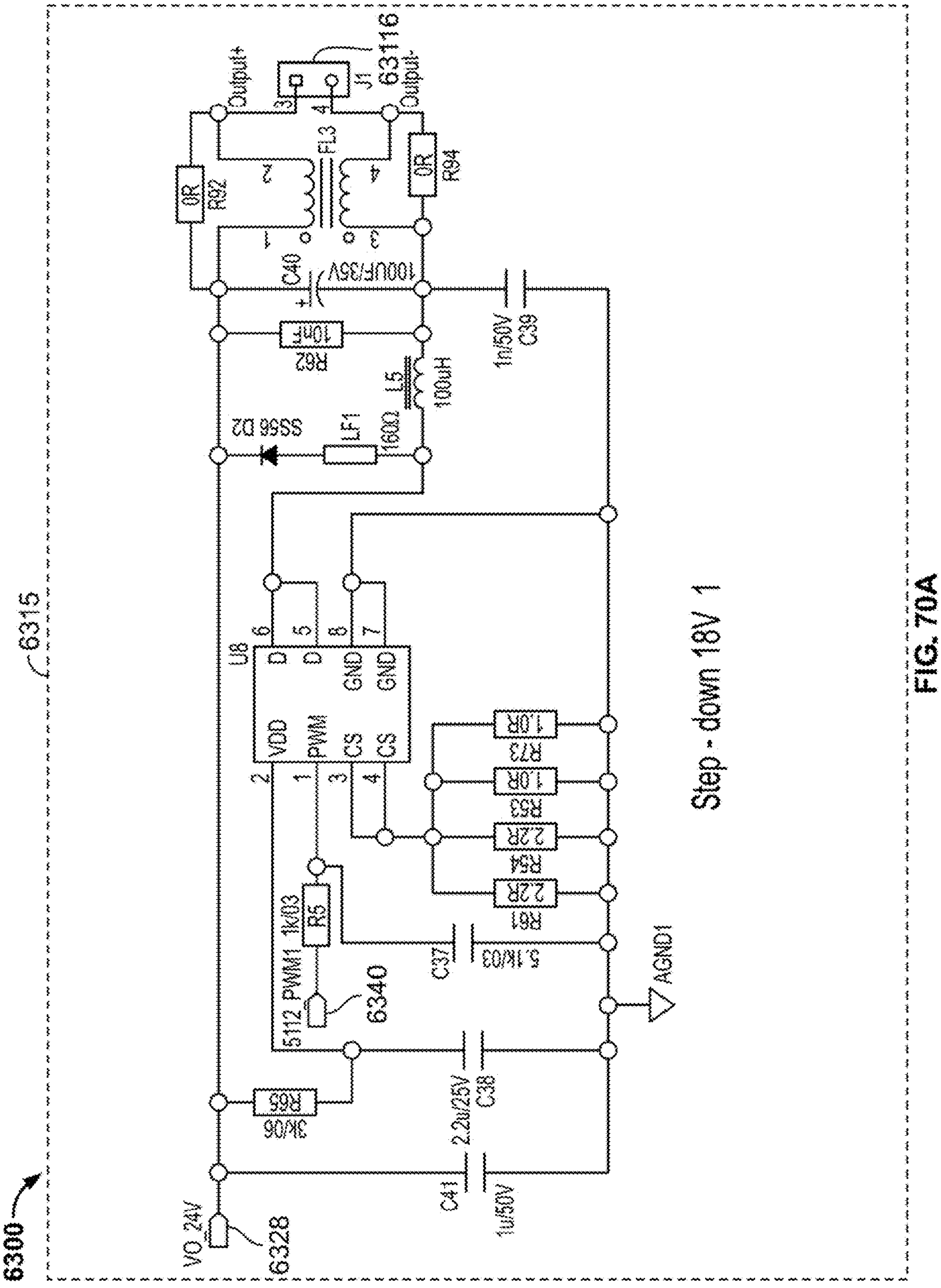
FIG. 70A shows illustrative apparatus in accordance with principles of the invention.

FIG. 70A shows illustrative circuit 6300. Circuit 6300 may include current regulated output channel 6315. Current regulated output channel 6315 may receive an input of voltage of 24 VDC. Current regulated output channel 6315 may receive an input voltage of 24 VDC through terminal 6328. Current regulated output channel 6315 may receive an input voltage of 24 VDC through terminal 6328 from power protection circuitry 6309. Current regulated output channel 6315 may include buck converter circuitry. The buck converter circuitry may step-down the voltage. The buck converter circuitry may step down the voltage from 24 VDC to 18 VDC.

Current regulated output channel 6315 may include terminal 6340 (PWM1). Terminal 6340 may be a PWM terminal. Current regulated output channel 6315 may be in electronic communication with microcontroller 6327. Current regulated output channel 6315 may be in electronic communication with microcontroller 6327 through terminal 6340. Terminal 6340 may transmit signals from microcontroller 6327. The signals may include dimming signals. The signals may include correlated color temperature ("CCT") signals. The signals may include any suitable lighting control signal.

Current regulated output channel 6315 may output a current through output jack 63116. Output jack 63116 may connect to one or more LED modules. The one or more LED modules may each include one or more LEDs. Current regulated output channel 6315 may output a current regulated based on a PWM signal transmitted through terminal 6340.

Figure 70B:
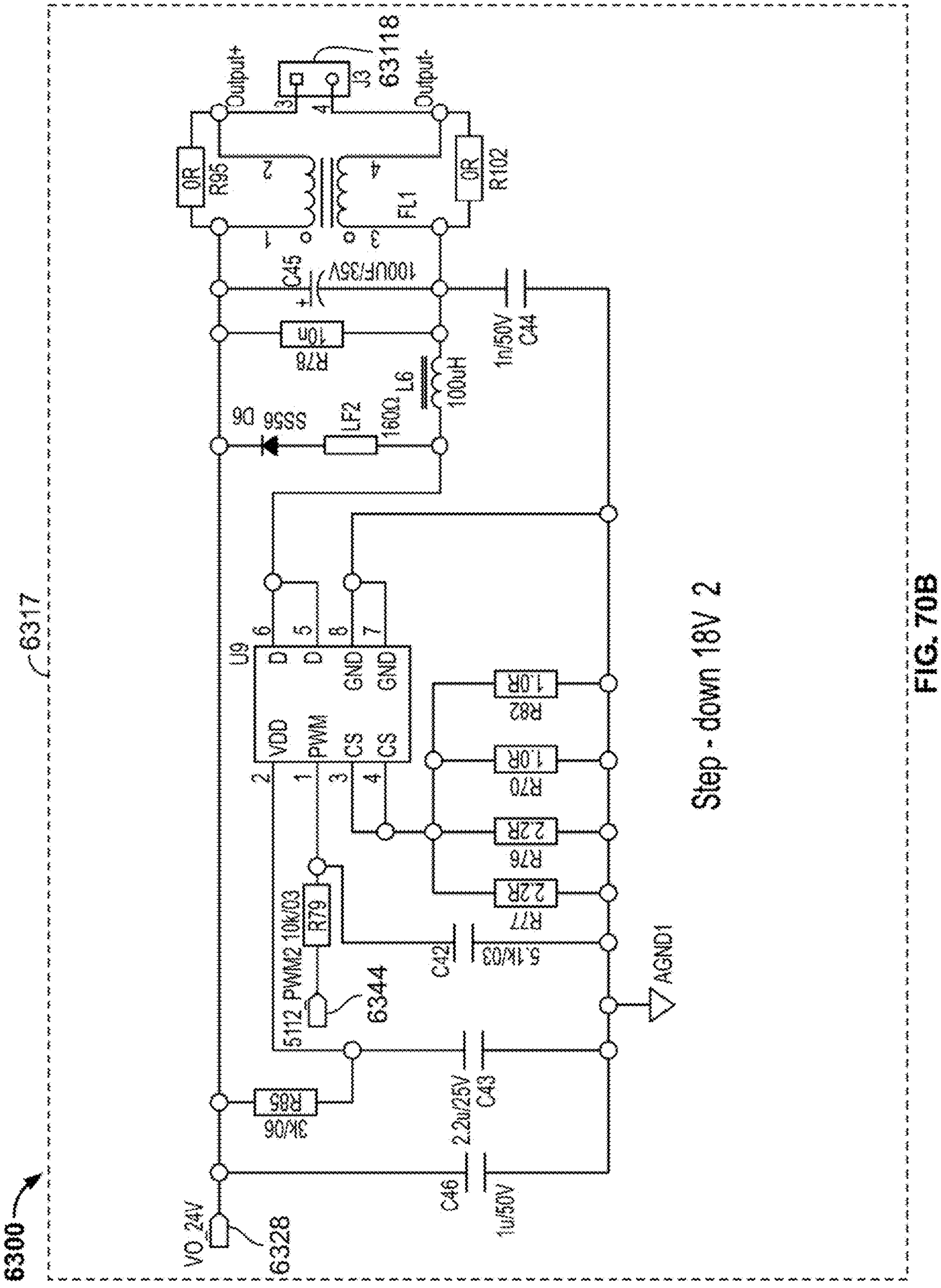
FIG. 70B shows illustrative apparatus in accordance with principles of the invention.

FIG. 70B shows illustrative circuit 6300. Circuit 6300 may include current regulated output channel 6317. Current regulated output channel 6317 may receive an input of voltage of 24 VDC. Current regulated output channel 6317 may receive an input voltage of 24 VDC through terminal 6328. Current regulated output channel 6317 may receive an input voltage of 24 VDC through terminal 6328 from power protection circuitry 6309. Current regulated output channel 6317 may include buck converter circuitry. The buck converter circuitry may step-down the voltage. The buck converter may step-down the voltage from 24 VDC to 18 VDC.

Current regulated output channel 6317 may include terminal 6344 (PWM2). Terminal 6344 may be a PWM terminal. Current regulated output channel 6317 may be in electronic communication with microcontroller 6327. Current regulated output channel 6317 may be in electronic communication with microcontroller 6327 through terminal 6344. Terminal 6344 may transmit signals from microcontroller 6327. The signals may include dimming signals. The signals may include CCT signals. The signals may include any suitable lighting control signal.

Current regulated output channel 6317 may output a current through output jack 63118. Output jack 63118 may connect to one or more LED modules. The one or more LED modules may each include one or more LEDs. Current regulated output channel 6317 may output a current regulated based on a PWM signal transmitted through terminal 6344.

Figure 70C:
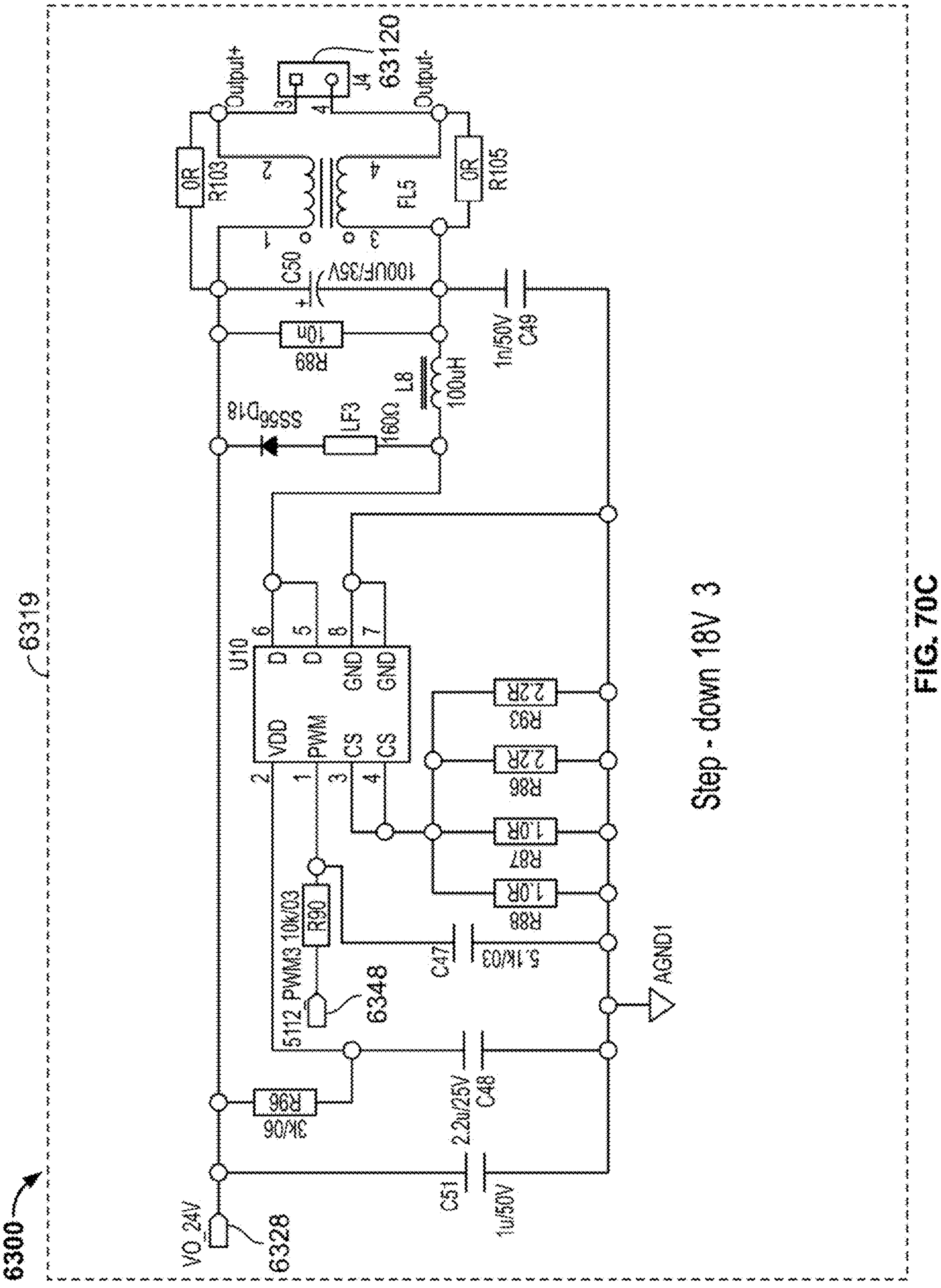
FIG. 70C shows illustrative apparatus in accordance with principles of the invention.

FIG. 70C shows illustrative circuit 6300. Circuit 6300 may include current regulated output channel 6319. Current regulated output channel 6319 may receive an input of voltage of 24 VDC. Current regulated output channel 6319 may receive an input voltage of 24 VDC through terminal 6328. Current regulated output channel 6319 may receive an input voltage of 24 VDC through terminal 6328 from power protection circuitry 6309. Current regulated output channel 6319 may include buck converter circuitry. The buck converter circuitry may step-down the voltage. The buck converter circuitry may step-down the voltage from 24 VDC to 18 VDC.

Current regulated output channel 6319 may include terminal 6348 (PWM3). Terminal 6348 may be a PWM terminal. Current regulated output channel 6319 may be in electronic communication with microcontroller 6327. Current regulated output channel 6319 may be in electronic communication with microcontroller 6327 through terminal 6348. Terminal 6348 may transmit signals from microcontroller 6327. The signals may include dimming signals. The signals may include CCT signals. The signals may include any suitable lighting control signal.

Current regulated output channel 6319 may output a current through output jack 63120. Output jack 63120 may connect to one or more LED modules. The one or more LED modules may each include one or more LEDs. Current regulated output channel 6319 may output a current regulated based on a PWM signal transmitted through terminal 6348.

Figure 70D:
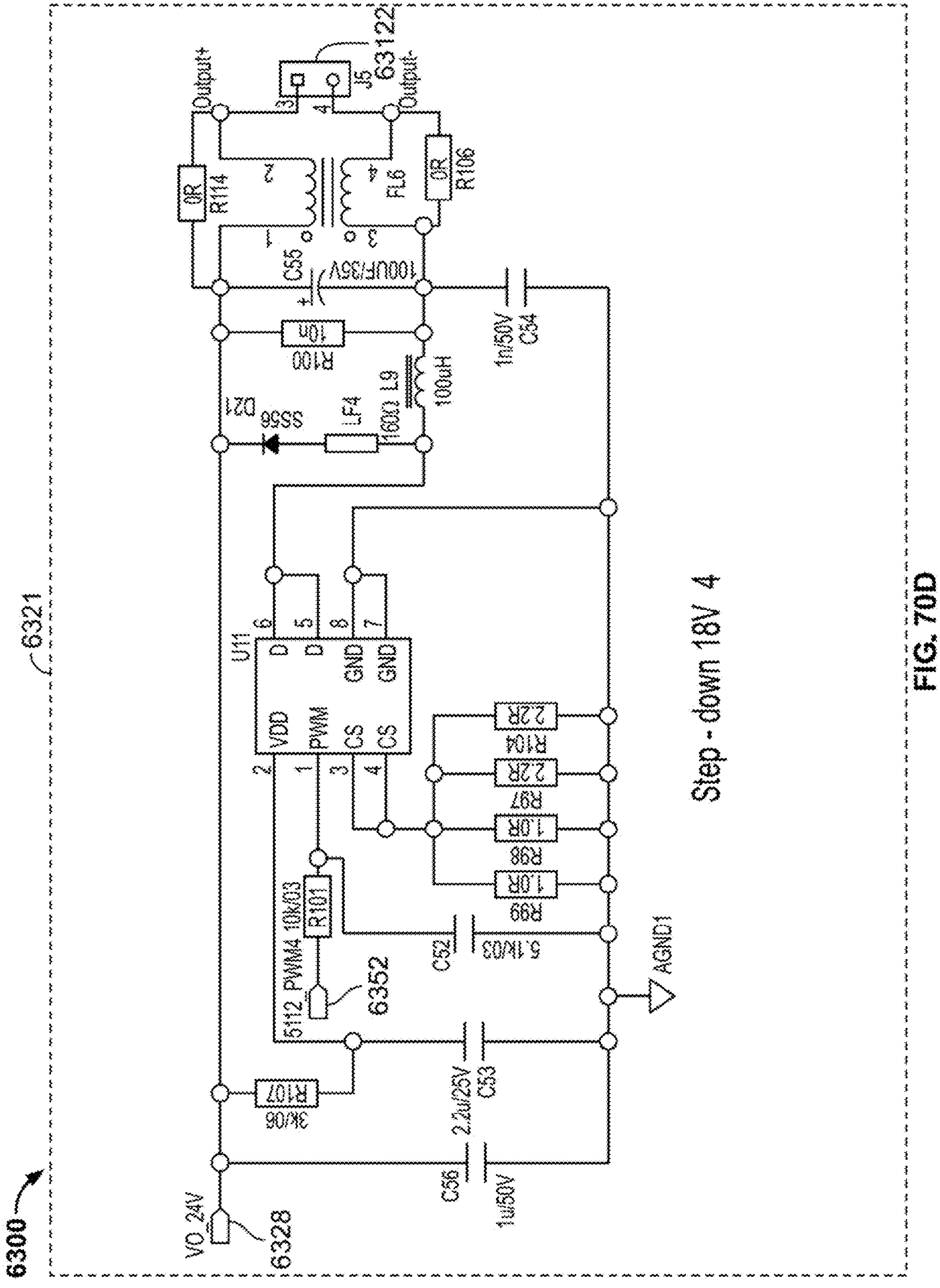
FIG. 70D shows illustrative apparatus in accordance with principles of the invention.

FIG. 70D shows illustrative circuit 6300. Circuit 6300 may include current regulated output channel 6321. Current regulated output channel 6321 may receive an input of voltage of 24 VDC. Current regulated output channel 6321 may receive an input voltage of 24 VDC through terminal 6328. Current regulated output channel 6321 may receive an input voltage of 24 VDC through terminal 6328 from power protection circuitry 6309. Current regulated output channel 6321 may include buck converter circuitry. The buck converter circuitry may step-down the voltage. The buck converter circuitry may step-down the voltage from 24 VDC to 18 VDC.

Current regulated output channel 6321 may include terminal 6352 (PWM4). Terminal 6352 may be a PWM terminal. Current regulated output channel 6321 may be in electronic communication with microcontroller 6327. Current regulated output channel 6321 may be in electronic communication with microcontroller 6327 through terminal 6352. Terminal 6352 may transmit signals from microcontroller 6327. The signals may include dimming signals. The signals may include CCT signals. The signals may include any suitable lighting control signal.

Current regulated output channel 6321 may output a current through output jack 63122. Output jack 63122 may connect to one or more LED modules. The one or more LED modules may each include one or more LEDs. Current regulated output channel 6321 may output a current regulated based on a PWM signal transmitted through terminal 6352.

Figure 70E:
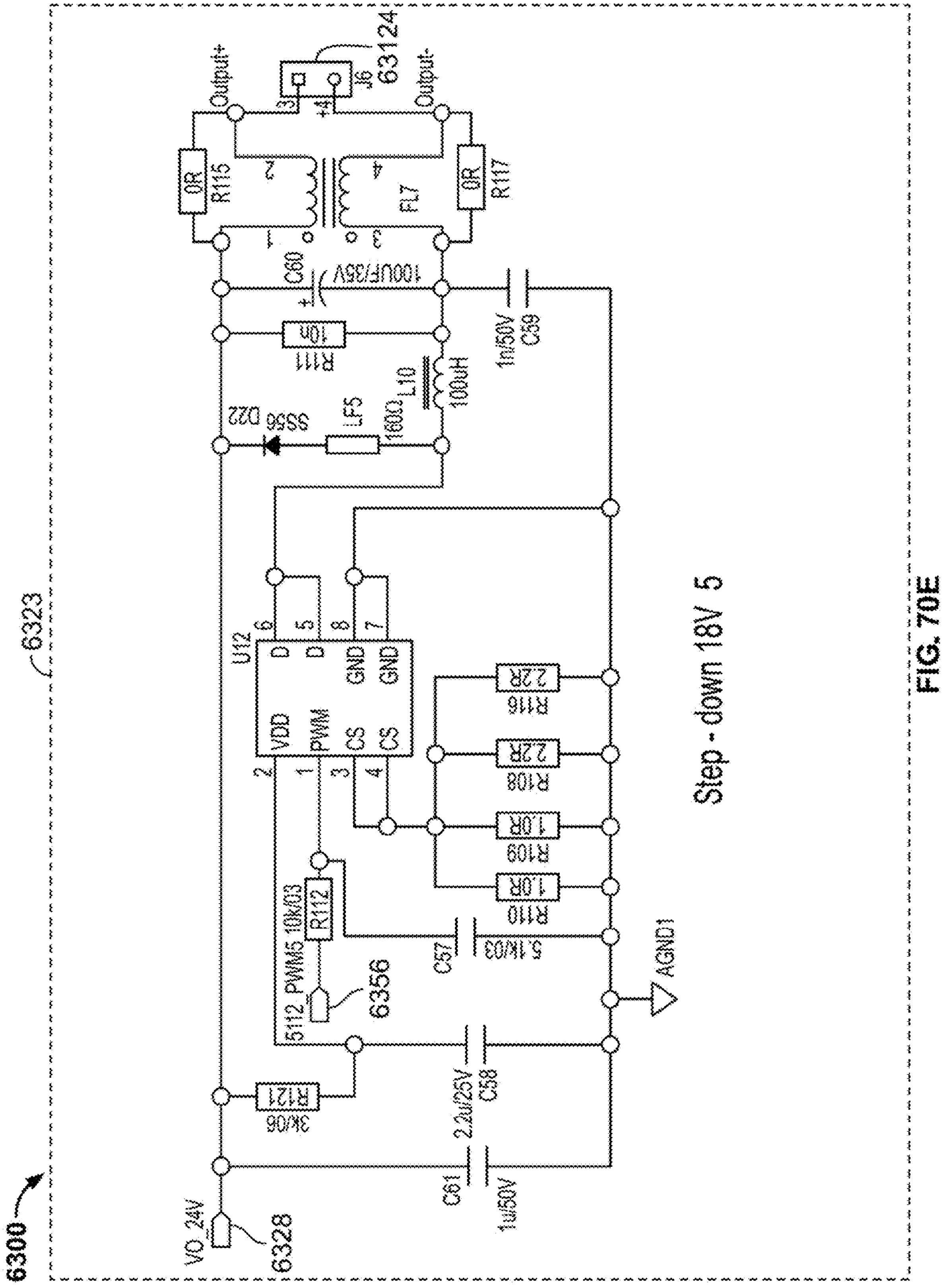
FIG. 70E shows illustrative apparatus in accordance with principles of the invention.

FIG. 70E shows illustrative circuit 6300. Circuit 6300 may include current regulated output channel 6323. Current regulated output channel 6323 may receive an input of voltage of 24 VDC. Current regulated output channel 6323 may receive an input voltage of 24 VDC through terminal 6328. Current regulated output channel 6323 may receive an input voltage of 24 VDC through terminal 6328 from power protection circuitry 6309. Current regulated output channel 6323 may include buck converter circuitry. The buck converter circuitry may step-down the voltage. The buck converter circuitry may step-down the voltage from 24 VDC to 18 VDC.

Current regulated output channel 6323 may include terminal 6356 (PWM5). Terminal 6356 may be a PWM terminal. Current regulated output channel 6323 may be in electronic communication with microcontroller 6327. Current regulated output channel 6323 may be in electronic communication with microcontroller 6327 through terminal 6356. Terminal 6356 may transmit signals from microcontroller 6327. The signals may include dimming signals. The signals may include CCT signals. The signals may include any suitable lighting control signal.

Current regulated output channel 6323 may output a current through output jack 63124. Output jack 63124 may connect to one or more LED modules. The one or more LED modules may each include one or more LEDs. Current regulated output channel 6323 may output a current regulated based on a PWM signal transmitted through terminal 6356.

Figure 70F:
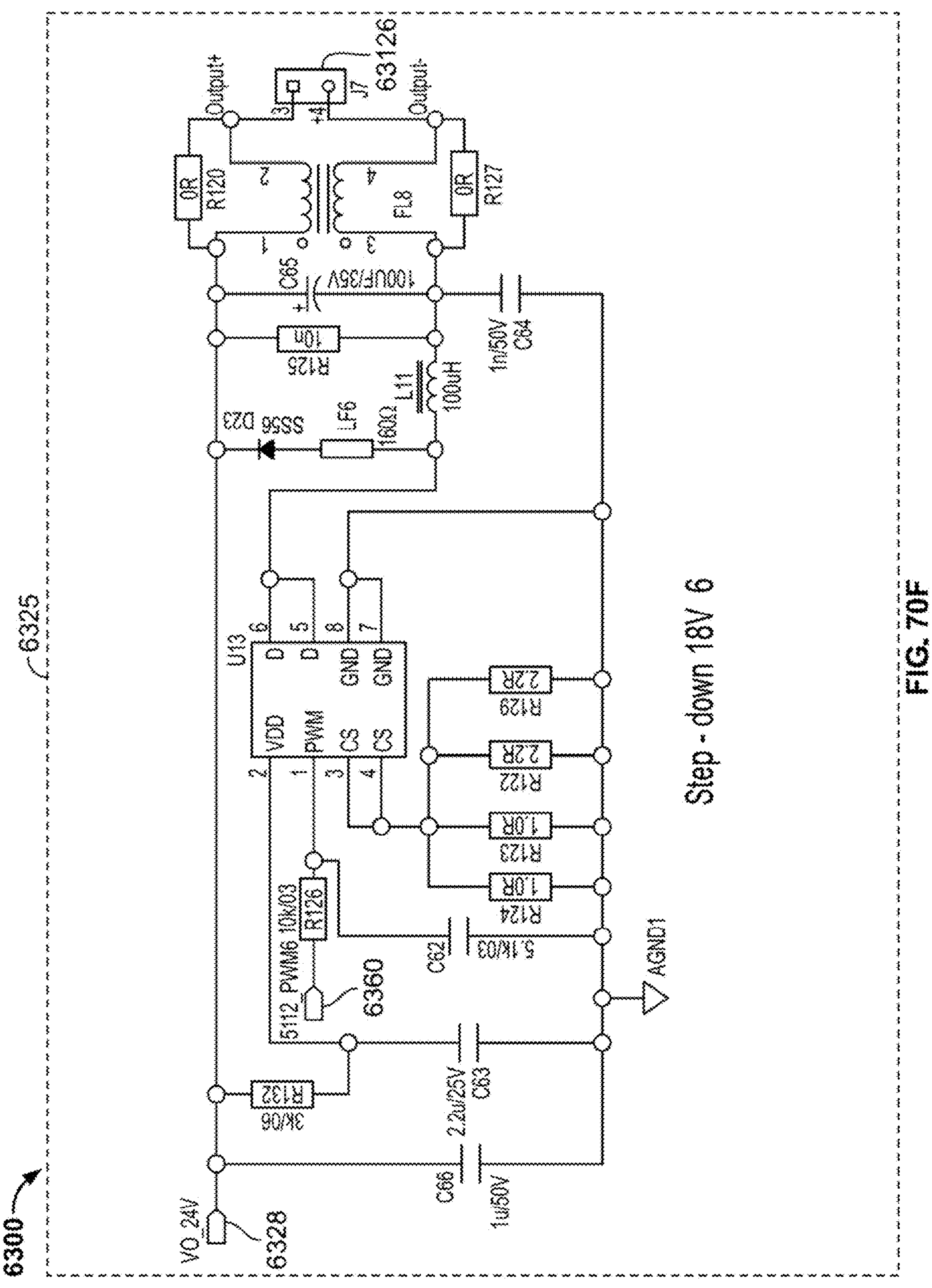
FIG. 70F shows illustrative apparatus in accordance with principles of the invention.

FIG. 70F shows illustrative circuit 6300. Circuit 6300 may include current regulated output channel 6325. Current regulated output channel 6325 may receive an input of voltage of 634 VDC. Current regulated output channel 6325 may receive an input voltage of 24 VDC through terminal 6328. Current regulated output channel 6325 may receive an input voltage of 24 VDC through terminal 6328 from power protection circuitry 6309. Current regulated output channel 6325 may include buck converter circuitry. The buck converter may step down the voltage. The buck converter may step down the voltage from 24 VDC to 18 VDC.

Current regulated output channel 6325 may include terminal 6360 (PWM6). Terminal 6360 may be a PWM terminal. Current regulated output channel 6325 may be in electronic communication with microcontroller 6327. Current regulated output channel 6325 may be in electronic communication with microcontroller 6327 through terminal 6360. Terminal 6360 may transmit signals from microcontroller 6327. The signals may include dimming signals. The signals may include CCT signals. The signals may include any suitable lighting control signal.

Current regulated output channel 6325 may output a current through output jack 63126. Output jack 63126 may connect to one or more LED modules. The one or more LED modules may each include one or more LEDs. Current regulated output channel 6325 may output a current regulated based on a PWM signal transmitted through terminal 6360.

Figure 71:
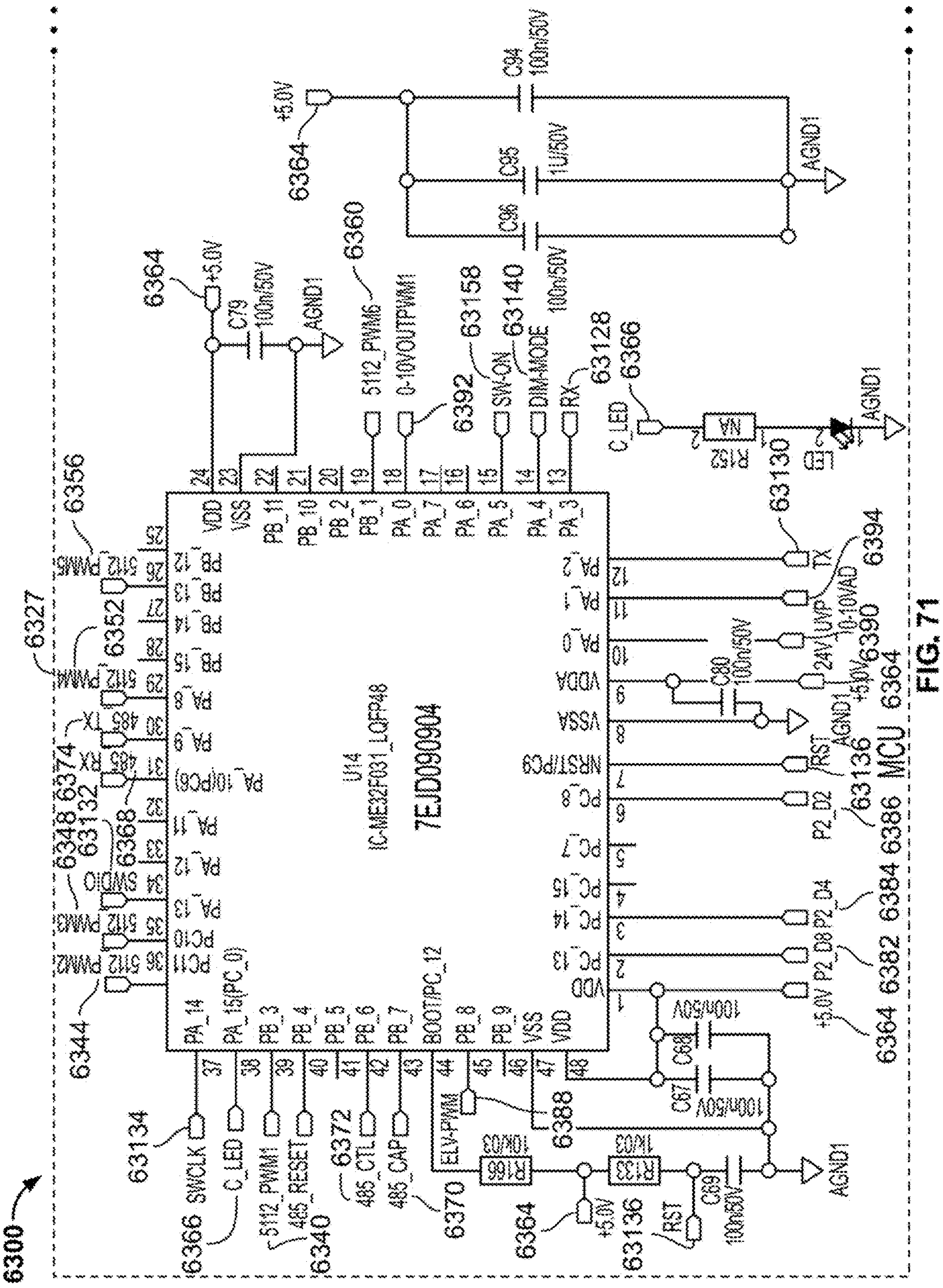
FIG. 71 shows illustrative apparatus in accordance with principles of the invention.
Figure 71:
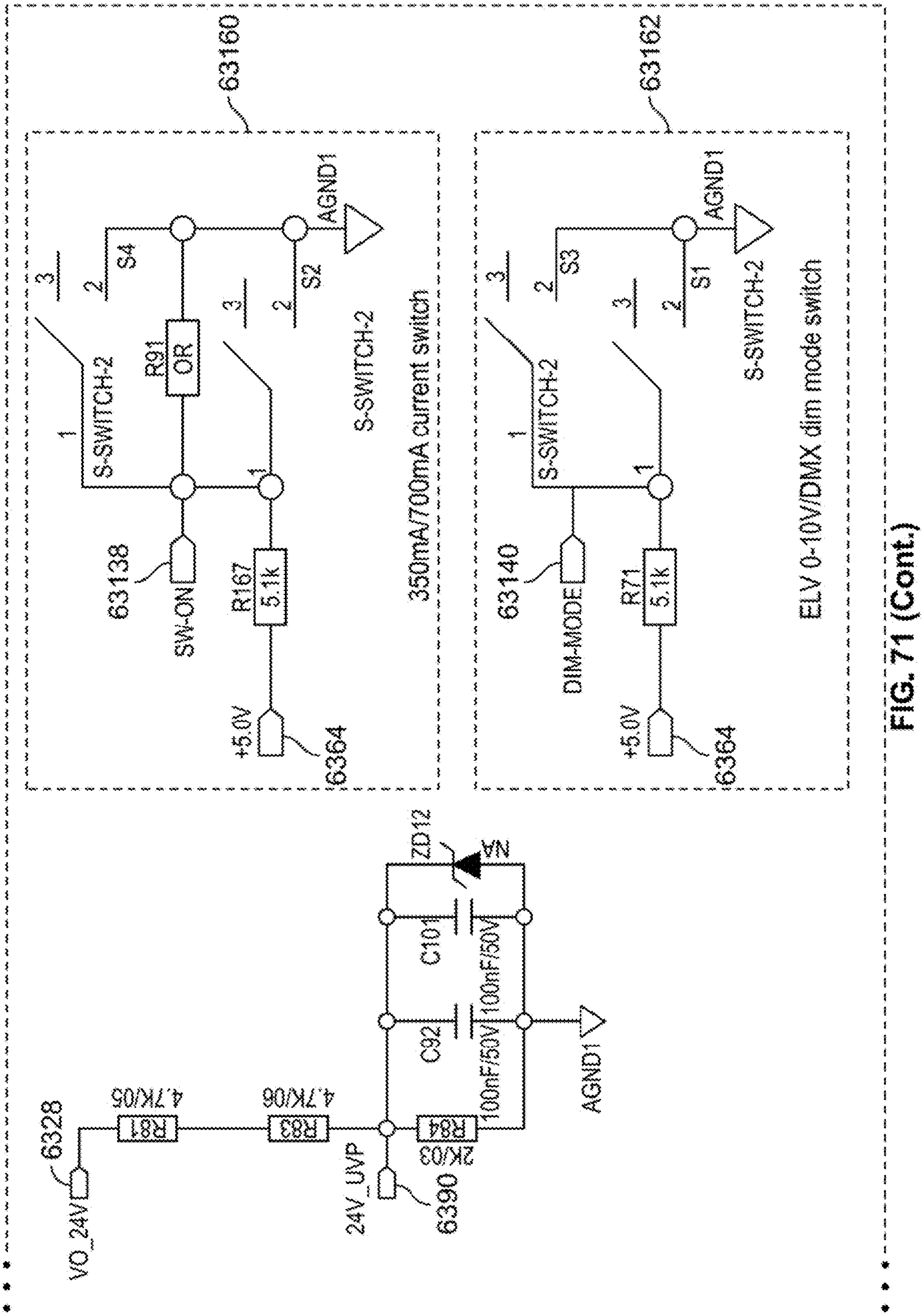

FIG. 71 shows illustrative circuit 6300. Circuit 6300 may include microcontroller 6327. Microcontroller 6327 may be a microcontroller such as that available from Minsi Microelectronics, China, model ME32F031C8T6.

Microcontroller 6327 may receive an input voltage of 5 VDC. Microcontroller 6327 may receive the input voltage through terminal 6364. Microcontroller 6327 may receive the input voltage from microcontroller VCC circuitry 6329. The input voltage may power microcontroller 6327.

Microcontroller 6327 may be in electronic communication with dimming circuitry including DMX circuitry 6331, TRIAC/ELV circuitry 6333, and 0-10V circuitry 6335. Microcontroller 6327 may be in electronic communication with DMX circuitry 6331 through terminals 6368 (485_RX), 6370 (485_CAP), 6372 (485_CTL), 6374 (485_TX), and 6376 (485_RESET). DMX circuitry 6327 may send a DMX signal to microcontroller 6327 through terminals 6368, 6370, 6372, 6374 and 6376. Microcontroller 6327 may transmit the DMX signal to current regulated output channels 6315, 6317, 6319, 6321, 6323, and 6325. The DMX signal may control the dimming level of LED modules connected to current regulated output channels 6315, 6317, 6319, 6321, 6323, and 6325 using a DMX protocol.

Microcontroller 6327 may be in electronic communication with TRIAC/ELV circuitry 6333 through terminal 6388 (ELV_PWM). ELV/TRIAC circuitry 6333 may transmit a TIRAC/ELV signal to microcontroller 6327 through terminal 6388. Microcontroller 6327 may transmit the TRIAC/ELV signal to current regulated output channels 6315, 6317, 6319, 6321, 6323, and 6325. The TRIAC/ELV signal may control the dimming level of LED modules connected to current regulated output channels 6315, 6317, 6319, 6321, 6323, and 6325 using a TRIAC/ELV phase-cut.

Microcontroller 6327 may be in electronic communication with 0-10V circuitry 6335. Microcontroller 6327 may be in electronic communication with 0-10V circuitry 6335 through terminals 6392 (0-10VOUTPWM1) and 6394 (0-10VAD). 0-10V circuitry 6335 may transmit a 0-10V signal to microcontroller 6327 through terminals 6392 and 6394. Microcontroller 6327 may transmit the 0-10V signal to current regulated output channels 6315, 6317, 6319, 6321, 6323, and 6325. The 0-10V signal may control the dimming level of LED modules connected to current regulated output channels 6315, 6317, 6319, 6321, 6323, and 6325 using the 0-10V signal.

Microcontroller 6327 may throttle current to one or more of current regulated output channels 6315, 6317, 6319,

6321, 6323, and 6325 through PWM terminals 6340, 6344, 6348, 6352, 6356 and 6360 respectively. The current may be throttled based on signals received from the dimming circuitry included in circuit 6300. Microcontroller 6327 may prevent current transmission to one or more current regulated output channels 6315, 6317, 6319, 6321, 6323, and 6325. Microcontroller 6327 may limit current transmission to one or more current regulated output channels 6315, 6317, 6319, 6321, 6323, and/or 6325. Microcontroller 6327 may increase current transmission to one or more current regulated output channels 6315, 6317, 6319, 6321, 6323, and 6325.

Microcontroller 6327 may receive dimming curve setting information from dimming curve selection circuitry 6337. Microcontroller 6327 may receive dimming curve setting information from dimming curve selection circuitry 6337 through terminals 6382 (P2_D8), 6384 (P2_D4), and 6386 (P2_D2). Microcontroller 6327 may store a dimming curve corresponding to the received dimming curve setting information. Microcontroller 6327 may apply the stored dimming curve to the PWM signals transmitted to current regulated output channels 6315, 6317, 6319, 6321, 6323, and/or 6325.

Microcontroller 6327 may include terminals 63128 (RX), 63130 (TX), 63132 (SWIDO), and 63134 (SWCLK). Terminals 63128, 63130, 63132 and 63134 may be used for data transmission. Microcontroller 6327 may include terminal 6390 (24V_UVP). Terminal 6390 may be used to transmit a feedback signal. The feedback signal may give feedback to microcontroller 6327. The feedback signal may give feedback to microcontroller 6327 to check whether or not the 24 VDC is stable. Microcontroller 6327 may include terminal 6366 (C-LED) connecting microcontroller 6327 to an LED. Microcontroller 6327 may include terminal 63136 (RST) to connect microcontroller 6327 to reset circuitry.

Microcontroller 6327 may include terminal 63158 (SW_ON). Terminal 63158 may connect microcontroller 6327 to switch 63160. Switch 63160 may be a 350 mA/700 mA current switch. Switch 63160 may enable a user to select an output current option. Microcontroller 6327 may include terminal 63140 (DIM_MODE). Terminal 63140 may connect microcontroller 6327 to switch 63162. Switch 63162 may be an ELV/0-10V/DMX dim mode switch. Switch 63162 may enable a user to select a dimming mode.

Figure 72:
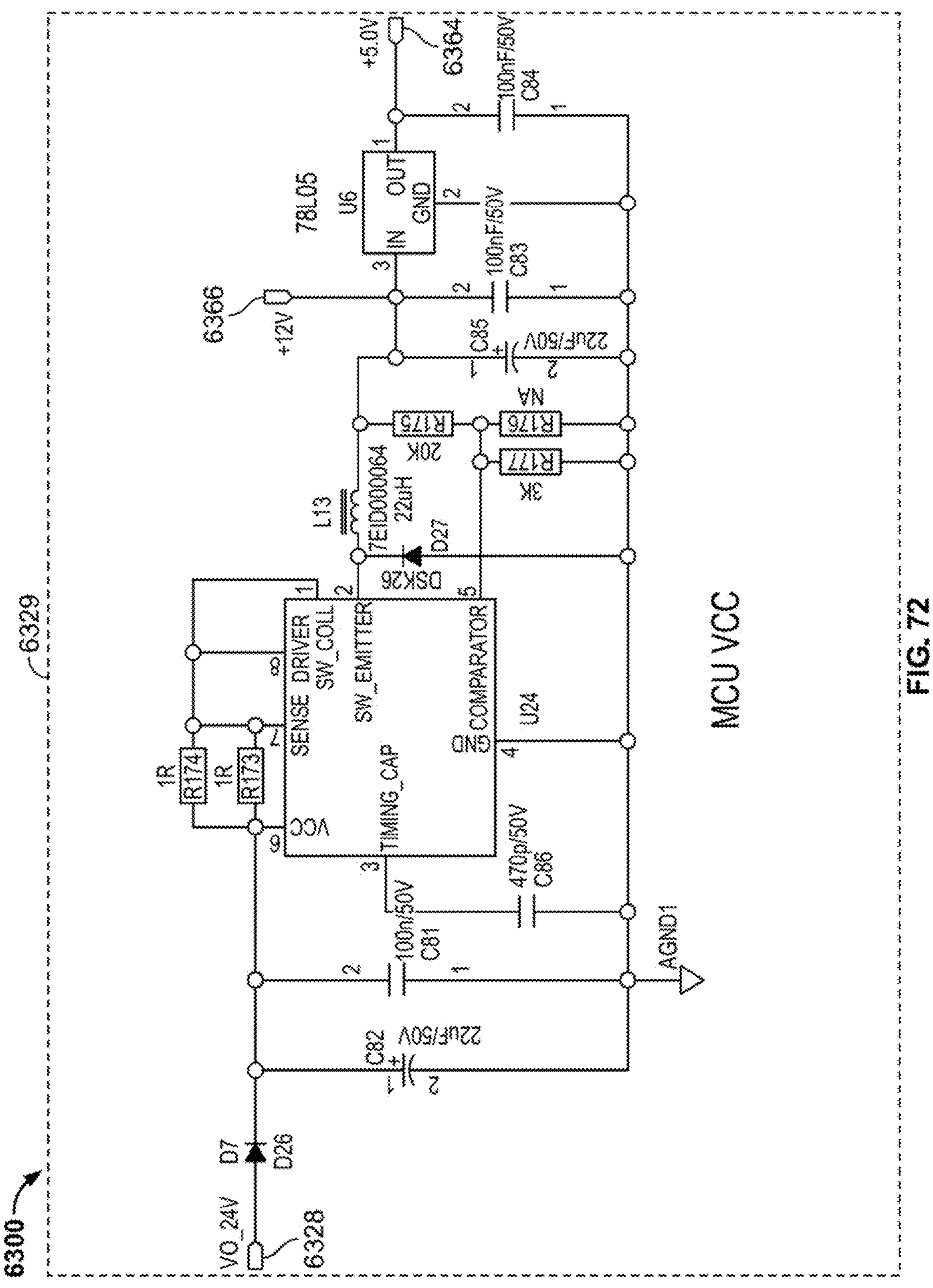
FIG. 72 shows illustrative apparatus in accordance with principles of the invention.

FIG. 72 shows illustrative circuit 6300. Circuit 6300 may include microcontroller VCC circuitry 6329. Microcontroller VCC circuitry 6329 may provide supply voltage to microcontroller 6327. Microcontroller VCC circuitry 6329 may receive voltage from protection circuitry 6309. Microcontroller VCC circuitry 6329 may receive voltage through terminal 6328. Microcontroller VCC circuitry 6329 may receive 24 VDC. Microcontroller VCC circuitry 6329 may receive any suitable voltage. Microcontroller VCC circuitry 6329 may step-down the voltage received through terminal 6328. Microcontroller VCC circuitry 6329 may step-down the voltage to 12 VDC. Microcontroller VCC circuitry 6329 may step-down the voltage to 5 VDC. Microcontroller VCC circuitry 6329 may transmit the 12 VDC through terminal 6366. Microcontroller VCC circuitry 6329 may transmit the 5 VDC through terminal 6364.

Figure 73:
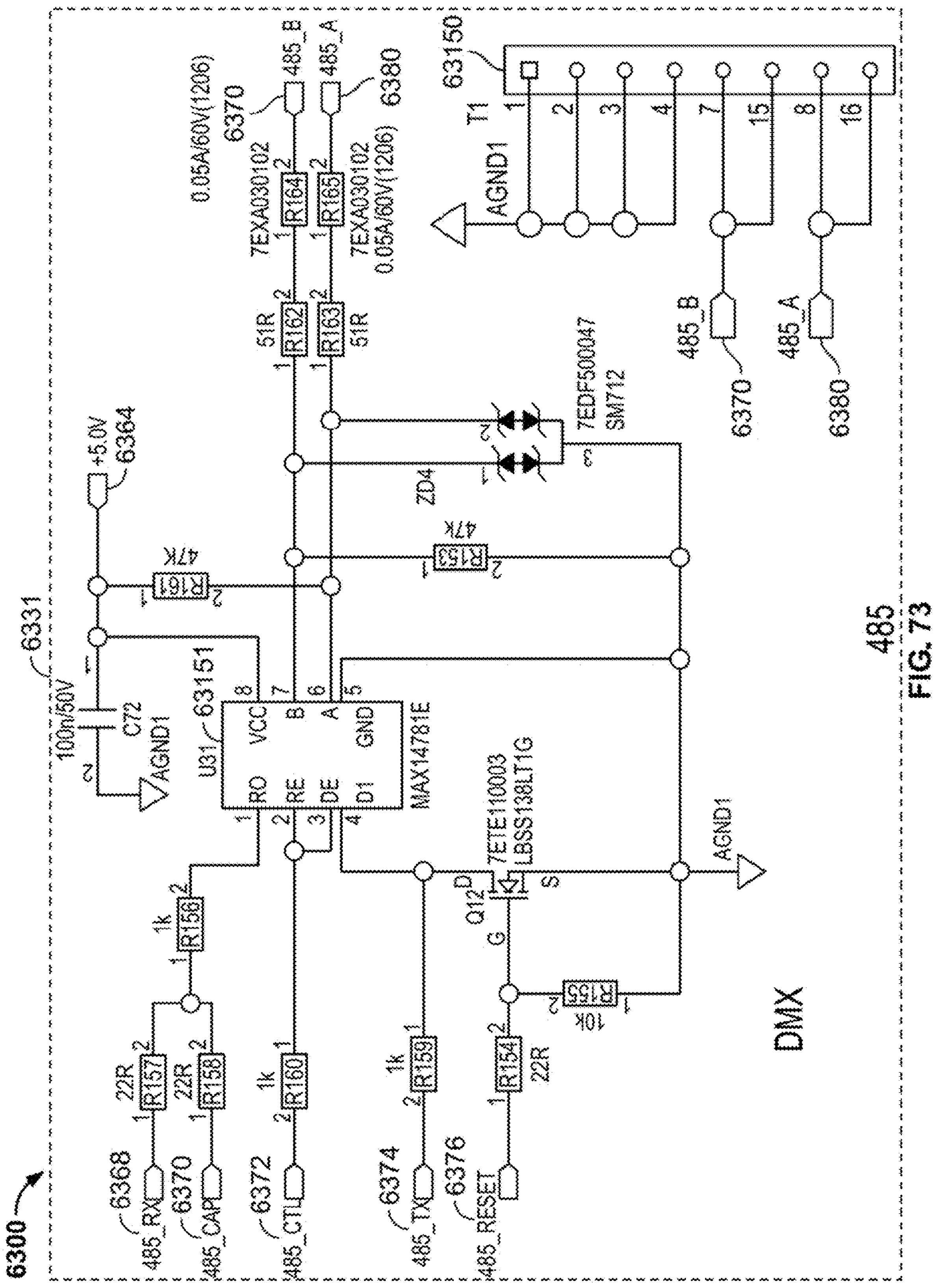
FIG. 73 shows illustrative apparatus in accordance with principles of the invention.

FIG. 73 shows illustrative circuit 6300. Circuit 6300 may include DMX circuitry 6331. DMX circuitry 6331 may dim the LED modules using a DMX protocol. The DMX protocol may transmit DMX signals using a RS-485 communication system. RS-485 communication system may include two data lines, data line 6378 (485B) and data line 6380 (485A). DMX circuitry 6331 may transmit DMX dimming signals to one or more of the LED modules connected to current regulated output channels 6315, 6317, 6319, 6321, 6323, and 6325. DMX circuitry 6331 may receive user selected dimming levels for each LED from microcontroller 6327. DMX circuitry 6331 may receive user selected dimming levels for each LED from microcontroller 6327 through terminals 6368 (485_RX), 6370 (485_CAP), 6372 (485_CTL), 6374 (485_TX), and 6376 (485_RESET).

DMX circuitry 6331 may include IC 63151. IC 63151 may be a RS-485 transceiver. IC 63151 may translate user selected dimming levels received from microcontroller 6327 into signals transmitted using data lines 6378 and 6380. IC 63151 may output signals to data lines 6378 and 6380. IC 63151 may be powered through terminal 6364.

Figure 74:
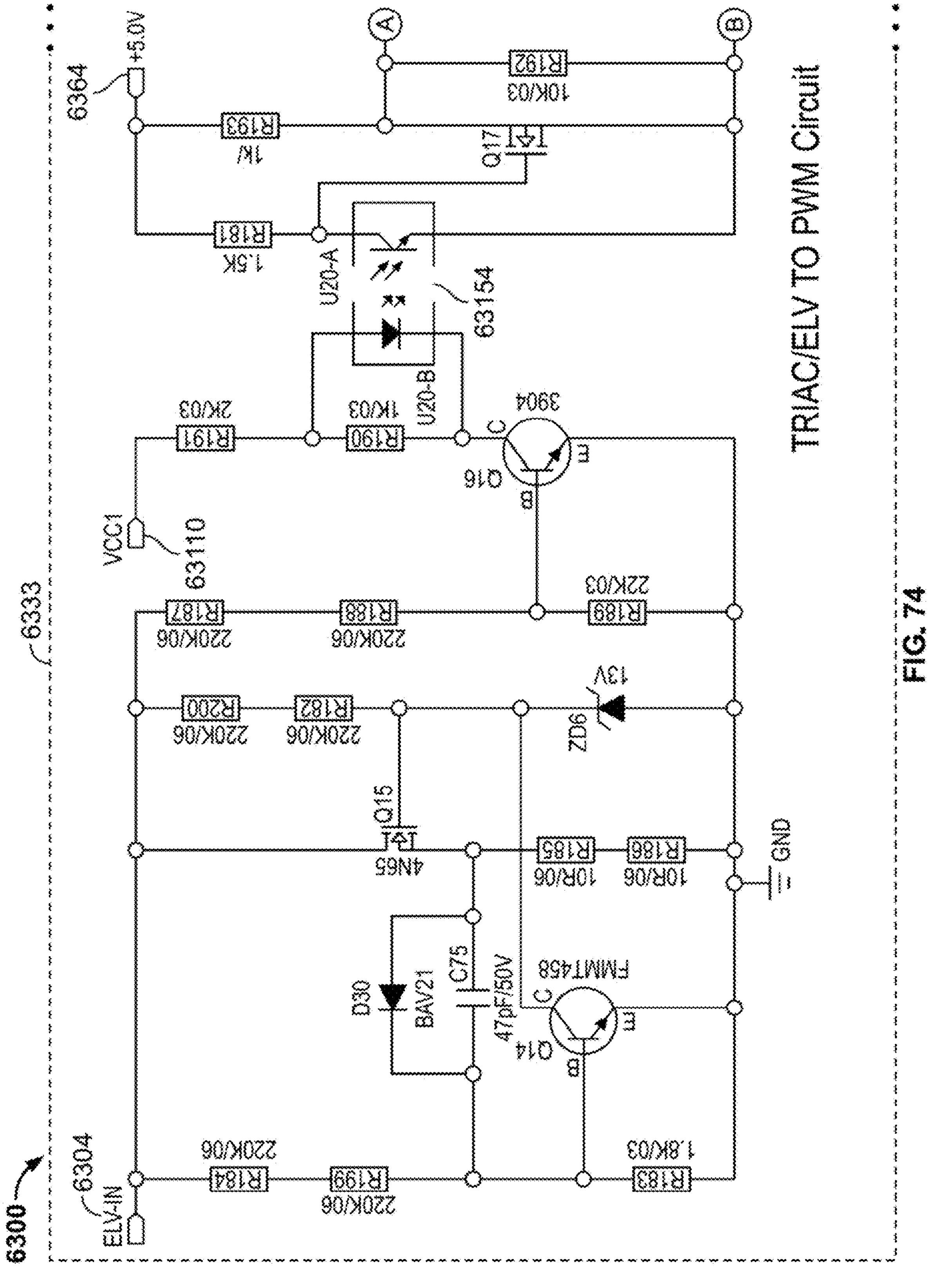
FIG. 74 shows illustrative apparatus in accordance with principles of the invention.
Figure 74:
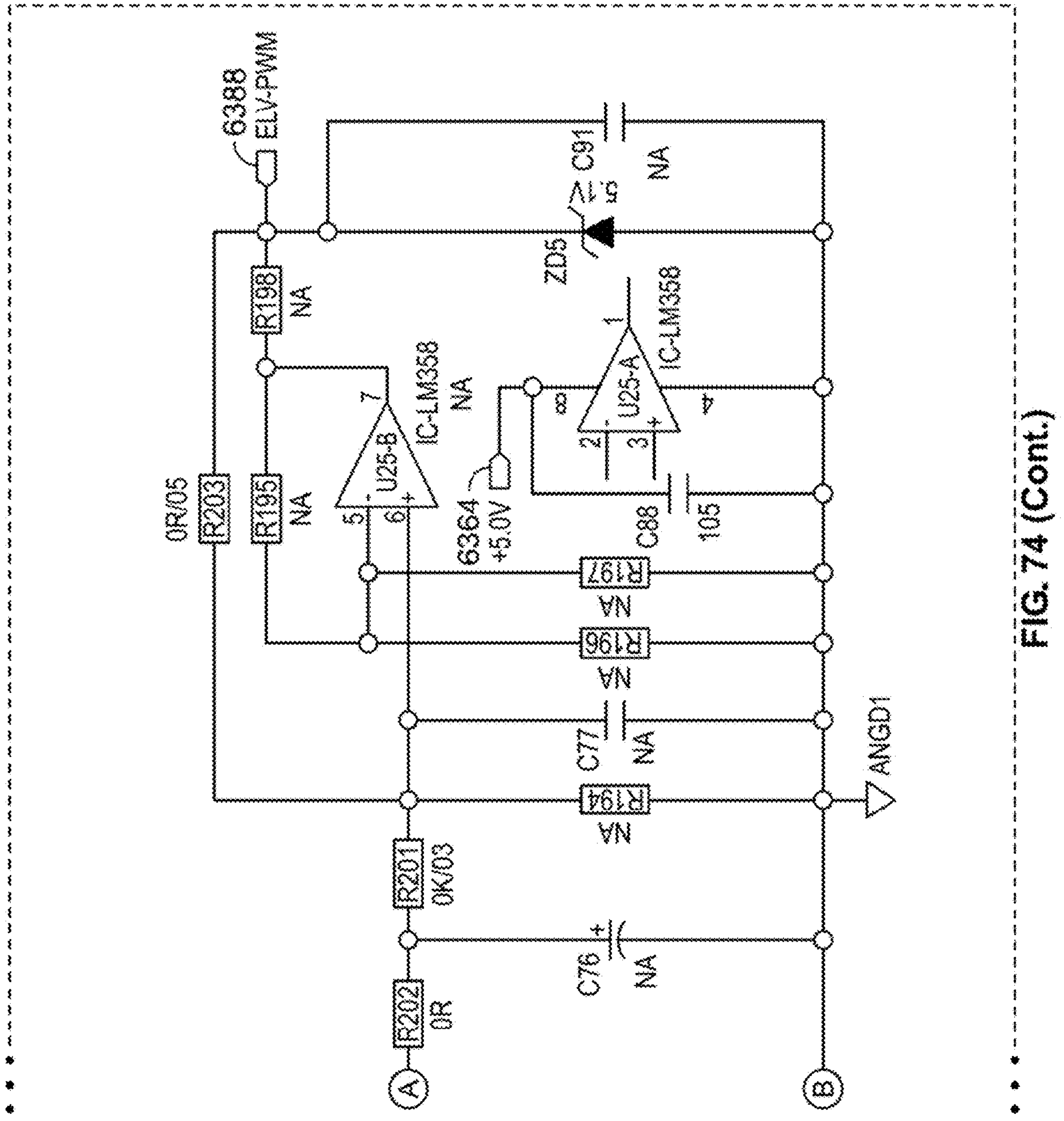

FIG. 74 shows illustrative circuit 6300. Circuit 6300 may include TRIAC/ELV circuitry 6333. TIRAC/ELV circuitry 6333 may receive AC voltage through terminal 6304. TRIAC/ELV circuitry 6333 may receive AC voltage from EMI circuitry 6301. TRIAC/ELV circuitry 6333 may alternate cutting and conducting of the current along the AC waveform to produce a dimming level. TRIAC/ELV circuitry 6333 may translate the dimming level into a microcontroller readable signal. TRIAC/ELV circuitry 6333 may transmit the microcontroller readable dimming signal to microcontroller 6327. TRIAC/ELV circuitry 6333 may transmit the dimming signal via a PWM signal to microcontroller 6327. Microcontroller 6327 may control the dimming level of LED modules connected to current regulated output channels 6315, 6317, 6319, 6321, 6323, and 6325 with corresponding PWM signals.

Figure 75:
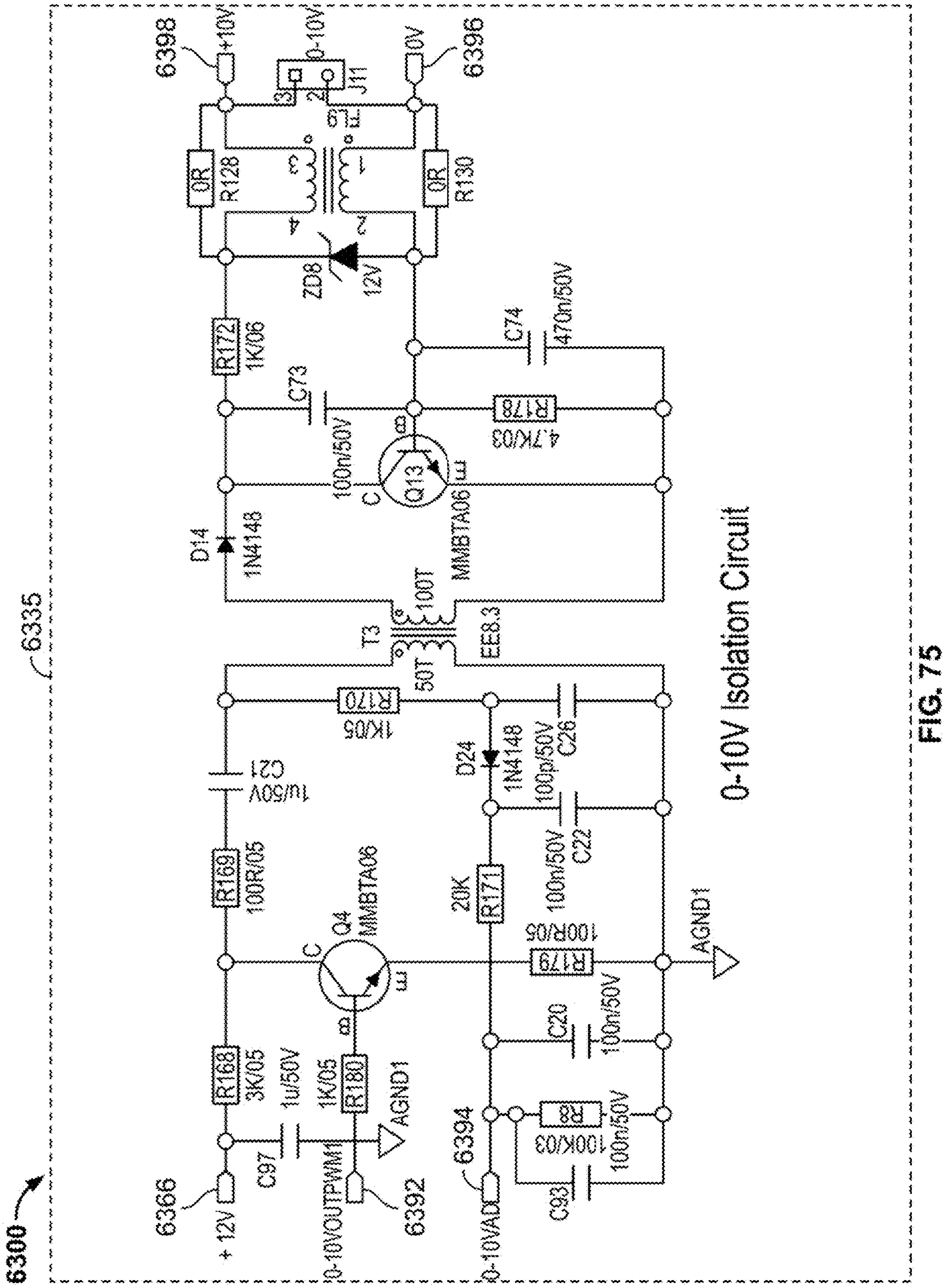
FIG. 75 shows illustrative apparatus in accordance with principles of the invention.

FIG. 75 shows illustrative circuit 6300. Circuit 6300 may include 0-10V circuitry 6335. 0-10V circuitry 6335 may receive power through terminal 6366. 0-10V circuitry 6335 may receive signals corresponding to a user selected 0-10V dimming level from microcontroller 6327 through terminals 6392 (0-10VOUTPWM1) and 6394 (0-10VAD). 0-10V circuitry 6335 may translate the user-selected 0-10V dimming level into output voltage levels. 0-10V circuitry 6335 may output voltage levels corresponding to the user selected 0-10V dimming level. 0-10V circuitry 6335 may output voltage levels corresponding to the user selected 0-10V dimming level through output channels 6398 (10V) and 6396 (0V). Output channels 6398 and 6396 may be connected to the LED modules. The voltage levels output by 0-10V circuitry 6335 may control the dimming level of the connected LED modules.

Figure 76:
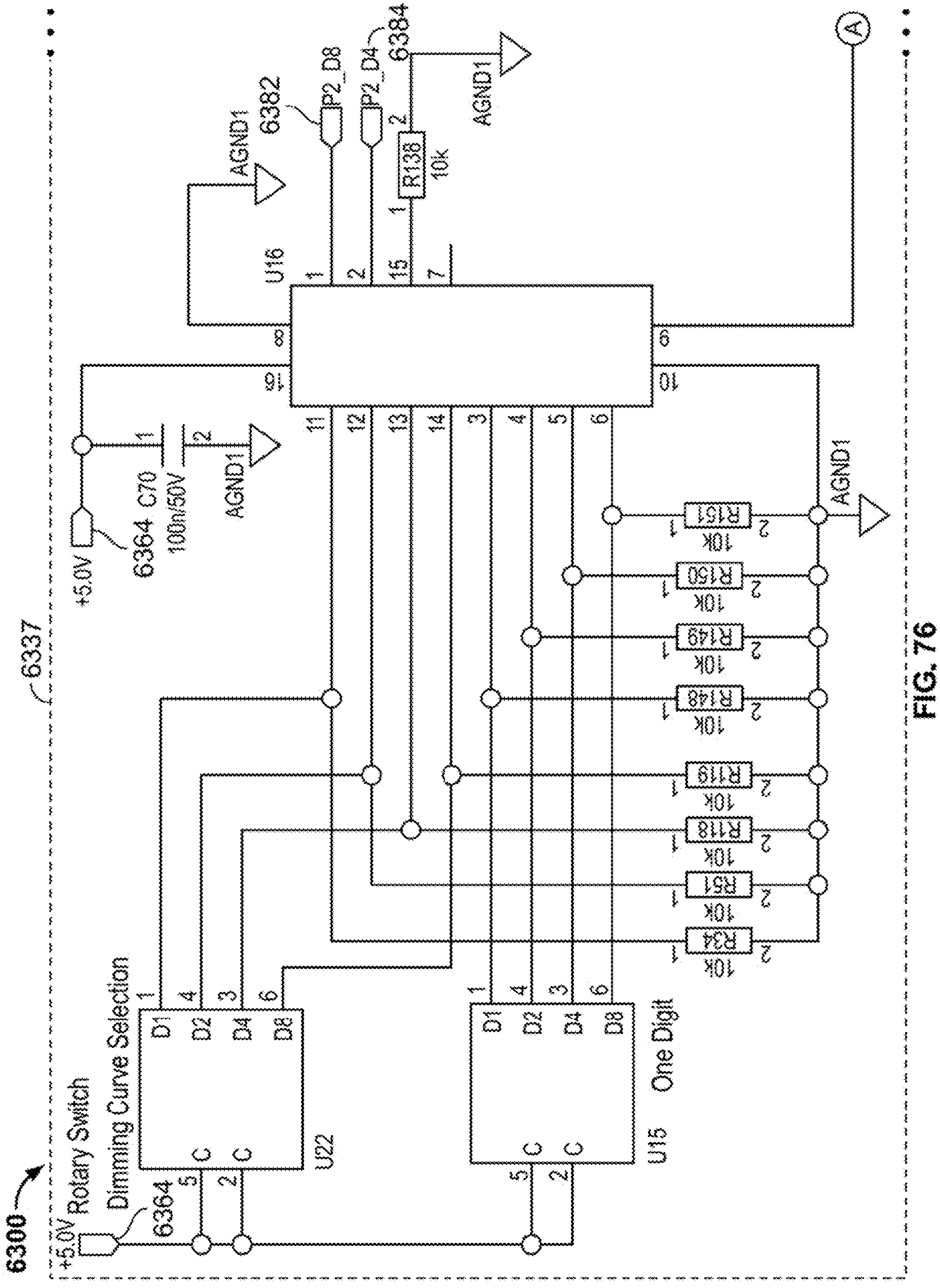
FIG. 76 shows illustrative apparatus in accordance with principles of the invention.
Figure 76:
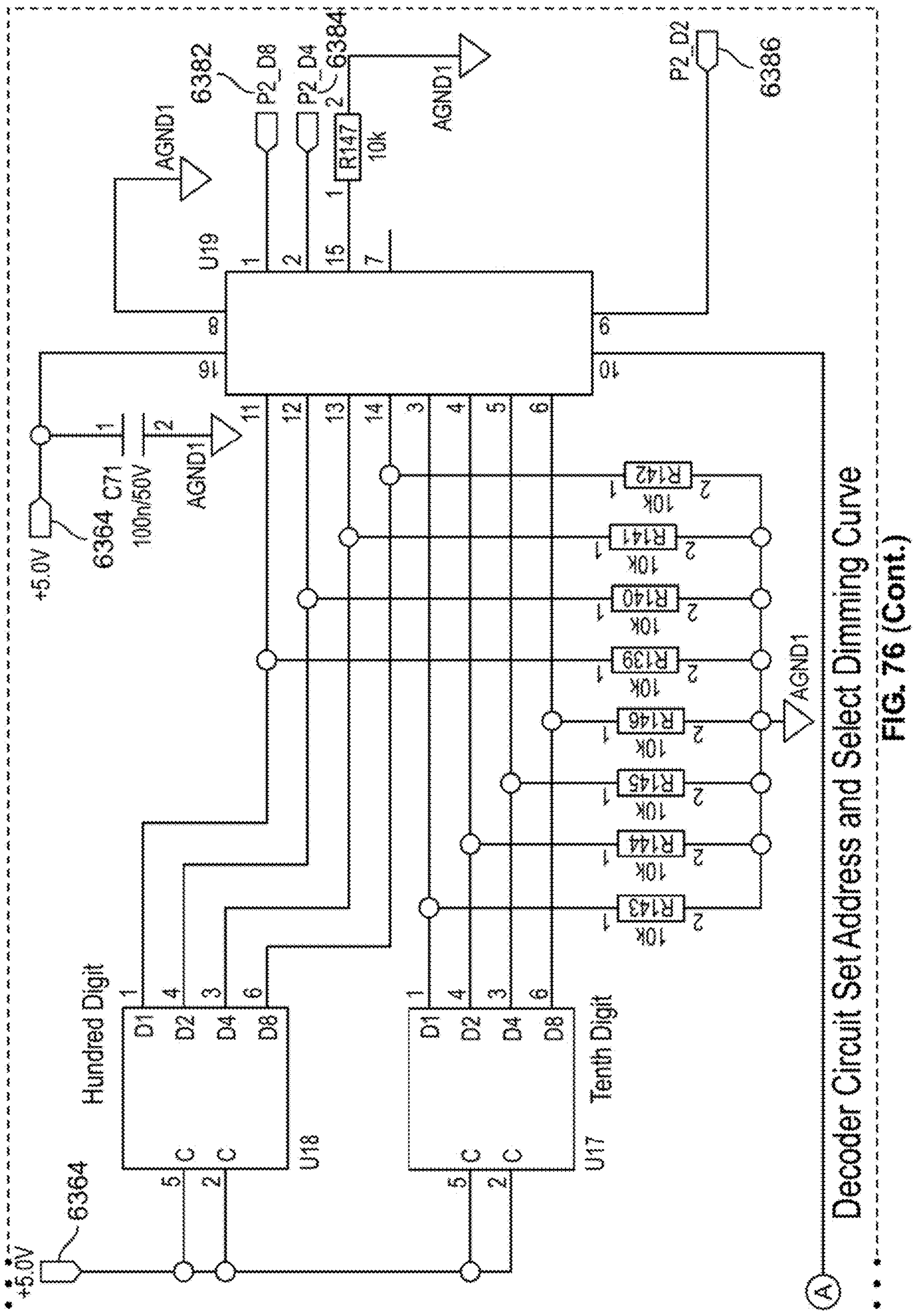

FIG. 76 shows illustrative circuit 6300. Circuit 6300 may include dimming curve selection circuitry 6337. Dimming curve selection circuitry 6337may be used to select a dimming curve. Dimming curve selection circuitry 6337 may receive power through terminal 6364. Dimming curve selection circuitry 6337 may include a plurality of shift registers and rotary encoding switches. A dimming curve may be selected using the plurality of shift registers and rotary encoding switches Dimming curve selection circuitry 6337 may transmit the selected dimming curve to microcontroller 6327. Dimming curve selection circuitry 6337 may transmit the selected dimming curve to microcontroller 6327 through terminals 6382 (P2_D8), 6384 (P2_D4), and 6386 (P2_D2). Terminal 6382 may be an enable pin. Terminal 6382 may be active at a low level. Microcontroller 6327 may set terminal 6382 and a parallel data input from DO-D7 will be asynchronously read into the register (1 pin). Terminal 6384 may be a clock input pin. Terminal 6384 may control the output of terminal 6386. Terminal 6386 may transmit the data output to microcontroller 6327.

Figure 77:
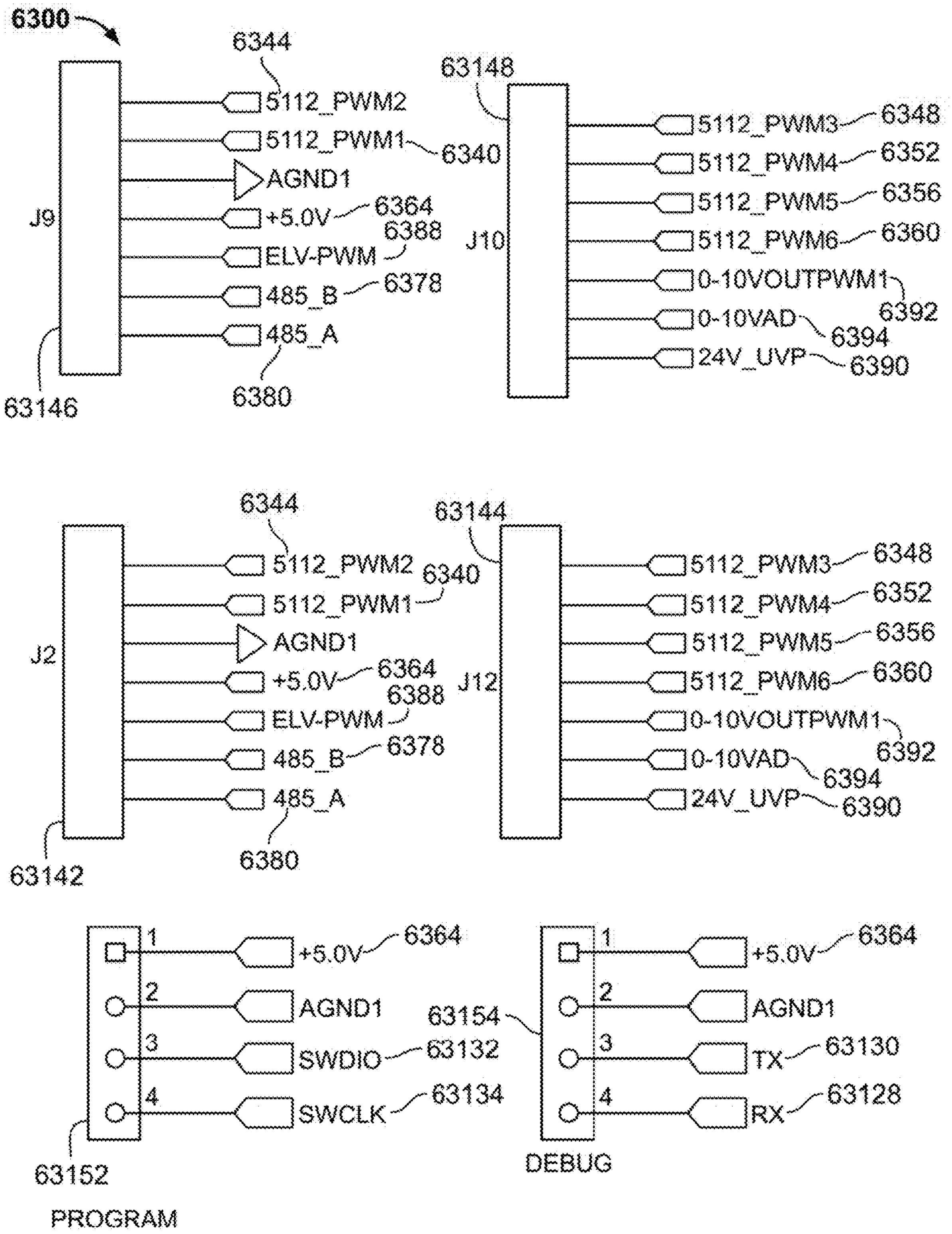
FIG. 77 shows illustrative apparatus in accordance with principles of the invention.

FIG. 77 shows illustrative circuit 6300. Circuit 6300 may include connectors 63146 (J9), 63148 (J10), 63142 (J2), 63144 (J12), 63152 (PROGRAM) and 63154 (DEBUG). Connectors 63146, 63148, 63142, 63144, 63152 and 63154 may be used to connect different terminals within circuit 6300.

Circuit 6300 may include one or more of the items, along with illustrative descriptions of the items, listed in Table 13.

TABLE 13

Illustrative items.

| Material Description | Component Tag |
|---|---|
| 1/10 W SMD resistor, 100 R ± 1% (0603) | R24 |
| 1/10 W SMD Resistor 430 R ± 1% (0603) | R5 |
| 1/10 W SMD Resistor, 2K ± 1% (0603) | R58, R113 |
| 1/10 W SMD Resistor, 3K ± 1% (0603) | R27 |
| 1/10 W SMD Resistor, 1.5K ± 1% (0603) | R69 |
| 1/10 W SMD Resistor, 3K ± 1% (0603) | R44 |
| 1/10 W SMD Resistor_4.7K ± 1% (0603) | R21 |
| 1/10 W SMD Resistor 5.6K = 1% 0603 | R33 |
| 1/10 W SMD Resistor, 1K ± 1% (0603) | R35, R47 |
| 1/10 W SMD Resistor_10K ± 1% (0603) | R26, R23, R67, R59, R36 |
| 1/10 W SMD Resistor 9.1K ± 1% 0603 | R41 |
| 1/10 W SMD Resistor_12K ± 1% (0603) | R43 |
| 1/10 W SMD Resistor, 4.3K ± 1% (0603) | R56 |
| 1/10 W SMD Resistor, 6.8K ± 1% (0603) | R42 |
| 1/10 W SMD Resistor_10K ± 1% (0603) | R45, R32 |
| 1/10 W SMD Resistor_28K ± 1% (0603) | R19 |
| 1/10 W SMD Resistor, 39K ± 1% (0603) | R18 |
| 1/10 W SMD Resistor, 51K ± 5% (0603) | R17 |
| 1/10 W SMD Resistor, 75K ± 1% (0603) | R68 |
| 1/10 W SMD Resistor_30K ± 1% (0603) | R25, R39 |
| 1/10 W SMD Resistor, 200K ± 1% (0603) | R20 |
| 1/10 W SMD Resistor_270K ± 1% (0603) | R11 |
| 1/10 W SMD Resistor 820K ± 5% (0603) | R57 |
| 1/8 W SMD Resistor 75 R = 1% (0805) | R66 |
| 1/8 W SMD Resistor, 3K ± 1% (0805) | R60, |
| 1/8 W SMD Resistor 5.1K = 1% 0805 | R206 |
| 1/8 W SMD Resistor, 47 R ± 1% (0805) | R13, R28, R49 |
| 1/8 W SMD Resistor, 10K ± 1% (0805) | R16 |
| 1/8 W SMD Resistor, 47KΩ ± 1% (0805) | R29, R50 |
| 1/4 W SMD Resistor, 4.7K ± 1% (1206) | R31, R48 |
| 1/4 W SMD Resistor 0.82 R ± 1% (1206) | R46, R46B, R46C, R46D, R46A |
| 1/4 W SMD Resistor, 3.6K ± 1% (1206) | R205 |
| 1/4 W SMD Resistor, 100K ± 5% (1206) | ZD2 |
| 1/4 W SMD Resistor, 510K ± 5% (1206) | R1, R2, R3, R4 |
| 1/4 W SMD Resistor 1M5 ± 1% 1206 | R14, R15, R30 |
| 1/4 W SMD Resistor_3M ± 5% (1206) | R37, R38, R40 |
| 1/4 W SMD Resistor, 5.1 R ± 1% (1206) | R55, R204 |
| 1 W SMD Alloy Resistor 0.02 R ± 1% (2010) | R52 |
| 3/4 W SMD Resistor 1.0K ± 5% (2010) | R64 |
| NPO SMD Capacitor 470 PF/50 V ± 5% 125° C. (0603) | C33, C86 |
| X7R SMD Capacitor 1 nF/50 V, ± 10%, 125° C. (0603) | C19, C23, C3 |
| X7R SMD Capacitor 10 nF/50 V, ± 10%, 125° C. (0603) | C25, C34 |
| X7R SMD Capacitor 33 nF/50 V ± 10%_125° C. (0603) | C16, C18 |
| X7R SMD Capacitor 100 nF/50 V, ± 10%, 125° C. (0603) | C29, C17, C78 |
| X7R SMD Capacitor 1 uF/50 V, ± 10%, 125° C. (0603) | C11, C12, C24, C8, C36, C5, C30, C31 |
| X7R SMD Capacitor 2.2 uF/25 V, ± 10%, 125° C. (0805) | C35 |
| X7R SMD Capacitor 470 nF/50 V, ± 10%, 125° C. (0603) | C14, C32 |
| X7R SMD Capacitor 100 nF/50 V, ± 10%, 125° C. (0805) | C9, C89, C87 |
| NPO SMD Capacitor 10 PF 1K V ± 5% 125° C. 1206 | C27, C27A |
| X7R SMD Capacitor 1 uF/50 V, ± 10%, 125° C. (1206) | C90 |
| X7R SMD Capacitor 100 pF/1K V, ± 10%, 125° C. (1206) | C6, C10, C15 |
| NPO SMD Capacitor 150 pF/1K V, ± 10%, 125° C. (1206) | C28 |
| 47 pF/50 V, ± 5%, 125° C. (0805) | C75 |
| SMD switching diode, 1N4148W, 0.15 A/75 V, SOD-123 | D30 |
| SMD Voltage Regulator Diode 5.1 V/0.5 W SOD-123 | ZD6 |
| 1/8 W SMD Resistor, 1.8K ± 1% (0805) | R183 |
| SMD NPN Transistor MMBTA44 VCEO 400 V TO-236 | Q14 |
| SMD N-MOSFET, UTC 4N65KG-TN3-R, TO-252 | Q15 |
| 1/4 W SMD Resistor, 220K ± 5% (1206) | R182, R184, R199, R200 |
| 1/4 W SMD Resistor, 10 R ± 1% (1206) | R185, R186 |
| SMD Schottky diode 0.35 A/40 V, SD103AW, SOD-123 | D7 |
| SMD Rectifier Diode, 1 A/1000 V, SOD-123 | D3, D5, D8, D26, D25 |
| Ultra-fast recovery diode ES1JW 1 A/600 V SOD-123FL | D4 |
| SMD switching diode, 1N4148W, 0.15 A/75 V, SOD-123 | D20, D19, D13, D12, D28, D1, D17, D16 |
| SMD switching diode, SOD1F6, 1 A/600 V, SOD-123FL | D9 |
| SMD Voltage Regulator Diode, 13 V, 0.5W, SOD-123 | ZD1, ZD7 |
| SMD NPN Transistor 2SD1760U_SOT-89_60 V/3A | Q18, Q5 |
| New SMD NMOS 13 A 700 V CRJD360N70G2 TO-252 | Q1 |
| SMD NMOS 8NM65L-TN3-R 8A 650 V R = 0.6 TO-252 | Q2, Q3 |
| SMD IC BP8519C SOT23-5 Tray Packaging RoHS | U1 |
| SMD optocoupler BL817S-C, 4-pin, Galaxy | U2 |
| SMD Power IC, ON, NCP1654BD65R2G SO-8, Reel Packaging, ROHS | U3 |
| SMD Power IC, MPS HR1001BGS SOIC-16 Reel Packaging, ROHS | U7 |
| SMD Voltage Regulator IC TL431(SOT-23) = 1% | U4, U26 |

TABLE 13-continued

Illustrative items.

| Material Description | Component Tag |
|---|---|
| SMD IC, BL78L05, SOT-89 | U6 |
| SMD Operational Amplifier IC LM258(SO-8) | U5 |
| Double-sided PCB FR4 250 * 90 * 1.6 MM 1 * 2 contiguous 1 OZ ROHS | |
| 1/10 W SMD Resistor, 20K ± 5% (0603) | R175 |
| 1/10 W SMD Resistor, 3K ± 1% (0603) | R177 |
| 1/4 W SMD Resistor, 1 R ± 1% (1206) | R173, R174 |
| X7R SMD Capacitor 100 nF/50 V, ±10%, 125° C. (0805) | C81, C83, C84 |
| SMD Schottky diode, DSK26, 2A/60 V, SOD-123FL | D27 |
| SMD IC MC34063A SOP-8 VCC −0.3-±40 V RoHS | U24 |
| SMD Inductor 22 uH = 10% 5.8 * 5.2 * 2.1 mm | L13 |
| 1/8 W SMD Resistor, 4.7K ± 1% (0805) | R81, R83 |
| 1/10 W SMD Resistor, 2K ± 1% (0603) | R84 |
| X7R SMD Capacitor 100 nF/50 V, ± 10%, 125° C. (0603) | C101 |
| NPO SMD Capacitor 330 pF/1000 V, ± 5%, 125° C. (1206) | C98 |
| SMD Voltage Regulator Diode, 10 V/0.5 W, BZT52B10SOD-123 | ZD8, ZD9, ZD10, ZD11 |
| Ultra-fast recovery diode ES1JW 1A/600 V SOD-123FL | D29 |
| X7R SMD Capacitor 10 nF/100 V ± 10% 125° C. (0805) | C99 |
| 1/8 W SMD Resistor, 10K ± 1% (0805) | R6 |
| 1/4 W SMD Resistor, 10K ± 5% (1206) | R7 |
| MOSFET 2N7002 60 V/250mA SOT-23 | Q6 |
| SMD N-MOSFET_3A/60V_UT3N06G-AB3-R_SOT-89 | Q7 |
| SMD IC Huihai H5112A SOP8 RoHS | U8, U9, U10, U11, U12, U13 |
| SMD Schottky diode 5 A/60 V, SS56, SMA | D2, D6, D18, D21, D22, D23 |
| SMD Ferrite Bead, 16062, 6 A, 1206 | LF1, LF2, LF3, LF4, LF5, LF6 |
| X7R SMD Capacitor 1 nF/500 V ± 10% 125° C. (1206) | C39, C44, C49, C54, C59, C64 |
| X7R SMD Capacitor 10 nF/250 V, ± 10%, 125° C. (1206) | R62, R78, R89, R100, R111, R125 |
| 1/4 W SMD Resistor, 3K ± 1% (1206) | R65, R85, R96, R107, R121, R132 |
| X7R SMD Capacitor 2.2 uF/25 V, ± 10%, 125° C. (0805) | C38, C43, C48, C53, C58, C63 |
| X7R SMD Capacitor 1 uF/50 V, ± 10%, 125° C. (1206) | C41, C46, C51, C56, C61, C66 |
| 1/10 W SMD Resistor_10K ± 1% (0603) | R63, R79, R90, R101, R112, R126 |
| 1/10 W SMD Resistor, 5.1K ± 1% (0603) | C37, C42, C47, C52, C57, C62 |
| 1/4 W SMD Resistor, 1 R ± 1% (1206) | R73, R53, R82, R70, R87, R88, R98, R99, R109, R110, R123, R124 |
| 1/4 W SMD Resistor, 2.2 R ± 1% (1206) | R129, R116, R104, R93, R77, R54, R61, R76, R86, R97, R108, R122 |
| SMD Inductor 100 uH ± 20% 1.4 A 8 * 8 * 6.5 mm | L5, L6, L8, L9, L10, L11 |
| SMD transistor MMBTA06, 1GM (SOT-23) | Q16 |
| 1/4 W SMD Resistor, 220K ± 5% (1206) | R187, R188 |
| 1/8 W SMD Resistor, 22K ± 1% (0805) | R189 |
| 1/8 W SMD Resistor, 1K ± 1% (0805) | R190 |
| 1/8 W SMD Resistor, 2.2K ± 1% (0805) | R191 |
| SMD optocoupler BL817S-C, 4-pin, Galaxy | U20 |
| 1/8 W SMD Resistor, OR ± 5% (0805) | R202, R203, R201 |
| SMD Voltage Regulator Diode 5.1 V/0.5 W SOD-123 | ZD5 |
| 1/8 W SMD Resistor, 1.5K ± 1% (0805) | R181 |
| 1/8 W SMD Resistor, 10K = 1% (0805) | R192 |
| 1/8 W SMD Resistor, 1K ± 1% (0805) | R193 |
| MOSFET 2N7002 60 V/250 mA SOT-23 | Q17 |
| X7R SMD Capacitor 1 uF/50 V, ± 10%, 125° C. (0603) | C97 |
| 1/4 W SMD Resistor, 3K ± 1% (1206) | R168 |
| 1/8 W SMD Resistor, 10002 ± 1% (0805) | R169, R179 |
| 1/8 W SMD Resistor, 1K ± 1% (0805) | R180, R170 |
| SMD transistor MMBTA06, 1GM (SOT-23) | Q4, Q13 |
| X7R SMD Capacitor 1 uF/50 V, ± 10%, 125° C. (0805) | C21 |
| SMD switching diode, 1N4148W, 0.15 A/75 V, SOD-123 | D24, D14 |
| 1/10 W SMD Resistor, 20K ± 5% (0603) | R171 |
| NPO SMD Capacitor 100 pF/50 V_ ± 5%_125° C. (0603) | C26 |
| X7R SMD Capacitor 100 nF/50 V, ± 10%, 125° C. (0603) | C22, C20 |
| 1/10 W SMD Resistor, 100K ± 5% (0603) | R8 |
| X7R SMD Capacitor 100 nF/50 V, ± 10%, 125° C. (0805) | C73 |
| 1/4 W SMD Resistor, 1K ± 5% (1206) | R172 |
| SMD Voltage Regulator Diode 12 V ± 2%/MM1ZB12 0.5 W SOD-123 | ZD3 |
| 1/8 W SMD Resistor, 4.7K ± 1% (0805) | R178 |
| X7R SMD Capacitor 470 nF/50 V, ± 10%, 125° C. (0805) | C74 |
| X7R SMD Capacitor 1 uF/50 V, ± 10%, 125° C. (0805) | C95 |
| X7R SMD Capacitor 100 nF/50 V, ± 10%, 125° C. (0805) | C96, C70, C71 |
| SMD IC MCU Mesilicon ME32F031C8T6 LQFP48 | U14 |
| SMD IC, 74HC165, SOIC-16 | U16, U19 |
| 1/10 W SMD Resistor_10K ± 1% (0603) | R138, R150, R148, R151, R149, R34, R118, R51, R119, R166, R139, R140, R141, R142, R147, R14 3, R144, R145, R146 |
| X7R SMD Capacitor 100 nF/50 V, ± 10%, 125° C. (0603) | C94, C79, C68, C69, C80, C92, C93, C67 |
| 1/10 W SMD Resistor_10K = 1% (0603) | R133 |
| 1/8 W SMD Resistor 5.1K ± 1% 0805 | R167 |

TABLE 13-continued

Illustrative items.

| Material Description | Component Tag |
|---|---|
| Chip IC MAX14781EESA ± SO-8 | U31 |
| Chip resettable fuse 0.05 A/60 V(1206) | R165, R164 |
| 1/4 W SMD Resistor, 5.1 R ± 1% (1206) | R162, R163 |
| SMD bidirectional TVS tube 7 V/12 V (SOT-23) SM712 | ZD4 |
| 1/8 W SMD Resistor, 47KΩ ± 1% (0805) | R153, R161 |
| 1/10 W SMD Resistor, 1K = 1% (0603) | R156, R160, R159 |
| 1/10 W SMD Resistor, 22 R ± 5% (0603) | R157, R158, R154 |
| X7R SMD Capacitor 100 nF/50 V, ± 10%, 125° C. (0805) | C72 |
| 1/10 W SMD Resistor_10K ± 1% (0603) | R155 |
| SMD NMOS LBSS138LT1G 0.2 A/50 V SOT-23 | Q12 |
| 1/8 W SMD Resistor 5.1K = 1% 0805 | R71 |
| Slow-blow Square Fuse 3.15 A 300 V 8.5 * 8 * 4.5 12.7 Hole Spacing Tape Packaged | F1 |
| Thermistor NTC 5D-9 5 R = 20% Inner Bent Leads | RT1 |
| Varistor Φ 10 mm 510 V ± 10% 7.5 P Tape Packaged High Surge | RV1 |
| Varistor Φ 7 mm 510 V ± 10% 7.5 P Tape Packaged | RV2 |
| Varistor Φ 7 mm 560 V ± 10% 7 P Tape Packaged | RV3 |
| X2 Safety Capacitor 0.1 uF/305 V ± 10% P = 10 T = 5 | CX1, C2 |
| X2 Safety Capacitor 0.1 uF/305 V = 10% P = 10 T = 5 | CX2 |
| X2 Safety Capacitor 0.22 uF/310 V ± 10% P = 10 L = 3.0 | C1 |
| Iron-Silicon-Aluminum Inductor 250UH MIN Magnetic Core KS050-125A Vertical | L1, L3 |
| Common-Mode Inductor UU10.5 (70:70) 22 mH MIN | FL4 |
| Common mode inductor T13X8X6.5 1.9 mH | FL2 |
| Common mode inductor T13 * 7 * 5 18 uH ± 20% | FL10 |
| Y1 safety capacitor 2.2 nF/400 V ± 20% P = 10 | CY7 |
| Plug-in Bridge Rectifier 4 A 1000 V GBP410 GBP | BD1 |
| Iron-Silicon-Aluminum Inductor 430 UH MIN Magnetic Core KS065-125 Vertical | L7 |
| Y2 safety capacitor 1 NF 300 V ± 20% Y5P P-7.5 pin length L = 3.5 MM | CY2, CY4 |
| Electrolytic capacitor 1 uF/500 V ± 20% 105° C. Φ 6.3 * 11 | EC1 |
| Plug-in color ring inductor CKL0510 2.8 mH J-CCA | L2 |
| Ultrafast Diode 10 A/600 V SF1008F ITO-220 AC | D15 |
| Electrolytic capacitor 22 uF ± 20% 50 V 105° C. Φ 5 * 11 mm 7000 H | EC2, EC3, EC4, C82, C85 |
| Electrolytic Capacitor FT 33 UF/500 V ± 20% 105° C. 6000 H Φ 16 * 25 | C4 |
| MMKP82 bimetallic polypropylene capacitor 18 NF/1000 V ± 5% P = 10 L = 3.5 | C7 |
| Electrolytic Capacitor 1500 uF 35 V ± 20% 105° C. @13 * 20 6K Hole Spacing Tape Packaged | EC5 |
| Electrolytic Capacitor RJ 680 UF/35 V = 20% 105° C. Φ 10 * 16 Pin Length 3.0 MM | EC6 |
| Schottky Diode 20 A/100 V PS20U100FCT ITO-220AB | D10, D11 |
| PFC transformer PQ2620 0.1 * 30 * 65.5 L = 550 UH pin length 3.0 MM | L4 |
| Main transformer ER28 horizontal double slot 54:6:6 L = 1.1 MH pin length 3.0 MM | T2 |
| Electrolytic Capacitor 100 uF/35 V ± 20% 105° C. Φ 6.3 * 11 12.7 Hole Spacing Tape Packaged | C40, C45, C50, C55, C60, C65 |
| 18# White Teflon Wire, Length 220, Partially Stripped 13/Tin-dipped 3 | N |
| 18# Black Teflon Wire, Length 220, Partially Stripped 13/Tin-dipped 3 | L |
| Ferrite Bead, RH 3.5 * 3 * 1.5 Nickel-Zinc | D10, D11, D15 pins |
| Zhengdasheng Instant Adhesive 221F | Fixed Ferrite Bead |
| PH2.54 2 × H 2.54 × 7 PIN L = 22 mm single-row pin header | J9, J10(Connecting A/B panel) |
| 2W small-volume plug-in wire-wound resistor 100 R ± 5% tape packaged | R72 |
| Red, black, and white button terminal block, 2 sets DA805-550-2P UL certified | J1, J3, J4, J5, J6, J7 |
| Transformer EE8.3 100: 50 26 mH = 30% | T3 |
| Common-Mode Inductor 9 * 5 *3 200 uH | FL1, FL3, FL5, FL6, FL7, FL8, FL9 |
| Purple, Pink, and white button terminal block, 2 sets DA805-550-2P UL certified | J11 |
| Single-sided PCB CEM-1 164 * 24 * 1.6 mm 2 * 5 Panel, RoHS | D10, D11 side |
| 10-position rotary encoding switch | U22, U15, U17, U18 |
| 2-speed toggle switch vertical plug P = 2.5 mm | S1 |
| Dual network port female terminal RJ45 | T1 |
| 6-way output MCU firmware 0-10 V version ME32F031C8T6 REV.A | |
| DMX top cover baked enamel BK | |
| PS-0600A-UR6-X Plug Assembly | |
| Insulation sheet B | |
| Insulation sheet B | |

TABLE 13-continued

Illustrative items.

| Material Description | Component Tag |
|---|---|
| Main body welding component, baked enamel finish BK | |
| PS-0600A-UR6-X DMX version silk screen | |
| 5.2 round head Phillips screw M3 * 0.5 tooth length 5 dyed black | |
| @6.6 Round Head Phillips Screws 5/32 | |
| Xishun Two-Component Sealing Adhesive, Barrel Packaging, 280 KG | |
| Single-Component White Sealing Silicone, XS1110C | |
| 3011 Protective Wire Sleeve, Black | |
| Terminal Cover Plate, Baked Enamel Finish BK | |
| Gray Thermal Conductive Silicone Pad, 164 × 5 × 5 | |
| 18# Green Teflon-Coated Lead Wire, Length 220, Tin-Dipped | |
| 13/3.2 Ring Terminal | |
| 120-277 V dimming power supply 6-way output 2-21 V 600 MA DMX version | |
| WAC inner box B9B according to the parameters | |
| 130 * 80 * 350 mm | |
| Pearl Wool 16 kg 125 * 75 * 50 mm | |
| WAC Outer Box A = B 365 * 275 * 280 mm | |
| Plastic bag 400 * 150 mm T = 0.025 mm opening on the short side punched according to the standard | |

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 11" should be considered to include any and all subranges between (and inclusive of) the minimum value of 1 and the maximum value of 11; that is, all subranges beginning with a minimum value of 1 or more (e.g. 1 to 6.1), and ending with a -36-maximum value of 11 or less (e.g., 2.3 to 10.4, 3 to 8, 4 to 7), and finally to each number 1, 2, 3, 4, 5, 6, 7, 8, 10, and 11 contained within the range.

Thus, apparatus, methods and apparatus for lighting have been provided. Persons skilled in the art will appreciate that the present invention may be practiced by other than the described embodiments, which are presented for purposes of illustration rather than of limitation.

What is claimed is:

1. Apparatus for lighting, the apparatus comprising:

a removable recess lighting assembly that:

includes a light-emitting diode ("LED") light source; and defines a central axis; and a housing, configured to be mounted in a structure, including a heat sink that: includes fines; and is configured to:

retain the lighting assembly; and release the lighting assembly in response to a translation of the lighting assembly along the central axis without a rotation of the lighting assembly about the central axis.

2. The apparatus of claim 1 wherein the LED light source is configured as a downlight.

3. The apparatus of claim 1 wherein the lighting assembly is magnetically retained by the heat sink.

4. The apparatus of claim 1 wherein the structure is a ceiling.

5. The apparatus of claim 1 wherein the lighting assembly includes:

a light engine base; and an LED brace that is configured to be fastened to the light engine base.

6. The apparatus of claim 1 further including:

a reflector; and a spackle plate;

wherein the reflector is:

positioned to form a beam of light emitted by the LED light source; and configured to engage the spackle plate.

7. The apparatus of claim 1 wherein the LED light source and the heat sink are configured such that the heat sink draws heat from the LED light source when the lighting assembly is magnetically retained by the heat sink.

8. The apparatus of claim 1 wherein the lighting assembly includes a material that is configured to magnetically connect to the heat sink.

9. The apparatus of claim 8 wherein the material is ferromagnetic.

10. The apparatus of claim 1 further comprising a tool for removing the lighting assembly from the heat sink, the tool comprising:

a handle comprising a first extension member; and a tubular base comprising a second extension member;

wherein the tubular base is configured to be releasably connected to the handle.

11. The apparatus of claim 10 wherein the tubular base is configured to be threadingly attached to the handle.

12. The apparatus of claim 10 wherein:

the apparatus includes a reflector; and the first extension member is configured to detach the reflector from the apparatus.

13. The apparatus of claim 10 wherein the second extension member is configured to:

engage with a receptacle in the lighting assembly; and release the lighting assembly, along a central axis of the lighting assembly, in response to a force from a user.

14. The apparatus of claim 3 wherein:

the structure includes a panel; and the housing is mounted on a first side of the panel.

15. The apparatus of claim 14 wherein the panel includes plaster.

16. The apparatus of claim 14 wherein the panel includes sheet rock.

17. The apparatus of claim 14 further comprising a spackle plate configured to:

be disposed flush against a second side of the panel; and retain a surface treatment.

18. The apparatus of claim 17 wherein the lighting assembly is configured to be removable through an aperture defined by the spackle plate.

19. The apparatus of claim 17 further including:

a thermally insulating bushing;

a thermally insulating gasket; and a spacer;

wherein the thermally insulated bushing, the thermally insulated gasket, and the spacer are configured to reduce an amount of heat conducted from the LED light source to the spackle plate.

20. The apparatus of claim 17 further including:

a power lead that is configured to provide power to the LED light source; and a connector that is attached to an end of the power lead;

wherein the end is configured to be accessible, to a user, below the spackle plate when the lighting assembly is released from the heat sink.

21. The apparatus of claim 1 further comprising a power supply that is configured to be disposed outside the housing.

22. The apparatus of claim 1 further comprising a power supply that is configured to be disposed inside the housing.

23. The apparatus of claim 17 wherein the lighting assembly is configured to be removed from the structure without causing damage to the panel or surface treatment.

24. The apparatus of claim 17 wherein the lighting assembly is removable from the structure without removal of the spackle plate.

25. The apparatus of claim 18 wherein:

the heat sink has a diameter;

the aperture has a second diameter;

the first diameter is larger than the second diameter; and the heat sink is not removable through the aperture.

26. The apparatus of claim 1 wherein the lighting assembly is configured to be removed from the structure without causing damage to the structure.

27. The apparatus of claim 1 wherein the lighting assembly is removable from the structure without removal of a spackle plate.

28. The apparatus of claim 3 wherein the lighting assembly is configured to be removed from the structure without causing damage to the structure.

29. The apparatus of claim 3 wherein the lighting assembly is removable from the structure without removal of a spackle plate.

* * * * *